US012236540B2

(12) United States Patent
Estany Rodriguez et al.

(10) Patent No.: US 12,236,540 B2
(45) Date of Patent: Feb. 25, 2025

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Miquel Estany Rodriguez, San Francisco, CA (US); Wan Si Wan, Sunnyvale, CA (US); Gregory M. Apodaca, Colbert, WA (US); William A. Sorrentino, III, Mill Valley, CA (US); James J. Owen, San Francisco, CA (US); Pol Pla I. Conesa, San Francisco, CA (US); Alan C. Dye, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 95 days.

(21) Appl. No.: 17/950,035

(22) Filed: Sep. 21, 2022

(65) Prior Publication Data
US 2023/0114043 A1  Apr. 13, 2023

Related U.S. Application Data

(60) Provisional application No. 63/328,686, filed on Apr. 7, 2022, provisional application No. 63/248,381, filed on Sep. 24, 2021.

(51) Int. Cl.
*G06T 19/00* (2011.01)
(52) U.S. Cl.
CPC ........ *G06T 19/006* (2013.01); *G06T 2200/24* (2013.01)
(58) Field of Classification Search
CPC ............... G06T 19/006; G06T 2200/24; G06F 3/04815; G06F 3/0482; G06F 3/04842;
(Continued)

(56) References Cited

U.S. PATENT DOCUMENTS 9,949,021 B1    4/2018  Voigt et al.
2002/0022515 A1  2/2002  Boku et al.
(Continued)

FOREIGN PATENT DOCUMENTS

| JP | 2007-018173 A | 1/2007 |
| WO | WO 2018200337 A1 | 11/2018 |
| WO | WO 2019079826 A1 | 4/2019 |

OTHER PUBLICATIONS

Invitation to Pay Additional Fees, dated Jan. 20, 2023, received in International Patent Application No. PCT/US2022/044577, which corresponds with U.S. Appl. No. 17/950,035, 22 pages.
Levin et al., "Passive Light and Viewpoint Sensitive Display of 3D Content", 2016 IEEE International Conference on Computational Photography (ICCP), May 2016, 16 pages.
Office Action, dated Jun. 30, 2023, received in U.S. Appl. No. 17/030,219, 40 pages.

(Continued)

*Primary Examiner* — Chong Wu
(74) *Attorney, Agent, or Firm* — Morgan, Lewis & Bockius LLP

(57) ABSTRACT

A computer system concurrently displays a view of a physical environment; and a computer-generated user interface element overlaid on the view of the physical environment. An appearance of the computer-generated user interface element is based on an appearance of the view of the physical environment on which the computer-generated user interface element is overlaid. In response to an appearance of the physical environment changing, the appearance of the computer-generated user interface element is updated at a first time based on a graphical composition of the appearance of one or more portions of the physical environment at different times prior to the first time, including: an appearance of a first portion of the physical environment at a second time that is before the first time; and an appearance of a second portion of the physical environment at a third time that is before the second time.

60 Claims, 32 Drawing Sheets

(58) Field of Classification Search
CPC ......... G06F 3/04845; G06F 2203/0381; G06F 2203/04804; G06F 3/013; G06F 3/017; G06F 3/011
See application file for complete search history.

(56) References Cited

U.S. PATENT DOCUMENTS

| | | |
|---|---|---|
| 2007/0236485 A1 | 10/2007 | Trepte |
| 2014/0043321 A1 | 2/2014 | Matjasko et al. |
| 2015/0110263 A1 | 4/2015 | Johnston et al. |
| 2016/0364914 A1 | 12/2016 | Todeschini |
| 2017/0026509 A1 | 1/2017 | Rand |
| 2018/0357780 A1 | 12/2018 | Young et al. |
| 2019/0139307 A1 | 5/2019 | Min |
| 2019/0235729 A1 | 8/2019 | Day et al. |
| 2019/0318534 A1 | 10/2019 | Mory et al. |
| 2021/0096726 A1* | 4/2021 | Faulkner ............... G06T 19/006 |
| 2021/0319778 A1 | 10/2021 | Lerner et al. |
| 2022/0083197 A1 | 3/2022 | Rockel et al. |
| 2022/0092862 A1 | 3/2022 | Faulkner et al. |
| 2022/0229524 A1 | 7/2022 | McKenzie et al. |
| 2024/0404189 A1 | 12/2024 | Owen et al. |

OTHER PUBLICATIONS

Final Office Action, dated Oct. 12, 2023, received in U.S. Appl. No. 17/030,219, 44 pages.

Office Action, dated Jun. 6, 2023, received in European Patent Application No. 20789388.4, which corresponds with U.S. Appl. No. 17/030,219, 16 pages.

Office Action, dated Apr. 25, 2023, received in Japanese Patent Application No. 2022-515137, which corresponds with U.S. Appl. No. 17/030,219, 7 pages.

International Search Report and Written Opinion, dated Jun. 20, 2023, received in International Patent Application No. PCT/US2022/044579, which corresponds with U.S. Appl. No. 17/950,795, 16 pages.

Notice of Allowance, dated Aug. 2, 2024, received in Japanese Patent Application No. 2022-515137, which corresponds with U.S. Appl. No. 17/030,219, 2 pages.

Invitation to Pay Additional Fees, dated Sep. 12, 2024, received in International Patent Application No. PCT/US2024/025058, which corresponds with U.S. Appl. No. 18/639,759, 11 pages.

Office Action, dated Oct. 31, 2024, received in Chinese Patent Application No. 2022104017449, which corresponds with U.S. Appl. No. 17/030,219, 1 page.

* cited by examiner

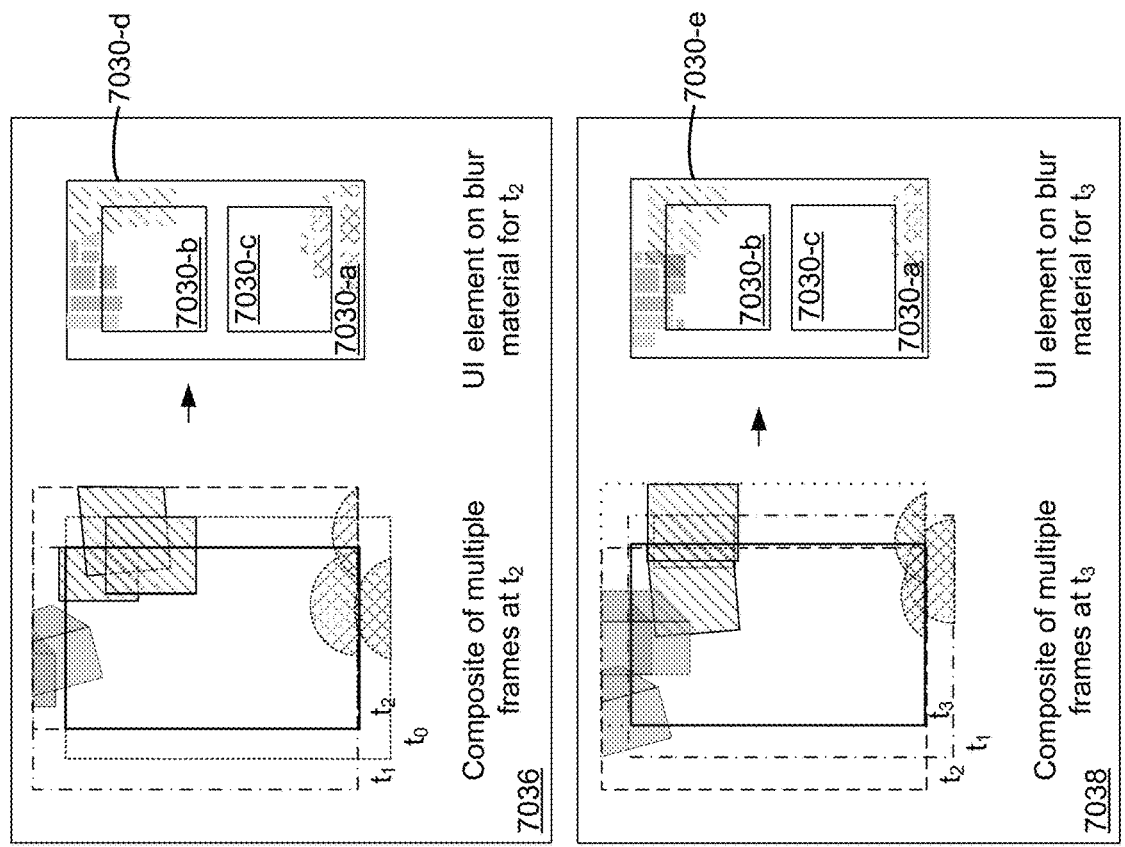
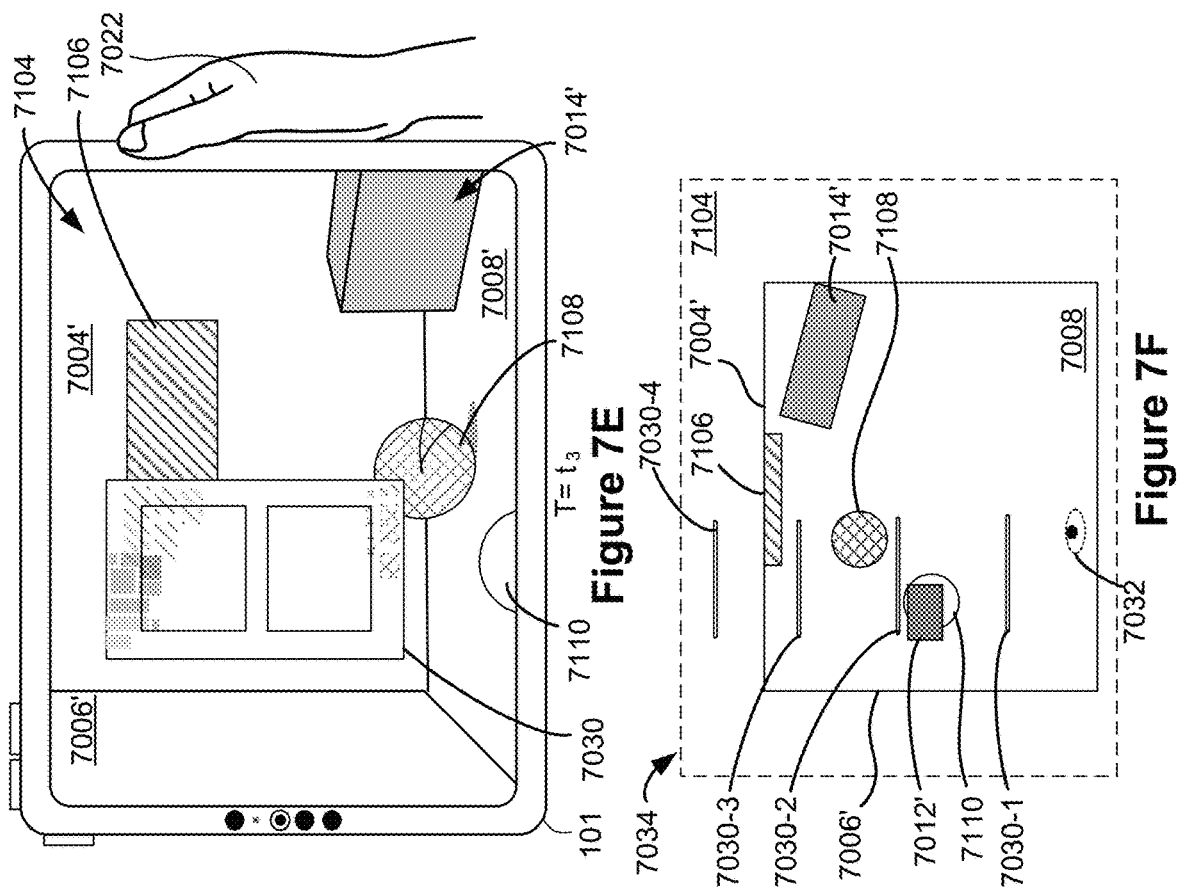
Figure 7E
Figure 7F
Figure 7G

← 14000

14002 Display, via the display generation component, a computer-generated user interface object overlaid on a first portion of a view of a three-dimensional environment. An appearance of the computer-generated user interface object is based on a blurred representation of the first portion of the view of the three-dimensional environment on which the computer-generated user interface object is overlaid.

14004 Visually distinguish a first region of the computer-generated user interface object from a second region of the computer-generated user interface object by:
  applying a first transformation without applying a second transformation to a first subset of the blurred representation of the first portion of the view of the three-dimensional environment on which the computer-generated user interface object is overlaid, corresponding to the first region of the computer-generated user interface object; and
  applying the second transformation without applying the first transformation to a second subset of the blurred representation of the first portion of the view of the three-dimensional environment on which the computer-generated user interface object is overlaid, corresponding to the second region of the computer-generated user interface object. The second subset of the blurred representation of the first portion of the view of the three-dimensional environment is different from the first subset of the blurred representation of the first portion of the view of the three-dimensional environment

14006 As an appearance of the first portion of the view of the three-dimensional environment changes, update the appearance of the computer-generated user interface object based on a blurred representation of the changed first portion of the view of the three-dimensional environment, including:

14008 Applying the first transformation without applying the second transformation to a first subset of the blurred representation of the changed first portion of the view of the three-dimensional environment on which the computer-generated user interface object is overlaid, corresponding to the first region of the computer-generated user interface object; and
  applying the second transformation without applying the first transformation to a second subset of the blurred representation of the changed first portion of the view of the three-dimensional environment on which the computer-generated user interface object is overlaid, corresponding to the second region of the computer-generated user interface object. The second subset of the blurred representation of the changed first portion of the view of the three-dimensional environment is different from the first subset of the blurred representation of the changed first portion of the view of the three-dimensional environment

Figure 14

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Application Ser. No. 63/328,686, filed Apr. 7, 2022 and U.S. Provisional Application Ser. No. 63/248,381, filed Sep. 24, 2021, each of which is hereby incorporated by reference in its entirety.

TECHNICAL FIELD

The present disclosure relates generally to computer systems with a display generation component and one or more input devices that provide computer-generated extended reality (XR) experiences, including, but not limited to, electronic devices that provide virtual reality and mixed reality experiences via a display generation component.

BACKGROUND

The development of computer systems for virtual reality, augmented reality, and extended reality has increased significantly in recent years. Example augmented reality and extended reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented/extended reality environments. Example virtual elements include virtual objects, such as digital images, video, text, icons, and control elements such as buttons and other graphics.

But methods and interfaces for interacting with environments that include at least some virtual elements (e.g., applications, augmented reality environments, mixed reality environments, virtual reality environments, and extended reality environments) are cumbersome, inefficient, and limited. For example, systems that provide insufficient feedback for performing actions associated with virtual objects, systems that require a series of inputs to achieve a desired outcome in a virtual/augmented/extended reality environment, and systems in which manipulation of virtual objects are complex, tedious and error-prone, create a significant cognitive burden on a user, and detract from the experience with the virtual/augmented/extended reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing extended reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a display generation component. The method includes concurrently displaying, via the display generation component, a view of a physical environment and a computer-generated user interface element overlaid on at least a portion of the view of the physical environment. An appearance of the computer-generated user interface element is based on an appearance of one or more portions of the view of the physical environment on which the computer-generated user interface element is overlaid. While concurrently displaying the view of the physical environment and the computer-generated user interface element, an appearance of a portion of the physical environment changes. In response to the change in appearance of the portion of the physical environment, the appearance of the computer-generated user interface element is updated at a first time based on a graphical composition of the appearance of one or more portions of the physical environment at different times prior to the first time, including: an appearance of a first portion of the physical environment at a second time that is before the first time; and an appearance of a second portion of the physical environment at a third time that is before the second time.

In some embodiments, a method is performed at a computer system that is in communication with a display generation component. The method includes concurrently displaying, via the display generation component: a view of a physical environment; and a computer-generated user interface element overlaid on at least a portion of the view of the physical environment. An appearance of the computer-generated user interface element is based on a respective gradient between a first set of representative colors sampled from one or more portions of the view of the physical environment on which the computer-generated user interface element is overlaid. The first set of representative colors includes: a first color that represents a portion of the view of the physical environment that is behind a first portion of the computer-generated user interface element in a first time period; and a second color that represents a portion of the view of the physical environment that is behind a second portion of the computer-generated user interface element in the first time period. While concurrently displaying the view of the physical environment and the computer-generated user interface element, an appearance of a portion of the physical environment changes. The method includes, in response to the change in appearance of the portion of the physical environment, updating the appearance of the computer-generated user interface element based on the respective gradient between a second set of representative colors sampled from one or more portions of the view of the physical environment on which the computer-generated user interface element is overlaid. The second set of representative colors includes: a third color that represents a portion of the view of the physical environment that is behind the first portion of the computer-generated user interface element in a second time period that is different from the first time period; and a fourth color that represents a portion of the view of the physical environment that is behind the second portion of the computer-generated user interface element in the second time period.

In some embodiments, a method is performed at a computer system that is in communication with a display generation component. The method includes displaying, via the display generation component, a first view of a three-dimensional environment, including displaying a first user interface object in the first view of the three-dimensional environment and displaying background content behind the first user interface object in the three-dimensional environment. The first user interface object includes a first portion, the first portion having an appearance selected based on an appearance of background content located behind the first portion of the first user interface object in the three-dimensional environment. The first user interface object has a simulated thickness between the first portion and a front of the first user interface object; and content is displayed in the first user interface object between the first portion of the first user interface object and the front of the first user interface object. The method includes, while displaying the first user interface object, detecting a request to move the content; and in response to detecting the request to move the content, moving the content within the first user interface object while the content remains between the first portion of the first user interface object and the front of the first user interface object. Moving the content within the first user interface object includes displaying a visual effect that is applied to the content based on the simulated thickness of the first user interface object.

In some embodiments, a method is performed at a computer system with a display generation component and one or more input devices. The method includes displaying, via the display generation component: a user interface that includes a view of a three-dimensional environment; a simulated three-dimensional object in the three-dimensional environment that is displayed with an appearance corresponding to a respective simulated material, wherein a first region of the simulated three-dimensional object is displayed with an appearance of a portion of the respective simulated material removed from a surface of the simulated three-dimensional object; and a first user interface element that includes the first region of the simulated three-dimensional object. The method includes detecting a first input directed to the first user interface element; and, in response to detecting the first input directed to the first user interface element: performing, in the user interface, a respective operation associated with the first user interface element.

In some embodiments, a method is performed at a computer system with a display generation component and one or more input devices. The method includes displaying, via the display generation component, a user interface that includes a view of a three-dimensional environment and a user interface element that is associated with a respective surface in the three-dimensional environment. A first set of one or more portions of the user interface element is associated with a first layer of the user interface element; a second set of one or more portions of the user interface element is associated with a second layer of the user interface element; and the user interface element is displayed with an appearance indicating a first degree of separation between the first layer and the second layer. The method includes detecting a first input corresponding to a user directing attention to the user interface element; and, in response to detecting the first input corresponding to a user directing attention to the user interface element: changing the appearance of the user interface element to indicate a second degree of separation between the first layer and the second layer. The second degree is different from the first degree.

In some embodiments, a method is performed at a computer system that is in communication with a display generation component and one or more input devices. The method includes displaying, via the display generation component, a user interface object while a first view of a three-dimensional environment is visible. The user interface object includes a first selectable object that is activatable to perform a respective operation in the three-dimensional environment. The method includes detecting a first input corresponding to the first selectable object. The method further includes, in response to detecting the first input corresponding to the first selectable object, and in accordance with a determination that the first input indicates a user's readiness to interact with the first selectable object, changing a thickness of the first selectable object.

In some embodiments, a method is performed at a computer system with a display generation component and one or more input devices. The method includes displaying, via the display generation component, a computer-generated user interface object overlaid on a first portion of a view of a three-dimensional environment. An appearance of the computer-generated user interface object is based on a blurred representation of the first portion of the view of the three-dimensional environment on which the computer-generated user interface object is overlaid. The method includes visually distinguishing a first region of the computer-generated user interface object from a second region of the computer-generated user interface object by: applying a first transformation without applying a second transformation to a first subset of the blurred representation of the first portion of the view of the three-dimensional environment on which the computer-generated user interface object is overlaid, corresponding to the first region of the computer-generated user interface object; and applying the second transformation without applying the first transformation to a second subset of the blurred representation of the first portion of the view of the three-dimensional environment on which the computer-generated user interface object is overlaid, corresponding to the second region of the computer-generated user interface object. The second subset of the blurred representation of the first portion of the view of the three-dimensional environment is different from the first subset of the blurred representation of the first portion of the view of the three-dimensional environment. The method includes, as an appearance of the first portion of the view of the three-dimensional environment changes, updating the appearance of the computer-generated user interface object based on a blurred representation of the changed first portion of the view of the three-dimensional environment, including: applying the first transformation without applying the second transformation to a first subset of the blurred representation of the changed first portion of the view of the three-dimensional environment on which the computer-generated user interface object is overlaid, corresponding to the first region of the computer-generated user interface object; and applying the second transformation without applying the first transformation to a second subset of the blurred representation of the changed first portion of the view of the three-dimensional environment on which the computer-generated user interface object is overlaid, corresponding to the second region of the computer-generated user interface object. The second subset of the blurred representation of the changed first portion of the view of the three-dimensional environment is different from the first subset of the blurred representation of the changed first portion of the view of the three-dimensional environment.

In accordance with some embodiments, a computer system includes or is in communication with a display generation component (e.g., a hardware element, comprising one or more display devices, such as a display, a projector, a heads-up display, a head-mounted display, a touchscreen, and/or the like), one or more input devices (e.g., one or more cameras, a touch-sensitive surface, optionally one or more sensors to detect intensities of contacts with the touch-sensitive surface), optionally one or more audio output components, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions that, when executed by a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more audio output components, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, includes means for performing or causing performance of the operations of any of the methods described herein.

Thus, computer systems with display generation components are provided with improved methods and interfaces for interacting with a three-dimensional environment and facilitating the user's use of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7G illustrate displaying a user interface element over a view of a physical environment, where the user interface element has an appearance that is based on a graphical composition of content in the physical environment that is behind the user interface element at multiple different points in time, in accordance with some embodiments.

FIG. 14 is a flowchart of a method of visually distinguishing different parts of a computer-generated user interface object whose appearance is based on content in a surrounding three-dimensional environment that is behind the user interface object, by applying different transformations to a representation of the underlying content, in accordance with some embodiments.

DESCRIPTION OF EMBODIMENTS

Figure 1:
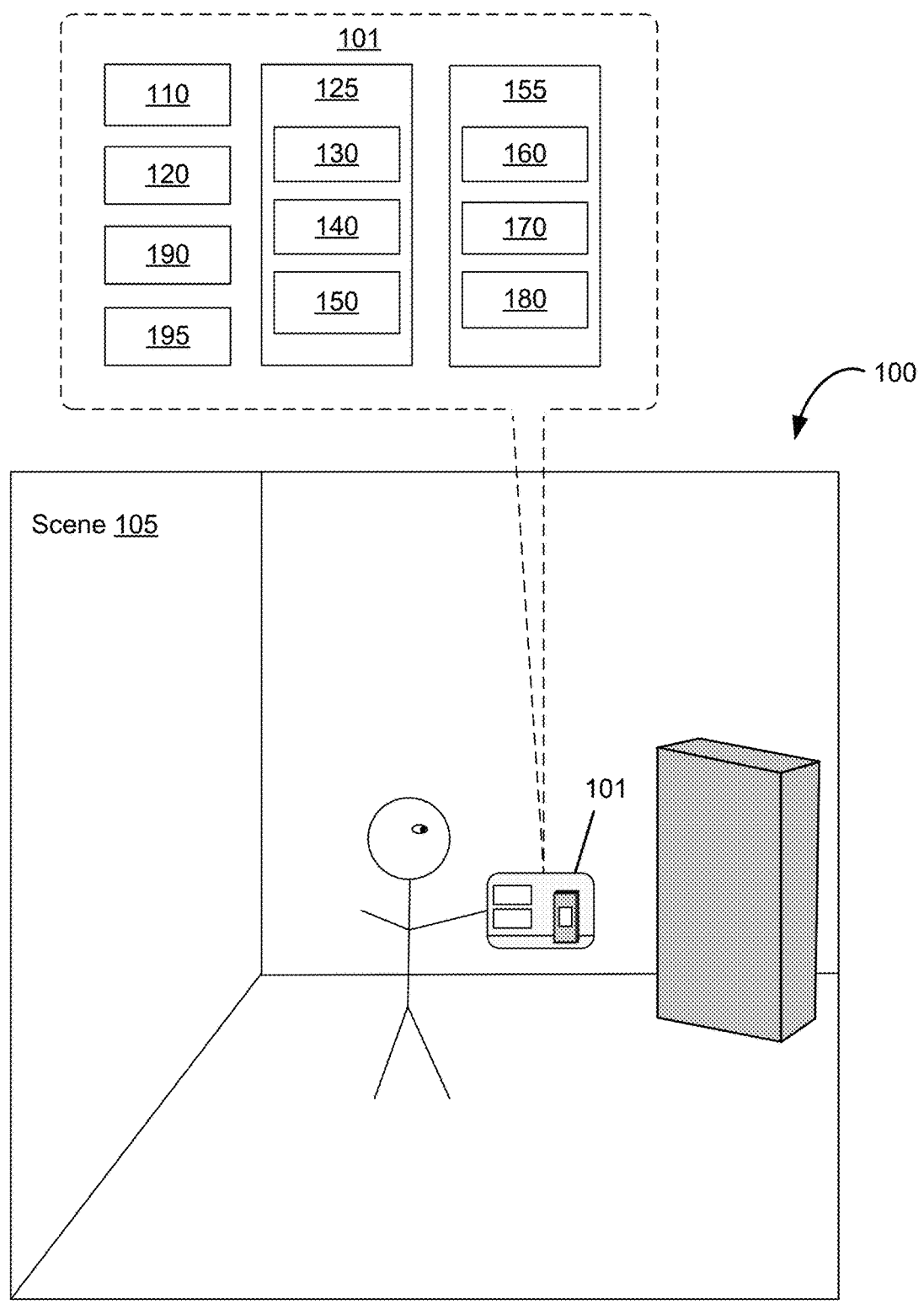
FIG. 1 is a block diagram illustrating an operating environment of a computer system for providing extended reality (XR) experiences in accordance with some embodiments.

The present disclosure relates to user interfaces for providing a computer-generated extended reality (XR) experience to a user, in accordance with some embodiments.

The systems, methods, and GUIs described herein improve user interface interactions with virtual/augmented reality environments in multiple ways.

In some embodiments, a computer system concurrently displays a view of a physical environment and a computer-generated user interface element (e.g., an application user interface, a view of a file or document, or a communication session) overlaid on at least a portion of the view of the physical environment. In some embodiments, the appearance of the computer-generated user interface element is based on an appearance of one or more portions of the view of the physical environment on which the computer-generated user interface element is overlaid. In some embodiments, the appearance of the computer-generated user interface element is based on a graphical composition of the appearance of one or more portions of the physical environment at different times. In some embodiments, in response to changes in appearance of the portion of the physical environment on which the computer-generated user interface element is overlaid, the appearance of the computer-generated user interface element is updated at a first time based on a graphical composition of the appearance of one or more portions of the physical environment at different times prior to the first time, including an appearance of a first portion of the physical environment at a second time that is before the first time; and an appearance of a second portion of the physical environment at a third time that is before the second time.

In some embodiments, a computer system concurrently displays a view of a physical environment and a computer-generated user interface element (e.g., an application user interface, a view of a file or document, or a communication session) overlaid on at least a portion of the view of the physical environment. In some embodiments, the appearance of the computer-generated user interface element is based on a respective gradient between a first set of representative colors sampled from one or more portions of the view of the physical environment on which the computer-generated user interface element is overlaid. In some embodiments, the first set of representative colors include at least two colors sampled from different portions of the view of the physical environment that are behind different portions of the computer-generated user interface element in a first time period. In some embodiments, in response to changes in appearance of the portion of the physical environment on which the computer-generated user interface element is overlaid, the computer system updates the appearance of the computer-generated user interface element based on the respective gradient between a second set of representative colors sampled from one or more portions of the view of the physical environment on which the computer-generated user interface element is overlaid. In some embodiments, the second set of representative colors include at least two colors sampled from different portions of the view of the physical environment that are behind different portions of the computer-generated user interface element in a second time period that is different from the first time period.

In some embodiments, a computer system, displays a first user interface object in a first view of the three-dimensional environment and background content behind the first user interface object in the three-dimensional environment. In some embodiments, the first user interface object includes a rear portion with an appearance selected based on an appearance of background content located behind the first portion of the first user interface object in the three-dimensional environment, and content displayed embedded in the first user interface object between the rear portion of the first user interface object and the front of the first user interface object. In some embodiments, in response to a request to move the content, the computer system moves the content within the first user interface object while the content remains between the front and rear portion of the first user interface object, and displays a visual effect that is applied to the content based on the simulated thickness of the first user interface object to simulate the appearance of the content reflecting, refracting, or wrapping, or otherwise curving around the edge of the simulated thickness of the first user interface object.

In some embodiments, a computer system concurrently displays a user interface that includes a view of a three-dimensional environment, and a simulated three-dimensional object in the three-dimensional environment that is displayed with an appearance corresponding to a respective simulated material. A first region of the simulated three-dimensional object is displayed as a recessed region, and is associated with a first user interface element. In some embodiments, the computer system detects a first input directed to the first user interface element, and, in response to detecting the first input directed to the first user interface element, performs, in the user interface, a respective operation associated with the first user interface element. In some embodiments, edges of the simulated three-dimensional object are displayed with a visual effect of specular reflection(s) simulating light from the three-dimensional environment reflecting from the edges. In some embodiments, the specular reflection(s) is based on one or more simulated light sources and/or one or more physical light sources in a physical environment corresponding to the displayed three-dimensional environment. In some embodiments, the appearance of the specular reflection(s) is changed as the simulated three-dimensional object is moved in the three-dimensional environment, as the viewpoint of the user relative to the simulated three-dimensional object changes, and/or as lighting in the three-dimensional environment changes.

In some embodiments, a computer system displays a user interface that includes a view of a three-dimensional environment and a control that is associated with a respective surface in the three-dimensional environment. In some embodiments, a first set of graphical elements that are part of the control are associated with a first layer of the user interface element; a second set of graphical elements that are part of the control are associated with a second layer of the user interface element. In some embodiments, the control is displayed with an appearance indicating a respective degree of separation between the first layer and the second layer (e.g., and optionally one or more other layers of the control). In some embodiments, in response to detecting a first input corresponding to a user directing attention to the user interface element, the computer system changes the appearance of the user interface element to indicate a different degree of separation between the first layer and the second layer (e.g., and optionally one or more other layers of the control). In some embodiments, the degree(s) of separation between the layers of a control is dependent on the type and extent of interaction by a user with the control. In some embodiments, the degree(s) of separation between the layers of a control are changed in response to user interaction that progresses a predefined gesture, and the change in the degree(s) of separation is reversed in response to user interaction that reverses the predefined gesture. In some embodiments, one or more graphical elements of the control are animated in response to the user interaction.

In some embodiments, a computer system displays, as part of a user interface object in a three-dimensional environment that is in view, a selectable object that can be activated to perform an operation in the three-dimensional environment. In some embodiments, in response to a user input that indicates a user's readiness to interact with the selectable object, the computer system changes (e.g., increases) a thickness of the selectable object, while optionally changing one or more additional visual properties of the selectable object and/or keeping one or more visual properties of the selectable object the same. Changing a thickness of a selectable object in response to an input that indicates user intent to interact with the selectable object helps the user understand which part of the environment currently has focus for further interaction.

In some embodiments, a computer system displays a computer-generated user interface object overlaid on a portion of a view of a three-dimensional environment, and an appearance of the computer-generated user interface object is based on a blurred representation of the underlying portion of the view of the three-dimensional environment. In some embodiments, the computer system visually distinguishes a first region of the computer-generated user interface object from a second region of the computer-generated user interface object by applying different (e.g., mutually exclusive) transformations to different (e.g., mutually exclusive) areas of the blurred representation. In some embodiments, the computer system updates the appearance of the computer-generated user interface object as the appearance of the underlying portion of the view of the three-dimensional environment changes, including by applying the different transformations respectively to the different areas of a blurred representation of the changed underlying portion of the view. Applying different transformations to different regions of a computer-generated object visually distinguishes some regions from others to indicate and/or emphasize certain properties of the regions, such as whether a region is interactive and/or whether a region conveys semantic meaning (e.g., through glyphs and/or text), and in some cases to improve the legibility of such regions.

FIGS. 1-6 provide a description of example computer systems for providing XR experiences to users. The user interfaces in FIGS. 7A-7Z are used to illustrate the processes in FIGS. 8-14.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, increasing user safety and reducing motion sickness often associated with XR experiences, reducing the number of inputs needed to perform an operation, providing additional control options without cluttering the user interface with additional displayed controls, performing an operation when a set of conditions has been met without requiring further user input, reducing the computational burden associated with displaying user interfaces, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended-reality: In contrast, an extended-reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
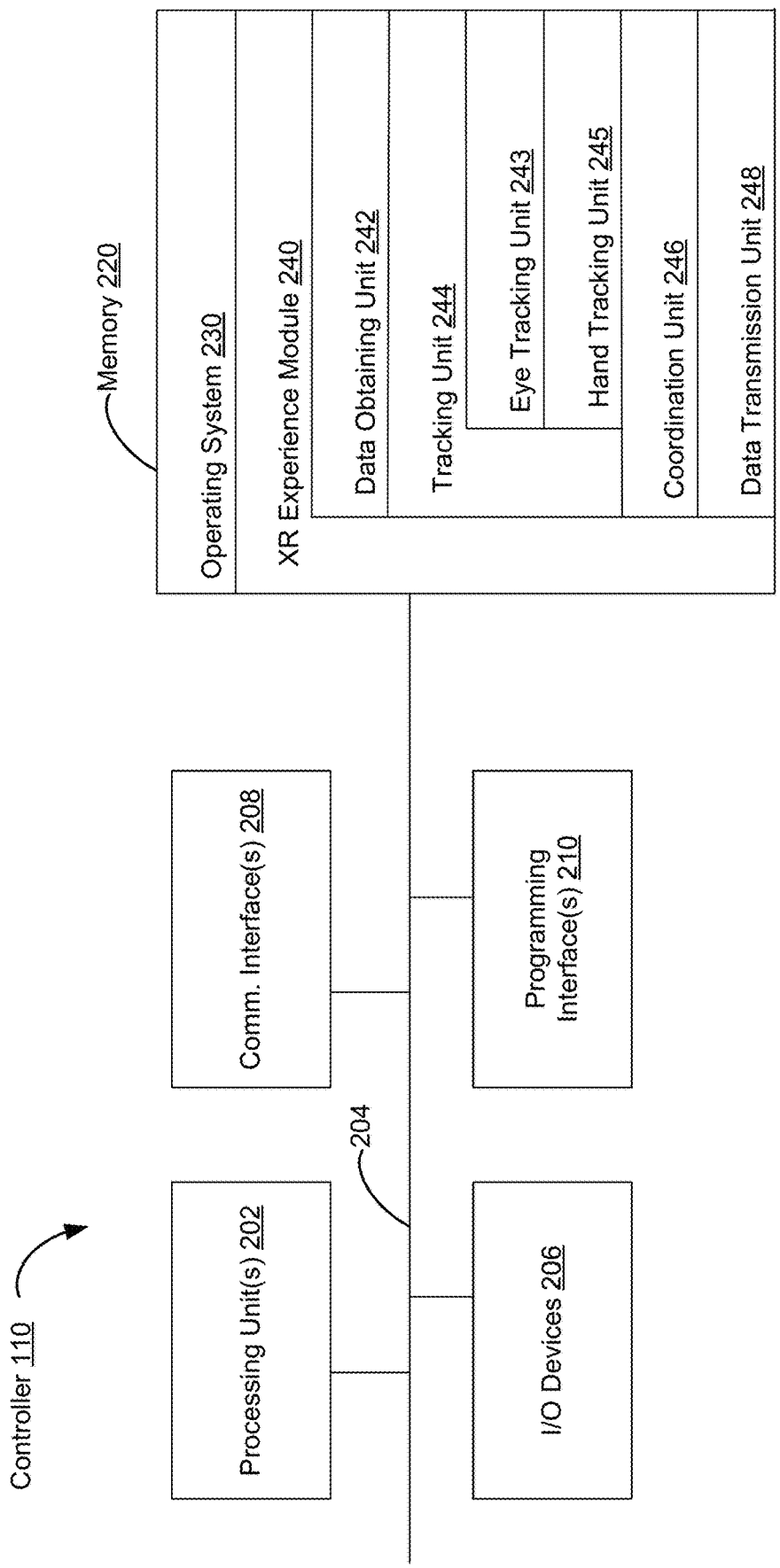
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
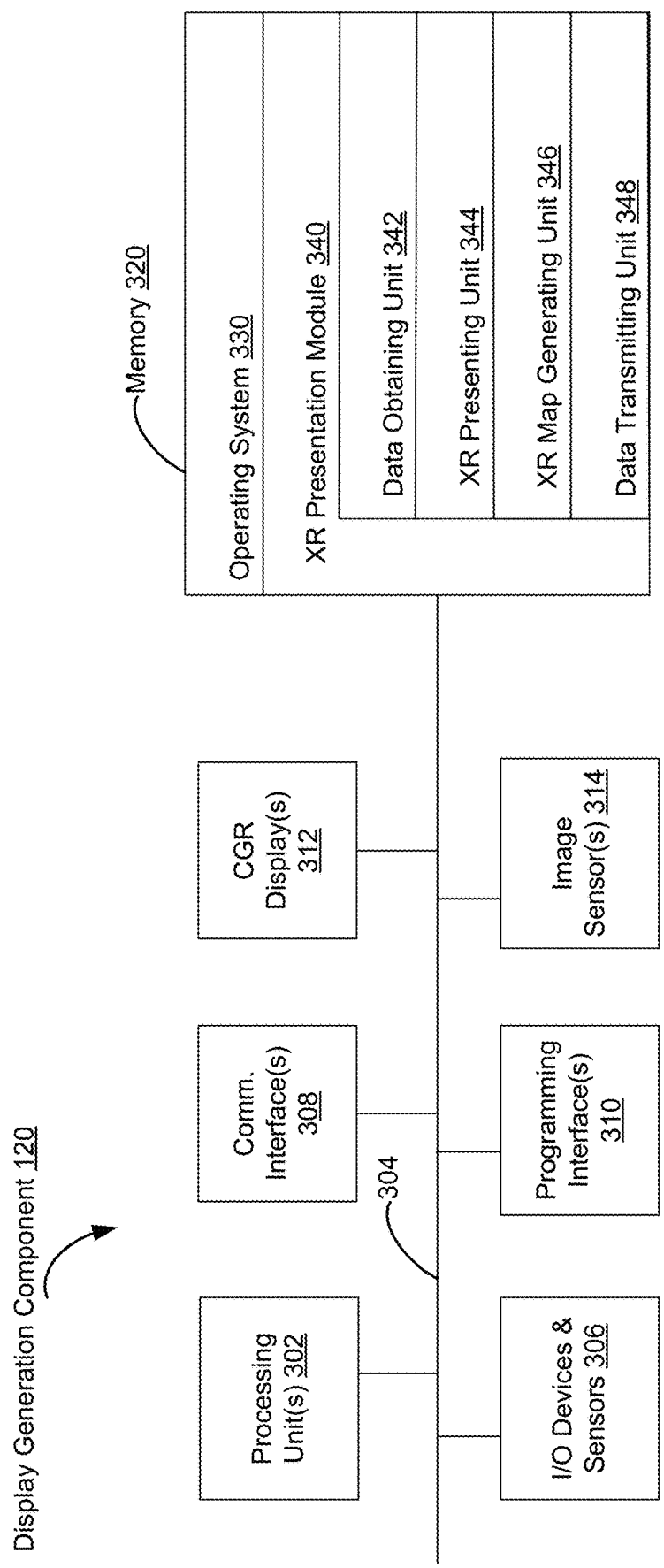
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
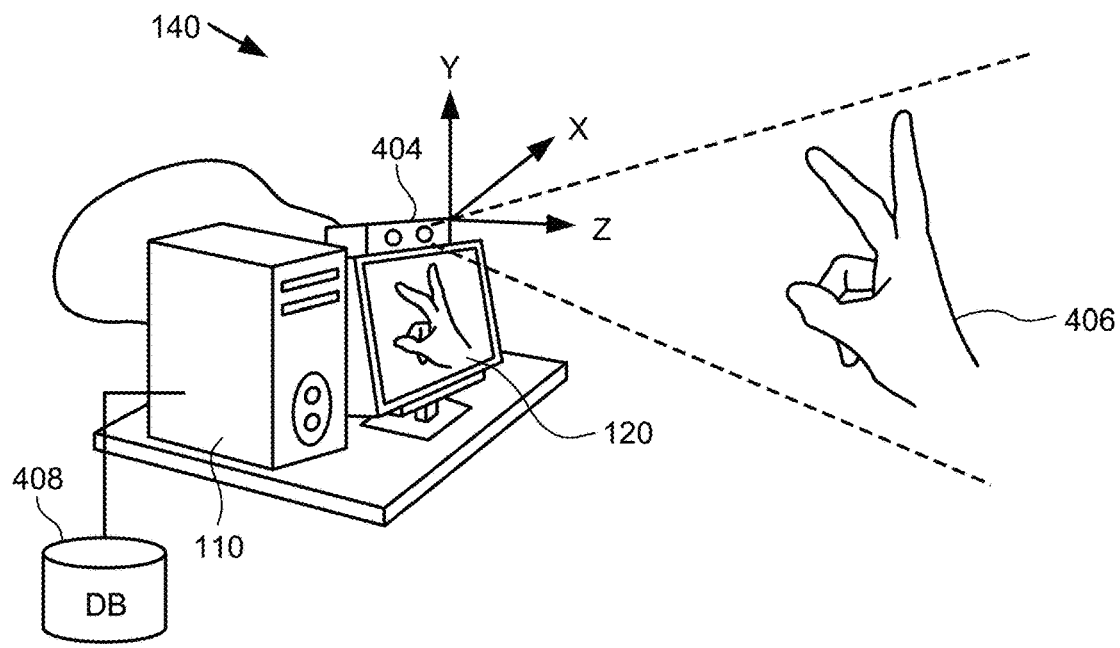
FIG. 4 is a block diagram illustrating a hand tracking unit of a computer system that is configured to capture gesture inputs of the user in accordance with some embodiments.
Figure 4:
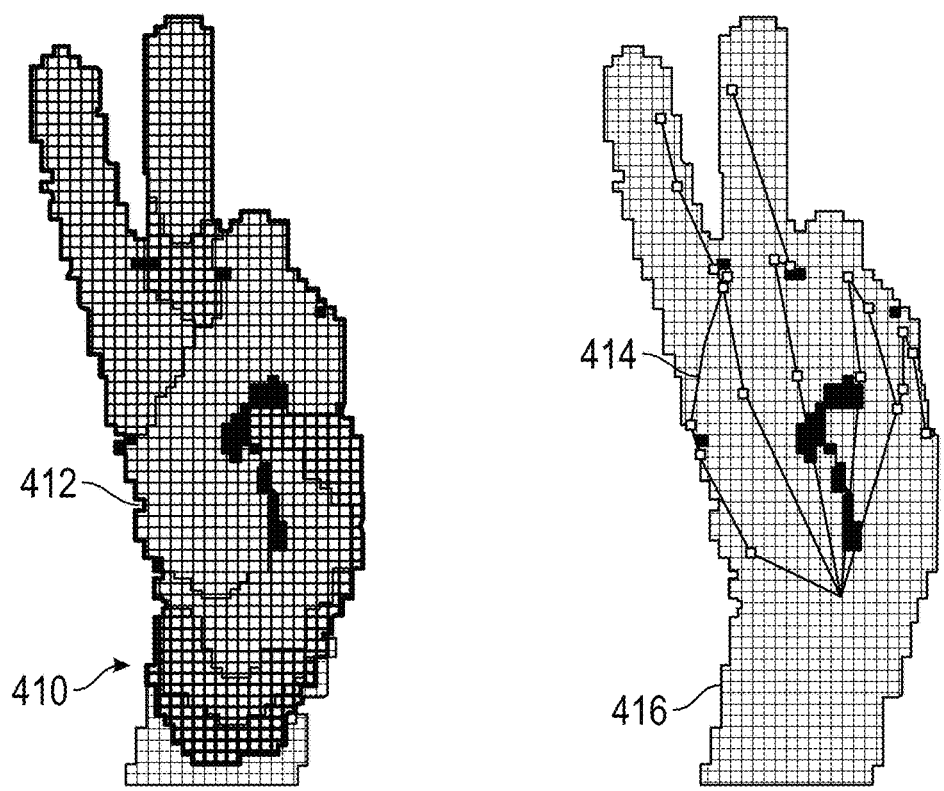

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
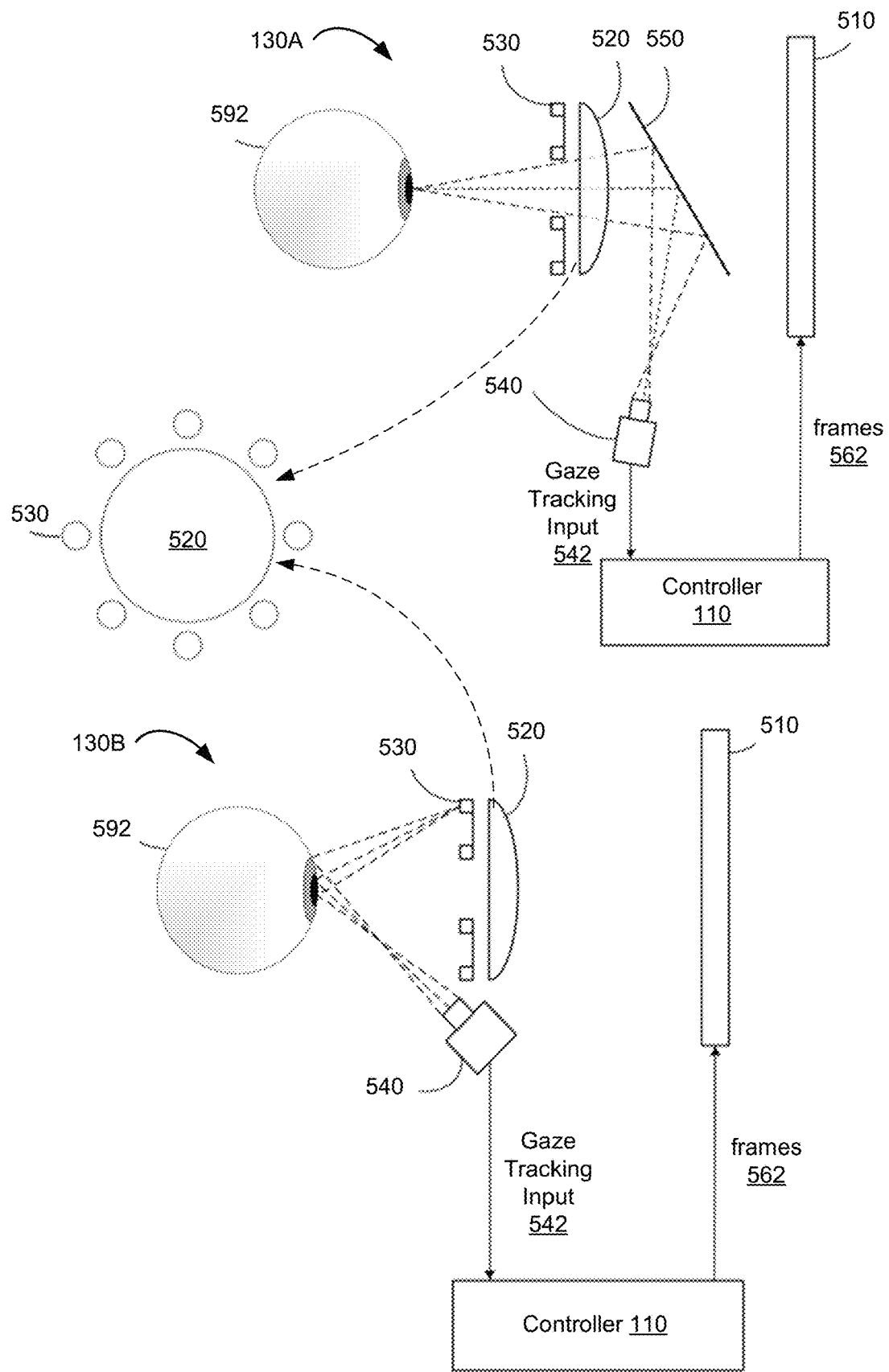
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus on the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in extended-reality (e.g., including virtual reality and/or mixed reality) applications to provide extended-reality (e.g., including virtual reality, augmented reality, and/or augmented virtuality) experiences to the user.

Figure 6:
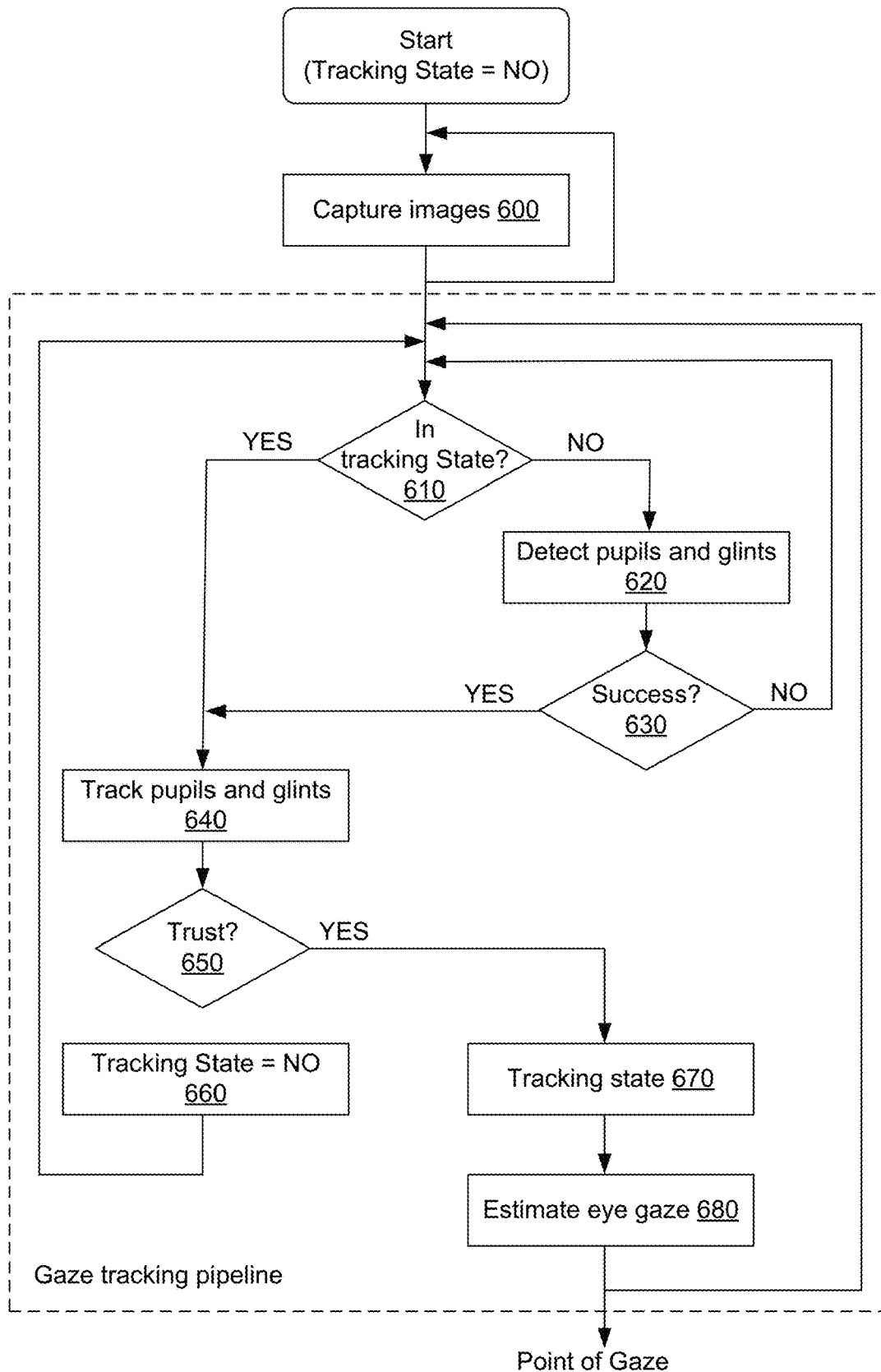
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and optionally one or cameras.

FIGS. 7A-7Z illustrate three-dimensional environments that are visible via a display generation component (e.g., a display generation component 7100 or a display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detects movement of other persons and objects and movement of the user that may not quality as a recognized gesture input for triggering an associated operation of the computer system.

In some embodiments, a three-dimensional environment that is displayed or visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed or visible. In some embodiments, the pass-through portion of the display generation component is a transparent or semi-transparent (e.g., see-through) portion of the display generation component revealing at least a portion of a physical environment surrounding and within the field of view of a user (sometimes called "optical passthrough"). For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system) (sometimes called "digital passthrough"). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7A-7Z, the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

FIGS. 7A-7G illustrate displaying a user interface element over a view of a physical environment (or a three-dimensional environment that optionally corresponds to and/or includes a representation of one or more portions of a physical environment), where the user interface element has an appearance that is based on a graphical composition of content in the physical environment that is behind the user interface element at multiple different points in time, in accordance with some embodiments. The user interfaces in FIGS. 7A-7G are used to illustrate the processes described below, including the processes in FIG. 8.

In some embodiments, the user interface element presents a user interface, for example of an application, operating system, or alert. In some embodiments, the user interface element is displayed as a three-dimensional object at a location in three-dimensional space. The user interface element typically includes a background that is based on the appearance of the underlying environment, and content with which a user can interact (e.g., whereas the background is typically non-interactive), such as text or graphics that can be (e.g., are configured to be) scrolled, zoomed, and/or selected, and/or icons or buttons that can be (e.g., are configured to be) pressed or activated. Behaviors described in FIGS. 7A-7G with respect to user interface elements in some examples are applicable to user interface elements in other examples, in accordance with various embodiments, unless stated otherwise in the descriptions.

FIGS. 7A-7Z in general show an exemplary computer system (e.g., device 101, or another computer system) that is in communication with a display generation component (e.g., display generation component 7100, or another display generation component). As shown in the examples in FIG. 7A-7Z, display generation component 7100 is a touchscreen held by user 7002. In some embodiments, the display generation component of computer system 101 is a head-mounted display worn on a user's head (e.g., what is shown in FIGS. 7A-7Z as being visible via display generation component 7100 of computer system 101 corresponds to user 7002's field of view when wearing a head-mounted display). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device (e.g., an HMD or a pair of goggles) that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment.

As shown in FIGS. 7B-7G, the computer system displays a view of a three-dimensional environment (e.g., environment 7104, a virtual three-dimensional environment, an augmented reality environment, a pass-through view of a physical environment, or a camera view of a physical environment). In some embodiments, the three-dimensional environment is a virtual three-dimensional environment without a representation of a physical environment. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment (e.g., representations 7004' and 7006' of walls, representation 7008' of a floor, and representation 7014' of physical object 7014) surrounding the display generation component 7100. In some embodiments, the representation of the physical environment includes a camera view of the physical environment. In some embodiments, the representation of the physical environment includes a view of the physical environment through a transparent or semitransparent portion of the display generation component.

FIG. 7A illustrates an example scene 105 in an example physical environment 7102. In scene 105 in FIG. 7A, user 7002 is in physical environment 7102 holding display 7100 of the computer system in the user's hand 7022. Physical environment 7102 includes walls 7004 and 7006 and floor 7008. Physical box 7014 is positioned on floor 7008. In addition, physical box 7012 is falling in space toward floor 7008.

Figure 7B:
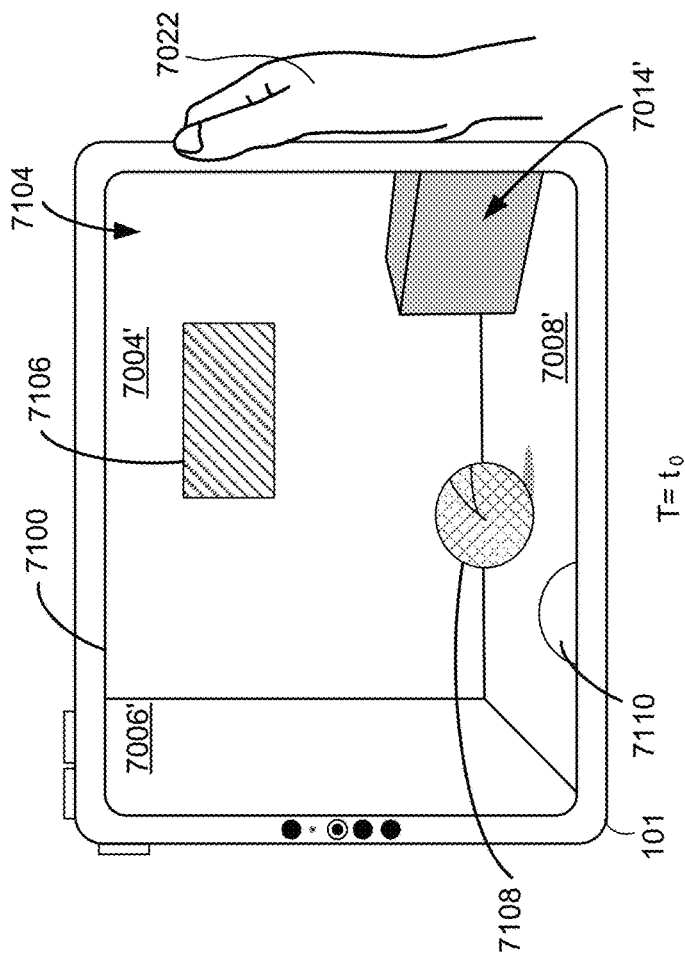
Figure 7A:
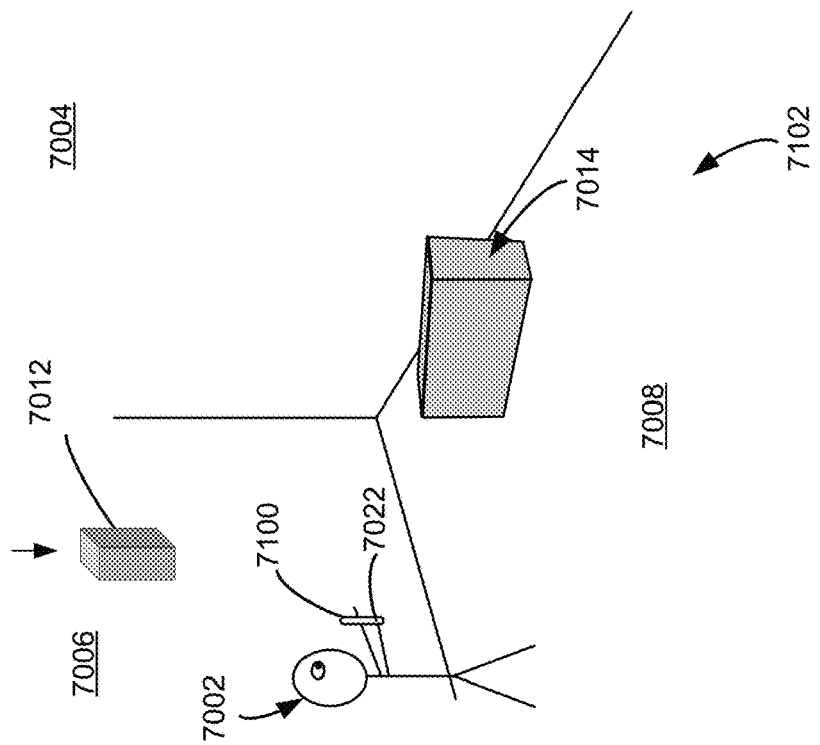
Figure 7D:
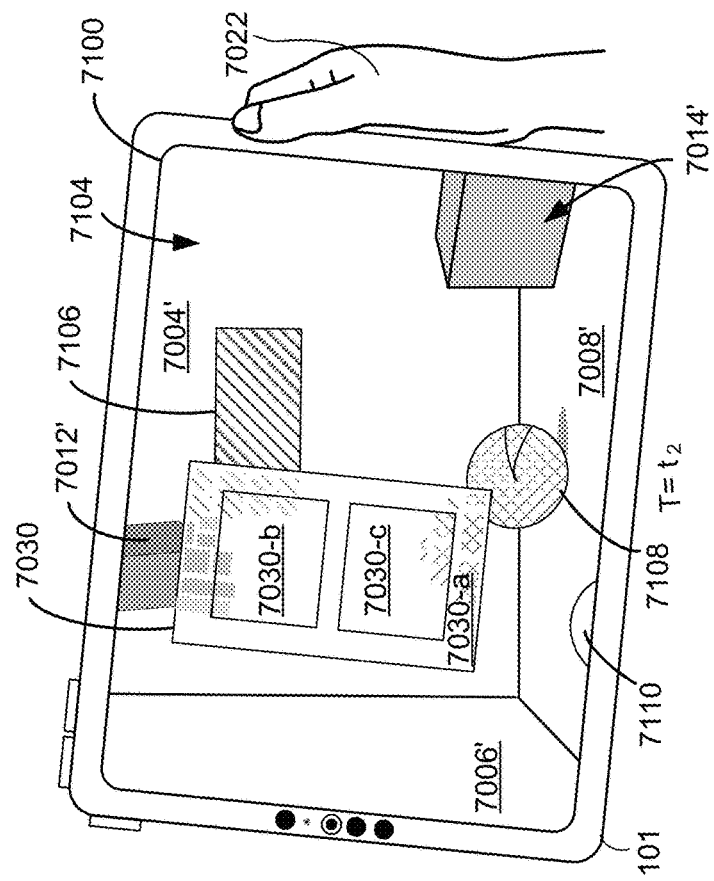

FIG. 7B illustrates a three-dimensional environment 7104 displayed via display 7100. In the example shown in FIG. 7B, environment 7104 optionally includes a view of one or more portions of scene 105 based on the portion of scene 105 that is in a field of view of the computer system (or more specifically the field of view of one or more cameras of the computer system) that includes display 7100. For example, environment 7104 includes displayed walls 7004' and 7006' that are representations of physical walls 7004 and 7006, respectively, a displayed floor 7008' that is a representation of physical floor 7008, and box 7014' that is a representation of physical box 7014. In the example shown in FIG. 7B, physical box 7012 is not in the field of view of the one or more cameras of the computer system, so no representation of physical box 7012 is displayed in environment 7104 (e.g., in contrast to box 7012', which is a representation of physical box 7012, being displayed in environment 7104 as shown for example in FIG. 7C described herein). As shown in the FIG. 7B example, environment 7104 also optionally includes computer-generated objects (e.g., not corresponding to representations of physical objects), such as computer-generated wall hanging 7106, which appears positioned on wall 7004' as a physical object placed on wall 7004 would appear, and computer-generated balls 7108 and 7110 on floor 7008' as physical balls would appear on floor 7008. Ball 7110 is closer to the viewpoint of the user than ball 7108, and both ball 7110 and ball 7108 are closer to the viewpoint of the user than wall hanging 7106. In FIG. 7B, the view of environment 7104 that is displayed corresponds to a time T=$t_0$.

Figure 7C:
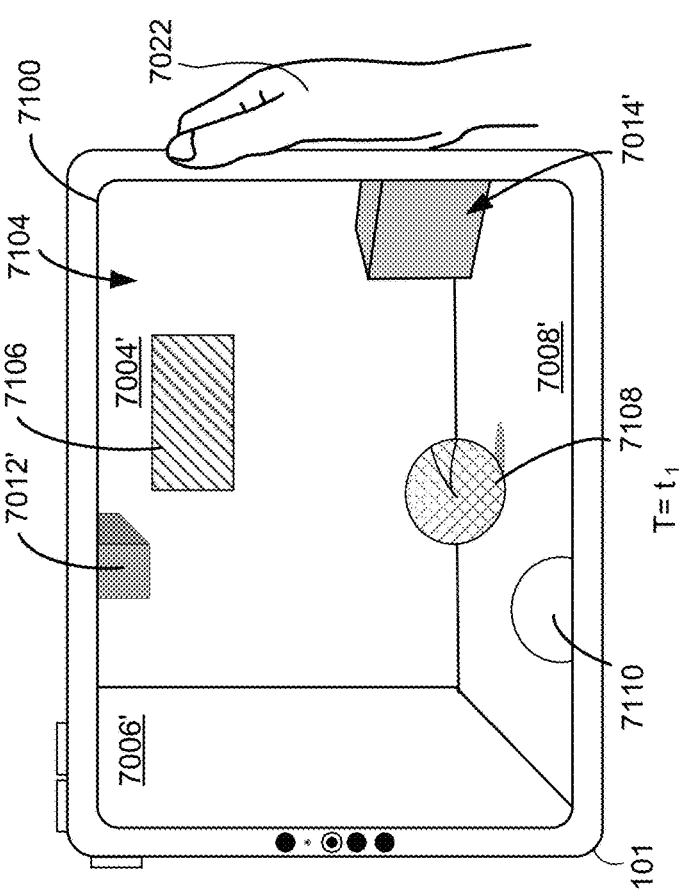

FIG. 7C illustrates a view of environment 7104 at a time T=$t_1$ that is different from, and in this example later than, time T=$t_0$ illustrated in FIG. 7B. Environment 7104 as shown in FIG. 7C reflects movement of the viewpoint of the user downward in space and backward (e.g., away) from wall 7004 (e.g., in response to movement of the computer system, or more specifically one or more cameras of the computer system downward and backward in space relative to wall 7004). Accordingly, wall 7004' in environment 7104 in FIG. 7C appears further from the viewpoint of the user, and more of wall 7006' and floor 7008' are shown. Also, box 7014' appears smaller, further from the viewpoint of the user, and further from the bottom edge of display 7100 in FIG. 7C than in FIG. 7B. In addition, wall hanging 7106, being virtually positioned on wall 7004 and thus further from the viewpoint of the user in FIG. 7C than in FIG. 7B, is displayed smaller in environment 7104 in FIG. 7C than in FIG. 7B. FIG. 7C also shows that in accordance with physical box 7012 falling, such that physical box 7012 has entered the field of view of the computer system (or more specifically, the field of view of one or more cameras of the computer system), box 7012' is displayed in environment 7104. In addition, in FIG. 7C, ball 7108 has rolled toward the right, as indicated by the shifted position of ball 7108 and by the markings on ball 7108 rotating clockwise.

FIG. 7D illustrates a view of environment 7104 at a time T=$t_2$ that is later than time $t_1$ illustrated in FIG. 7C and time $t_0$ illustrated in FIG. 7B. FIG. 7D represents a transition from FIG. 7C based on movement of the viewpoint of the user via clockwise rotation (e.g., via clockwise rotation of the computer system). As the orientation of environment 7104 remains anchored to physical environment 7102 (FIG. 7A) in which the computer system is located, environment 7104 as shown in FIG. 7D appears tilted (e.g., rotated counterclockwise) relative to display 7100 of the computer system. Physical box 7012 has continued to fall in space (e.g., in physical environment 7102) such that more of physical box 7012 has entered the field of view of the computer system, and accordingly more of box 7012', representing physical box 7012, is displayed in environment 7104. In addition, ball 7108 has rolled further toward the right in environment 7104, as indicated by the shifted position of ball 7108 and by the markings on ball 7108 having rotated further clockwise relative to FIG. 7C.

FIG. 7D also illustrates a view of environment 7104 that is displayed in response to computer system 101 detecting an event that triggers display of user interface element 7030. In some embodiments, user interface element 7030 is a user interface such as an application user interface or system user interface displayed within environment 7104. In the example of FIG. 7D, user interface element 7030 is anchored to the viewpoint of the user rather than to environment 7104, as illustrated by user interface element 7030 being tilted relative to environment 7104 in FIG. 7D (in contrast to user interface element 7030 being upright relative to environment 7104 in FIG. 7E, described in more detail below). User interface element 7030 may be a user interface of an application executing on the computer system, displayed in response to a user input to launch the application. User interface element 7030 may be an alert or notification, displayed in response to an event occurring at the computer system (e.g., an error condition or conditions for displaying a reminder being satisfied, such as a scheduled time being reached). FIG. 7D shows user interface element 7030 displayed over a portion of environment 7104, and specifically over a portion of box 7012', a portion of wall hanging 7106, a portion of ball 7108, and a portion of wall 7004'.

The appearance of at least a portion of user interface element 7030 is based on the appearance of underlying portions of environment 7104 at one or more times prior to time $t_2$ and/or at time $t_2$. Generating the appearance of user interface element 7030 based on underlying portions of the environment 7104 is described in more detail herein with reference to FIG. 7G.

FIG. 7E shows a view of environment 7104 at a time T=$t_3$ that is different from (e.g., later than) time $t_2$ illustrated in FIG. 7D, time $t_1$ illustrated in FIG. 7C, and time $t_0$ illustrated in FIG. 7B. FIG. 7E represents a transition from FIG. 7D. Environment 7104 as shown in FIG. 7E reflects movement of the viewpoint of the user via counterclockwise rotation (e.g., righting the computer system, and reversing the clockwise rotation of the viewpoint of the user shown in the transition from FIG. 7C to FIG. 7D) such that environment 7104 appears level relative to display 7100 in FIG. 7E. In addition, physical box 7012 has fallen further in space relative to the field of view of the computer system such that all of corresponding box 7012' is behind and obscured by user interface element 7030. Moreover, ball 7108 is shown as having rolled further toward the right in environment 7104, as indicated by the shifted position of ball 7108 and by the markings on ball 7108 having rotated further clockwise relative to environment 7104 shown in FIG. 7D.

User interface element 7030 in FIG. 7E remains anchored to the viewpoint of the user (e.g., the perspective of the computer system) rather than to environment 7104. Accordingly, in response to the viewpoint of the user being rotated counterclockwise to be substantially level relative to environment 7104 shown in FIG. 7E, user interface element 7030 is also rotated counterclockwise to be substantially upright relative to environment 7104 (e.g., the orientation of user interface element 7030 relative to the computer system is maintained). One of ordinary skill in the art will readily understand that user interface elements such as user interface element 7030 may alternatively be anchored to environment 7104 such that the user interface element (e.g., user interface element 7030) is not moved relative to environment 7104 despite changes in the viewpoint of the user relative to environment 7104. The appearance of user interface element 7030 displayed over environment 7104 in FIG. 7E is different from the appearance of user interface element 7030. Specifically, the appearance of user interface element 7030 in FIG. 7E is based on the appearance of underlying portions of environment 7104 at different times than those used for the appearance of user interface element 7030 in FIG. 7D. For example, the appearance of user interface element 7030 in FIG. 7E is based on the appearance of underlying portions of environment 7104 at one or more times prior to time $t_3$ and/or at time $t_3$, as described in more detail herein with reference to FIG. 7G.

FIG. 7F illustrates different simulated positions of user interface element 7030 relative to environment 7104, as shown in top-down view 7034 of environment 7104. Top-down view 7034 shows the location of the viewpoint 7032 of the user in environment 7104, the positions of ball 7110 and ball 7108, and several different positions 7030-1 through 7030-4 of user interface element 7030 in the three-dimensional environment. The different simulated positions shown in FIG. 7F are possible simulated positions in environment 7104 of user interface element 7030 shown in FIGS. 7D and 7E. For example, user interface element 7030 in FIG. 7D and/or 7E may be at a simulated position in environment 7104 that corresponds to position 7030-1 in FIG. 7F, which is in front of other objects shown in environment 7104, such as ball 7110 and box 7012', from the viewpoint 7032 of the user.

In another example, user interface element 7030 in FIG. 7D and/or 7E may be at a simulated position in environment 7104 that corresponds to position 7030-2 in FIG. 7F, where position 7030-2 is further from viewpoint 7032 than position 7030-1 (e.g., the distance between position 7030-2 and viewpoint 7032 is greater than the distance between position 7030-1 and viewpoint 7032), further from viewpoint 7032 than box 7012' (e.g., the simulated position of box 7012' in environment 7104 corresponding to the physical position of box 7012 in physical environment 7102), further from viewpoint 7032 than (e.g., the simulated position of) ball 7110, and closer to viewpoint 7032 than (e.g., the simulated position of) ball 7108 (e.g., and other objects behind ball 7108 such as wall hanging 7106 and wall 7004').

In another example, user interface element 7030 in FIG. 7D and/or 7E may be at a simulated position in environment 7104 that corresponds to position 7030-3 in FIG. 7F, where position 7030-3 is further from viewpoint 7032 than positions 7030-1 and 7030-2 (e.g., the distance between position 7030-3 and viewpoint 7032 is greater than the distance between position 7030-2 and viewpoint 7032), further from viewpoint 7032 than (e.g., the simulated position of) ball 7108, and closer to viewpoint 7032 than wall hanging 7106 and wall 7004'.

In yet another example, user interface element 7030 in FIG. 7D and/or 7E may be at a simulated position in environment 7104 that corresponds to position 7030-4 in FIG. 7F, where position 7030-4 is further from viewpoint 7032 than positions 7030-1 through 7030-3 (e.g., the distance between position 7030-4 and viewpoint 7032 is greater than the distance between position 7030-3 and viewpoint 7032), and further from viewpoint 7032 than even wall 7004'.

As described in more detail herein with reference to FIG. 7G, in some embodiments, the appearance of user interface element 7030 is based on portions of environment 7104 that overlap with user interface element 7030 regardless of whether the overlapping portions are behind the simulated position of user interface element 7030 or in front of the simulated position of user interface element 7030. In some cases, the appearance of user interface element 7030 is based on portions of environment 7104 that are behind user interface element 7030. In some cases, the appearance of user interface element 7030 is based on portions of environment 7104 that are in front of the simulated position of user interface element 7030 (e.g., even if user interface element 7030 is displayed overlaid on, and thereby obscures, the overlapping portion of environment 7104).

FIG. 7G illustrates a way of generating the appearance of a user interface element (e.g., user interface element 7030) based on a graphical composition of the appearance of overlapping portions of the three-dimensional environment (e.g., environment 7104) on which the user interface element is overlaid. In scenario 7036 in FIG. 7G, user interface element 7030-d has the same appearance as user interface element 7030 in FIG. 7D. Scenario 7036 illustrates that the appearance of user interface element 7030-d at time $t_2$ (e.g., the appearance of user interface element 7030 as shown in FIG. 7D, which shows a view of environment 7104 at time $t_2$) is based on a composite generated at time $t_2$ of multiple frames, with different frames corresponding to a portion of a view of environment 7104 at different times. In some embodiments, in basing the appearance of a respective user interface element on a composite, as described herein with reference to FIG. 7G, one or more visual transformations are applied to one or more regions of the composite to generate the resulting appearance of the user interface element, as described in more detail herein with reference to FIGS. 7X-7Z. The composite in scenario 7036 is based on the appearance of a portion of a first view of environment 7104 at time $t_0$ (FIG. 7B) that corresponds to the portion of environment 7104 over which user interface element 7030 in FIG. 7D is displayed, indicated by the densely dotted line; a portion of a second view of environment 7104 at time $t_1$ (FIG. 7C) that corresponds to the portion of environment 7104 over which user interface element 7030 in FIG. 7D is displayed, indicated by the dashed and dotted line; and a portion of a third view of environment 7104 at time $t_2$ over which user interface element 7030 in FIG. 7D is displayed, indicated by the dashed line. In the example in scenario 7036, the center portion of the composite, indicated by the solid line, defines the appearance of user interface element 7030-d.

In some embodiments, as shown in FIG. 7D, user interface element 7030 includes background portion 7030-a, first content portion 7030-b, and second content portion 7030-c. Content portions 7030-a and 7030-b optionally include visual content such as text or graphics, or selectable and/or activatable objects such as buttons or controls. In some embodiments, the appearance of a background portion of a user interface element (e.g., background portion 7030-a of user interface element 7030) is based on the composite of the appearance of the underlying three-dimensional environment at different prior times. In some embodiments, the appearance of the content portion(s) of a user interface element (e.g., content portions 7030-b and/or 7030-c) are based on the content displayed in the content portion(s), and optionally not based on the composite (e.g., though the content portion(s) may be transparent or partially transparent such that at least some of the background portion, with an appearance based on the composite, is visible, as indicated in FIG. 7G).

In some circumstances, the composite is based on the appearance of a portion of a view of the three-dimensional environment at a time when the user interface element was not displayed. For example, the appearance of user interface element 7030 in FIG. 7D is based on the appearance of corresponding portions of environment 7104 in FIGS. 7B and 7C even though user interface element 7030 is not displayed at time $t_0$ and time $t_1$ (e.g., because user interface element 7030 is displayed in response to an event that occurred at the computer system after time $t_1$ and before time $t_2$). In some embodiments, the portion of the view of environment 7104 that is incorporated into the composite corresponds to the region of display 7100 occupied by user interface element 7030. For example, FIG. 7D shows user interface element 7030 occupying a respective region of display 7100. Although user interface element 7030 is not displayed in FIG. 7C, in some embodiments it is the portion of the view of environment 7104 that occupies a corresponding region of display 7100 in FIG. 7C that is incorporated into the composite. In some embodiments, the portion of the view of environment 7104 that is incorporated into the composite includes all or substantially all (e.g., 90% or greater) of the portion displayed in the corresponding region of display 7100 occupied (or later occupied) by user interface element 7030. In some embodiments, the portion of the view of environment 7104 that is incorporated into the composite extends beyond the corresponding region of display 7100 occupied (or later occupied) by user interface element 7030 (e.g., frames $t_0$, $t_1$, and $t_2$ extend beyond the solid line outline of the center portion of the composite, which optionally delineates user interface element 7030-$d$).

In the example in scenario 7036, the portion of the view of environment 7104 from FIG. 7B that is included in the frame from time $t_0$ and incorporated into the composite is a portion that includes, in the left part of the frame, part of the left side of wall hanging 7106 and, in the bottom part of the frame, part of the top of ball 7108. Frame $t_0$ does not include any part of box 7012', which was not displayed in the view of environment 7104 at time $t_0$ (e.g., because physical box 7012 had not yet entered the field of view of the one or more cameras corresponding to the displayed portion of environment 7104).

The portion of the view of environment 7104 from FIG. 7C that is included in the frame from time $t_1$ and incorporated into the composite in scenario 7036 is different from that of frame $t_0$ in accordance with the change in viewpoint of the user and changes in environment 7104. Specifically, frame $t_1$ includes, in the left part of the frame, part of the left side of wall hanging 7106 at a higher position and at a smaller scale than the part of wall hanging 7106 that is in frame $t_0$ (e.g., because the viewpoint of the user in FIG. 7C has moved downward and further away from wall 7004' and wall hanging 7106 than the viewpoint of the user in FIG. 7B). Frame $t_1$ also includes, in the bottom part of the frame, part of the top of ball 7108, which is a greater portion of the top of ball 7108 than that included in frame $t_0$. Specifically, the portion of the FIG. 7C view of environment 7104 in frame $t_1$ includes more of ball 7108 due to the viewpoint of the user in FIG. 7C having moved downward and further away from wall 7004' than the viewpoint of the user in FIG. 7B. Ball 7108 is also further to the right in frame $t_1$ than in frame $t_0$ due to ball 7108 having rolled further toward the right in FIG. 7C relative to FIG. 7B. Frame $t_1$ also includes, in the top part of the frame, part of the bottom of box 7012', which is displayed in the view of environment 7104 in FIG. 7C (e.g., in accordance with physical box 7012 falling in space and entering the field of view of the computer system that corresponds to the portion of the view of environment 7104 in frame $t_1$).

The portion of the view of environment 7104 from FIG. 7D that is included in the frame from time $t_2$ and incorporated into the composite in scenario 7036 reflects changes in environment 7104 and is tilted relative to the portions of the view of environment 7104 in frames to and $t_1$, in accordance with the clockwise rotation of the viewpoint of the user to the viewpoint shown in FIG. 7D. Specifically, frame $t_2$ includes, in the left part of the frame, more of the left side of wall hanging 7106 than frame $t_1$, and the included part of wall hanging 7106 is tilted counterclockwise. Frame $t_2$ also includes, in the bottom part of the frame, less of the top of ball 7108 due to ball 7108 having rolled even further toward the right, and the included part of ball 7108 is tilted counterclockwise as well (e.g., to the extent discernible, given that ball 7108 is circular). In addition, frame $t_2$ includes, in the top part of the frame, more of box 7012' (e.g., in accordance with physical box 7012 falling in space such that more of box 7012 is in the field of view of the computer system that corresponds to the displayed view of environment 7104, and accordingly such that more of box 7012' is in the portion of environment 7104 over which user interface element 7030 in FIG. 7D is displayed), and the included part of box 7012' is also tilted counterclockwise relative to frame $t_2$.

In some embodiments, as shown in FIG. 7G, the frames used in a composite may be offset from each other based on the viewpoint of the user at the time associated with each frame. For example, frame $t_0$ is positioned to the right and/or scaled up (e.g., zoomed in), and lower, than frame $t_1$ in forming the composite, in accordance with the viewpoint of the user in FIG. 7B (for frame to) being different from the viewpoint of the user in FIG. 7C (for frame $t_1$), the viewpoint of the user having moved downward and further from wall 7004' from FIG. 7B to 7C. Stated another way, the offset and/or scaling of frame $t_1$ relative to frame $t_0$ is consistent with the change in viewpoint of the user causing the contents of frame $t_1$ to be shifted higher and zoomed out relative to the contents of frame $t_0$. Similarly, the contents of frame $t_2$ are tilted counterclockwise relative to the contents of frames to and $t_1$, in accordance with the viewpoint of the user being rotated clockwise in FIG. 7D relative to FIGS. 7B-7C.

In some embodiments, the appearance of user interface element 7030 is based on a composite of the appearance of portions of environment 7104 even if the simulated position of user interface element 7030 is further from the viewpoint of the user than those portions of environment 7104, as discussed above with reference to FIG. 7F. For example, the simulated position of user interface element 7030 in FIG. 7D may be position 7030-4 as shown in FIG. 7F. In this example, the appearance of user interface element 7030-$d$ is based on the appearance of frames $t_0$, $t_1$, and $t_2$, which include views of portions of objects (e.g., wall hanging 7106, ball 7108, and, in frames $t_1$ and $t_2$, box 7012') that are closer to viewpoint 7032 of the user in environment 7104 than position 7030-4, even though user interface element 7030 in FIG. 7D is overlaid on or replaces the views of the portions of those closer objects. In another example, the simulated position of user interface element 7030 in FIG. 7D is position 7030-3 as shown in FIG. 7F, and the appearance of user interface element 7030-$d$ is based on the appearances of portions of environment 7104 including parts of wall hanging 7106, ball 7108, and box 7012', even though position 7030-3 is further from viewpoint 7032 of the user than ball 7108 and box 7012'. In yet another example, the simulated position of user interface element 7030 in FIG. 7D is position 7030-2, and the appearance of user interface element 7030-$d$ is likewise based at least partially on the appearance of box 7012', even though box 7012' is closer to viewpoint 7032 than position 7030-2. Finally, with respect to FIG. 7F, user interface element 7030 may have a simulated position that is position 7030-1, which is closer to viewpoint 7032 of the user than any of box 7012', ball 7108, and wall hanging 7106.

In some embodiments, generating the composite includes assigning different weights to different frames. Optionally, a frame that is given a greater weight in generating the composite has a greater impact on the appearance of user interface element 7030 than a frame that is given a lesser weight. In scenario 7036, the appearance of user interface element 7030-d may be based a first amount (e.g., to a first degree or extent) on frame $t_0$, a different second amount (e.g., to a second degree or extent) on frame $t_1$, and a different third amount (e.g., to a third degree or extent) on frame $t_2$. If, for example, frame $t_2$ is weighted more heavily than frame $t_1$, and frame $t_1$ is in turn weighted more heavily than frame $t_0$, then the top portion of user interface element 7030-d (e.g., delineated by the solid line in the composite) is based more on the appearance of the bottom portion of box 7012' in frame $t_2$ (e.g., in which box 7012' spans across the solid outline) than on the corresponding portion of frame $t_1$ (e.g., in which box 7012' is outside of the solid outline), and even more than on the corresponding portion of frame $t_0$ (e.g., in which box 7012' is not displayed). Stated another way, the contribution of box 7012' to the appearance of user interface element 7030-d as shown in scenario 7036 is more pronounced than if frame $t_2$ were weighted less heavily. Continuing with the same example, the lower right portion of user interface element 7030-d is based more on the appearance of the top part of ball 7108 in frame $t_2$ than on the appearance of the corresponding portions of frame $t_1$ and frame $t_0$. Stated another way, the contribution of ball 7108 to the appearance of user interface element 7030-d as shown in scenario 7036 would be more pronounced if frame $t_1$ were weighted more heavily, because ball 7108 in frame $t_1$ extends further into the solid outline than in frames to and $t_2$.

In some embodiments, the weighting of frames in a composite is based on whether the frames are from times closer to or further from the time at which the composite is generated. For example, the contribution of frames from times closer to the time at which the composite is generated (e.g., later, more recent frames) is in some embodiments greater than the contribution of frames from times further from the time at which the composite is generated (e.g., earlier, less recent frames). Using the example in scenario 7036, in accordance with time $t_1$ being closer to time $t_2$ than time $t_0$ is to time $t_2$, the composite generated at time $t_2$ optionally includes a greater contribution from frame $t_1$ than from frame to, such as a greater contribution of box 7012' from frame $t_1$ than the contribution of the absence of box 7012' from frame $t_0$.

In some embodiments, one or more transformations or alterations are applied in generating a composite (e.g., applied first to the frames before the frames are used in generating the composite, or applied to an intermediate composite of the unaltered frames to generate the final composite). In some cases, the transformations/alternations serve to smooth the appearance of the frames and/or the resulting composite, which improves the legibility of content displayed overlaid on the user interface element. For example, the composite and/or the frames used in generating the composite may be blurred. In another example, the resolution of the image or graphics information in the frames and/or the resulting composite may be reduced (e.g., by downsampling). In another example, a noise pattern may be applied to the composite and/or the frames used in generating the composite. Accordingly, scenario 7036 in FIG. 7G shows user interface element 7030-d with a blurred appearance achieved by blurring and/or applying a noise pattern to frames $t_0$, $t_1$, and/or $t_2$ in generating the composite at time $t_2$. In some embodiments, the frames are made partially translucent for generating the composite and/or the resulting composite is made partially translucent, which would allow underlying environment 7104 to be at least partially visible underneath user interface element 7030.

Returning to FIG. 7G, scenario 7038 illustrates a way of generating the appearance of user interface element 7030-e, which has the same appearance as user interface element 7030 in FIG. 7E. Scenario 7038 illustrates that the appearance of user interface element 7030 at time $t_3$ (e.g., the appearance of user interface element 7030 as shown in FIG. 7E, which shows a view of environment 7104 at time $t_3$) is based on a composite generated at time $t_3$ of multiple frames, with different frames corresponding to a portion of a view of environment 7104 at different times. The appearance of user interface element 7030 at time $t_3$ (FIG. 7E) is optionally based on different frames than the frames used to generate the composite serving as the basis for the appearance of user interface element 7030 at time $t_2$ (FIG. 7D). Specifically, the composite in scenario 7038 is based on the appearance of a portion of a first view of environment 7104 at time $t_1$ (FIG. 7C) that corresponds to the portion of environment 7104 over which user interface element 7030 in FIG. 7E is displayed, indicated by the dashed and dotted line; a portion of a second view of environment 7104 at time $t_2$ (FIG. 7D) over which user interface element 7030 is displayed (or alternatively, a portion of the view of environment 7104 at time $t_2$ that corresponds to the portion of environment 7104 over which user interface element 7030 is later displayed at time $t_3$, as shown in FIG. 7E), indicated by the dashed line; and a portion of a third view of environment 7104 at time $t_3$ over which user interface element 7030 in FIG. 7E is displayed, indicated by the sparsely dotted line. In the example in scenario 7038, the center portion of the composite, indicated by the solid line, defines the appearance of user interface element 7030-e. In the example shown in FIG. 7G, the composite in scenario 7038 differs from the composite in scenario 7036 in that the composite in scenario 7038 includes frame $t_3$ and does not include frame $t_0$. One of ordinary skill will recognize that different combinations of current and/or prior frames may be included in (or excluded from) the composite that defines the appearance of a user interface element at a given point in time, relative to the frames used for the composites that determine the appearance of a user interface element at other points in time.

As discussed above with reference to scenario 7036, the composite may in some circumstances be based on the appearance of a portion of a view of environment 7104 at a time when user interface element 7030 was not displayed. Scenario 7038 illustrates that the composite is based on the appearance of a portion of the view of environment 7104 at time $t_1$ illustrated in FIG. 7C, prior to display of user interface element 7030. In such circumstances, the portion of the view of environment 7104 that is incorporated into the composite corresponds to the region of display 7100 occupied by user interface element 7030 at a later time such as $t_2$ or $t_3$. Moreover, in some embodiments, the portion of the view of environment 7104 that is included in a particular frame that is incorporated into the composite extends beyond the boundaries of user interface element 7030 (e.g., frames $t_1$, $t_2$, and $t_3$ extend beyond the solid line outline of the center portion of the composite, which optionally delineates user interface element 7030-e).

Frames $t_1$ and $t_2$, which are used in the composite in scenario 7038, and which are taken from the views of environment 7104 as described with reference to FIGS. 7C and 7D, respectively, are the same as those used in the composite described above with reference to scenario 7036. The portion of the view of environment 7104 from FIG. 7E that is included in the frame from time $t_3$ and incorporated into the composite in scenario 7038 (e.g., instead of frame $t_0$) is rotated clockwise relative to that of frame $t_2$, in accordance with counterclockwise rotation of the viewpoint of the user in the transition from FIG. 7D to 7E, such that frame $t_3$ includes a level view of environment 7104. Specifically, frame $t_3$ includes, in the left part of the frame, part of the left side of wall hanging 7106 and, in the bottom part of the frame, part of the top of ball 7108. Frame $t_3$ also includes, in the top part of the frame, more of box 7012' (e.g., in accordance with physical box 7012 falling in space, such that more of box 7012' is in the portion of environment 7104 over which user interface element 7030 in FIG. 7E is displayed).

Accordingly, user interface element 7030-*e* in scenario 7038 has a different appearance than user interface element 7030-*d* in scenario 7036, because user interface element 7030-*e* is based on a composite of different frames with different contents than the frames used for the composite on which user interface element 7030-*d* is based. For example, because of the extent to which box 7012' extends into frame $t_3$, and because user interface element 7030-*e* is based on a composite that includes frame $t_3$, the contribution of box 7012' to the appearance of user interface element 7030-*e* as shown in scenario 7038 is more pronounced than the contribution of box 7012' to the appearance of user interface element 7030-*d* as shown in scenario 7036.

As discussed above with reference to scenario 7036, the frames used in a composite may be offset from each other based on the viewpoint of the user at the time associated with each frame. For example, in scenario 7038, the contents of frame $t_2$ are rotated (e.g., counterclockwise) relative to the contents of frames $t_1$ and $t_3$, in accordance with the viewpoint of the user being rotated (e.g., clockwise) relative to the viewpoint of the user in FIGS. 7C and 7E.

As also discussed above with reference to scenario 7036, the appearance of user interface element 7030 is optionally based on a composite of the appearance of portions of environment 7104 even if the simulated position of user interface element 7030 is further from the viewpoint of the user than those portions of environment 7104. For example, the simulated position of user interface element in FIG. 7E may be any of positions 7030-1 through 7030-4, and user interface element 7030-*e* may have the same appearance for any of those simulated positions.

In addition, as discussed above with reference to scenario 7036, in some embodiments, one or more transformations or alterations are applied in generating the composite at time $t_3$ in scenario 7038, such as blurring, applying a noise pattern, and/or downsampling image or graphics information. Accordingly, scenario 7038 shows user interface element 7030-*e* with a blurred appearance achieved by blurring, downsampling, and/or applying a noise pattern to frames $t_1$, $t_2$, and/or $t_3$ in generating the composite at time $t_3$.

Similarly, in scenario 7038, generating the composite optionally includes assigning different weights to different frames. For example, the appearance of user interface element 7030-*e* may be based a first amount on frame $t_1$, a different second amount on frame $t_2$, and a different third amount on frame $t_3$. If, for example, frame $t_3$ is weighted more heavily than frame $t_2$, and frame $t_2$ is in turn weighted more heavily than frame $t_1$, then the top portion of user interface element 7030-*e* (e.g., delineated by the solid line in the composite) is based more on the appearance of the bottom portion of box 7012' in frame $t_3$ (e.g., in which box 7012' extends further into the frame) than on the corresponding portion of frame $t_2$ (e.g., in which box 7012' extends less into the frame and is also rotated counterclockwise relative to the frame). Stated another way, the contribution of box 7012' to the appearance of user interface element 7030-*e* as shown in scenario 7038 is more pronounced than if frame $t_3$ were weighted less heavily. Continuing with the same example, the right portion of user interface element 7030-*e* is based more on the appearance of the left part of wall hanging 7106 in frame $t_3$ than on the appearance of the corresponding portions of frame $t_2$ and $t_1$. Stated another way, the contribution of wall hanging 7106 to the appearance of user interface element 7030-*e* as shown in scenario 7038 would be more pronounced if frame $t_2$ were weighted more heavily, because wall hanging 7106 in frame $t_2$ extends further into the solid outline than in frames $t_1$ and $t_3$.

As a further example of assigning greater weights to frames from times closer to the time at which the composite is generated (e.g., later, more recent frames) than to frames from times further from the time at which the composite is generated (e.g., earlier, less recent frames), in scenario 7038, frame $t_3$ is weighted more heavily than frame $t_1$, consistent with the composite being generated at time $t_3$, which occurs later than time $t_1$. Accordingly, the composite generated at time $t_3$ includes a greater contribution from frame $t_3$ than from frame $t_1$, such as a greater contribution from box 7012' in frame $t_3$ than from the smaller portion of box 7012' in frame $t_1$.

The greater contribution of later frames to a composite is also apparent in a comparison of the composite generated at time $t_2$ (scenario 7036) to the composite generated at time $t_3$ (scenario 7038). For example, both composites include frame $t_1$. However, time $t_1$ is closer to time $t_2$ than to time $t_3$, so the composite generated at time $t_2$ (scenario 7036) includes a greater contribution from frame $t_1$ than does the composite generated at time $t_3$. Specifically, the contribution of ball 7108 in frame $t_1$ to the composite generated at time $t_2$ (scenario 7036) is greater than the contribution of ball 7108 in frame $t_1$ to the composite generated at time $t_3$ (scenario 7038), such that the effect of ball 7108 is more pronounced in user interface element 7030-*d* than in user interface element 7030-*e*. In another example, the absence of box 7012' from frame $t_0$ contributes to the composite generated at time $t_2$ (scenario 7036), whereas frame $t_0$ is not included in and does not contribute to the composite generated at time $t_3$ (scenario 7038), and instead the composite generated at time $t_3$ is based on an additional frame $t_3$ that does include a portion of box 7012', such that the resulting top portion of user interface element 7030-*d* is less influenced by the presence of box 7012' than the top portion of user interface element 7030-*e*.

In some embodiments, the number of frames included in a composite is based on the amount of movement of the viewpoint of the user. For example, in FIG. 7G, the composite generated at time $t_2$ includes three frames $t_0$, $t_1$, and $t_2$, based on the amount of movement of the viewpoint of the user between FIGS. 7B through 7D. Similarly, the composite generated at time $t_3$ includes three frames $t_1$, $t_2$, and $t_3$, based on the amount of movement of the viewpoint of the user between FIGS. 7C through 7E. One of ordinary skill will recognize that where there is less movement of the viewpoint of the user, fewer frames may be included when generating the composite. For example, if the view of environment 7104 had remained the same in FIG. 7D as in FIG. 7C, the composite generated at $t_2$ might include two frames instead of three (e.g., frame $t_0$ and only one other frame selected from frames $t_1$ and $t_2$). Stated another way, the appearance of the underlying environment is sampled more frequently when the viewpoint of the user moves more, such that the time intervals between the different frames included in a composite are larger when there is less movement of the viewpoint of the user, and smaller for more movement of the viewpoint of the user.

Figure 7H:
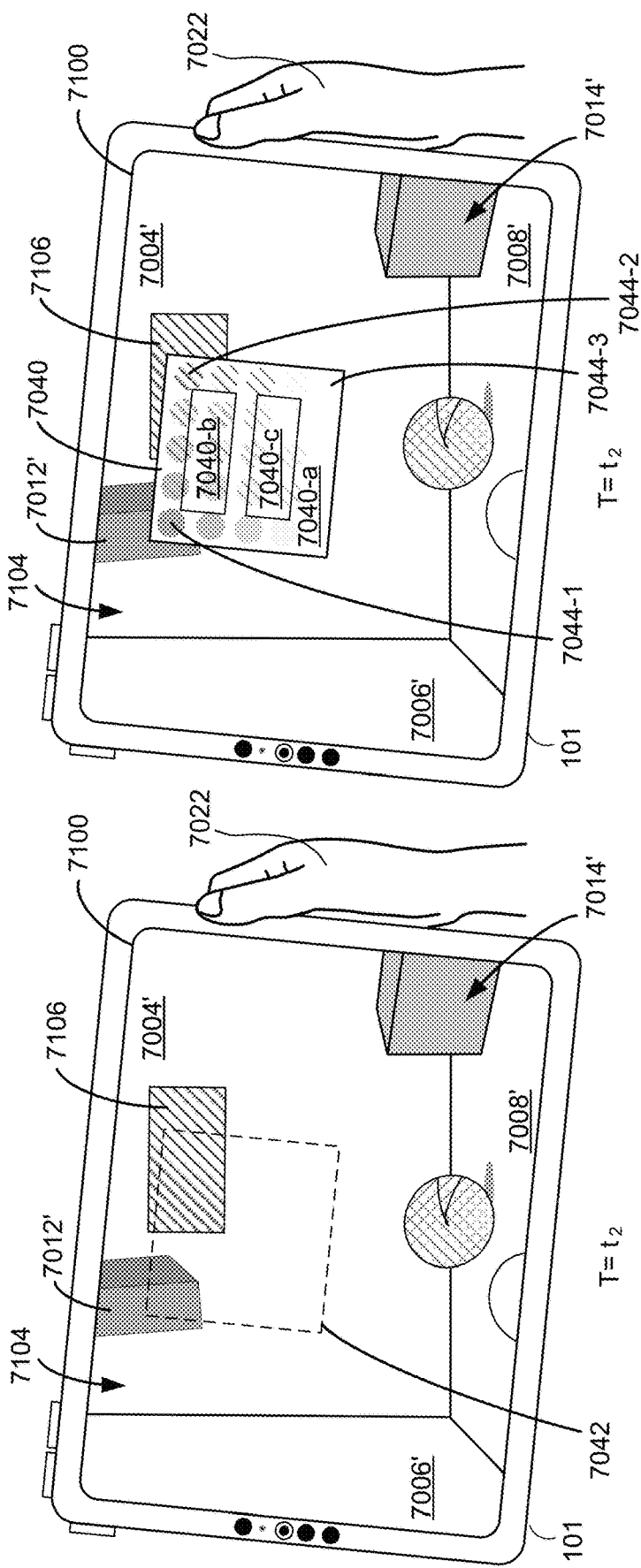
FIGS. 7H-7J illustrate displaying a user interface element over a view of a three-dimensional environment, where the user interface element has an appearance that is based on a color gradient generated from one or more colors sampled from multiple points in the three-dimensional environment, in accordance with some embodiments.
Figure 7I:
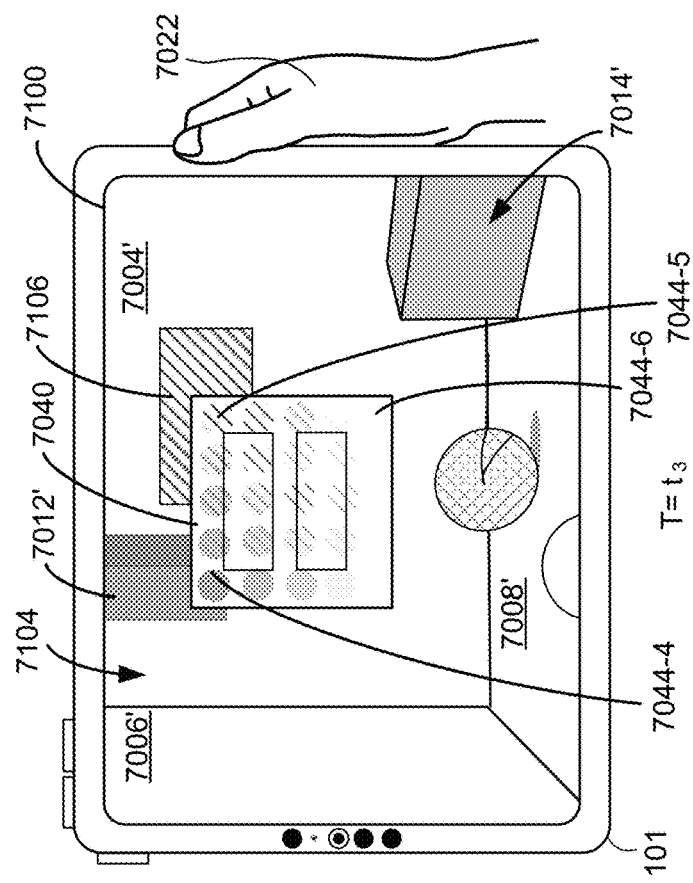
Figure 7I:
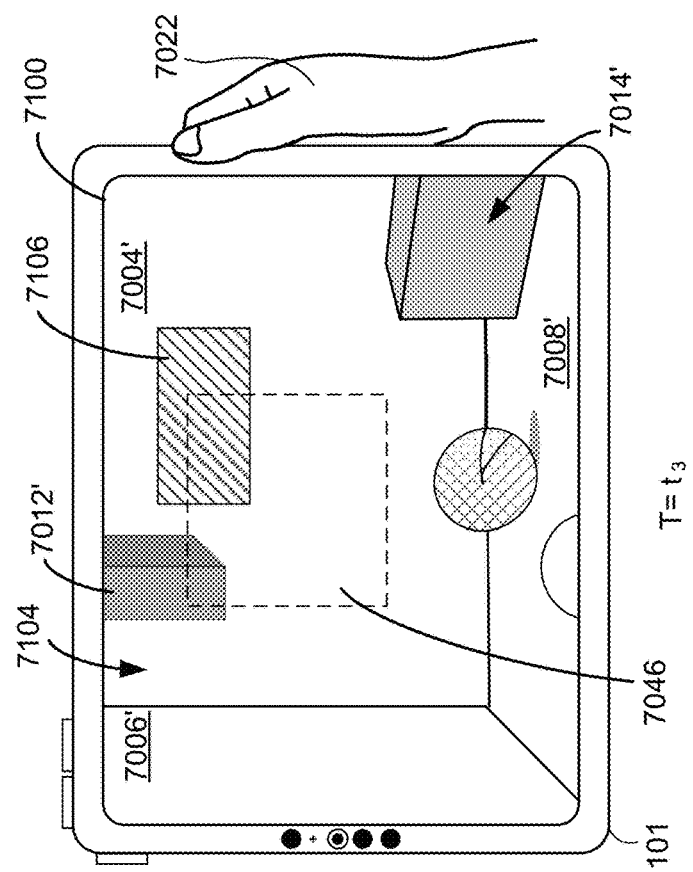
Figure 7J:
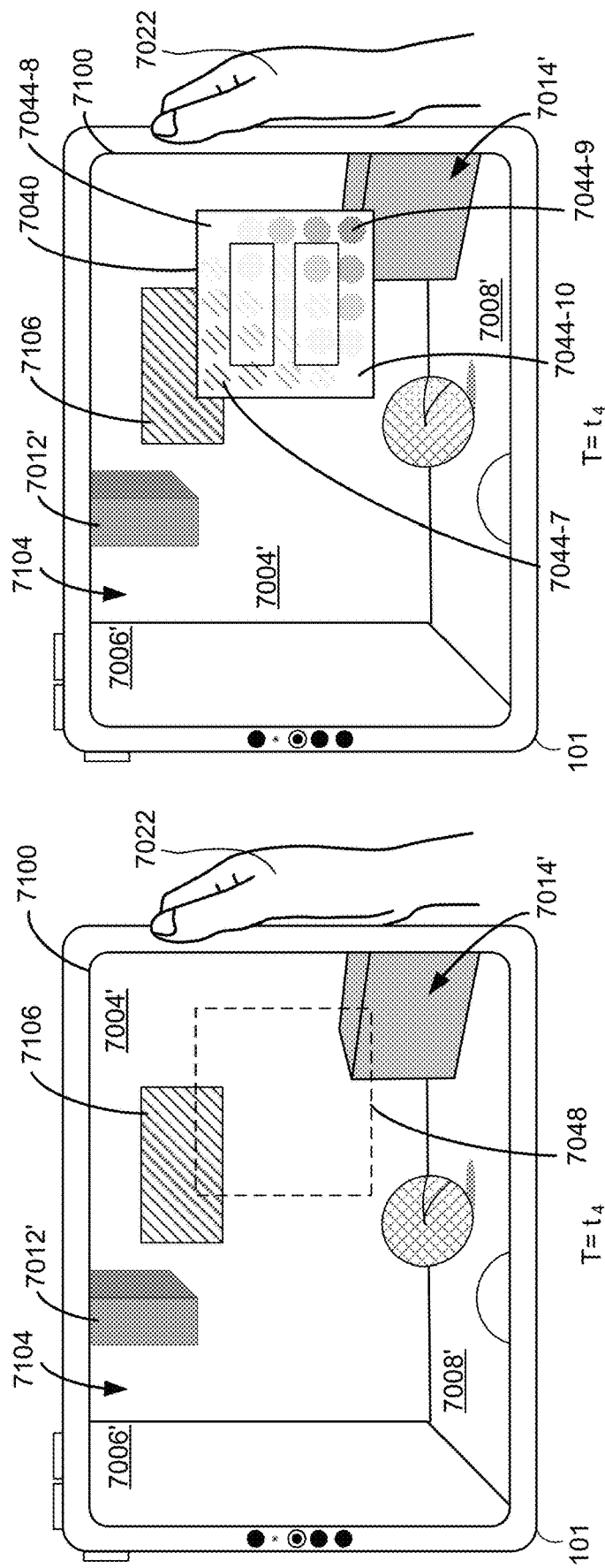

FIGS. 7H-7J illustrate displaying a user interface element over a view of a three-dimensional environment, where the user interface element has an appearance that is based on a color gradient generated from one or more colors sampled from multiple points in the three-dimensional environment, in accordance with some embodiments. The user interfaces in FIGS. 7H-7J are used to illustrate the processes described below, including the processes in FIG. 9.

In some embodiments, as described herein with reference to FIGS. 7A-7G, the user interface element presents a user interface and/or is displayed as a three-dimensional object at a location in three-dimensional space. The user interface element typically includes a background that is based on the color gradient generated from one or more colors sampled from the underlying environment, and content with which a user can interact. Behaviors described in FIGS. 7H-7J with respect to user interface elements in some examples are applicable to user interface elements in other examples, in accordance with various embodiments, unless stated otherwise in the descriptions. In some embodiments, in basing the appearance of a respective user interface element on a color gradient, as described herein with reference to FIGS. 7H-7J, one or more visual transformations are applied to one or more regions of the color gradient to generate the resulting appearance of the user interface element, as described in more detail herein with reference to FIGS. 7X-7Z.

FIG. 7H illustrates a view of environment 7104 at a time T=$t_2$ (e.g., FIG. 7H is an alternate scenario to the scenario shown in FIG. 7D). In FIG. 7H, display generation component 7100 displays a view of environment 7104 in response to computer system 101 detecting an event that triggers display of user interface element 7040 instead of user interface element 7030. Like user interface element 7030 (FIG. 7D), user interface element 7040 may be an application user interface (e.g., displayed in response to a user input to launch the application), an alert, a notification, an operating system user interface, or other computer-generated object. In contrast to FIG. 7D, in which user interface element 7030 is displayed with an appearance that is based on a graphical composition of underlying portions of environment 7104 at different times, including times prior to time $t_2$ (and optionally including $t_2$), in FIG. 7H, user interface element 7040 is displayed with an appearance that is based on a color gradient generated from colors sampled from environment 7104. In the example shown in FIG. 7H, the color gradient is generated from colors sampled from environment 7104 at a time corresponding to time $t_2$ (e.g., at time $t_2$, at a time just prior to $t_2$ that results in the gradient, upon being generated, being displayed at time $t_2$ as shown in FIG. 7H, or during a range of times that includes or ends at $t_2$). In some embodiments, generating a color gradient for a given time or range of times is less computationally intensive than generating a graphical composition of multiple frames from different points in time.

Specifically, the color gradient is generated from colors sampled from the portion of the view of environment 7104 on which user interface element 7040 is overlaid, denoted as region 7042 in FIG. 7H (left). That is, the appearance of user interface element 7040 is based on a color gradient between a plurality of colors (e.g., two or more colors) sampled from region 7042 of environment 7104. In the example in FIG. 7H, the sampled colors include a first color 7044-1 taken from box 7012', a second color 7044-2 taken from wall hanging 7106, and a third color 7044-3 taken from wall 7004'. Accordingly, user interface element 7040 is displayed in FIG. 7H (right) with a color gradient between colors 7044-1, 7044-2, and 7044-3. In particular, the color gradient from the top left corner of user interface element 7040, which is overlaid on box 7012', to the top right corner of user interface element 7040, which is overlaid on wall hanging 7106, transitions from color 7044-1, sampled from box 7012', to color 7044-2, sampled from box 7106. Similarly, the color gradient from the top left corner of user interface element 7040, which is overlaid on box 7012', to the bottom left corner of user interface element 7040, which is overlaid on wall 7004', transitions from color 7044-1 sampled from box 7012' to color 7044-3 sampled from wall 7004'. Likewise, the color gradient from the top right corner of user interface element 7040, which is overlaid on wall hanging 7106, to the bottom right corner of user interface element 7040, which is overlaid on wall 7004', transitions from color 7044-2 sampled from box 7106 to color 7044-3 sampled from wall 7004'. The color gradient along the bottom edge region of user interface element 7040 is based on two colors both sampled from wall 7004', which in the example of FIG. 7H are both the same color, and thus the bottom edge region of user interface element 7040 is shown without a discernible gradient.

In some embodiments, as shown in FIG. 7H, user interface element 7040 includes background portion 7040-*a*, first content portion 7040-*b*, and second content portion 7040-*c*. Content portions 7040-*a* and 7040-*b* optionally include visual content such as text or graphics, or selectable and/or activatable objects such as buttons or controls. In some embodiments, the appearance of a background portion of a user interface element (e.g., background portion 7040-*a* of user interface element 7040) is based on the color gradient generated from colors sampled from different portions of the underlying three-dimensional environment. In some embodiments, the appearance of the content portion(s) of a user interface element (e.g., content portions 7040-*b* and/or 7040-*c*) are based on the content displayed in the content portion(s), and optionally not based on the color gradient (e.g., though the content portion(s) may be transparent or partially transparent such that at least some of the background portion, with an appearance based on the color gradient, is visible, as indicated in FIG. 7H).

In some embodiments, as shown in FIGS. 7H-7J, a user interface element such as user interface element 7040 is opaque. That is, user interface element 7040, including specifically background portion 7040-*a*, is displayed with an appearance based on the generated color gradient and is not displayed with a degree of transparency that allows the underlying three-dimensional environment to be at least partially visible through user interface element 7040. In some embodiments, as shown in FIGS. 7H-7J, the effect of the color gradient on the appearance of user interface element 7040 extends to the edges of user interface element 7040, including specifically background portion 7040-*a*.

FIG. 7I illustrates a view of environment 7104 at a time T=$t_3$ that is different from (e.g., later than) time $t_2$ illustrated in FIG. 7H (e.g., FIG. 7I is an alternate scenario to the scenario shown in FIG. 7E). FIG. 7I represents an example transition from FIG. 7H. Environment 7104 as shown in FIG. 7I reflects movement of the viewpoint of the user via counterclockwise rotation (e.g., similar to the change in the viewpoint of the user from FIG. 7D to FIG. 7E) such that environment 7104 appears level relative to display 7100 in FIG. 7I. User interface element 7040 remains anchored to the viewpoint of the user (e.g., the perspective of the computer system) rather than to environment 7104. Accordingly, in response to the viewpoint of the user being rotated counterclockwise to be substantially level relative to environment 7104, user interface element 7040 is also rotated counterclockwise to be substantially upright relative to environment 7104 (e.g., the orientation of user interface element 7040 relative to the computer system is maintained). The appearance of user interface element 7040 displayed over environment 7104 in FIG. 7I is based on a color gradient generated from colors sampled from environment 7104 at a time or range of times corresponding to time $t_3$ (e.g., at time $t_3$, at a time just prior to time $t_3$ that results in the gradient being displayed at time $t_3$ as shown in FIG. 7I, or during a range of times that includes or ends at $t_3$), and in particular from portions of environment 7104 over which user interface element 7040 is displayed.

Specifically, the color gradient is generated from colors sampled from region 7046 in FIG. 7I (left), which indicates the portion of the view of environment 7104 on which user interface element 7040 is overlaid. In the example in FIG. 7I, the sampled colors include a first color 7044-4 (e.g., different from color 7044-1 in FIG. 7H) taken from box 7012', a second color 7044-5 (e.g., different from color 7044-2 in FIG. 7H) taken from wall hanging 7106, and a third color 7044-6 (e.g., different from color 7044-3 in FIG. 7H) taken from wall 7004'. Accordingly, user interface element 7040 is displayed in FIG. 7I (right) with a color gradient between colors 7044-4, 7044-5, and 7044-6. In particular, the color gradient from the top left corner of user interface element 7040, which is overlaid on box 7012', to the top right corner of user interface element 7040, which is overlaid on wall hanging 7106, transitions from color 7044-4, sampled from box 7012', to color 7044-5, sampled from box 7106. Similarly, the color gradient from the top left corner of user interface element 7040, which is overlaid on box 7012', to the bottom left corner of user interface element 7040, which is overlaid on wall 7004', transitions from color 7044-4 sampled from box 7012' to color 7044-6 sampled from wall 7004'. Likewise, the color gradient from the top right corner of user interface element 7040, which is overlaid on wall hanging 7106, to the bottom right corner of user interface element 7040, which is overlaid on wall 7004', transitions from color 7044-5 sampled from box 7106 to color 7044-6 sampled from wall 7004'. The color gradient along the bottom edge region of user interface element 7040 is based on two colors both sampled from wall 7004', which in the example of FIG. 7I are both the same color, and thus the bottom edge region of user interface element 7040 is shown without a discernible gradient.

In some circumstances, the colors of the portions of environment 7104 that are behind user interface element 7040, and as such the sampled colors, are the same from one point in time $t_0$ another, such as if the viewpoint of the user did not change from FIG. 7H to FIG. 7I, and the portions of environment 7104 that were behind user interface element 7040 in FIG. 7I were the same as those in FIG. 7H (e.g., if color 7044-4 were the same as color 7044-1, if color 7044-5 were the same as color 7044-2, and if color 7044-6 were the same as color 7044-3). In such circumstances, the color gradient aspect of the appearance of user interface element 7040 would be the same in FIG. 7I as in FIG. 7H. In some embodiments, after generating the color gradient for the appearance of user interface element 7040 at time $t_2$, the computer system would not need to regenerate the color gradient for the appearance of user interface element 7040 at time $t_3$, which would reduce the computational burden of generating the appearance of and/or displaying user interface element 7040.

FIG. 7J illustrates a view of environment 7104 at a time $T=t_4$ that is different from (e.g., later than) time $t_3$ illustrated in FIG. 7I. FIG. 7J represents an example transition from FIG. 7I. Environment 7104 as shown in FIG. 7J reflects movement of user interface element 7040 to the right and slightly downward from its position as shown in FIG. 7I. The appearance of user interface element 7040 in FIG. 7J is based on a color gradient generated from colors sampled from environment 7104 at a time or range of times corresponding to time $t_4$, and in particular from portions of environment 7104 over which user interface element 7040 is displayed.

Region 7048 in FIG. 7J (left) indicates the portion of the view of environment 7104 over which user interface element 7040 is overlaid. In FIG. 7J (right), user interface element 7040 is overlaid on a portion of environment 7104 that includes wall hanging 7106 and box 7014'. The appearance of user interface element 7040 is accordingly based on a color gradient between a plurality of colors sampled from region 7048 of environment 7104. In the example in FIG. 7H, the sampled colors include a first color 7044-7 taken from wall hanging 7106, a second color 7044-8 taken from wall 7004', a third color 7044-9 taken from box 7014', and a fourth color 7044-10 taken from wall 7004'. Accordingly, user interface element 7040 is displayed in FIG. 7J (right) with a color gradient between colors 7044-7, 7044-8, 7044-9, and 7044-10. In particular, the color gradient from the top left corner of user interface element 7040, which is overlaid on wall hanging 7106, to the top right corner of user interface element 7040, which is overlaid on wall 7004', transitions from color 7044-7, sampled from wall hanging 7106, to color 7044-8, sampled from wall 7004'. Similarly, the color gradient from the top left corner of user interface element 7040, which is overlaid on wall hanging 7106, to the bottom left corner of user interface element 7040, which is overlaid on wall 7004', transitions from color 7044-7 sampled from wall hanging 7106 to color 7044-10 sampled from wall 7004'. Likewise, the color gradient from the top right corner of user interface element 7040, which is overlaid on wall 7004', to the bottom right corner of user interface element 7040, which is overlaid on box 7014', transitions from color 7044-8 sampled from wall 7004' to color 7044-9 sampled from box 7014'. In addition, the color gradient along the bottom edge region of user interface element 7040, from the bottom left corner of user interface element 7040, which is overlaid on wall 7004', to the bottom right corner of user interface element 7040, which is overlaid on box 7014', transitions from color 7044-10 sampled from wall 7004' to color 7044-9 sampled from box 7014'.

In some embodiments, the appearance of a user interface element at a given time, such as user interface element 7040 at time $t_2$, is based on a color gradient that uses colors sampled at a time corresponding to the given time without using colors sampled at times corresponding to times prior to the given time, such as time $t_1$ or time $t_0$, thereby reducing the computational burden of generating the color gradient and thus of generating the user interface element. In another example, the appearance of user interface element 7040 at time ta is based on a color gradient that uses colors sampled at a time corresponding to time $t_4$ without using colors sampled at times corresponding to times prior to $t_4$, such as $t_2$, or $t_3$.

In some embodiments where the appearance of a user interface element is based on a gradient between colors sampled from portions of the environment behind the user interface element, the colors are sampled from one or more other computer-generated user interface elements, whose appearances in turn are also based on respective gradients between colors sampled from portions of the environment behind those other computer-generated elements, and updated over time, analogously to the foreground user interface element. For example, if in FIGS. 7H-7J, the appearance of one or more regions of wall hanging 7106 were based on a color gradient between a plurality of colors sampled from one or more portions of environment 7104 behind wall hanging 7106 (e.g., one or more portions of wall 7004'), then the appearance of user interface element 7040 would be based on colors sampled from another computer-generated object, wall hanging 7106, whose appearance is also updated over time according to the techniques described above with reference to user interface element 7040 in FIGS. 7H-7J.

Figure 7K:
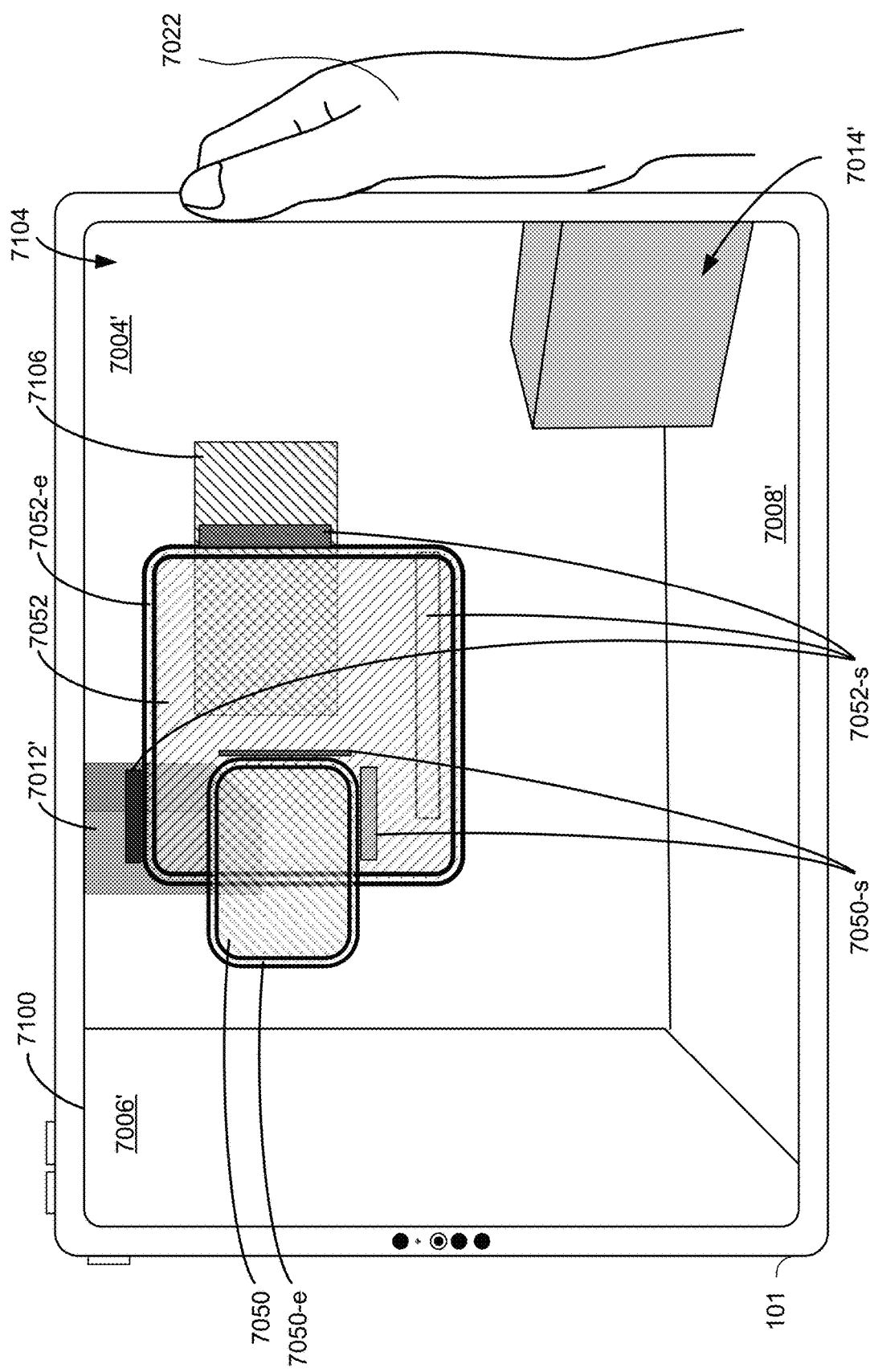
FIGS. 7K-7O illustrate displaying a user interface element with the appearance of a simulated material having a simulated thickness and curvature along the edges of the user interface element, where the edges of the user interface element have simulated optical properties that interact with light in the three-dimensional environment, in accordance with some embodiments.

In some circumstances, multiple user interface elements whose appearances are based on overlapping portions of the three-dimensional environment (e.g., based on graphical compositions and/or color gradients) are displayed as at least partially overlapping with each other (e.g., overlapping user interface elements 7050 and 7052 as described herein with reference to FIG. 7K). In some embodiments, the appearance of the user interface element in the background is generated using one or more of the techniques described herein (e.g., based on graphical compositions and/or color gradients), and the appearance of the portion of the user interface element in the foreground that overlaps with the user interface element in the background is based on, defined by, or the same as the appearance of the corresponding portion of the underlying user interface element. For example, if, as described above, the appearance of wall hanging 7106 were based on a color gradient between colors sampled from wall 7004' and other underlying portions of environment 7104 behind wall hanging 7106, the appearance of the portion of user interface element 7040 that is overlaid on wall hanging 7106 is optionally based on, the same as, or a copy of the corresponding underlying portion of wall hanging 7106, thereby reducing the computation burden in generating user interface element 7040.

In some embodiments, the appearance of a user interface element is based on a color gradient between colors sampled from portions of the environment that overlap with, though are not necessarily behind, the user interface element. For example, as described herein with reference to FIG. 7F, portions of environment 7104 that are closer to viewpoint 7032 of the user than user interface element 7030 is to viewpoint 7032 can contribute to the appearance of user interface element 7030. Similarly, the simulated position of user interface element 7040 in environment 7104 may be further from the viewpoint of the user in FIGS. 7H-7J than box 7012', wall hanging 7106, and/or 7014' are to the viewpoint of the user, yet the color gradient for the appearance of user interface element 7040 may be generated from colors sampled from box 7012', wall hanging 7106, and/or 7014' and optionally one or more other portions of environment 7104 that are closer to the viewpoint of the user than the simulated position of user interface element 7040 (e.g., if the simulated position of user interface element 7040 in FIGS. 7H-7J relative to environment 7104 is position 7030-4, shown FIG. 7F).

FIGS. 7K-7O illustrate displaying a user interface element (e.g., user interface element 7050 and user interface element 7052) with the appearance of a simulated material having a simulated thickness and curvature along the edges of the user interface element, where the edges of the user interface element have simulated optical properties that interact with light in the three-dimensional environment, in accordance with some embodiments. The user interfaces in FIGS. 7K-7O are used to illustrate the processes described below, including the processes in FIGS. 10 and 11. The user interface elements described with reference to FIGS. 7K-7O optionally have one or more of the characteristics and/or behaviors of the user interface elements described herein with respect to other examples such as the examples in FIGS. 7A-7G, 7H-7J, 7P, 7Q-7W, and/or 7X-7Z, in accordance with some embodiments, unless stated otherwise in the descriptions.

FIG. 7K illustrates a view of environment 7104 displayed via display generation component 7100. The displayed view of environment 7104 includes a view of a portion of box 7012', a view of wall hanging 7106, and a view of a portion of box 7014'. FIG. 7K shows a first user interface element 7050 and a second user interface element 7052 displayed over the view of environment 7104. User interface element 7050 in FIG. 7K is displayed as a three-dimensional object with the appearance of being made of a simulated material (e.g., a pane or platter of the simulated material, such as a transparent or semi-transparent material). In addition, user interface element 7052 in FIG. 7K is displayed as a three-dimensional object with the appearance of being made of the simulated material (e.g., a pane or platter of the simulated material, such as a transparent or semi-transparent material). User interface element 7050 has an appearance that is based on the appearance of overlapping portions of environment 7104, such as wall 7004' and/or box 7012', using a graphical composition of frames from different times as described herein with reference to FIGS. 7A-7G, a color gradient as described with reference to FIGS. 7H-7J, or any other example technique described herein. Also, the appearance of user interface element 7050 is in some embodiments updated over time based on changes in the appearance of the overlapping portions of environment 7104, analogously to the user interface elements described herein with reference to FIGS. 7A-7J. Similarly, user interface element 7052 has an appearance that is based on the appearance of underlying portions of environment 7104, such as wall 7004', box 7012', and/or wall hanging 7106, using a graphical composition of frames from different times, a color gradient, or other example technique described herein. The appearance of user interface element 7050 is in some embodiments also updated over time based on changes in the appearance of the overlapping portions of environment 7104, analogously to the user interface elements described herein with reference to FIGS. 7A-7J and to user interface element 7050.

In the example in FIG. 7K, user interface element 7050 is in front of user interface element 7052 in environment 7104, from the viewpoint of the user (e.g., user interface element 7050 is positioned closer to the viewpoint of the user than user interface element 7052, and user interface element 7050 optionally obscures part of the left side of user interface element 7052). In addition, user interface element 7052 is in front of, and optionally obscures, box 7012', wall hanging 7106, and wall 7004', from the viewpoint of the user (e.g., user interface element 7052 is positioned closer to the viewpoint of the user than box 7012', wall hanging 7106, and wall 7004'). As described herein with reference to FIGS. 7H-7J, in FIG. 7K, the appearance of the portion of foreground user interface element 7050 that overlaps with background user interface element 7052 is optionally based on, the same as, or a copy of the corresponding underlying portion of user interface element 7052 (e.g., without independently generating the appearance of the overlapping portion of user interface element 7050 based on the appearances of wall 7004' and box 7012', separate from generating the appearance of the corresponding portion of user interface element 7052 based in part on wall 7004' and box 7012').

In addition, FIG. 7K shows a representation of an edge 7050-e of user interface element 7050. Edge 7050-e is representative of user interface element 7050 being displayed with a simulated thickness between the front surface of user interface element 7050 and the back surface of user interface element 7050. Edge 7050-e is shown in FIG. 7K as curved in two dimensions (e.g., giving user interface element 7050 the shape of a rounded rectangle from the viewpoint of the user). Alternatively or in addition, edge 7050-e represents curvature in three-dimensions (e.g., without straight edges resulting from two faces meeting at an angle). Alternatively, edge 7050-e represents a plurality of planar faces (e.g., of a rectangular prism), such as the top, bottom, and side faces of user interface element 7054 in FIG. 7L. In some embodiments, edge 7050-e of user interface element 7050 is displayed with the visual effect of reflecting light from one or more light sources in environment 7104. For example, a reflection (sometimes called specular reflection) is optionally displayed at a first position on edge 7050-e to simulate reflection from the outer surface of user interface element 7050. In some embodiments, a reflection is optionally displayed at a second position on edge 7050-e, opposite from the first position (e.g., a bottom right corner opposite a top left corner, or vice versa), to simulate internal reflection from the inner surface of user interface element 7050 (e.g., of some of the light that was not reflected at the location of the external specular reflection and that has traveled through to the opposite side of user interface element 7050). In some embodiments, the amount of specular reflection that is displayed along edge 7050-e is based on the simulated thickness of edge 7050-e of user interface element 7050 (e.g., with a thinner pane reflecting less light than a thicker pane).

Similarly, edge 7052-e is representative of user interface element 7052 being displayed with a simulated thickness between the front surface of user interface element 7052 and the back surface of user interface element 7052. Edge 7052-e of user interface element 7052, while shown in FIG. 7K as curved in two dimensions, is optionally curved in three dimensions or alternatively represents a plurality of planar faces such as the top, bottom, and side faces of user interface element 7054 in FIG. 7L. In addition, in some embodiments, edge 7052-e of user interface element 7052 is displayed with the visual effect of reflecting light from one or more light sources in environment 7104. For example, a specular reflection is optionally displayed at a first position on edge 7052-e to simulate reflection from the outer surface of user interface element 7052, and optionally another specular reflection is displayed at a second position on edge 7052-e, opposite from the first position (e.g., a bottom edge opposite a top edge, or vice versa), to simulate internal reflection from the inner surface of user interface element 7052 (e.g., of some of the light that was not reflected at the location of the external specular reflection and that has traveled through to the opposite side of user interface element 7052). In some embodiments, the amount of specular reflection that is displayed along edge 7052-e is based on the simulated thickness of edge 7052-e of user interface element 7052 (e.g., with a thinner pane reflecting less light than a thicker pane).

In some embodiments, specular reflection(s) for user interface elements 7050 and/or 7052 in FIG. 7K simulate reflection of light from one or more light sources in environment 7104. In some embodiments, the one or more light sources include one or more physical light sources detected in a physical environment (e.g., environment 7102 in FIG. 7A) corresponding to environment 7104. In some embodiments, the one or more light sources include one or more simulated light sources in environment 7104. Simulated specular reflection from a computer-generated user interface object is described in more detail herein with reference to FIGS. 7L-7O.

In some embodiments, the appearance of a user interface element, including any specular reflection(s), is changed based on different contexts of the three-dimensional environment. For example, the appearance of user interface element 7050 and/or the appearance of user interface element 7052 are changed based on different contexts of environment 7104 such as different times of day (e.g., dawn or dusk versus midday, sunlight versus artificial light in physical environment 7102 (FIG. 7A) corresponding to environment 7104), different room color temperatures (e.g., warmer versus cooler tones in environment 7104), different brightness (e.g., of light and/or colors in environment 7104), and other ambient characteristics of environment 7104.

As noted above, user interface element 7050 is displayed for example as a pane of simulated transparent or partially transparent material. In some embodiments, content associated with user interface element 7050 is displayed. In some embodiments, the content is displayed with a visual effect of being positioned behind the front surface of user interface element 7050, embedded within the pane of simulated material (e.g., between the front surface and a back surface of user interface element 7050, at a depth that is less than the simulated thickness of user interface element 7050). In some embodiments, content of user interface element 7050 that is near (e.g., within a threshold distance of) edge 7050-e is displayed with a visual effect of curving or wrapping around the simulated thickness of edge 7050-e, to simulate the appearance of internal reflection and/or refraction within user interface element 7050 of the content (e.g., as would appear at the edge of a lens or pane of glass). The content is configured to be moved (e.g., scrolled, repositioned, resized, rescaled, rotated, and/or other transformation applied) in response to user input. As the content is moved, different portions of the content are within the threshold distance of edge 7050-e. Accordingly, the optical effect of internal reflection and/or refraction is updated based on the updated portions of the content that are within the threshold distance of edge 7050-e.

Similarly, in some embodiments, user interface element 7052 is displayed as a pane of simulated transparent or partially transparent material. In some embodiments, content associated with user interface element 7052 is displayed with a visual effect of being positioned behind the front surface of user interface element 7052, embedded within the pane of simulated material. In some embodiments, content of user interface element 7052 that is near edge 7052-e of user interface element 7052 is displayed with the visual effect of curving or wrapping around the simulated thickness of edge 7052-e, and updated as the content is moved such that different portions of the content move within the threshold distance of edge 7052-e.

In some embodiments, the content that is displayed as embedded within a user interface element is visible from the front of the user interface element and not clearly visible, or not visible at all, from the back of the user interface element. For example, FIG. 7K shows a front view of user interface elements 7050 and 7052. In some embodiments, content displayed as embedded within user interface element 7050 and/or user interface element 7052 is visible from the perspective of user interface elements 7050 and 7052 as shown in FIG. 7K. If the viewpoint of the user were to change relative to user interface element 7050 to a view of the back of user interface element 7050 (e.g., via movement of the viewpoint of the user to the back of user interface element 7050 or movement of user interface element 7050 that flips or rotates user interface element 7050), in some embodiments the content is visually deemphasized, such as by blurring, fading, shading, or darkening, or the content is not displayed. User interface element 7052 optionally exhibits similar behavior to user interface element 7050.

In FIG. 7K, user interface elements 7050 and 7052 cast one or more shadows on other objects in environment 7104. As described in more detail herein with respect to FIGS. 7L-7O, in some embodiments, the shadows cast by user interface elements in a displayed three-dimensional environment are based on one or more sources of light in the three-dimensional environment, such as simulated or computer-generated light sources and/or physical light sources in a physical environment corresponding to the displayed three-dimensional environment. In FIG. 7K, user interface element 7050 casts shadows 7050-s on user interface element 7052 behind user interface element 7050. User interface element 7052 casts shadows 7052-s on box 7012', wall hanging 7106, and wall 7004' behind user interface element 7052.

Figure 7L:
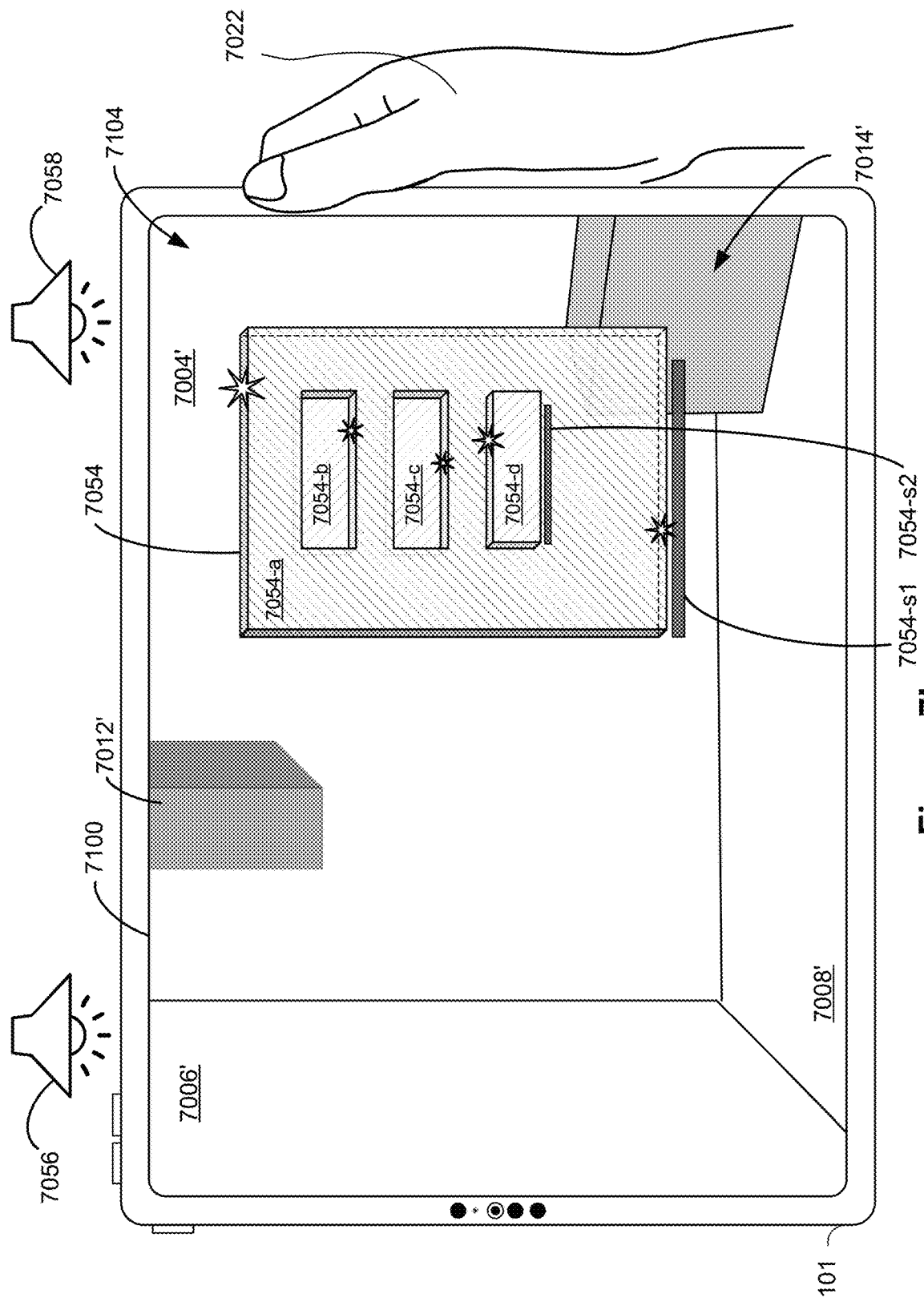

FIG. 7L illustrates user interface element 7054 displayed over a view of environment 7104. User interface element 7054 is displayed with a thickness, which is visible along the top and left edges of user interface element 7054 from the viewpoint of the user in FIG. 7L. In addition, where user interface element 7054 is displayed as a transparent or partially transparent material, the thickness of user interface element 7054 is optionally apparent from the right and bottom edges, which would be displayed as partially visible through user interface element 7054 from the viewpoint of the user in FIG. 7L.

In addition, user interface element 7054 includes a plurality of regions. Specifically, user interface element 7054 includes a first region 7054-a (e.g., a pane or platter of the simulated material) that defines a front surface (e.g., front face or front plane) of user interface element 7054. In some embodiments, region 7054-a of user interface element 7054 is analogous to background portion 7030-a of user interface element 7030 (FIG. 7D) and/or to background portion 7040-a of user interface element 7040 (FIG. 7H). User interface element 7054 also includes regions 7054-b, 7054-c, and 7054-d that have different depths relative to the front surface defined by user interface element 7054-a. In some embodiments, region 7054-a is a background portion of user interface element 7054. In some embodiments, regions 7054-a through 7054-c are content regions that include visual content such as text or graphics, or selectable and/or activatable objects such as buttons or controls. As shown in FIG. 7L, regions 7054-b and 7054-c have the appearance of recesses into the front surface of user interface element 7054 (e.g., having the appearance of depressions in the surface or of portions of material being removed from the surface, such as by etching or cutting away). In contrast, region 7054-d has the appearance of material that is raised relative to the front surface of user interface element 7054 (e.g., the appearance of portions of material being extruded, embossed, added to or placed on top of, or lifted away from the surface). In some embodiments, a user interface element includes one or more raised regions similar to raised region 7054-d. In some embodiments, raised regions of user interface element 7054 correspond to user interface elements that are activatable to perform operations in the user interface or in environment 7104, such as buttons, menus, or other controls. In some embodiments, recessed regions of user interface element 7054 correspond to user interface elements that are content entry regions, such as text entry boxes.

User interface element 7054 is displayed as a material having optical properties that interact with light in environment 7104. In addition, different regions of user interface element 7054 interact with light in environment 7104 in accordance with the characteristics of those regions and in accordance with the source(s) of the light. FIG. 7L shows two light sources, light source 7056 and light source 7058. Light source 7056 may be a physical light source (e.g., physically present in physical environment 7102 (FIG. 7A)), or a simulated light source in environment 7104. Similarly, light source 7058 may be a physical light source or a simulated light source. For example, light sources 7056 and 7058 may both be physical light sources; light sources 7056 and 7058 may both be simulated light sources; or one light source may be a physical light source while the other light source is a simulated light source.

As shown in FIG. 7L, user interface element 7054 is displayed with the appearance of reflecting light from light source 7058 as it would appear to a person viewing user interface element 7054, at its position in environment 7104 in FIG. 7L, and from the viewpoint of the user in FIG. 7L. For example, the top edge of user interface element 7054 faces light source 7058 and is displayed with a reflection (also sometimes called specular reflection, used herein) corresponding to light source 7058. In some embodiments, as noted herein, light source 7058 is a physical light source in physical environment 7102, and the specular reflection from the top edge of user interface element 7054 is generated and displayed by the computer system to simulate the appearance of a physical object in physical environment 7102 reflecting light from light source 7058. In some embodiments, as noted herein, light source 7058 is a simulated light source in environment 7104, and the specular reflection from the top edge of user interface element 7058 is also simulated. In some embodiments, the amount of specular reflection from the top edge of user interface element 7054 is based on the simulated thickness of user interface element 7054.

In another example, raised region 7054-d reflects light from along its top edge, which faces light source 7058, in a similar manner to the top edge of user interface 7054. In the example shown in FIG. 7L, the amount of specular reflection from the top edge of raised region 7054-d is less than the amount of specular reflection from the top edge of user interface element 7054, because the thickness of raised region 7054-d relative to the front surface of user interface element 7054 (e.g., the extent to which raised region 7054-d protrudes from the surface of user interface element 7054) is less than the thickness of the top edge of user interface element 7054.

In contrast to the top edge of user interface element 7054 and raised region 7054-d, recessed regions 7054-b and 7054-c reflect light from along their bottom edges, because it is the bottom edges of recessed regions 7054-b and 7054-c that face light source 7058. Although the depth of recessed regions 7054-b and 7054-c relative to the front surface of user interface element 7054 is the same as the thickness of raised region 7054-d relative to the front surface of user interface element 7054, the amount of specular reflection from the bottom edge of recessed region 7054-b is less than the amount of specular reflection from the top edge of raised region 7054-c. This is consistent with the principle that less light would reach the bottom edge of recessed region 7054-b due to the light having to travel through the simulated material of user interface element 7054, in contrast to the light reaching the top edge of raised region 7054-*c*, being relatively less obstructed. The amount of specular reflection from the bottom edge of recessed region 7054-*c*, in turn, is less than the amount of specular reflection from the bottom edge of recessed region 7054-*b*, consistent with the principle that the light reaching the bottom edge of recessed region 7054-*b* would have been more obstructed, for example due to the light having to travel a greater distance through the simulated material of user interface element 7054 (e.g., and past raised region 7054-*c*), than the light reaching the bottom edge of recessed region 7054-*b*.

In some embodiments, user interface element 7054 is also displayed with the appearance of light reflecting into user interface element 7054 from an edge of user interface element 7054 that is opposite a light source. For example, FIG. 7L shows specular reflection from the bottom edge of user interface element 7054, in accordance with internal reflection of light traveling through user interface element 7054 from light source 7058, and in accordance with user interface element 7054 being displayed as a transparent or partially transparent material (e.g., the internal specular reflection is shown along the inside of the edge of user interface element 7054 opposite the location of the external specular reflection). As shown in FIG. 7L, the amount of specular reflection from the bottom edge of user interface element 7054 is less than the amount of specular reflection from the top edge of user interface element 7054, in accordance with the specular reflection from the bottom edge of user interface element 7054 being associated with internal reflection and/or in accordance with the bottom edge of user interface element 7054 being further from light source 7058 than the top edge of user interface element 7054.

Although user interface element 7054 and its constituent regions are generally shown with rectangular corners (also called vertices) and rectangular edges (e.g., regions 7054-*a* through 7054-*d* are shown as rectangular prisms with rectangular recesses), one of ordinary skill will recognize that other three-dimensional shapes are possible. For example, the corners of user interface element 7054 and/or of regions 7054-*a* through 7054-*d* are optionally rounded rather than rectangular as shown in FIGS. 7L-7O (e.g., with a rounded rectangle shape as viewed from the perspective of the user, for example with the top face of user interface element 7054 curving downward and becoming the side faces of user interface element 7054 instead of meeting the right face at an edge and meeting the left face at another edge, similar to the shape of user interface elements 7050 and 7052 in FIG. 7K). Alternatively or in addition, the edges of user interface element 7054 and/or of regions 7054-*a* through 7054-*d* are optionally rounded rather than rectangular as shown in FIGS. 7L-7O (e.g., with beveling or curvature along the perimeter of user interface element 7054, for example with the front face of user interface element 7054, corresponding to region 7054-*a*, curving backward away from the user and becoming the side faces of user interface element 7054 instead of meeting the right face at an edge and meeting the left face at another edge). In some embodiments, the specular reflection(s) on user interface element 7054 are positioned in accordance with the shape of the surface of user interface element at the corners and edges (e.g., a different specular reflection is shown for a rounded corner than for a rectangular corner).

In addition to specular reflection, user interface elements may cast shadows on other objects. For example, in FIG. 7L, raised region 7054-*d* casts a shadow 7054-*s*2 onto user interface element 7054, in accordance with raised region 7054-*d* blocking some of the light from light source 7058 from reaching the part of user interface element 7054 that is below and slightly to the left of raised region 7054-*d*. User interface element 7054 is also shown as casting a shadow 7054-*s*1 in environment 7104, in accordance with user interface element 7054 blocking some of the light from light source 7058 from reaching portions of environment 7104 that are below and slightly to the left of user interface element 7054. One of ordinary skill will recognize that similar principles regarding specular reflection and/or shadows may be applied to other objects in environment 7104, including but not limited to other computer-generated objects and/or representations of physical objects (e.g., simulated light may be cast onto physical objects resulting in simulated specular reflection, and the physical objects may cast simulated shadows).

In some embodiments, the specular reflection(s) displayed from objects in environment 7104 are based on a subset of the light sources in environment 7104 and/or corresponding physical environment 7102. One of ordinary skill in the art will recognize that one or more light sources may be selectively disregarded in generating and presenting the view of environment 7104. For example, although two light sources 7056 and 7058 are shown in FIG. 7L, the specular reflections shown in FIG. 7L are based on light source 7058 and not on light source 7056. In some cases, light source 7506 is a physical light source, light source 7508 is a simulated light source, and the specular reflection(s) are based on light source 7508, while physical light source 7506 is disregarded. This may provide the user with a more immersive viewing experience of environment 7104 in which the sources of light are fully generated by the computer system. Alternatively, light source 7508 is a physical light source, and displaying specular reflection(s) based on physical light source 7508 improves user safety by providing the user with a viewing experience that is more closely tied to the user's surrounding physical environment.

Figure 7M:
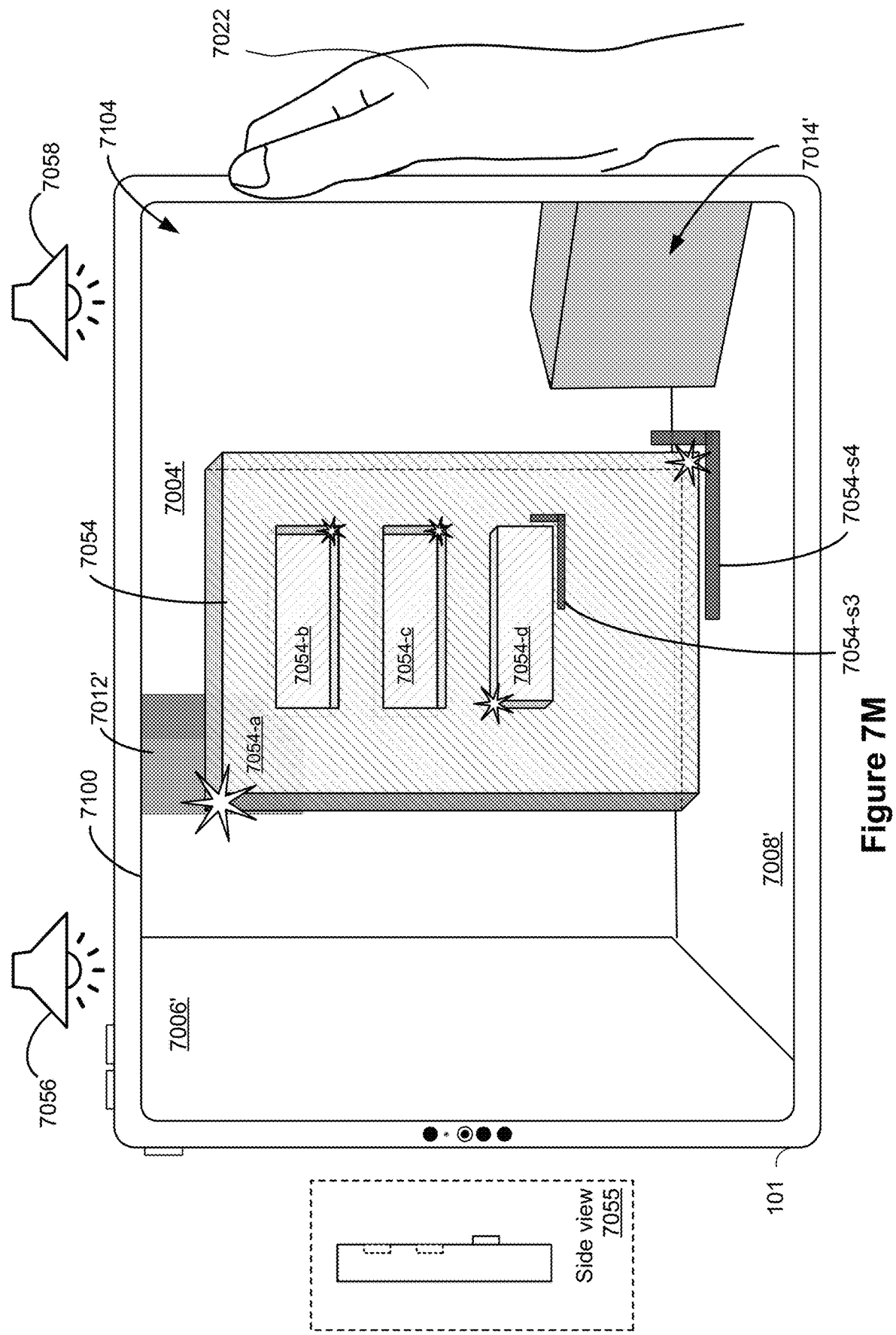

FIG. 7M shows user interface element 7054 displayed at a different position relative to environment 7104. In FIG. 7M, user interface element 7054 is closer to the viewpoint of the user than in FIG. 7L. Accordingly, user interface element 7054 is shown larger in scale (e.g., wider and taller) in FIG. 7M than in FIG. 7L, and with a thickness $h_2$ that is greater than the thickness $h_1$ of user interface element 7054 in FIG. 7L. The increased thickness $h_2$ of user interface element 7054 in FIG. 7M is partly due to the repositioning of user interface element 7054 to be closer to the viewpoint of the user, in accordance with objects appearing larger when positioned closer to the user. In addition, in some embodiments, the thickness of user interface element 7054 is increased more than the amount associated with repositioning user interface element 7054. For example, if repositioning an object from the position shown in FIG. 7L to the position 7M is associated with first amount of increase in the displayed thickness of the object (e.g., user interface element 7054 would have been displayed with a thickness $h_3$ that is greater than $h_1$ and less than $h_2$), user interface element 7054 is displayed with a second amount of increase in its displayed thickness, where the second amount is greater than the first amount. In some embodiments, exaggerating the increase in the displayed thickness of an object that has been moved closer to the user in a displayed three-dimensional environment helps the user better recognize the repositioned object as being closer.

FIG. 7M also includes side view 7055, which shows a profile view of user interface element 7054. Side view 7055 represents the thicknesses of recessed region 7054-*b*, recessed region 7054-*c*, and raised region 7054-*d* relative to user interface element 7054 (e.g., the depth of recessed regions 7054-*b* and 7054-*c* relative to the front surface of user interface element 7054, and the thickness of raised region 7054-*d* relative to the front surface user interface element 7054).

In addition, in FIG. 7M, the specular reflections on user interface element 7054 are located at different positions on user interface element 7054 than in FIG. 7L. Specifically, the specular reflections in FIG. 7M are based on light source 7056 instead of light source 7058 as in FIG. 7L, and simulate light from light source 7056 reflecting off of user interface element 7054 as it would appear to a person viewing user interface element 7054, at its position in environment 7104 in FIG. 7M, and from the viewpoint of the user in FIG. 7M. For example, FIG. 7M shows a specular reflection at the top left corner (e.g., of the top edge) of user interface element 7054 (e.g., at a place along the outer edge of user interface element 7054 that faces light source 7056) and a specular reflection at the top left corner of raised region 7054-*d* (e.g., at a location along the outer edge of raised region 7054-*d* that faces light source 7056). Specular reflections are also displayed at the inner bottom right corner of recessed region 7054-*b* (e.g., at a place along the edge of recessed region 7054-*b* that is opposite light source 7056) and at the inner bottom right corner of recessed region 7054-*c* (e.g., at a place along the edge of recessed region 7054-*c* that is opposite light source 7056). User interface element 7054 is also displayed with the appearance of light reflecting into user interface element 7054 from its bottom right corner (e.g., the internal specular reflection is shown along the inside of the edge of user interface element 7054 opposite the location of the external specular reflection), where the amount of internal specular reflection at the bottom right corner is less than the amount of external specular reflection at the top left corner.

In some circumstances, the change in the locations of the specular reflections from user interface element 7054 from the locations shown in FIG. 7L to the locations shown in FIG. 7M is at least partially due to the changed position of user interface element 7054 (e.g., in accordance with user interface element 7054 being moved further from and/or less directly under the spatial location in environment 7104 of light source 7058, and closer to and/or more directly under the spatial location in environment 7104 of light source 7056). In some circumstances, the change in the locations of specular reflections from user interface element 7054 is at least partially due to a change in the viewpoint of the user relative to user interface element 7054. In some circumstances, the change in the locations of the specular reflections from user interface element 7054 from the locations shown in FIG. 7L to the locations shown in FIG. 7M is at least partially due to changes in light source 7056 and/or light source 7058 (e.g., light source 7058 having decreased in brightness or turned off in FIG. 7M and/or light source 7056 having increased in brightness or turned on in FIG. 7M, in contrast to FIG. 7L). In some embodiments, the computer system selects which light source on which to base the specular reflections, for example due to contextual considerations such as time of day (e.g., sunlight may be used as a light source during daytime, whereas a lamp may be used as a light source at night), room color temperature (e.g., a warmer temperature light source may be used for specular reflection in a room with warmer color tones and/or to achieve a warmer ambience in environment 7104), brightness (e.g., a brighter light source may be used for specular reflection in a more brightly lit room, or to achieve a more brightly lit room) and/or in response to user selection of one or more particular light sources.

As discussed herein with reference to FIG. 7L, user interface element 7054 and portions thereof may cast shadows on other objects. For example, in FIG. 7M, raised region 7054-*d* casts a shadow 7054-*s3* onto user interface element 7054, in accordance with raised region 7054-*d* blocking some of the light from light source 7056 from reaching the part of user interface element 7054 that is below and to the right of raised region 7054-*d*. User interface element 7054 is also shown as casting a shadow 7054-*s4* in environment 7104, in accordance with user interface element 7054 blocking some of the light from light source 7056 from reaching portions of environment 7104 that are below and to the right of user interface element 7054.

As also discussed herein with reference to FIG. 7L, the specular reflections from user interface element 7054 are in some embodiments based on a subset of the light sources in environment 7104 and/or corresponding physical environment 7102. For example, the specular reflections shown in FIG. 7M are based on light source 7056 instead of on light source 7058 (as is the case in FIG. 7L). One of ordinary skill will recognize that other embodiments in which specular reflections for both light source 7056 and light source 7058 are displayed on user interface element 7054 and/or other objects in environment 7104 are possible.

Figure 7N:
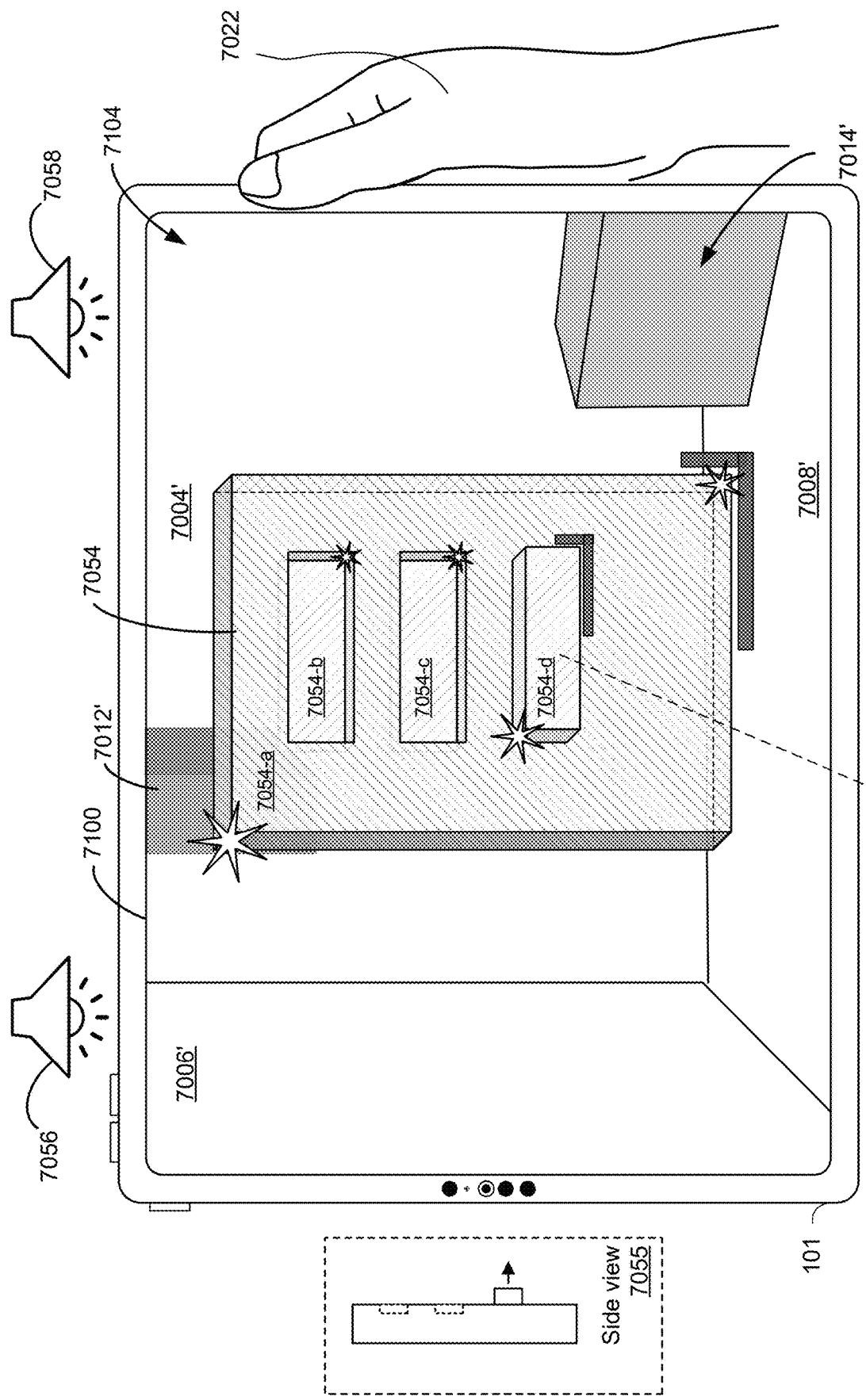

FIG. 7N illustrates a transition in user interface element 7054 in response to user interaction with user interface element 7054. FIG. 7N shows user 7002 directing attention to (e.g., gazing at) raised region 7054-*d*, indicated in FIG. 7N by the dashed line extending from user 7002's eye to raised region 7054-*d*. In response to user 7002 directing attention to raised region 7054-*d*, raised region 7054-*d* is raised even more from the surface of user interface element 7054 (e.g., from the front surface defined by region 7054-*a*). Side view 7055 shows a profile view illustrating the increase in thickness of raised region 7054-*d* relative to the surface of user interface element 7054 (e.g., as compared to side view 7055 in FIG. 7M) without any change in the thicknesses (e.g., depths) of recessed regions 7054-*b* and 7054-*c*. In accordance with the increased thickness of raised region 7054-*d*, a greater amount of specular reflection from the top left corner of raised region 7054-*d* is shown, and raised region 7054-*d* is shown as casting a longer shadow onto portions of user interface element 7054 that are below and to the right of raised region 7054-*d*.

In some embodiments, the thickness of a raised region of a user interface element relative to the surface of the user interface element is changed (e.g., the thickness of raised region 7054-*d* is increased as shown in FIG. 7N; alternatively, the thickness is decreased) in response to a user directing attention to the raised region. In some embodiments, the thickness of a raised region of a user interface element is changed by a first amount in response to a first portion of a user input directing attention to the raised region (e.g., increased in thickness in response to gazing at the raised region) and then by a second amount in response to a second, subsequent portion of the user input (e.g., decreased in thickness in response to selection or activation of the raised region, or more specifically of a control corresponding to or defined by the raised region). In some embodiments, the depth of a recessed region of a user interface element is not changed in response to a user directing attention to the recessed region (e.g., the depth of recessed region 7054-*b* or 7054-*c* would not be changed in response to the user's gaze). Alternatively, in some embodiments, the depth of a recessed region of a user interface element is changed (e.g., the depth is increased, or the recessed region is changed to a raised region) in response to a user directing attention to the recessed region, as described in more detail herein with reference to FIG. 7O.

In some embodiments, a raised region of a user interface element includes multiple layers, each raised to a different degree relative to the surface of the user interface element. For example, although raised region 7054-*d* is shown as a single layer with a first thickness relative to the front surface of user interface element 7054 in FIGS. 7L-7M and a second, greater thickness relative to the front surface of user interface element 7054 in FIG. 7N, one of ordinary skill will recognize that raised region 7054-*d* could include a stack of layers each with a respective thickness. User interface elements having different layers, and interactions with such user interface elements, are described in more detail herein with reference to FIG. 7P.

Figure 7O:
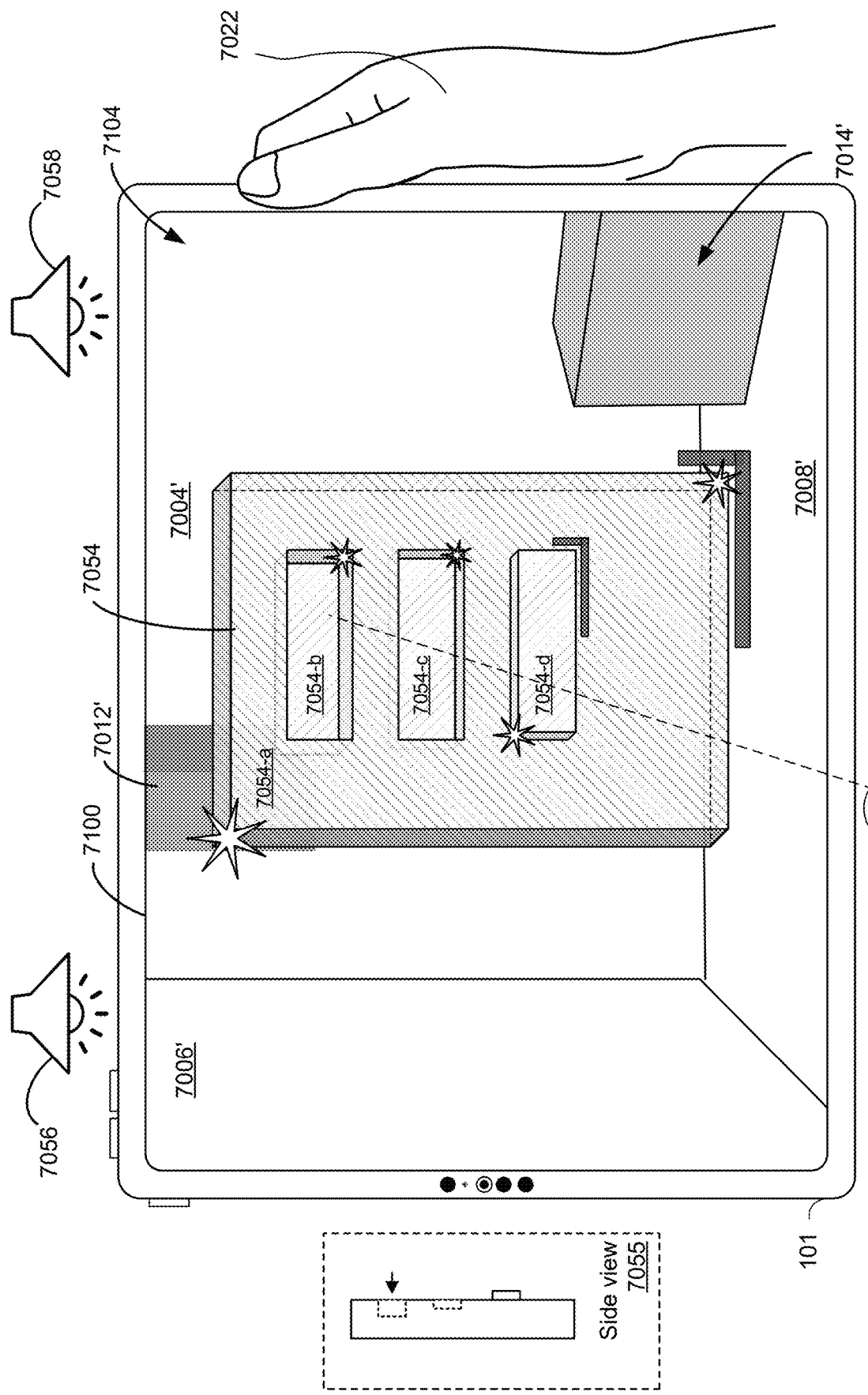

FIG. 7O illustrates a transition in user interface element 7054 in response to a different user interaction with user interface element 7054 than the interaction shown in FIG. 7N. FIG. 7O shows user 7002 directing attention to (e.g., gazing at) recessed region 7054-*b*, indicated in FIG. 7O by the dashed line extending from user 7002's eye to recessed region 7054-*b* (e.g., a transition from FIG. 7M due to user 7002 directing attention to recessed region 7054-*b*, or a transition from FIG. 7N due to user 7002's attention moving away from region 7054-*d* to region 7054-*b* instead). In response to user 7002 directing attention to recessed region 7054-*b*, recessed region 7054-*b* is recessed even more from the surface of user interface element 7054 (e.g., from the front surface defined by region 7054-*a*). Side view 7055 shows a profile view illustrating the increase in depth of recessed region 7054-*b* relative to the surface of user interface element 7054 (e.g., as compared to side view 7055 in FIG. 7M) without any change in the thickness of recessed region 7054-*c* and without any change in the thickness (e.g., height) of raised region 7054-*d*. In accordance with the increased depth of recessed region 7054-*b*, a greater amount of specular reflection from the inner bottom right corner of recessed region 7054-*b* is shown (e.g., without any changes in the specular reflections from recessed region 7054-*c* and raised region 7054-*d*). In the example of FIG. 7O, the change in specular reflection from recessed region 7054-*b* is due to changes in user interface element 7054 (e.g., in the simulated optical properties of the simulated material that forms recessed region 7054-*b* and/or user interface element 7054 more generally) rather than due to changes in one or more light sources, simulated and/or physical, in the three-dimensional environment (which, as described herein, may also be taken into account in some embodiments). In some embodiments, user interface element 7054 is shown as casting a shadow onto recessed regions such as 7054-*b* and/or 7054-*c* (e.g., shadows cast by the edges of user interface element 7054 that abut the recessed regions), and optionally, in accordance with the increase in depth of recessed region 7054-*b*, a greater amount of shadow is shown as being cast onto recessed region 7054-*b* by user interface element 7054.

In some embodiments, the depth of a recessed region of a user interface element relative to the surface of the user interface element is changed (e.g., the depth of recessed region 7054-*b* is increased as shown in FIG. 7O; alternatively, the depth is decreased) in response to a user directing attention to the recessed region. In some embodiments, the depth of a recessed region of a user interface element is changed by a first amount in response to a first portion of a user input directing attention to the recessed region (e.g., increased in depth in response to gazing at the recessed region) and then by a second amount in response to a second, subsequent portion of the user input (e.g., decreased in depth in response to selection or activation of the recessed region, or more specifically of a control corresponding to or defined by the recessed region). In some embodiments, the depth of a recessed region of a user interface element is not changed in response to a user directing attention to the recessed region (e.g., the depth of recessed region 7054-*b* or 7054-*c* would not be changed in response to the user's gaze). Alternatively, in some embodiments, the depth of a recessed region of a user interface element is changed by changing the recessed region to a raised region in response to a user directing attention to the recessed region.

In some circumstances, such as in those embodiments in which recessed regions are input fields, such as for text entry, a recessed region includes text. For example, a recessed region that is a search bar may include a text label, such as the word "Search", as a visual prompt about the purpose of and how to interact with the recessed region. In another example, a recessed region that is an input field includes text previously entered by a user (e.g., an entered search term or search query, provided via voice command, keyboard, or other input device). Using the example of FIGS. 7M-7N, in some embodiments, while user attention is not directed to recessed region 7054-*b*, text is positioned at a first depth relative to recessed region 7054-*b*. In some embodiments, the text is at the same plane as the surface into which the region is recessed (e.g., zero depth relative to user interface element 7054, at the same simulated distance from the viewpoint of the user as the front surface of user interface element 7054, defined by region 7054-*a*). In some embodiments, the text is within the recessed region past the plane of the surface into which the region is recessed (e.g., nonzero depth relative to user interface element 7054, at a greater simulated distance from the viewpoint of the user than is the front surface of user interface element 7054). In some embodiments, the text is in front of (e.g., at a lesser depth than) the recessed surface of region 7054-*b*. In some embodiments, the text exhibits parallax with respect to the recessed surface as the viewpoint of user 7002 moves, which improves the user's depth perception within environment 7104.

In some embodiments, in response to user 7002 directing attention to recessed region 7054-*b*, as described herein with reference to FIG. 7O, in combination with the change (e.g., increase) in depth of recessed region 7054-*b*, the depth of the text in recessed region 7054-*b* is also changed (e.g., increased), optionally by an amount corresponding to the amount of change in depth of recessed region 7054-*b*. In some embodiments, the depth of the text in recessed region 7054-*b* is not changed, in response to user 7002 directing attention to recessed region 7054-*b* (e.g., merely indicating readiness to interact), until user 7002 interacts with recessed region 7054-*b*. In some such embodiments, in response to user 7002 interacting with recessed region 7054-*b*, such as with an input gesture like the input gesture of FIG. 7U described herein, the depth of the text in recessed region 7054-*b* is changed (e.g., increased) in response to a first portion of the input gesture, optionally by an amount corresponding to the amount of change in depth of recessed region 7054-*b* that previously occurred in response to user 7002 directing attention to recessed region 7054-*b* (e.g., the change in depth of the text is delayed relative to the change in depth of the recessed region 7054-*b*). In some embodiments, the depth of recessed region 7054-*b* is not further changed in response to the first portion of the input gesture. In some embodiments, in response to the first portion of the input gesture, the depth of the text in recessed region 7054-*b* is further changed (e.g., further increased) beyond the amount of change that previously occurred, if any, in response to user 7002 directing attention to recessed region 7054-*b*, optionally while maintaining the depth of recessed region 7054-*b*. In some embodiments, in response to the end of the input gesture, the change in the depth of the text in recessed region 7054-*b* is reversed. For example, in response to the end of the input gesture, the text is reverted to the same depth as in response to the first portion of the input gesture, to the same depth as in response to user 7002 directing attention to recessed region 7054-*b*, to the default depth just prior to user 7002 directing attention to recessed region 7054-*b*, or to any other depth that is different from (e.g., less than) the depth of the text in recessed region 7054-*b* in response to the first portion of the input gesture. In some embodiments, the change in the depth of the text is partially reversed to an intermediate depth (e.g., the same depth as in response to user 7002 directing attention to recessed region 7054-*b*) after the end of the input gesture as long as user 7002's attention remains directed to recessed region 7054-*b*, and then further reversed in response to user 7002's attention no longer being directed to recessed region 7054-*b*. In some embodiments, the changed depth of recessed region 7054-*b* is maintained after the end of the input gesture as long as user 7002's attention remains directed to recessed region 7054-*b*. In some embodiments, the change in the depth of the text is entirely reversed in response to the end of the input gesture (e.g., without regard to whether, and even if, user 7002's attention remains directed to recessed region 7054-*b*). In some embodiments, the change in depth of recessed region 7054-*b* is also reversed in response to the end of the input gesture (e.g., without regard to whether, and even if, user 7002's attention remains directed to recessed region 7054-*b*).

Figure 7P:
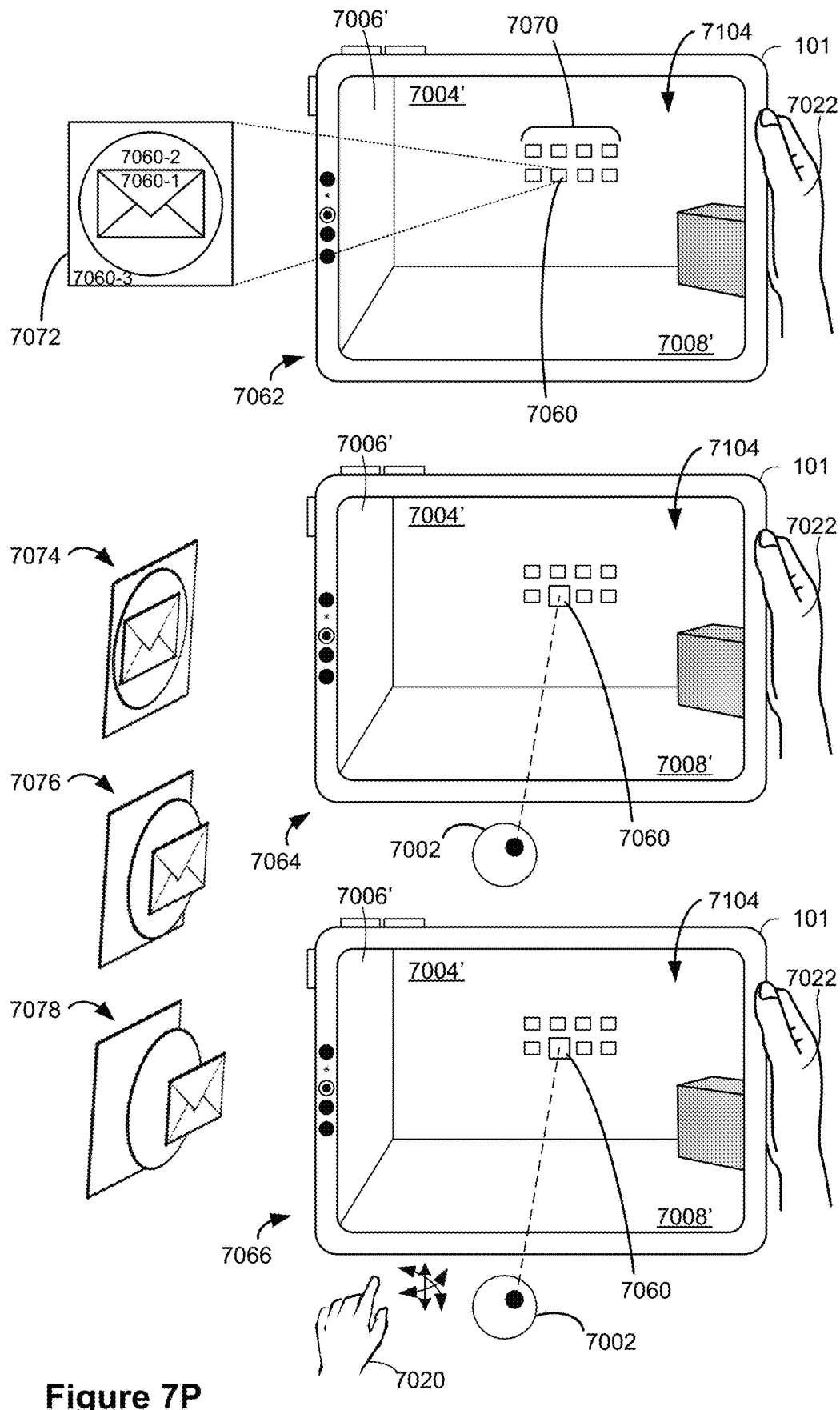
FIG. 7P illustrates separating layers of a user interface element to different degrees in response to different user interactions including a user directing attention to the user interface element, in accordance with some embodiments.
Figure 7R:
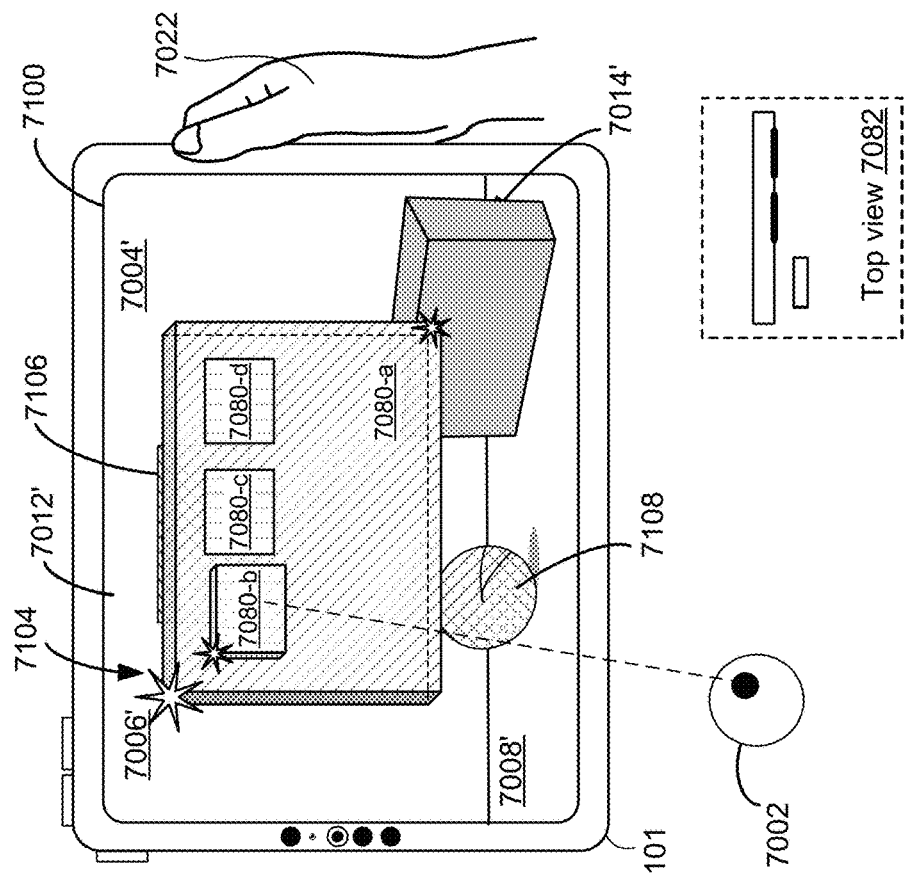
FIGS. 7Q-7W illustrate changing the appearance of a selectable user interface object in response to an input that corresponds to and indicates readiness to interact with the selectable user interface object, in accordance with some embodiments.

FIG. 7P illustrates separating layers of a user interface element (e.g., user interface element 7060) to different degrees in response to different user interactions including a user directing attention to the user interface element, in accordance with some embodiments. The user interfaces in FIG. 7P are used to illustrate the processes described below, including the processes in FIG. 12. The user interface elements described with reference to FIG. 7P optionally have one or more of the characteristics and/or behaviors of the user interface elements described herein with respect to other examples such as the examples in FIGS. 7A-7G, 7H-7J, 7K-7O, 7Q-7W, and/or 7X-7Z, in accordance with some embodiments, unless stated otherwise in the descriptions.

In FIG. 7P, scenario 7062 shows computer system 101 displaying a view of environment 7104 (e.g., via display generation component 7100), which includes a representation of a portion of physical environment 7102 (FIG. 7A), as described herein. In addition, displayed in environment 7104 in FIG. 7P are a plurality of user interface elements (also herein called icons). The plurality of user interface elements are displayed as a cluster of icons 7070 and represents a home user interface or launch pad for computer system 101, such as icons for launching applications, icons for starting communication sessions (e.g., the icons corresponding to different users other than user 7002), icons for starting computer-generated experiences, group icons for different categories of user interface objects, container objects such as folders or groups, a home button, a dock, a root menu, or other user interface elements for performing operations in and interacting with the three-dimensional environment. Respective icons in the cluster of icons 7070 are activatable to perform one or more operations in environment 7104 (e.g., launching applications or experiences, opening files or folders, or the like)

FIG. 7P also shows an enlarged view 7072 of a respective icon 7060, which illustrates that icon 7060 includes a plurality of icon elements associated with different icon layers. For example, an envelope graphic is associated with (e.g., assigned to) a foreground layer 7060-1; a circle element is associated with (e.g., assigned to) an intermediate layer 706-2; and a square backing element is associated with (e.g., assigned to) a background layer 7030-3. One of ordinary skill will recognize that additional elements (e.g., more than one at a time) may be associated with a respective layer of icon 7060 and that user interface element 7060 may include more or fewer layers.

FIG. 7P also illustrates icon 7060 with different degrees of separation between layers 7060-1, 7060-2, and 7060-3. For example, view 7074 shows icon 7060 with no separation between layers 7060-1 through 7060-3. View 7076 shows icon 7060 with a first amount (or degree) of separation between each of the layers 7060-1 through 7060-3. View 7078 shows icon 7060 with a second amount (or degree) of separation between each of the layers 7060-1 through 7060-3 that is greater than the first amount of separation. One of ordinary skill will recognize that different amounts of separation may be used for different sets of layers (e.g., optionally, the amount of separation between layers 7060-1 and 7060-2 is different than the amount of separation between layers 7060-2 and 7060-3 in view 7076 and/or 7078).

In some embodiments, a layer of a user interface element casts light and/or shadow onto one or more other layers of a user interface element. For example, as described herein with reference to FIG. 7N, a raised region of a user interface element (e.g., corresponding to an interactive control or content entry region), such as raised region 7054-*d* of user interface element 7054, optionally casts a shadow onto other portions of user interface element 7054 and/or environment 7104. In addition, as described herein with reference to FIG. 7N, a raised region of a user interface element optionally includes a stack of layers each with a respective thickness. For example, as shown in view 7074 in FIG. 7P, layers 7060-1 through 7060-3 each have a respective thickness, and with no separation between layers 7060-1 through 7060-3, the layers 7060-1 through 7060-3 appear stacked (e.g., such that the total thickness of user interface element 7060 is the sum of the thicknesses of each of layers 7060-1 through 7060-3). In some embodiments, layer 7060-1 casts shadow onto layer 7060-2 and/or 7060-3 in accordance with the thickness of layer 7060-1. Similarly, in some embodiments, layer 7060-2 casts shadow onto layer 7060-1 and/or layer 7060-3 in accordance with the thickness of layer 7060-2. Likewise, in some embodiments, layer 7060-3 casts shadow onto layer 7060-1 and/or layer 7060-2 in accordance with the thickness of layer 7060-3. In some embodiments, the layers 7060-1 through 7060-3 cast shadow(s) even without separation between the layers (e.g., as shown in and described herein with reference to FIG. 7N). In some embodiments, as shown for example in view 7076, layers 7060-1 through 7060-3 cast shadow on each other while separated: layer 7060-1 casts a shadow onto layer 7060-2, indicated by the shaded region of layer 7060-2, which in turn casts a shadow on layer 7060-3, indicated by the shaded region of layer 7060-3. In some embodiments, the appearance of the shadow is based on the degree of separation between the layers. For example, as shown in view 7078, layer 7060-1 casts onto layer 7060-2 a shadow that is more diffuse than the shadow in view 7076, in accordance with the increased degree of separation between layers 7060-1 and 7060-2 in view 7078 relative to the degree of separation shown in view 7076. Similarly, as shown in view 7078, layer 7060-2 casts onto layer 7060-3 a shadow that is more diffuse than the shadow in view 7076, in accordance with the increased degree of separation between layers 7060-2 and 7060-3 in view 7078 relative to the degree of separation shown in view 7076.

In some embodiments, the layers of a user interface element cast light on each other. For example, the shaded regions in views 7074, 7076, and 7078 in FIG. 7P, described herein as shadows, may alternatively represent light. As such, similarly to the behaviors described above with reference to shadows, in some embodiments, the light cast by layers 7060-1 through 7060-3 onto each other has different appearances based on the degree(s) of separation between the layers. For example, the light cast by layers 7060-1 and 7060-2 (e.g., represented by the shading) in view 7078 is more diffuse than the light cast by layers 7060-1 and 7060-2 in view 7076, in accordance with the greater degree of separation between layers 7060-1 through 7060-3 in view 7078 than in view 7076. In some embodiments, the light cast by a first layer onto a second layer (or elsewhere into environment 7104) is displayed so as to simulate light that is emitted by the first layer. In some embodiments, the light cast by a first layer onto a second layer (or elsewhere into environment 7104) is displayed so as to simulate light from one or more separate light sources in environment 7104 (e.g., one or more physical and/or simulated light sources) that is reflected off of the first layer.

In some embodiments, icon 7060 is displayed with different amounts of separation between layers 7060-1 through 7060-3 based on different types of user inputs directed to icon 7060 and/or different extents to which the user inputs have progressed. In scenario 7062 in FIG. 7P, user 7002 is not interacting with icon 7060. In scenario 7064 in FIG. 7P, user 7002 is gazing at icon 7060. In scenario 7066 in FIG. 7P, user 7002 is gazing at icon 7060, and the user's hand 7020 is in a ready state (e.g., a state in which the position of the user's hand and/or fingers indicates that the user is prepared to perform an air gesture such as a pinch while the user's gaze is directed to the icon or a tap at a location in the three-dimensional environment corresponding to the icon), with hand 7020 raised toward computer system 101, as well as in a configuration with the index finger extended toward computer system 101. While the user's left hand 7020 is shown in FIG. 7P, one of ordinary skill will recognize that inputs may additionally or alternatively be provided using the user's right hand 7022.

In some embodiments, in the absence of user interaction with icon 7060, as shown in scenario 7062, icon 7060 is displayed without any separation between layers 7060-1 through 7060-3, as shown in view 7074. In some embodiments, as shown in scenario 7064, in response to user 7002 directing attention to icon 7060 based on gaze, icon 7060 is visually distinguished in environment 7104, and specifically is increased slightly in scale relative to other icons in the cluster of icons 7070 as well as outlined displayed as casting a shadow behind it in environment 7104 (e.g., onto other icons in the cluster of icons 7070). In some embodiments, in response to user 7002 directing attention to icon 7060 based on gaze as shown in scenario 7064, the layers 7060-1 through 7060-3 of icon 7060 are separated to the first extent shown in view 7076.

In some embodiments, as shown in scenario 7066, in response to user 7002 directing attention to icon 7060 based on gaze and hand state (e.g., hand position and configuration), icon 7060 continues to be visually distinguished relative to other icons in the cluster of icons 7070 in environment 7104 (e.g., increased slightly in scale relative to other icons in the cluster of icons 7070, outlined, and/or casting a shadow). Optionally, the type of visual distinction between the icon that is the subject of the user's attention and other icons is changed as the user input progresses (e.g., as user 7002 brings hand 7020 into the ready state while gazing at icon 7060, or as user 7002 shifts gaze to icon 7060 while hand 7020 is in the ready state), for example by changing the scale of icon 7060, changing the outline of icon 7060, and/or changing the simulated shadow cast by icon 7060 into environment 7104. In some embodiments, in response to user 7002 directing attention to icon 7060 based on gaze and hand state as shown in scenario 7066, the layers 7060-1 through 7060-3 of icon 7060 are separated to the second extent shown in view 7078.

In some embodiments, in a transition from scenario 7066, while icon 7060 is displayed with the degree of separation indicated in view 7078, and while user 7002's gaze is directed to 7060 and user 7002's hand 7020 is in the ready state, user 7002 performs a selection gesture to select icon 7060 (e.g., an air gesture such as a pinch while the user's gaze is directed to the icon or a tap at a location in the three-dimensional environment corresponding to the icon). In some embodiments, the selection gesture is a pinch gesture that includes movement of two or more fingers (e.g., thumb and index finger) of a hand toward one another. In some embodiments, as the selection gesture is progressed (e.g., the two fingers are moved toward each other before making contact), the amount of separation between layers 7060-1 through 7060-3 is reduced (e.g., icon 7060 is transitioned, or is at least partially transitioned, from an appearance with the degree of separation shown in view 7078 to an appearance with the degree of separation shown in view 7076). In some embodiments, in conjunction with the reduction in the degree of separation in response to the progression of the selection gesture, icon 7060 is changed in scale (e.g., decreased in scale). In some embodiments, if the progression of the selection gesture is reversed (e.g., the two fingers are moved away from each other before making contact), the transformation of icon 7060 is reversed: for example, the amount of separation between layers 7060-1 through 7060-3 is increased (e.g., icon 7060 is transitioned, or is at least partially transitioned, from an appearance with the degree of separation shown in view 7076 to an appearance with the degree of separation shown in view 7078), and/or icon 7060 is changed in scale (e.g., increased in scale).

In some embodiments, as the selection gesture is completed (e.g., the two fingers make contact and/or separate after making contact), optionally while user 7002's gaze remains on icon 7060, the amount of separation between layers 7060-1 through 7060-3 is again increased, and/or icon 7060 is changed in scale (e.g., increased in scale). In some embodiments, the transformation of icon 7060 in response to completion of the selection gesture at least partially reverses the transformation of icon 7060 in response to the initiation of the selection gesture (e.g., initial movement of the two fingers toward each other before making contact). In some embodiments, in response to completion of the selection gesture, an operation associated with icon 7060 is performed in environment 7104. For example, an application (such as an email application associated with icon 7060) is launched and a user interface associated with the application (such as an email application user interface) is displayed (e.g., an application platter having the characteristics and behavior of user interface elements 7030, 7040, and/or 7054 described herein with reference to FIGS. 7A-7O). In another example, a file is opened, and its contents displayed. In another example, a communication session is initiated.

In some embodiments, the transformation of icon 7060 in response to user 7002 directing attention to icon 7060 includes an animation of one or more elements of icon 7060 (e.g., in addition to separation of layers 7060-1 through 7060-3 and/or rescaling of icon 7060). For example, the envelope graphic is optionally animated to show the envelope being opened (e.g., by lifting up the top flap of the envelope), the envelope shaking or vibrating, or other animation. In some embodiments, the animation of icon 7060 is displayed or progressed in response to user 7002 performing a selection gesture directed to icon 7060.

FIGS. 7Q-7W illustrate changing the appearance of a selectable user interface object in response to an input that corresponds to and indicates readiness to interact with the selectable user interface object, in accordance with some embodiments. The user interfaces in FIGS. 7Q-7W are used to illustrate the processes described below, including the processes in FIG. 13. The user interface elements described with reference to FIGS. 7Q-7W optionally have one or more of the characteristics and/or behaviors of the user interface elements described herein with respect to other examples such as the examples in FIGS. 7A-7G, 7H-7J, 7K-7O, 7P, and/or 7X-7Z, in accordance with some embodiments, unless stated otherwise in the descriptions.

As shown in the examples in FIG. 7Q-7W, content that is visible via display generation component 7100 of computer system 101 is displayed on a touch screen held by user 7002. In some embodiments, display generation component 7100 of computer system 101 is a head-mounted display worn on user 7002's head (e.g., what is shown in FIGS. 7Q-7W as being visible via display generation component 7100 of computer system 101 corresponds to user 7002's field of view when wearing a head-mounted display).

Figure 7Q:
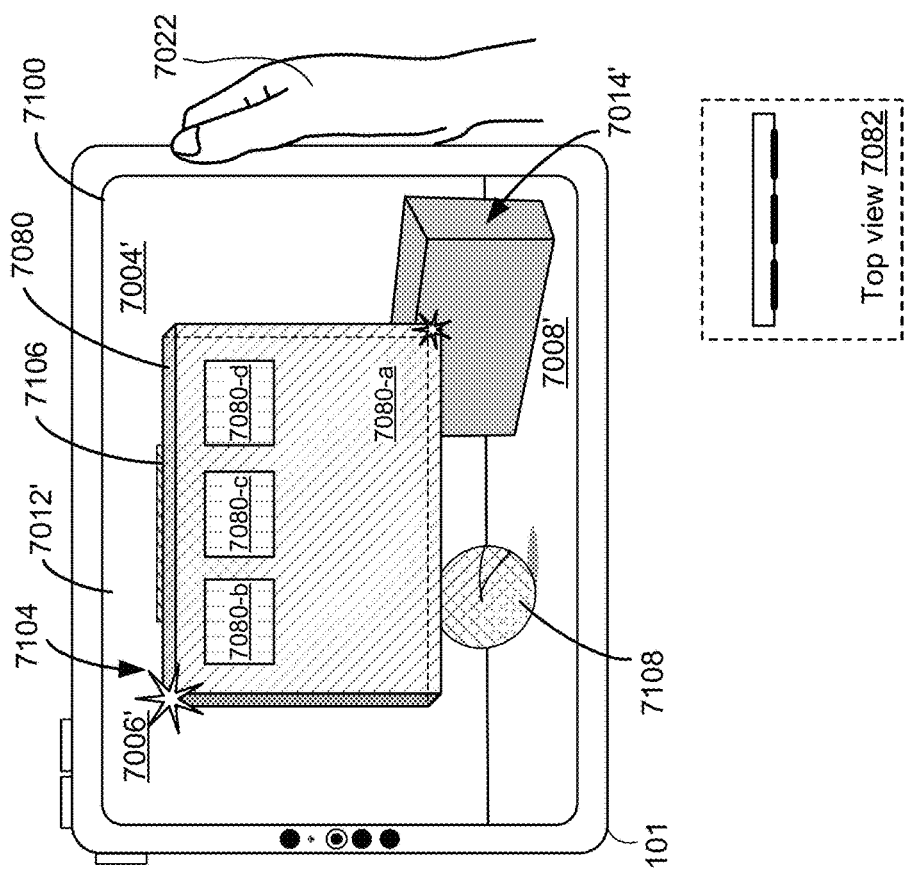
Figure 7T:
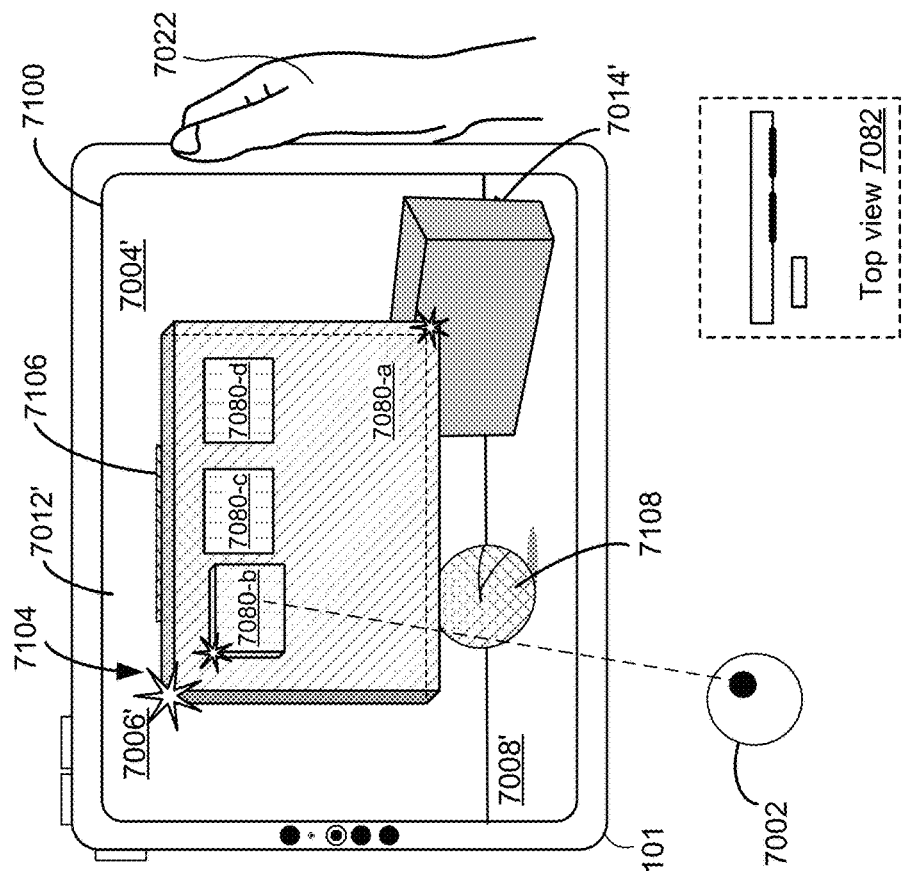

FIG. 7Q illustrates a view of environment 7104 that is visible via display generation component 7100 (e.g., with one or more portions displayed via display generation component and/or one or more passthrough portions visible through a transparent or semitransparent display). The view of environment 7104 includes a view of wall hanging 7106, a view of virtual ball 7108, and a view of box 7014'. FIG. 7Q also illustrates user interface element 7080 displayed over the view of environment 7104. User interface element 7080 may be a user interface of an application executing on computer system 101, a system user interface (e.g., a settings user interface or an application launching user interface), an alert or notification, or a settings menu. User interface element 7080 is displayed as a three-dimensional object with the appearance of being made of a simulated material (e.g., a pane or platter of the simulated material, such as a transparent or semi-transparent material), with a thickness that is visible along the top and left edges of user interface element 7080 from the viewpoint of the user in FIG. 7Q. In addition, in accordance with user interface element 7080 being displayed as a transparent or partially transparent material, the thickness of user interface element 7080 is apparent from the right and bottom edges, from the viewpoint of the user in FIG. 7Q. User interface element 7080 has an appearance that is based on the appearance of underlying portions of environment 7104, such as wall 7004', wall hanging 7106, ball 7108, and/or box 7014', optionally using a graphical composition of frames from different times, a color gradient, or other example technique described herein. The appearance of user interface element 7080 is in some embodiments also updated over time based on changes in the appearance of the overlapping portions of environment 7104, analogously to the user interface elements described herein with reference to FIGS. 7A-7J.

User interface element 7080 includes a plurality of regions. Specifically, user interface element 7080 includes a first region 7080-a (e.g., the pane or platter of the simulated material) that defines a front surface (e.g., a front face or front plane) of user interface element 7080. In some embodiments, region 7080-a of user interface element 7080 is analogous to background portion 7030-a of user interface element 7030 (FIG. 7D), to background portion 7040-a of user interface element 7040 (FIG. 7H), and/or to first region 7054-a of user interface element 7054 (FIG. 7L). User interface element 7080 also includes regions 7080-b, 7080-c, and 7080-d that correspond to selectable objects, such as buttons, menus, or other controls, that are activatable to perform respective associated operations in environment 7104. As shown in FIG. 7Q, regions 7080-b, 7080-c, and 7080-d are flat and flush with the surface of user interface element 7080 (e.g., while user 7002 is not indicating readiness to interact with, such as by not directing attention $t_0$, any of regions 7080-b, 7080-c, and 7080-d), as indicated in top view 7082, which shows a top-down view of user interface element 7080 and its regions 7080-b, 7080-c, and 7080-d. The appearances of regions 7080-b, 7080-c, and 7080-d in FIG. 7Q are optionally default appearances (e.g., based on default settings or values for one or more visual properties, such as brightness or darkness, opacity or transparency, size, thickness, amount of specular reflection, degree of blurring, and/or degree of separation from user interface element 7080) indicative of regions 7080-b, 7080-c, and 7080-d not currently being selected for further interaction, and optionally indicative of regions 7080-b, 7080-c, and 7080-d being in a first (e.g., off or inactivated) state.

User interface element 7080 is displayed as a material having optical properties that interact with light in environment 7104. As shown in FIG. 7Q, user interface element 7080 is displayed with the appearance (e.g., based on a visual effect) of reflecting light from one or more sources (e.g., one or more physical light sources in a physical environment surrounding computer system 101 and/or one or more simulated light sources in environment 7104, or a subset thereof) as it would appear to a person viewing user interface element 7080, at its position in environment 7104 in FIG. 7Q, and from the viewpoint of the user in FIG. 7Q. For example, in accordance with a light source above and to the left of user interface element 7080, FIG. 7Q shows a specular reflection at the top left corner (e.g., of the top edge) of user interface element 7080 (e.g., at a place along the outer edge of user interface element 7080 that faces a given light source) and a specular reflection at the inner bottom right corner of user interface element 7080 (e.g., the internal specular reflection is shown along the inside of the edge of user interface element 7080 opposite the location of the external specular reflection in the top left corner, where the amount of internal specular reflection at the bottom right corner is less than the amount of external specular reflection at the top left corner. As shown in FIG. 7Q, specular reflections are optionally not displayed for regions 7080-b, 7080-c, and 7080-d due to these regions being flat and flush with the surface of user interface element 7080.

FIG. 7R illustrates a transition in user interface element 7080 in response to user 7002 indicating readiness to interact with user interface element 7080. FIG. 7R shows user 7002 directing attention to (e.g., gazing at) region 7080-*b*, indicated in FIG. 7R by the dashed line extending from user 7002's eye to region 7080-*b*. The directing of user 7002's attention to region 7080-*b* indicates user 7002's readiness to interact with region 7080-*b*, prior to an interaction input directed to region 7080-*b* being received. In some embodiments, in order for an input to indicate user 7002's readiness to interact with a respective region, such as region 7080-*b*, user 7002's hand (e.g., left hand 7020, or right hand 7022, if computer system 101 were not held in right hand 7022) must be in a ready state (e.g., instead of or in addition to the requirement that user 7002 direct attention to the respective region).

As shown in FIG. 7R, in response to user 7002 directing attention to region 7080-*b*, the visual appearance of region 7080-*b* is changed (e.g., to an appearance indicative of selection of region 7080-*b* for further interaction): a thickness of region 7080-*b* is increased; an opacity of region 7080-*b* is decreased (such that region 7080-*b* becomes more transparent); and region 7080-*b* is lifted away from the surface of region 7080-*a* and away from the surface of user interface element 7080 more generally, so as to appear to hover over the surface of user interface element 7080 (e.g., with separation from the surface of user interface element 7080, such as in a z-direction of an x-y-z coordinate system in which the front surface of user interface element 7080 defines the x-y plane) and be moved closer to the viewpoint of user 7002, as shown in environment 7104 and indicated in top view 7082 in FIG. 7R. Accordingly, a shadow is displayed as being cast onto the surface of user interface element 7080 by the lifted region 7080-*b* (e.g., due to the increased thickness of region 7080-*b* and/or the separation of region 7080-*b* from the surface of user interface element 7080). In some embodiments, the increase in thickness of region 7080-*b* is displayed via an animated transition, such as an animation of region 7080-*b* gradually increasing in thickness. Optionally, other visual changes are also animated. In some embodiments, the size of region 7080-*b* (e.g., in x- and y-dimensions) is maintained in response to user 7002 directing attention to region 7080-*b*. In some embodiments, region 7080-*b* is increased in brightness.

In some embodiments, as illustrated in FIG. 7R, region 7080-*b* is displayed as a material having optical properties that interact with light in environment 7104, and in accordance with the increase in thickness of region 7080-*b*, the lifted region 7080-*b* is displayed so as to appear to be reflecting light, as indicated by the specular reflection from the top left corner of the lifted region 7080-*b* (e.g., consistent with the light source(s) corresponding to the other specular reflections displayed on user interface element 7080 in FIG. 7R, as described herein with reference to FIG. 7Q). In some embodiments, the amount of specular reflection and/or the extent to which the specular reflection extends along one or more edges of region 7080-*b* indicates the magnitude of the thickness of region 7080-*b* (e.g., the amount and/or extent of the specular reflection from region 7080-*b* is gradually increased or decreased as the thickness of region 7080-*b* is gradually increased or decreased, respectively (e.g., during an animation)). In some embodiments, as illustrated in FIG. 7R, an amount of blurring of region 7080-*b* is increased in response to user 7002 directing attention to region 7080-*b*, as region 7080-*b* is increased in thickness and lifted away from user interface element 7080 (e.g., to enhance the visual effect of a semi-transparent material lifting away from an underlying object, which would make the underlying object appear blurrier through the material being lifted away).

The appearances of regions 7080-*c* and 7080-*d* remain unchanged in FIG. 7R, in accordance with user 7002 not indicating readiness to interact with those regions (e.g., not directing attention to, such as by gazing at, those regions).

In some circumstances, environment 7104 includes a user interface element that includes a slider (e.g., for selecting a value of a particular setting, such as an audio volume level or brightness level, from a set or range of multiple values, or for selecting a position within content, such as a playback position within audio and/or video). For example, user interface element 7080 optionally also includes a slider. In some embodiments, prior to an input indicating user 7002's intent to interact with the slider, the slider is displayed without a control for changing the current value of the slider (e.g., a slider thumb or arrow button). In some embodiments, the control for changing the current value of the slider is displayed in response to the input indicating user 7002's intent to interact with the slider. In some embodiments, display of the slider control requires both that user 7002's attention be directed to the slider and that user 7002's hand be in a ready state (whereas in some embodiments, just one of the two conditions suffices to trigger display of the slider control). In some embodiments, the displayed slider control exhibits some of the same behavior as and/or has one or more of the visual properties of the lifted region 7080-*b* described above with reference to FIG. 7R. For example, the slider control has in some embodiments a nonzero thickness and/or nonzero degree of separation from the user interface element that the slider is part of. Optionally, the slider control has an opacity that corresponds to (e.g., is equal to or proportional to) the opacity of the lifted region 7080-*b*. Optionally, the slider and/or the slider control exhibit specular reflection, whereas in some embodiments one or both of the slider or slider control do not exhibit specular reflection (e.g., unlike button and other control regions). Optionally, the slider control casts a shadow onto underlying content, such as the slider and/or the encompassing user interface element. In some embodiments, if user 7002's attention ceases to be directed to the slider, or if user 7002's hand ceases to be in the ready state, or in some embodiments if both conditions occur, the slider control ceases to be displayed.

In some circumstances, environment 7104 includes a user interface element that includes a toggle switch (e.g., for selecting one of multiple, typically two, mutually exclusive values of a particular setting, such as for enabling or disabling a function or feature, or switching between two modes). For example, user interface element 7080 optionally also includes a toggle switch. The toggle switch typically includes a movable element (e.g., a disk or other shape) superimposed on a background element, different areas of which represent the different values of the setting (e.g., a bar or well, with one end representing one value and the opposite end representing the other value). In some embodiments, in the default appearance of the toggle switch (e.g., displayed while user 7002's attention is not directed to the toggle switch and/or while user 7002's hand is not in a ready state), the background element is a recessed region (e.g., similar to recessed region 7054-*c* (FIG. 7M)) and has a respective depth relative to a front surface of the encompassing user interface element. In some embodiments, the movable element is positioned in the recessed background region. In some embodiments, the movable element exhibits some or all of the same behavior as and/or has one or more of the visual properties of the lifted region 7080-*b* described above with reference to FIG. 7R (e.g., decreased opacity, increased brightness, maintained size, and/or casting of a shadow onto underlying content, such as onto the background element). In some embodiments, in the default state, the movable element has a respective thickness and/or height relative to the recessed background region. In some such embodiments, in response to user 7002's attention being directed to the toggle switch, the movable element does not increase in thickness (e.g., because the movable element already has a nonzero thickness) and/or is not lifted away from or otherwise changed in height relative to the recessed background region, and accordingly a shadow cast onto underlying content is not intensified, yet the movable element optionally exhibits other behavior analogous to region 7080-*b* (FIG. 7R), such as staying the same size, changing in opacity, and/or changing in brightness.

Figure 7S:
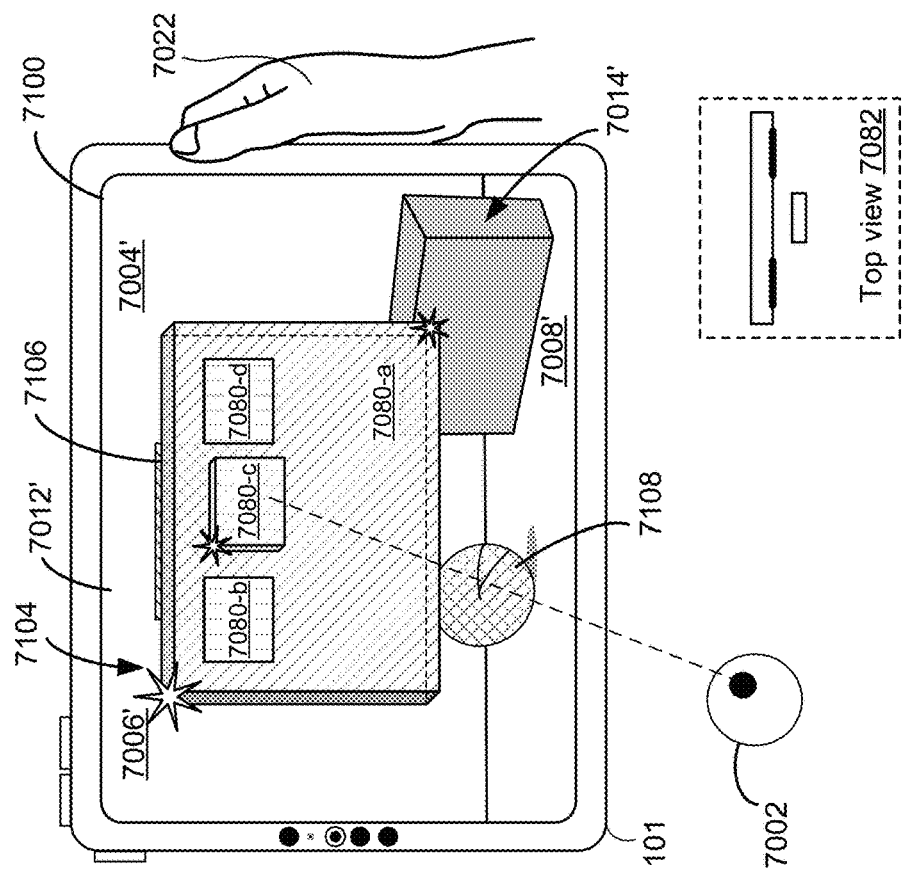

FIG. 7S illustrates a transition in user interface element 7080 in response to user 7002 indicating readiness to interact with a different portion of user interface element 7080 than in FIG. 7R. FIG. 7S shows user 7002 directing attention to (e.g., gazing at) region 7080-*c*, indicated in FIG. 7S by the dashed line extending from user 7002's eye to region 7080-*c*, instead of to region 7080-*b* as in FIG. 7R. The directing of user 7002's attention to region 7080-*c* indicates user 7002's readiness to interact with region 7080-*c*, prior to an interaction input directed to region 7080-*c* being received. As shown in FIG. 7S, in response to user 7002 directing attention to region 7080-*c*, the visual appearance of region 7080-*c* is changed in an analogous manner to that previously described herein with reference to region 7080-*b* (FIG. 7R), to an appearance indicating that region 7080-*c* is selected for further interaction (as well as unchanged with respect to some visual properties, such as size, in an analogous manner to that previously described herein with reference to region 7080-*b* (FIG. 7R)). For example, a thickness of region 7080-*c* is increased, an opacity of region 7080-*c* is decreased (such that region 7080-*c* becomes more transparent), and region 7080-*c* is lifted away from the surface of user interface element 7080, so as to appear to hover over the surface of user interface element 7080 and be closer to the viewpoint of user 7002, as shown in environment 7104 and indicated in top view 7082 in FIG. 7S. Accordingly, a shadow is displayed as being cast onto the surface of user interface element 7080 by the lifted region 7080-*c*. In some embodiments, region 7080-*c* is increased in brightness. In some embodiments, like region 7080-*b*, region 7080-*c* is displayed as a material having optical properties that interact with light in environment 7104, and in accordance with the increase in thickness of region 7080-*c*, the lifted region 7080-*c* is displayed so as to appear to be reflecting light, as indicated by the specular reflection from the top left corner of the lifted region 7080-*c* (e.g., consistent with the same light source(s) in environment 7104 as described herein with reference to FIGS. 7Q-7R). The blurriness of underlying content, such as region 7080-*a* of user interface element 7080, as viewed through the lifted region 7080-*c* is also increased.

In addition, in response to user 7002's attention no longer being directed to region 7080-*b*, the visual appearance of region 7080-*b* is reverted to its appearance as shown in and described with reference to FIG. 7Q (e.g., a default appearance indicative of region 7080-*b* not currently being selected for further interaction). For example, region 7080-*b* is reduced in thickness (e.g., restored to being flat) and thus no longer shown with specular reflection, increased in opacity, decreased in the amount of blurring of underlying content (such as of region 7080-*a*), and replaced on the surface of user interface element 7080 (e.g., restored to being flush with the surface of user interface element 7080), and thus no longer shown as casting a shadow onto user interface element 7080, as shown in environment 7104 and indicated in top view 7082 in FIG. 7S. In some embodiments, region 7080-*b* is decreased in brightness. The appearance of region 7080-*d* remains unchanged in FIG. 7S, in accordance with user 7002 not indicating readiness to interact with region 7080-*d*.

FIG. 7T illustrates a transition in user interface element 7080 in response to user 7002 directing attention to (e.g., gazing at) region 7080-*b* (e.g., again, as was the case in the FIG. 7R scenario), indicated in FIG. 7T by the dashed line extending from user 7002's eye to region 7080-*b* instead of to region 7080-*c* as in FIG. 7S. The directing of user 7002's attention to region 7080-*b* indicates user 7002's readiness (e.g., again) to interact with region 7080-*b*. As shown in FIG. 7T, in response to user 7002 directing attention to region 7080-*b*, the visual appearance of region 7080-*b* is changed in an analogous manner to that previously described herein with reference to region 7080-*b* of FIG. 7R and region 7080-*c* of FIG. 7S, to the same appearance as in FIG. 7R, indicating that region 7080-*b* is selected (e.g., reselected) for further interaction: the thickness of region 7080-*b* is increased; the opacity of region 7080-*b* is decreased; the degree of blurring of underlying content is increased; and region 7080-*b* is lifted away from the surface of user interface element 7080, so as to appear to hover over the surface of user interface element 7080 and be closer to the viewpoint of user 7002, as shown in environment 7104 and indicated in top view 7082 in FIG. 7T. Accordingly, a shadow is displayed as being cast onto the surface of user interface element 7080 by the lifted region 7080-*b*, and the lifted region 7080-*b* is displayed with specular reflection from the top left corner of the lifted region 7080-*b* and optionally with increased brightness of region 7080-*b*.

In addition, in response to user 7002's attention no longer being directed to region 7080-*c*, the visual appearance of region 7080-*c* is reverted to its appearance as shown in and described with reference to FIG. 7Q (e.g., a default appearance indicative of region 7080-*c* not currently being selected for further interaction), via changes that are analogous to the changes to region 7080-*b* in FIG. 7S. For example, region 7080-*c* is reduced in thickness (e.g., flattened) and thus no longer shown with specular reflection, increased in opacity, decreased in the amount of blurring of underlying content, and replaced on (e.g., so as to be flush with) the surface of user interface element 7080, and thus no longer shown as casting a shadow onto user interface element 7080, as shown in environment 7104 and indicated in top view 7082 in FIG. 7R, as well as optionally reduced (e.g., restored) in brightness. The appearance of region 7080-*d* still remains unchanged in FIG. 7T, in accordance with user 7002 not indicating readiness to interact with region 7080-*d*.

Figure 7V:
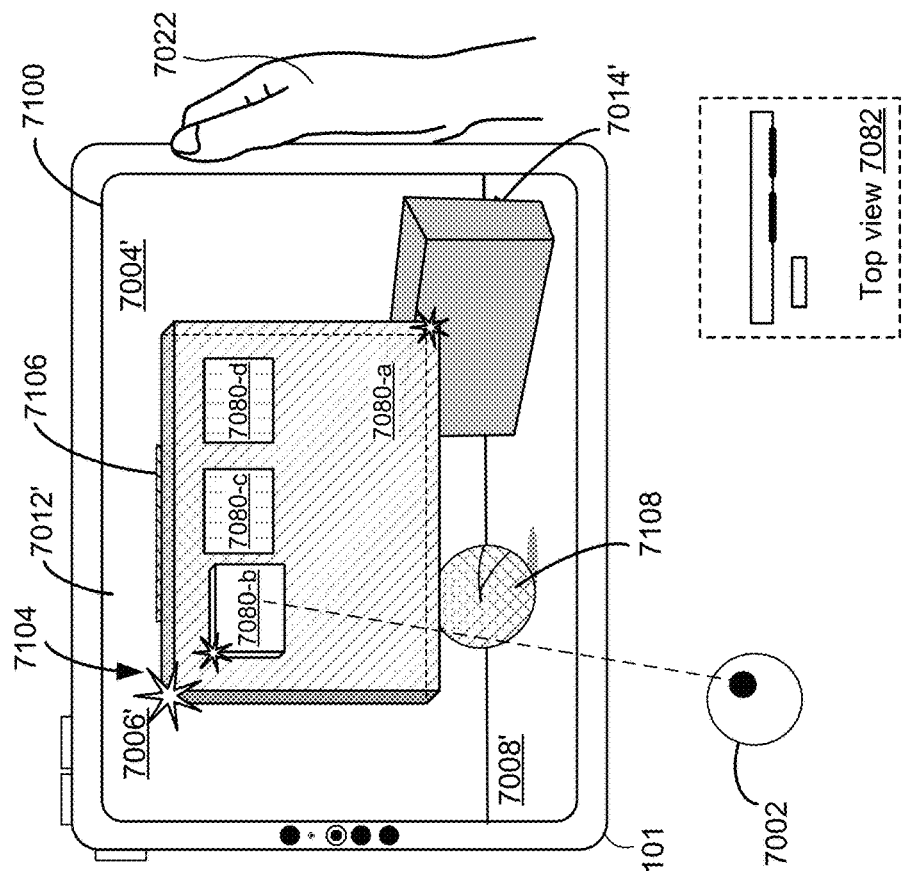
Figure 7U:
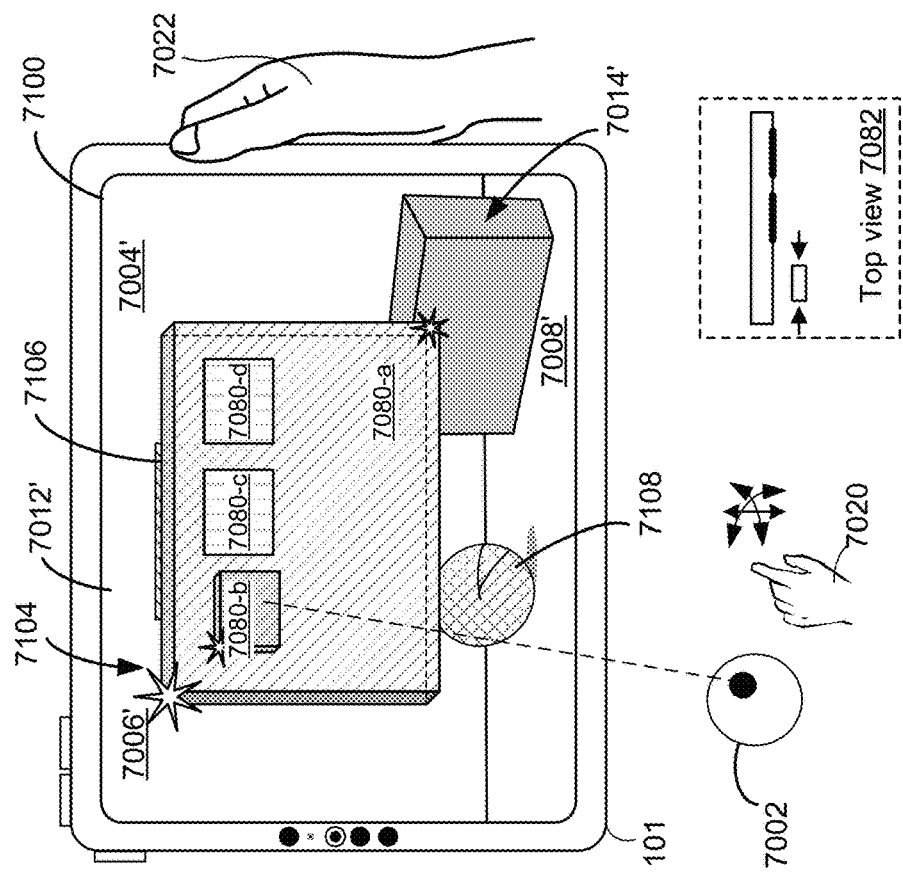

FIG. 7U illustrates a transition from FIG. 7T (or from FIG. 7R) based on user 7002 performing an input gesture with their hand 7020 (e.g., an air gesture such as a pinch or a tap at a location in the three-dimensional environment corresponding to region 7080-*b*), as indicated by hand 7020 shown with arrows alongside hand 7020 in FIG. 7U. In some embodiments, the input gesture is initiated while user 7002's attention is directed to user interface element 7080 (e.g., specifically to region 7080-*b*). In some embodiments, the input gesture is initiated after hand 7020 is brought into a ready state (e.g., the input gesture is initiated from the ready state). While FIG. 7U shows user 7002's left hand 7020, one of ordinary skill will recognize that inputs may additionally or alternatively be provided using the user's right hand 7022. In FIG. 7U, in response to user 7002 directing attention to region 7080-*b* and performing an input gesture, thus interacting with region 7080-*b*, the visual appearance of region 7080-*b* is changed from its appearance in FIG. 7T (e.g., is further changed from its appearance in FIG. 7Q), as shown in environment 7104 and indicated in top view 7082. For example, a size of the lifted region 7080-*b* is decreased, the opacity of the lifted region 7080-*b* is (e.g., further) decreased, and lifted region 7080-*b* is darkened (e.g., decreased in brightness, optionally to a brightness that is less than the default brightness as shown in FIG. 7Q). In addition, the shadow that is displayed as being cast onto the surface of user interface element 7080 by the lifted region 7080-*b* is intensified (e.g., lengthened and/or darkened). Optionally, one or more visual properties of the lifted region 7080-*b* are maintained in response to the input gesture, such the thickness, the corresponding specular reflection, the amount of blurring of underlying content, and/or the separation from the surface of user interface element 7080, as also shown in environment 7104 and indicated in top view 7082 in FIG. 7U. The appearances of regions 7080-*c* and 7080-*d* are maintained throughout FIGS. 7U-7W in accordance with the absence of input directed toward those regions (e.g., neither any input indicating readiness to interact nor any input actually interacting with those regions is detected).

As noted above, in some circumstances, a respective user interface element in environment 7104 includes a slider. In some embodiments, the control for changing the current value of the slider, while being displayed with an appearance responsive to user 7002 indicating intent to interact with the slider, exhibits some of the same behavior as and/or has one or more of the visual properties of the lifted region 7080-*b* described above with reference to FIG. 7U (e.g., in response to the input gesture by hand 7020). For example, in response to an input gesture like the input gesture of FIG. 7U, the slider control in some embodiments is decreased in size, decreased in opacity, and/or darkened (whereas in some embodiments, opacity and/or brightness are maintained). Optionally, the shadow cast by the slider control onto underlying content is intensified. In some embodiments, one or more of the visual properties of the slider control are maintained, such as the thickness, the corresponding specular reflection if any, the amount of blurring of underlying content, and/or the amount of separation, if any, from the user interface element that the slider is part of. The value indicated by the slider is optionally changed during the input gesture, in response to movement of the input gesture (e.g., in response to lateral movement of hand 7020 while in an air pinch or air tap configuration), and the amount of change in the value of the slider is optionally based on (e.g., proportional to or with acceleration of) the amount of movement of the input gesture.

As noted above, in some embodiments, a respective user interface element in environment 7104 includes a toggle switch. In some embodiments, the movable element (e.g., disk) of the toggle switch, while being displayed with an appearance responsive to user 7002 indicating intent to interact with the toggle switch, exhibits some of the same behavior as and/or has one or more of the visual properties of the lifted region 7080-*b* described above with reference to FIG. 7U (e.g., in response to the input gesture by hand 7020). For example, in response to an input gesture like the input gesture of FIG. 7U, the movable toggle element in some embodiments is decreased in size, decreased in opacity, and/or darkened (whereas in some embodiments, opacity and/or brightness are maintained). Optionally, the shadow cast by the movable toggle element onto underlying content, including for example the background element, is intensified. In some embodiments, one or more of the visual properties of the movable element are maintained, such as the thickness, the corresponding specular reflection if any, the amount of blurring of underlying content, and/or the amount of separation, if any, from the encompassing user interface element.

FIG. 7V illustrates a transition from FIG. 7U in response to completion of the input gesture performed by user 7002, and with user 7002's attention remaining directed to region 7080-*b*. In response to the end of the input gesture, computer system 101 performs a respective operation associated with region 7080-*b* (e.g., activating a button or control represented by region 7080-*b*, launching an application, revealing a menu, dismissing an alert, toggling a function, or other operation), and changes the visual appearance of region 7080-*b* from its appearance in FIG. 7U. In particular, in FIG. 7V, the size of the lifted region 7080-*b* is increased (e.g., restored to the same size as in any of FIGS. 7Q-7T, or increased to a different size, such as a size greater than that in FIG. 7Q), the opacity of the lifted region 7080-*b* is increased (e.g., restored to the same opacity as in FIG. 7T, restored to the same opacity as in FIG. 7Q, or increased to a different level of opacity, such as to an opacity greater than that in FIG. 7Q), and the brightness of the lifted region 7080-*b* is increased (e.g., restored to the same brightness as in FIG. 7T, restored to the same brightness as in FIG. 7Q, or increased to a different brightness level, such as to a brightness greater than that in FIG. 7Q). In addition, the shadow that is displayed as being cast onto the surface of user interface element 7080 by the lifted region 7080-*b* is reduced in intensity (e.g., shortened and/or lightened, for example to the same intensity as in FIG. 7T or as in FIG. 7Q). Optionally, while user 7002's attention remains directed to the lifted region 7080-*b* after the end of the input gesture, one or more visual properties of the lifted region 7080-*b* are maintained, such as the thickness, specular reflection, separation from the surface of user interface element 7080, and shadow intensity, as shown in environment 7104 and indicated in top view 7082 in FIG. 7V. In some embodiments, the respective operation associated with region 7080-*b* is performed in response to the end of the input gesture of FIG. 7U, without regard to whether (e.g., even if) user 7002's attention remains directed to region 7080-*b*. In some embodiments, the respective operation associated with region 7080-*b* is performed in response to the end of the input gesture of FIG. 7U and user 7002's attention having moved away from region 7080-*b* (e.g., in response to the end of the input gesture, performance of the respective operation is delayed until it is also the case that user 7002's attention is no longer directed to region 7080-*b*).

As noted above, in some circumstances, environment 7104 includes a user interface element that includes a slider, and in some embodiments a control for changing the current value of the slider, while displayed, exhibits some of the same behavior as and/or has one or more of the visual properties of the lifted region 7080-*b* described above with reference to FIG. 7U (e.g., in response to the input gesture by hand 7020 in FIG. 7U). In addition, in some embodiments the slider control exhibits some of the same behavior as and/or has one or more of the visual properties of the lifted region 7080-*b* described above with reference to FIG. 7V (e.g., in response to the end of the input gesture of FIG. 7U). For example, in response to the end of the input gesture that is analogous to the input gesture of FIG. 7U, the slider control in some embodiments is increased (e.g., restored) in size, increased (e.g., restored) in opacity, and/or brightened (e.g., restored to the same brightness as when user 7002 indicated intent to interact with the slider control, prior to the input gesture) (whereas in some embodiments, opacity and/or brightness are maintained). Optionally, the shadow cast by the slider control onto underlying content is reduced in intensity (e.g., to the same intensity as when user 7002 indicated intent to interact with the slider control, or to the same intensity as before user 7002 indicated the intent to interact). In some embodiments, while user 7002's attention remains directed to the slider or to the slider control in particular, the slider control continues to be displayed with one or more visual properties being maintained, such as the thickness, the corresponding specular reflection (if any), the amount of blurring of underlying content, and/or the separation from the user interface element that the slider is part of, and after user 7002's attention moves away from the slider, the slider control ceases to be displayed (e.g., fades away). In some embodiments, the slider control ceases to be displayed after the end of the input gesture (e.g., without regard to, and even if, user 7002's attention remains directed to the slider).

As noted above, in some circumstances, environment 7104 includes a user interface element that includes a toggle switch with a movable element that in some embodiments exhibits some of the same behavior as and/or has one or more of the visual properties of the lifted region 7080-*b* described above with reference to FIG. 7U (e.g., in response to the input gesture by hand 7020 in FIG. 7U). In addition, in some embodiments the movable element exhibits some of the same behavior as and/or has one or more of the visual properties of the lifted region 7080-*b* described above with reference to FIG. 7V (e.g., in response to the end of the input gesture of FIG. 7U). For example, in response to the end of the input gesture that is analogous to the input gesture of FIG. 7U, the movable element in some embodiments is increased (e.g., restored) in size, increased (e.g., restored) in opacity, and/or brightened (e.g., restored to the same default brightness as before user 7002 indicated intent to interact with the toggle switch, restored to the same brightness as in response to user 7002 indicating intent to interact with the toggle switch, or increased to a different brightness level, such as to a brightness greater than the default brightness) (whereas in some embodiments, opacity and/or brightness are maintained). Optionally, the shadow cast by the movable element onto underlying content is reduced in intensity (e.g., to the same intensity as when user 7002 indicated intent to interact with the toggle switch, or to the same intensity as before user 7002 indicated the intent to interact). In some embodiments, in response to completion of the input gesture, lateral movement of the movable element is displayed. For example, the movable element is moved from a position relative to the background element of the toggle switch that corresponds to one switch value to a different position relative to the background element of the toggle switch that corresponds to a different switch value (e.g., moved from one end of the background element to the opposite end). In addition, an appearance of the toggle switch is changed to indicate the new switch value (e.g., via a change in color, such as from gray or white to green or vice versa, or other visual property change). In some embodiments, after the end of the input gesture, while user 7002's attention remains directed to the toggle switch, the movable element continues to be displayed with one or more visual properties being maintained (e.g., maintaining the increased brightness that is indicative of user 7002's intent to interact with the toggle switch, where the increased brightness is applied to the toggle switch with its appearance corresponding to the new switch value), and then after user 7002's attention moves away from the toggle switch, the one or more visual properties are reverted (e.g., the brightness of the toggle switch is reverted to the default brightness in the absence of user intent to interact with the toggle switch, while the toggle switch otherwise maintains the same appearance corresponding to the new switch value).

Figure 7W:
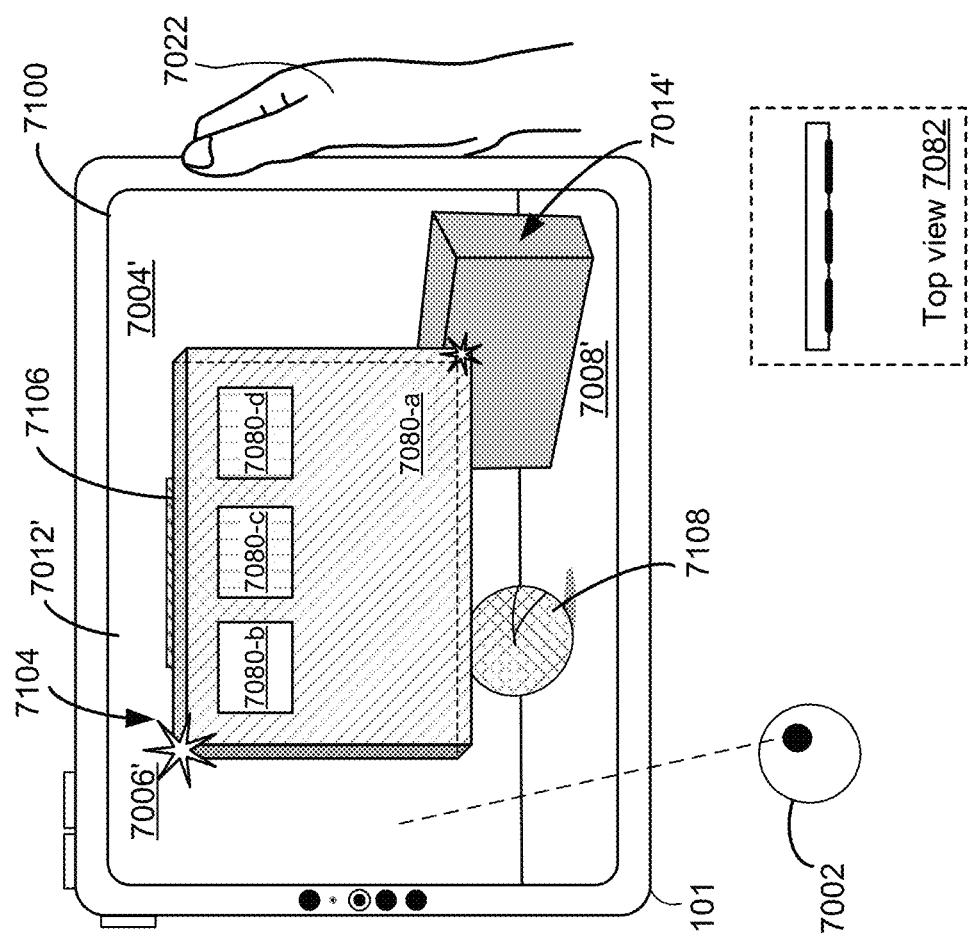

FIG. 7W illustrates a transition from FIG. 7V in response to user 7002's attention moving away from region 7080-*b*, as indicated by the dashed line in FIG. 7W extending from user 7002's eye away and to the left of user interface element 7080, and/or in response to the input gesture performed by user 7002 in FIG. 7U ending (e.g., being completed). In some embodiments, FIG. 7W represents a transition from FIG. 7V in response to user 7002's attention moving away from region 7080-*b* after the input gesture performed by user 7002 in FIG. 7U has already ended. In some embodiments, FIG. 7W represents a transition from FIG. 7U in response to user 7002's attention moving away from region 7080-*b* in conjunction with the input gesture performed by user 7002 in FIG. 7U ending. In some embodiments, FIG. 7W represents a transition from FIG. 7U in response to the input gesture performed by user 7002 ending after user 7002's attention has already moved away from region 7080-*b*. In some embodiments, the appearance of environment 7104 in FIG. 7W represents a transition from FIG. 7U in response to the input gesture performed by user 7002 ending, without regard to whether user 7002's attention has moved away from region 7080-*b* (e.g., the transition occurs in response to the end of the input gesture even if user 7002's attention remains on region 7080-*b*). In FIG. 7W, the visual appearance of region 7080-*b* is changed from its appearance in FIG. 7V: the thickness of region 7080-*b* is decreased (e.g., restored to the same zero thickness as in FIG. 7Q, where region 7080-*b* is flat), and the separation between region 7080-*b* and the surface of user interface element 7080 is decreased (e.g., restored to the same zero separation as in FIG. 7Q, where region 7080-*b* is flush with the surface of user interface element 7080), as shown in environment 7104 and indicated in top view 7082 in FIG. 7W. Region 7080-*b* in FIG. 7W is brighter and opaquer (e.g., less transparent) than region 7080-*b* in FIG. 7Q. In some embodiments, the visual appearance of region 7080-*b* in FIG. 7W indicates that region 7080-*b* is in a second state, such as an on or activated state (e.g., having been activated to change a setting of computer system 101 and/or perform a respective operation on computer system 101).

Figure 7X:
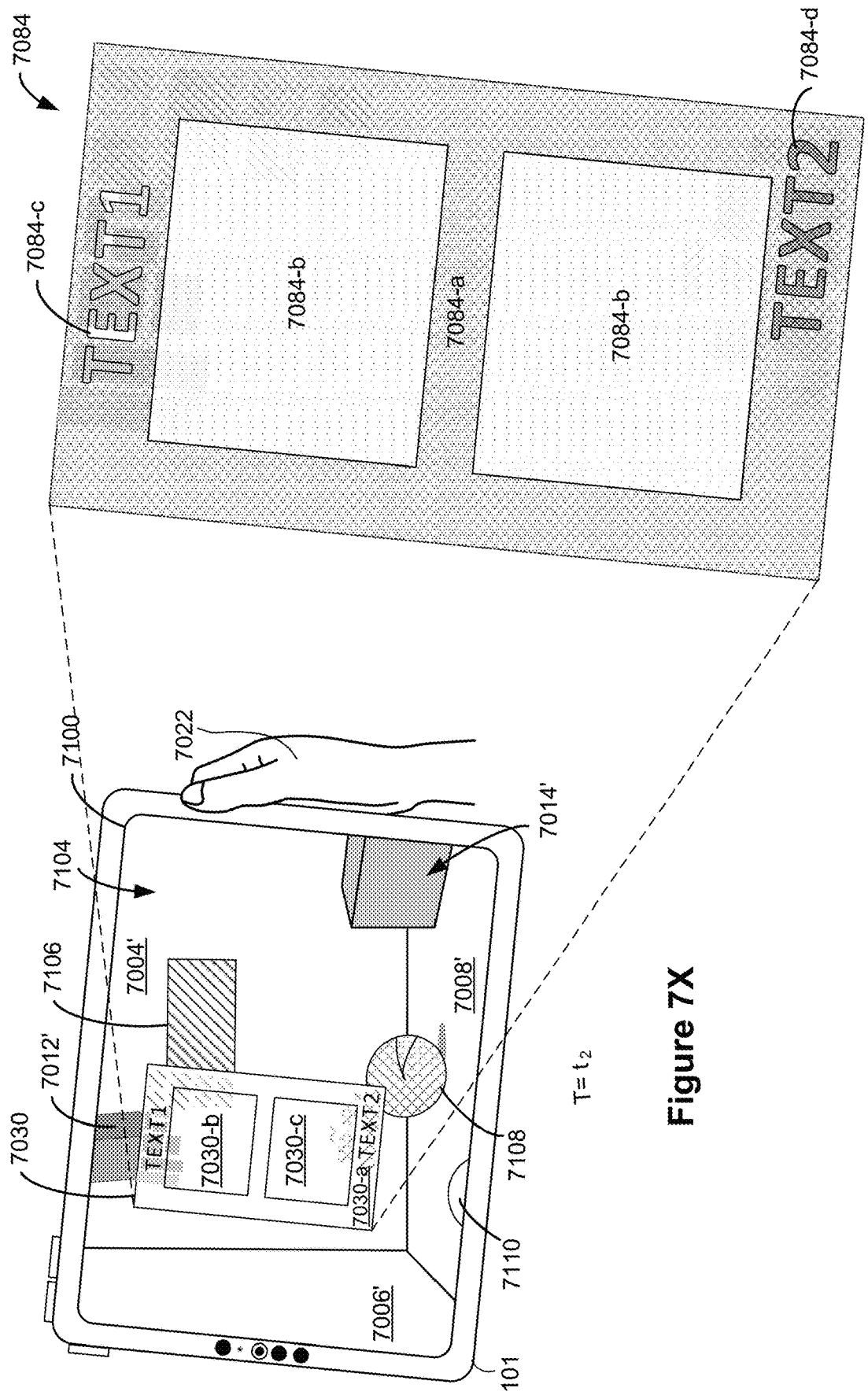
FIGS. 7X-7Z illustrate visually distinguishing different parts of a computer-generated user interface object whose appearance is based on content in a surrounding three-dimensional environment that is behind the user interface object, by applying different transformations to a representation of the underlying content, in accordance with some embodiments.
Figure 7Y:
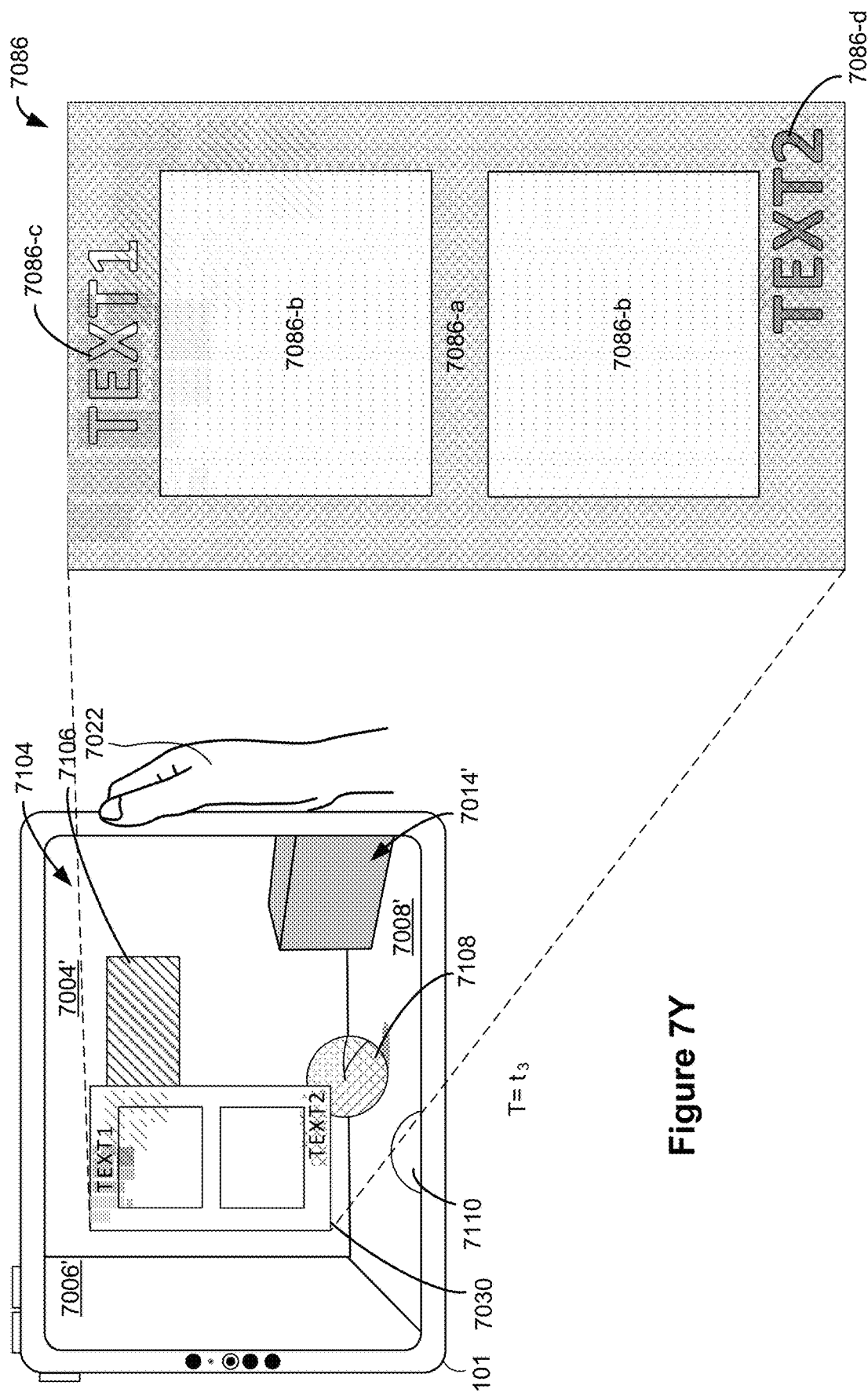
Figure 7Z:
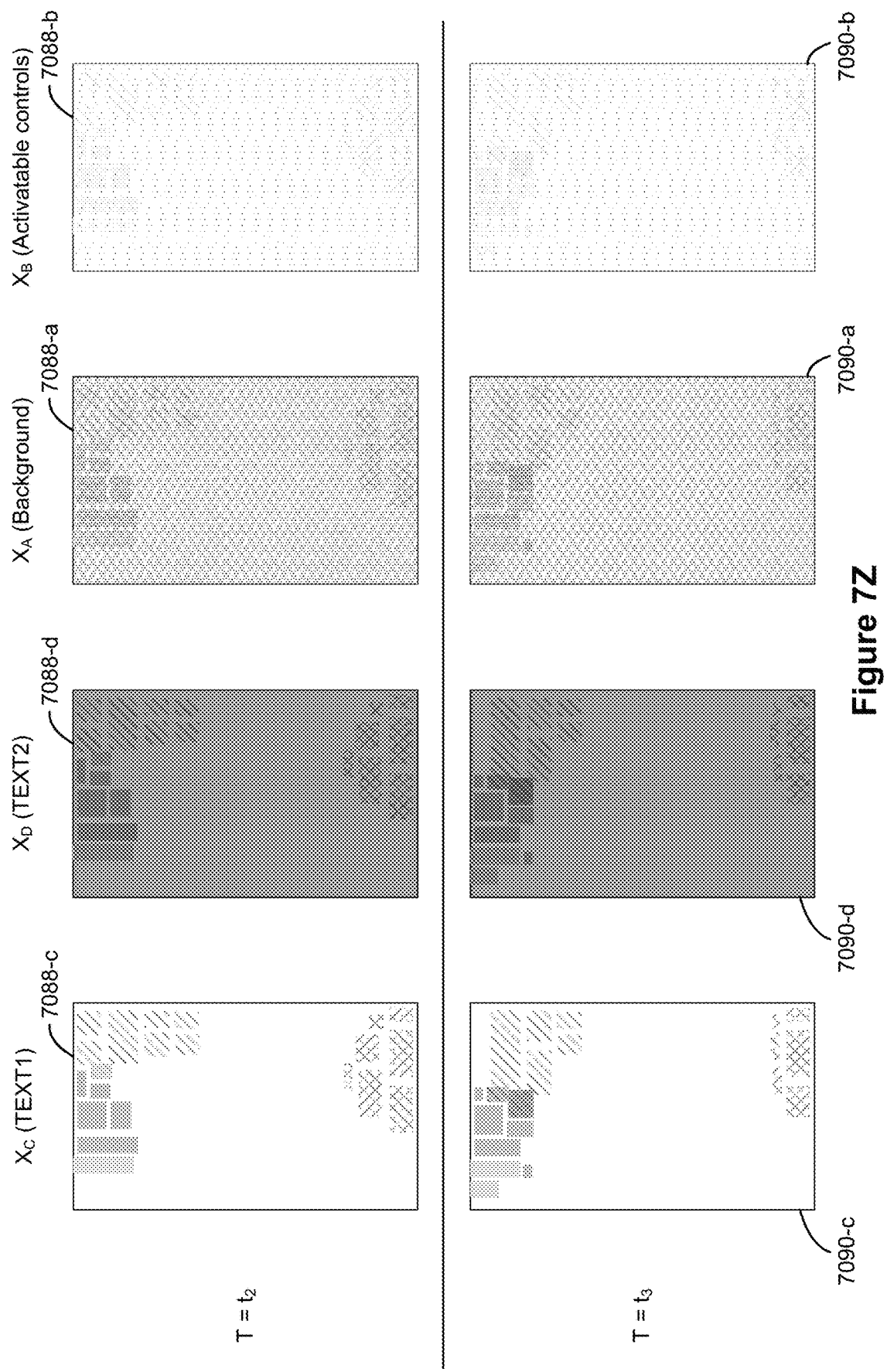

FIGS. 7X-7Z illustrate visually distinguishing different parts of a computer-generated user interface object whose appearance is based on content in a surrounding three-dimensional environment that is behind the user interface object, by applying different transformations to a representation of the underlying content, in accordance with some embodiments. The user interfaces in FIGS. 7X-7Z are used to illustrate the processes described below, including the processes in FIG. 14. The user interface elements described with reference to FIGS. 7X-7Z optionally have one or more of the characteristics and/or behaviors of the user interface elements described herein with respect to other examples such as the examples in FIGS. 7A-7G, 7H-7J, 7K-7O, 7P, and/or 7Q-7W, in accordance with some embodiments, unless stated otherwise in the descriptions.

As shown in the examples in FIG. 7X-7Z, content that is visible via display generation component 7100 of computer system 101 is displayed on a touch screen held by user 7002. In some embodiments, display generation component 7100 of computer system 101 is a head-mounted display worn on user 7002's head (e.g., what is shown in FIGS. 7X-7Z as being visible via display generation component 7100 of computer system 101 corresponds to user 7002's field of view when wearing a head-mounted display).

FIG. 7X shows the same scenario as in FIG. 7D, in which a view of environment 7104 at a time T=$t_2$ is visible via display 7100 of computer system 101. User interface element 7030 at time $t_2$ has an appearance that is based on the appearance of one or more portions of environment 7104 underlying user interface element 7030. While FIGS. 7X-7Z illustrate examples based on user interface element 7030 of FIGS. 7D-7G, whose appearance is based on a graphical composition of the appearance of underlying portions of environment 7104 at one or more times as described herein with reference to FIG. 7G, the concepts described herein with reference to FIGS. 7X-7Z apply analogously to user interface element 7040 of FIGS. 7H-7J, whose appearance is based on a color gradient generated from colors sampled from underlying portions of environment 7104. Both the graphical composition of FIG. 7G and the color gradient of FIGS. 7H-7J are examples of what is referred to herein as a blurred representation of the underlying portions of environment 7104.

FIG. 7X also shows expanded view 7084 of user interface element 7030. Expanded view 7084 illustrates four regions that are part of user interface element 7030. Region 7084-a is a background portion of user interface 7030, corresponding for example to non-interactive areas, such as regions that do not include selectable content such as text, images, buttons, and/or other controls (e.g., analogous to region 7030-a (FIG. 7D), region 7040-a (FIG. 7H), and/or region 7054-a (FIG. 7L)). Regions 7084-b represent interactive (e.g., selectable) objects, such as buttons, toggle switches, sliders, and/or other controls (e.g., analogous to regions 7030-b and 7030-c (FIG. 7D), regions 7040-b and 7040-c (FIG. 7H), and/or region 7054-d (FIG. 7L)). Region 7084-c corresponds to the text "TEXT1", and encompasses the areas occupied by the characters of "TEXT1". Region 7084-d corresponds to the text "TEXT2", and encompasses the areas occupied by the characters of "TEXT2". In some embodiments, as in the FIG. 7X example, background region 7084-a, control regions 7084-b, text region 7084-c, and text region 7084-d are mutually exclusive regions (e.g., encompass mutually exclusive areas of user interface element 7030).

As shown in FIG. 7X, the appearance of user interface element 7030 is the result of different visual transformations applied to distinct regions of a starting point representation, also called a blurred representation, of the one or more underlying portions of environment 7104. In some embodiments, the starting point representation is the composite resulting from the graphical composition at time $t_2$ in scenario 7036 in FIG. 7G, on which the appearance of user interface element 7030-d is based. In some embodiments, the starting point representation is the generated color gradient on which the appearance of user interface element 7040 at time $t_2$ in FIG. 7H is based. In some embodiments, the color saturation in the starting point representation (e.g., at any given time, including at time $t_2$ and/or at time $t_3$) is increased relative to the appearances of the underlying portions of environment 7104 on which the starting point representation is based (e.g., generating the composite or color gradient includes increasing color saturation, or an additional step of increasing color saturation is applied to the generated composite or color gradient to produce the starting point representation). In FIG. 7X, the appearance of background region 7084-a of user interface element 7084 is generated by applying a first transformation, referred to herein as "transformation $X_A$", selectively to the areas of the starting point representation that correspond to the areas included in background region 7084-a (e.g., as if an image mask in the shape of background region 7084-a (e.g., with the other regions cut out) were applied to the starting point representation before applying transformation $X_A$). In some embodiments, transformation $X_A$ darkens (e.g., reduces the brightness of) the areas to which transformation $X_A$ is applied. In some embodiments, transformation $X_A$ applies a gray filter (e.g., so as to darken, increase the grayness of, and/or reduce the color saturation of the areas to which transformation $X_A$ is applied (e.g., offsetting or reverting the increased color saturation of the starting point representation)). A larger view of the effect of transformation $X_A$ is shown in FIG. 7Z, in which panel 7088-a shows the result of transformation $X_A$ applied to the entirety of the starting point representation of time $t_2$. Transformation $X_A$ is not applied to certain other regions of user interface element 7084. In the example of FIG. 7X, transformation $X_A$ is not applied to any of regions 7084-b, 7084-c, and 7084-d. Instead, different transformations are applied to those regions.

The appearance of control regions 7084-b, for example, is generated by applying a different second transformation, referred to herein as "transformation $X_B$", selectively to the areas of the starting point representation that correspond to the areas included in control regions 7084-b (e.g., as if an image mask in the shape of control regions 7084-b (e.g., two rectangles) were applied to the starting point representation before applying transformation $X_B$), and in some embodiments transformation $X_B$ brightens (e.g., increases the brightness of) the areas to which transformation $X_B$ is applied. A larger view of the effect of transformation $X_B$ is shown in FIG. 7Z, in which panel 7088-b shows the result if transformation $X_B$ were applied to the entirety of the starting point representation of time $t_2$. In the example of FIG. 7X, transformation $X_B$ is not applied to any of regions 7084-a, 7084-c, and 7084-d.

Regions 7084-c and 7084-d of user interface element 7084 in FIG. 7X illustrate two different examples of transformations applied to text regions. The appearance of text region 7084-c, for example, is the result of forgoing applying transformation $X_A$ described with respect to background region 7084-a, forgoing applying transformation $X_B$ described with respect to control regions 7084-b, and forgoing applying transformation $X_D$ described as follows for the other text region 7084-d (e.g., not applying any transformation to the starting point representation, or applying to the starting point representation a visual transformation that is the identity transformation). Stated another way, the appearance of text region 7084-c is the result of maintaining the appearance of the starting point transformation (e.g., the result of the graphical composition or color gradient). A larger view of the effect of forgoing applying any transformations to the starting point representation of time $t_2$ (e.g., a larger view of the appearance of the starting point representation of time $t_2$) is shown in FIG. 7Z, in which panel 7088-c shows the starting point representation without any transformations applied. Within a respective area that otherwise has one or more visual transformations applied, refraining from applying some or all of the one or more visual transformations to text character areas is one way to improve the legibility of the text (e.g., the non-transformed areas). In some embodiments, the appearance of text region 7084-c is the result of applying a fourth transformation, referred to herein as "transformation $X_C$", that is different yet from transformation $X_A$, from transformation $X_B$, and from transformation $X_D$, without applying any of transformation $X_A$, transformation $X_B$, and transformation $X_D$ to text region 7084-c, and optionally where transformation $X_C$ is not applied to any of regions 7084-a, 7084-b, and 7084-d.

The appearance of text region 7084-d, in contrast, is the result of applying a third transformation, referred to herein as "transformation $X_D$" (e.g., and forgoing applying transformation $X_A$ described with respect to background region 7084-a and forgoing applying transformation $X_B$ described with respect to control regions 7084-b) selectively to the areas of the starting point representation of time $t_2$ that correspond to the text character areas included in text region 7084-d (e.g., as if an image mask in the shape of the characters of text region 7084-d were applied to the starting point representation before applying transformation $X_D$), and in some embodiments transformation $X_D$ darkens (e.g., decreases the brightness of) the areas to which transformation $X_D$ is applied more than transformation $X_A$ darkens the areas to which transformation $X_A$ is applied. A larger view of the effect of transformation $X_D$ is shown in FIG. 7Z, in which panel 7088-d shows the result of transformation $X_D$ applied to the entirety of the starting point representation of time $t_2$. In the example of FIG. 7X, transformation $X_D$ is not applied to any of regions 7084-a, 7084-b, and 7084-c. One of ordinary skill will recognize that the appearance of text region 7084-d may similarly be generated by applying transformation $X_A$ to text region 7084-d (e.g., rather than forgoing applying transformation $X_A$) and applying a transformation $X_D'$ that further darkens text region 7084-d (e.g., even if transformation $X_D'$ alone does not darken regions more than transformation $X_A$ does). Applying a visual transformation that (e.g., further) darkens text character areas within a respective area relative to the rest of the respective area is another way to improve the legibility of the text (e.g., the legibility of the darkened, or in some embodiments further darkened, areas).

FIG. 7Y shows the same scenario as in FIG. 7E, in which a view of environment 7104 at a time T=$t_3$ is visible via display 7100 of computer system 101, in a transition from the view of environment 7104 at time T=$t_2$ as shown in FIG. 7X. User interface element 7030 at time $t_3$ has a changed appearance, relative to user interface element 7030 at time $t_2$ (FIG. 7X), that is based on the appearance of one or more changed portions of environment 7104 underlying user interface element 7030, in accordance with a graphical composition of the appearance of underlying portions of environment 7104 at one or more times prior to and/or including time $t_3$, as described herein with reference to FIG. 7G (or, analogously, in accordance with a color gradient generated from colors sampled from the portions of environment 7104 underlying user interface element 7040 at time $t_3$, as described herein with reference to FIG. 7I).

In some circumstances, the changes in the one or more underlying portions of environment 7104 are due at least in part to movement of other objects in environment 7104 (e.g., box 7012 falling in space and/or ball 7108 rolling toward the right (FIGS. 7B-7E)). In some circumstances, the changes in the one or more underlying portions of environment 7104 are due at least in part to changes in lighting, real and/or virtual, in environment 7104 (e.g., as described herein with reference to FIGS. 7K-7M). In some circumstances, the changes in the one or more underlying portions of environment 7104 are due at least in part to a change in position of user interface element 7030 relative to environment 7104 (e.g., such that user interface element 7030 is overlaid on a different part of environment 7104, such as in the transition from FIG. 7D to FIG. 7E in which user interface element 7030 is rotated relative to environment 7104 in response to the viewpoint of user 7002 being rotated (e.g., as the user moves a touchscreen or turns their head while wearing a head-mounted display) while user interface element 7030 is viewpoint-locked (or the analogous transition from FIG. 7H to FIG. 7I in which user interface element 7040 is rotated relative to environment 7104), or such as in a transition analogous to the transition from FIG. 7I to FIG. 7J in which user interface element 7040 is laterally moved relative to environment 7104, for example in response to a drag or other input by user 7002 to reposition user interface element 7040 in environment 7104. In some circumstances, the changes in the one or more underlying portions of environment 7104 are due at least in part to a change in the viewpoint of the user relative to environment 7104 (e.g., as in the transition from FIG. 7D to FIG. 7E in which user interface element 7030 is rotated relative to environment 7104 in accordance with the viewpoint of user 7002 being rotated, as previously noted, and/or due to movement of the viewpoint of user 7002 in environment 7104 and relative to user interface element 7030 while user interface element 7030 is world-locked (e.g., as the user moves a touchscreen or moves their head, while wearing a head-mounted display, relative to a simulated position of user interface element 7030 in environment 7104), thereby changing which portions of environment 7104 are underlying user interface element 7030, even without moving user interface element 7030 relative to environment 7104). In some circumstances, the changes in the one or more underlying portions of environment 7104 are due to any combination of the reasons explained above.

FIG. 7Y also shows expanded view 7086 of user interface element 7030. Expanded view 7086, like expanded view 7084 in FIG. 7X, illustrates four regions that are part of user interface element 7030: region 7086-a is the background portion of user interface 7030 and is analogous to region 7084-a in FIG. 7X; regions 7086-b represent interactive (e.g., selectable) objects and are analogous to regions 7084-b in FIG. 7X; region 7086-c corresponds to the text "TEXT1", and encompasses the areas occupied by the characters of "TEXT1" and is analogous to region 7084-c in FIG. 7X; and region 7086-d corresponds to the text "TEXT2", and encompasses the areas occupied by the characters of "TEXT2" and is analogous to region 7084-d in FIG. 7X. In some embodiments, as in the FIG. 7Y example, and similar to the FIG. 7X example, background region 7086-a, control regions 7086-b, text region 7086-c, and text region 7086-d are mutually exclusive regions (e.g., encompass mutually exclusive areas of user interface element 7030).

As shown in FIG. 7Y, the appearance of user interface element 7030 is the result of different visual transformations applied to distinct regions of a starting point representation of the one or more underlying portions of environment 7104. In some embodiments, the starting point representation is the composite resulting from the graphical composition at time $t_3$ in scenario 7038 in FIG. 7G, on which the appearance of user interface element 7030-e is based, optionally with greater color saturation. In some embodiments, the starting point representation is the generated color gradient on which the appearance of user interface element 7040 at time $t_3$ in FIG. 7I is based, optionally with greater color saturation. In FIG. 7Y, the appearance of background region 7086-a of user interface element 7086 is generated by applying transformation $X_A$, which is optionally a darkening transformation (e.g., that decreases color saturation), selectively to the areas of the starting point representation that correspond to the areas included in background region 7086-a. Another larger view of the effect of transformation $X_A$ is shown in FIG. 7Z, in which panel 7090-a shows the result of transformation $X_A$ applied to the entirety of the starting point representation of time $t_3$. In the example of FIG. 7Y, transformation $X_A$ is not applied to certain other regions of user interface element 7086, such as regions 7086-b, 7086-c, and 7086-d.

The appearance of control regions 7086-b, for example, is generated by applying transformation $X_B$, which is optionally a brightening transformation, selectively to the areas of the starting point representation that correspond to the areas included in control regions 7086-b. Another larger view of the effect of transformation $X_B$ is shown in FIG. 7Z, in which panel 7090-b shows the result of transformation $X_B$ applied to the entirety of the starting point representation of time $t_3$. In the example of FIG. 7Y, transformation $X_B$ is not applied to any of regions 7086-a, 7086-c, and 7086-d.

Regions 7086-c and 7086-d of user interface element 7086 in FIG. 7Y illustrate two different examples of transformations applied to text regions. The appearance of text region 7086-c is the result of forgoing applying transformation $X_A$, forgoing applying transformation $X_B$, and forgoing applying transformation $X_D$ (e.g., not applying any transformation to the starting point representation, or applying to the starting point representation a visual transformation that is the identity transformation). Stated another way, the appearance of text region 7086-c is the result of maintaining the appearance of the starting point transformation (e.g., the result of the graphical composition or color gradient). Another larger view of the effect of forgoing applying any transformations to the starting point representation (e.g., a larger view of the appearance of the starting point representation) is shown in FIG. 7Z, in which panel 7090-c shows the starting point representation of time $t_3$ without any transformations applied. In some embodiments, the appearance of text region 7086-c is the result of applying transformation $X_C$ described above with reference to FIG. 7X, without applying any of transformation $X_A$, transformation $X_B$, and transformation $X_D$ to text region 7086-c, and optionally without applying transformation $X_C$ to any of regions 7086-a, 7086-b, and 7086-d.

The appearance of text region 7086-d, in contrast, is the result of applying transformation $X_D$ (e.g., without applying transformation $X_A$ and without applying transformation $X_B$) selectively to the areas of the starting point representation of time $t_3$ that correspond to the text character areas included in text region 7086-d. Another larger view of the effect of transformation $X_D$ is shown in FIG. 7Z, in which panel 7090-d shows the result of transformation $X_D$ applied to the entirety of the starting point representation of time $t_3$. In the example of FIG. 7Y, transformation $X_D$ is not applied to any of regions 7086-a, 7086-b, and 7086-c. FIGS. 7X-7Y thus provide an example of how the appearance of a user interface element (e.g., user interface element 7030 or user interface element 7040) changes over time (e.g., from time $t_2$ to time $t_3$) by generating the appearance of the user interface element by applying visual transformations to different regions of a representation of underlying content, where the representation itself is a graphical composition or color gradient based on underlying portions of the surrounding three-dimensional environment. One of ordinary skill will recognize that the appearance of the user interface element may be continually generated by applying the same visual transformations to the representation of underlying content as the representation continues to change over time (e.g., as described herein with reference to FIGS. 7A-7J).

In some embodiments, input gestures used in the various examples and embodiments described herein (e.g., with respect to FIGS. 7A-7Z, and FIGS. 8-14) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, and/or depth cameras). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, or a display with a pass-through portion). In some embodiments, the one or more imaging sensors include one or more rear-facing cameras on a side of a device opposite from a display of the device. In some embodiments, the input gestures are detected by a sensor system of a head-mounted system (e.g., a VR headset that includes a stereoscopic display that provides a left image for the user's left eye and a right image for the user's right eye). For example, one or more cameras that are components of the head-mounted system are mounted on the front and/or underside of the head-mounted system. In some embodiments, one or more imaging sensors are located in a space in which the head-mounted system is used (e.g., arrayed around the head-mounted system in various locations in a room) such that the imaging sensors capture images of the head-mounted system and/or the user of the head-mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g., infrared emitter) and/or sound emitter (e.g., ultrasound emitter). For example, while light (e.g., light from an array of infrared light emitters having a predetermined pattern) is projected onto a hand (e.g., hand 7102), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism(s) or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges (sometimes called segments) of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, or a swipe input type). In some embodiments, the amount of movement performed by the moving finger (e.g., thumb) and or other movement metrics associated with the movement of the finger (e.g., speed, initial speed, ending speed, duration, direction, and/or movement pattern) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), and/or a double tap input (e.g., two consecutive taps on the side of a finger at about the same location).

In some embodiments, the gesture inputs are performed by an index finger instead of the thumb (e.g., index finger performs the tap or swipe on the thumb, or the thumb and the index finger move toward each other to perform a pinch gesture). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of input or finger input may be used to trigger a type of operation in the examples provided in this disclosure, other types of input or finger input are optionally used to trigger the same type of operation in other embodiments.

Additional descriptions regarding FIGS. 7A-7Z are provided below in references to methods 8000, 9000, 10000, 11000, 12000, 13000, and 14000 described with respect to FIGS. 8-14 below.

Figure 8:
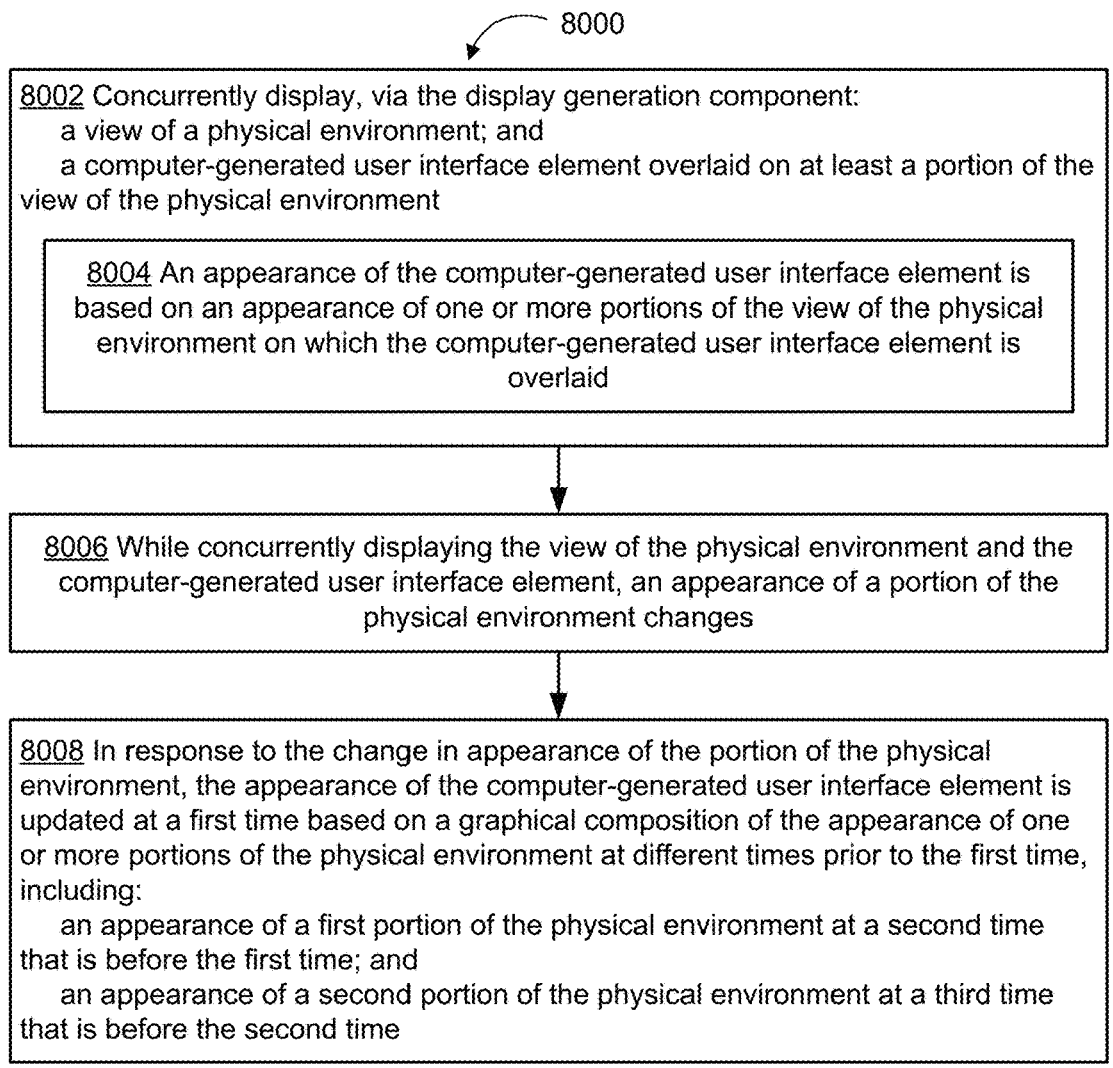
FIG. 8 is a flowchart of a method of displaying a user interface element over a view of a physical environment, where the user interface element has an appearance that is based on a graphical composition of content in the physical environment that is behind the user interface element at multiple different points in time, in accordance with some embodiments.

FIG. 8 is a flowchart of a method 8000 of displaying a user interface element over a view of a physical environment, where the user interface element has an appearance that is based on a graphical composition of content in the physical environment that is behind the user interface element at multiple different points in time, in accordance with some embodiments.

In some embodiments, the method 8000 is performed at a computer system (e.g., computer system 101 in FIG. 1) that is in communication with a display generation component (e.g., display generation component 120 in FIGS. 1, 3, and 4) (e.g., a heads-up display, a display, a touchscreen, and/or a projector), and optionally one or more input devices such as one or more cameras (e.g., a camera (e.g., color sensors, infrared sensors, and/or other depth-sensing cameras), for example pointing downward at a user's hand or forward from the user's head. In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, the method 8000 is performed at a computer system (e.g., the computer system 101 in FIG. 1, the computer system 101 described with respect to FIGS. 7A-7G, FIGS. 7H-7J, FIGS. 7K-7O, FIG. 7P, FIGS. 7Q-7W, and/or FIGS. 7X-7Z). In some embodiments, the computer system is in communication with a display generation component (e.g., the display generation component is a heads-up display, a head-mounted display (HMD), a display, a touch-screen, and/or a projector) and optionally one or more input devices (e.g., cameras, controllers, touch-sensitive surfaces, joysticks, buttons, gloves, watches, motion sensors, and/or orientation sensors). In some embodiments, the display generation component is a display generation component 7100 described with respect to FIGS. 7A-7Z. In some embodiments, the computer system is an integrated device with one or more processors and memory enclosed in the same housing as the display generation component and at least some of one or more input devices. In some embodiments, the computer system includes a computing component (e.g., a server, a mobile electronic device such as a smart phone or tablet device, a wearable device such as a watch, wristband, earphones, a desktop computer, or a laptop computer) that includes one or more processors and memory that is separate from the display generation component and/or the one or more input devices. In some embodiments, the display generation component and the one or more input devices are integrated and enclosed in the same housing. Many of the features of the method 8000 are described with respect to FIGS. 7A-7G, in accordance with some embodiments.

In method 8000, the computer system concurrently displays (8002), via the display generation component: a view of a physical environment; and a computer-generated user interface element overlaid on at least a portion of the view of the physical environment. An appearance of the computer-generated user interface element is (8004) based on an appearance of one or more portions of the view of the physical environment on which the computer-generated user interface element is overlaid. As described herein with reference to FIGS. 7A-7G, display generation component 7100 displays environment 7104 (FIG. 7B) that includes a view of physical environment 7102 (FIG. 7A) and computer-generated user interface element 7030 (FIG. 7D) displayed overlaid on at least a portion of the displayed view of the physical environment 7102 (e.g., overlaid on at least a portion of environment 7104).

In method 8000, while concurrently displaying the view of the physical environment and the computer-generated user interface element, an appearance of a portion of the physical environment changes (8006). As described herein with reference to FIGS. 7B-7E, box 7012 in physical environment 7102 is falling in space toward floor 7008. In addition, in the transition from FIG. 7B to 7C, the viewing perspective of physical environment 7102 is shifted downward and backward; in the transition from FIG. 7C to 7D, the viewing perspective is rotated (e.g., the computer system is rotated clockwise); and in the transition from FIG. 7D to 7E, the rotation of the viewing perspective is reversed (e.g., the computer system is rotated counterclockwise). In some embodiments, the computer system detects the change in the appearance of the portion of the physical environment.

In method 8000, in response to the change in appearance of the portion of the physical environment, the computer system updates (8008) the appearance of the computer-generated user interface element at a first time based on a graphical composition of the appearance of one or more portions of the physical environment at different times prior to the first time, including: an appearance of a first portion of the physical environment at a second time that is before the first time; and an appearance of a second portion of the physical environment at a third time that is before the second time. As described herein with reference to FIG. 7D, in response to the changes in physical environment 7102 that include box 7012 falling in physical environment 7102 and changes in the viewing perspective of physical environment 7102, the computer system generates the appearance of user interface element 7030 at time $t_2$ based on a graphical composition of the appearance of environment 7104 (e.g., which is based on the appearance of physical environment 7102) at different times $t_0$ and $t_1$ prior to time $t_2$. As described herein with reference to FIG. 7E, in response to the changes in physical environment 7102 that include box 7012 falling further in physical environment 7102 and changes in the viewing perspective of physical environment 7102, the computer system updates the appearance of user interface element 7030 at time $t_3$ based on a graphical composition of the appearance of environment 7104 (e.g., which is based on the appearance of physical environment 7102) at different times $t_1$ and $t_2$ prior to time $t_3$. In some embodiments, the second portion of the physical environment is the same as the first portion of the physical environment. In some embodiments, the second portion of the physical environment is the same as the first portion of the physical environment (e.g., if the computer system moved relative to the physical environment between the first time and the second time).

Where a computer-generated user interface element is displayed over a view of one or more portions of a physical environment, basing the appearance of the computer-generated user interface element on a graphical composition of the appearance of the one or more portions of the physical environment, and updating the appearance of the computer-generated user interface element in response to changes in the one or more underlying portions of the physical environment, simulates the appearance of an object made of a partially transparent material (e.g., sometimes called a blur material) and helps the user understand what is in the physical environment and being obscured by the computer-generated user interface element, and informs the user of changes occurring in the physical environment, which provides improved feedback to the user. In addition, using the blur materials improves the user's context awareness, which improves user safety by helping the user to avoid collisions with physical objects in the physical space and reduces the likelihood that the user will suffer from motion sickness when using the computer system.

In some embodiments, the appearance of the portion of the physical environment changes in response to movement of the computer system relative to the physical environment (e.g., that changes the view of the physical environment from the perspective of the computer system, or of a camera or other imaging component or subsystem of the computer system). As described herein with reference to FIGS. 7B-7E, the appearance of physical environment 7102 as displayed in environment 7104 changes in response to movement of the computer system (e.g., downward and backward, via clockwise rotation, and/or via counterclockwise rotation) relative to physical environment 7102. Updating the appearance of the computer-generated user interface element in response to changes that are perceived or detected in the one or more underlying portions of the physical environment in response to movement of the computer system relative to the physical environment (e.g., in contrast to changes in the physical environment only while the computer system remains stationary) improves the responsiveness of the system to changes in the physical environment and enables the user to interact with the computer system in more ways, which provides improved feedback to the user and provides additional control options without cluttering the user interface with additional displayed controls.

In some embodiments, the appearance of the portion of the physical environment changes in response to movement of one or more objects in the physical environment. In some embodiments, the one or more objects are distinct from the computer system. As described herein with reference to FIGS. 7B-7E, the appearance of physical environment 7102 as displayed in environment 7104 changes in response to movement of box 7012 (e.g., falling) in physical environment 7102, where box 7012 is distinct from the computer system. Updating the appearance of the computer-generated user interface element in response to movement of one or more objects in the physical environment improves the responsiveness of the system to changes occurring in the physical environment and informs the user of such changes, particularly if the changes occur in portions of the physical environment that are obscured from view by the computer-generated user interface element, which provides improved feedback to the user.

In some embodiments, the computer-generated user interface element includes content (e.g., visual content such as text or graphics, and/or one or more selectable objects or controls), and the updating of the appearance of the computer-generated user interface element based on the graphical composition (e.g., of the appearance of the one or more portions of the physical environment) is applied to one or more regions (e.g., a background) of the computer-generated user interface element distinct from the content of the computer-generated user interface element. As described herein with reference to FIGS. 7D-7G, user interface element 7030 includes a plurality of portions, which includes background portion 7030-*a* and content portions 7030-*b* and 7030-*c*, where the appearance of background portion 7030-*a* is based on and is continually updated based on the graphical composition (e.g., also called the composite), and where the appearances of content portions 7030-*b* and 7030-*c* are optionally not based on the graphical composition. In some embodiments, the appearance of the content of the computer-generated user interface element (e.g., content portions 7030-*b* and 7030-*c* of user interface element 7030 in FIG. 7D) is not based on the appearance of one or more portions of the view of the physical environment. In some embodiments, the appearance of the content of the computer-generated user interface element (e.g., content portions 7030-*b* and 7030-*c* of user interface element 7030 in FIG. 7D) is not updated based on the graphical composition. Basing the appearance of a background of the computer-generated user interface element on the appearance of underlying portions of the physical environment, without doing so to content of the computer-generated user interface element such as visual content and/or selectable controls, improves the legibility of the content of the computer-generated user interface element while informing the user of changes occurring in the physical environment, which provides improved feedback to the user.

In some embodiments, the graphical composition is based a first amount (e.g., a first magnitude) on the appearance of the first portion of the physical environment at the second time that is before the first time and based a second amount (e.g., a second magnitude) on the appearance of the second portion of the physical environment at the third time that is before the second time; and the first amount is different from (e.g., greater than or less than) the second amount. As described herein with reference to scenario 7036 in FIG. 7G, the appearance of user interface element 7030-*d* at time $t_2$ (which is the same as the appearance of user interface element 7030 at time $t_2$ in FIG. 7D) is based a first amount on the appearance of a first portion of physical environment 7102 at time $t_0$ that is before time $t_2$ (e.g., frame $t_0$) and based a second, optionally different amount on the appearance of a second portion of physical environment 7102 at time $t_1$ that is before time $t_2$ (e.g., frame $t_1$). Similarly, as described herein with reference to scenario 7038 in FIG. 7G, the appearance of user interface element 7030-*e* at time $t_3$ (which is the same as the appearance of user interface element 7030 at time $t_3$ in FIG. 7E) is based a first amount on the appearance of a first portion of physical environment 7102 at time $t_1$ that is before time $t_3$ (e.g., frame $t_1$) and based a second, optionally different amount on the appearance of a second portion of physical environment 7102 at time $t_2$ that is before time $t_3$ (e.g., frame $t_2$). Basing the appearance of the computer-generated user interface element on a graphical composition of the appearance of underlying portions of the physical environment, where the graphical composition is based more on the appearance of the physical environment at some times than at other times, informs the user of changes occurring in the physical environment with greater emphasis on the appearance of the physical environment at times that are more relevant than at other times, which provides improved feedback to the user.

In some embodiments, at the first time, the contribution of one or more portions of the physical environment at a time closer to the first time $t_0$ the appearance of the computer-generated user interface element at the first time is greater than the contribution of the one or more portions of the physical environment at a time further from the first time to the appearance of the computer-generated user interface at the first time. As described herein with reference to scenario 7036 in FIG. 7G, the contribution of the frame from time $t_2$ is greater than the contribution of the frame from time $t_1$, which is different from time $t_2$, to the appearance of user interface element 7030-*d* at time $t_2$. Likewise, the contribution of the frame from time $t_1$ to the appearance of user interface element 7030-*d* at time $t_2$ is greater than the contribution of the frame from time $t_0$ to the appearance of user interface element 7030-*d* at time $t_2$, because time $t_0$ is further from time $t_2$ than time $t_1$ is to time $t_2$. Similarly, as described herein with reference to scenario 7038 in FIG. 7G, the contribution of the frame from time $t_3$ is greater than the contribution of the frame from time $t_2$, which is different from time $t_3$, to the appearance of user interface element 7030-*e* at time $t_3$. Likewise, the contribution of the frame from time $t_2$ to the appearance of user interface element 7030-*e* at time $t_3$ is greater than the contribution of the frame from time $t_1$ to the appearance of user interface element 7030-*e* at time $t_3$, because time $t_1$ is further from time $t_3$ than time $t_2$ is to time $t_3$. In some embodiments, the time closer to the first time is a closest time $t_0$ the first time at which the one or more portions of the physical environment are sampled (e.g., the frame taken at time $t_3$ is naturally the frame taken closest in time $t_0$ $t_3$ and thus has the greatest contribution to the composite generated at time $t_3$). Basing the appearance of the computer-generated user interface element more on the appearance of the physical environment at times closer to the current point in time than on the appearance of the physical environment at times further from the current point in time better informs the user of more recent changes occurring in the physical environment, which provides improved feedback to the user.

In some embodiments, the contribution of one or more portions of the physical environment at a time furthest from the first time $t_0$ the appearance of the computer-generated user interface at the first time is less than the contribution of the one or more portions of the physical environment at any time closer to the first time $t_0$ the appearance of the computer-generated user interface at the first time. As described herein with reference to scenario 7036 in FIG. 7G, among frames $t_0$, $t_1$, and $t_2$, frame $t_0$ contributes the least to the appearance of user interface element 7030-$d$ at time $t_2$, because $t_0$ is the furthest time from $t_2$ (e.g., among times $t_0$, $t_1$, and $t_2$). Similarly, as described herein with reference to scenario 7038 in FIG. 7G, among frames $t_1$, $t_2$, and $t_3$, frame $t_1$ contributes the least to the appearance of user interface element 7030-$e$ at time $t_3$, because $t_1$ is the furthest time from $t_3$ (e.g., among times $t_1$, $t_2$, and $t_3$). Basing the appearance of the computer-generated user interface element least on the appearance of the physical environment at a furthest time from the current point in time, in comparison to the appearance of the physical environment at times closer to the current point in time, informs the user of changes occurring in the physical environment while deemphasizing outdated information about the appearance of the physical environment, which provides improved feedback to the user.

In some embodiments, the graphical composition is based on the appearance of the one or more portions of the physical environment at a number of different times prior to the first time, and the number of different times is based on an amount of movement of the computer system relative to the physical environment (e.g., that changes the view of the physical environment from the perspective of the computer system, or of a camera or other imaging component or subsystem the computer system). As described herein with reference to FIG. 7G, different numbers of frames may be included in generating the composite that defines the appearance of user interface element 7030 based on the amount of movement of the viewpoint of the user between FIGS. 7B through 7E. In some embodiments, in accordance with a first amount of movement of the computer system relative to the physical environment, the appearance of the computer-generated user interface element is updated based on a graphical composition of the appearance of the one or more portions of the physical environment at a first number of different times prior to the first time; and, in accordance with a second amount of movement of the computer system relative to the physical environment, the appearance of the computer-generated user interface element is updated based on a graphical composition of the appearance of the one or more portions of the physical environment at a second number of different times prior to the first time. In some embodiments, the number of different times is increased for a greater amount of movement of the computer system relative to the physical environment. In some embodiments, the number of different times is decreased for a greater amount of movement of the computer system relative to the physical environment. Basing the appearance of the computer-generated user interface element on a graphical composition of the appearance of underlying portions of the physical environment at different numbers of times for different amounts of movement of the computer system relative to the physical environment allows for flexibility in balancing the computational burden of producing the graphical composition with fidelity to changes occurring in the physical environment, which is associated with providing improved feedback to the user. For example, sampling the underlying physical environment more often for greater amounts of movement of the computer system may increase fidelity, which provides improved feedback to the user, but may also increase computational burden. In another example, sampling the underlying physical environment less often for greater amounts of movement may reduce computational burden, but may impact fidelity.

In some embodiments, determining the graphical composition includes applying a noise pattern to information (e.g., image data) captured about the appearance of the one or more portions of the physical environment at the different times (e.g., as described above with reference to FIG. 7G, specifically with reference to user interface element 7030-$d$ in scenario 7036 and user interface element 7030-$e$ in scenario 7038). In some embodiments, applying the noise pattern includes deterministically changing the brightness and/or saturation of different portions of an image of the physical environment. In some embodiments, a sequence of pseudo-random noise patterns that define the changes of brightness and/or saturation for different portions of the image is used. For example, a speckled gray noise pattern that animates through a plurality of different patterns over time (e.g., 1 frame every 1/60 of a second for 10 frames) is generated and applied to underlying image data, optionally using an image processing filter that increases the image darkness where the noise pattern is over a predetermined threshold (e.g., 50% grey) and increases the image lightness where the noise pattern is less than the predetermined threshold. Applying a noise pattern to image data that is used to generate a graphical composition of the appearance of a physical environment at different points in time smooths the data so as to reduce the impact of artifacts on the graphical composition and avoids producing a graphical composition that is overly sharp (which would be visually jarring and would reduce the legibility of content of the user interface element), thereby providing improved feedback to the user.

In some embodiments, in determining the graphical composition of the one or more portions of the physical environment at the different times, the appearance of the first portion of the physical environment at the second time is offset (e.g., laterally or spatially offset) from the appearance of the second portion of the physical environment at the third time based on a difference between a perspective of the computer system at the second time and a perspective of the computer system at the third time. As described herein with reference to scenario 7036 in FIG. 7G, in generating the composite for the appearance of user interface element 7030-$d$, the content from different frames $t_0$, $t_1$, and $t_2$ are offset from each other based on the different viewpoints of the user in FIG. 7B corresponding to frame $t_0$, FIG. 7C corresponding to frame $t_1$, and FIG. 7D corresponding to frame $t_2$. Similarly, as described herein with reference to scenario 7038 in FIG. 7G, in generating the composite for the appearance of user interface element 7030-$e$, the content from different frames $t_1$, $t_2$, and $t_3$ are offset from each other based on the different viewpoints of the user in FIG. 7C corresponding to frame $t_1$, FIG. 7D corresponding to frame $t_2$, and FIG. 7E corresponding to frame $t_3$. As the user's view of the computer-generated user interface element changes relative to the underlying physical environment and as the computer-generated user interface element changes orientation relative to the underlying physical environment, different portions of the physical environment enter the background of the computer-generated user interface element at different times. Producing a graphical composition of the appearance of the underlying portions of the physical environment by offsetting those appearances based on the different viewing perspectives of the underlying portions of the physical environment results in a graphical composition that is more true to what would have been visible in the physical environment behind the computer-generated user interface element at the different times, which helps the user better understand what is in the physical environment and being obscured by the computer-generated user interface element, which provides improved feedback to the user.

In some embodiments, determining the graphical composition of the appearance of the one or more portions of the physical environment at the different times includes blurring views of the physical environment captured by one or more cameras of the computer system (e.g., the appearance of the first portion of the physical environment at the second time is a blurred version of an image of the physical environment captured by the one or more cameras at the second time, and/or the appearance of the second portion of the physical environment at the third time is a blurred version of an image of the physical environment captured by the one or more cameras at the third time). As described above with reference to FIG. 7G, generating the composite on which the appearance of user interface element 7030-*d* in scenario 7036 is based optionally includes blurring the appearances of frames $t_0$, $t_1$, and/or $t_2$, where frames $t_0$, $t_1$, and/or $t_2$ include portions of the view of physical environment 7102 as captured by one or more cameras of the computer system. Similarly, generating the composite on which the appearance of user interface element 7030-*e* in scenario 7038 in FIG. 7G is based optionally includes blurring the appearances of frames $t_1$, $t_2$, and/or $t_3$, where frames $t_1$, $t_2$ and/or $t_3$ include portions of the view of physical environment 7102 as captured by one or more cameras of the computer system. Basing the appearance of the computer-generated user interface element on blurred views of the physical environment as captured by one or more cameras of the computer system helps the user understand what is in the physical environment and being obscured by the computer-generated user interface element, and informs the user of changes occurring in the physical environment, which provides improved feedback to the user.

In some embodiments, the graphical composition is partially translucent (e.g., the appearance of the first portion of the physical environment at the second time and/or the appearance of the second portion of the physical environment at the third time are partially translucent), as described for example herein with reference to FIG. 7G. Basing the appearance of the computer-generated user interface element on a partially translucent graphical composition of the appearance of the physical environment at different times helps the user understand what is in the physical environment and being obscured by the computer-generated user interface element, and informs the user of changes occurring in the physical environment, which provides improved feedback to the user.

In some embodiments, determining the graphical composition of the appearance of the one or more portions of the physical environment at the different times includes reducing resolution of information (e.g., image data) captured about the one or more portions of the physical environment at different times prior to the first time (e.g., as described above with reference to FIG. 7G, specifically with reference to user interface element 7030-*d* in scenario 7036 and user interface element 7030-*e* in scenario 7038). In some embodiments, the appearance of the first portion of the physical environment at the second time is determined by reducing the resolution of information captured about the first portion of the physical environment at the second time. In some embodiments, the appearance of the second portion of the physical environment at the third time is determined by reducing the resolution of information captured about the second portion of the physical environment at the third time. Reducing the resolution of information captured about the physical environment at different times in generating a graphical composition for the appearance of the computer-generated user interface element informs the user of changes occurring in the physical environment while reducing the computational burden of rendering the computer-generated user interface element, which provides improved feedback to the user.

In some embodiments, the appearance of the computer-generated user interface element is updated as a viewing perspective (e.g., a viewpoint of the user) of the computer-generated user interface element changes (e.g., movement of the computer system that changes the view of the physical environment, on which the computer-generated user interface element is overlaid, from the perspective of one or more cameras of the computer system, or movement of a user that changes the user's perspective of the computer-generated user interface element and in some cases of the physical environment as well). As described herein with reference to FIG. 7E, the appearance of user interface element 7030 changes in response to the viewpoint of the user being rotated relative to environment 7104. Updating the appearance of the computer-generated user interface element as a viewpoint of the user changes (e.g., a viewing perspective of the one or more underlying portions of the physical environment changes) helps the user understand what is in the physical environment and being obscured by the computer-generated user interface element, which provides improved feedback to the user.

In some embodiments, the appearance of the computer-generated user interface element is updated as the computer-generated user interface element is moved (e.g., relative to the displayed view of the physical environment). As described herein with reference to FIG. 7E, the appearance of user interface element 7030 changes in response to the viewpoint of the user being rotated relative to environment 7104 and user interface element 7030 remaining at the same position relative to the viewpoint of the user, resulting in user interface element 7030 accordingly being rotated relative to environment 7104 and physical environment 7102. Updating the appearance of the computer-generated user interface element as the computer-generated user interface element is moved relative to the displayed view of the physical environment helps the user understand what is in the physical environment and being obscured by the computer-generated user interface element, which provides improved feedback to the user.

In some embodiments, the appearance of the computer-generated user interface element is updated based on one or more additional computer-generated user interface elements having simulated positions behind a simulated position of the computer-generated user interface element (e.g., in the background of the computer-generated user interface element, from the perspective of the user). As described herein with reference to FIGS. 7B-7G, the appearance of user interface element 7030 is updated based on the appearances of virtual ball 7108 and virtual wall hanging 7106 in environment 7104 (e.g., in addition to the appearances of representations of physical objects such as box 7012), optionally while user interface element 7030 has a simulated position, such as simulated position 7030-1 or simulated position 7030-2 in FIG. 7F, that is in front of the simulated positions of virtual ball 7108 and virtual wall hanging 7106. Updating the appearance of the computer-generated user interface element based on other computer-generated user interface elements that are positioned, in a virtual sense, behind the computer-generated user interface element helps the user understand what else is in the environment that the user is viewing and being obscured by the computer-generated user interface element (e.g., a three-dimensional environment with various computer-generated user interface elements virtually positioned therein and overlaid on the view of the physical environment), which provides improved feedback to the user.

In some embodiments, the appearance of the one or more additional computer-generated user interface elements is updated over time (e.g., analogously as described herein with reference to the computer-generated user interface element). As described herein with reference to FIGS. 7B-7G, the appearances of virtual ball 7108 and virtual wall hanging 7106 are also updated over time in accordance with changes in environment 7104 (e.g., movement of virtual ball 7108 and/or changes in the viewing perspective of environment 7104). In some embodiments, the appearance of other virtual objects in environment 7104, such as virtual ball 7108, virtual wall hanging 7106, and/or one or more additional user interface elements analogous to user interface element 7030, are also updated over time based on a composite of underlying portions of environment 7104, analogously to user interface element 7030. Updating the appearance of multiple computer-generated user interface elements over time based on changes in those and other computer-generated user interface elements and changes in the physical environment gives the computer-generated user interface elements a consistent appearance simulating that of objects made of a partially transparent material, which helps the user understand the environment that the user is viewing and spatial relationships between different objects therein, which provides improved feedback to the user.

In some embodiments, the computer-generated user interface element is a back surface of a displayed user interface that includes one or more selectable user interface objects (and, optionally, content). For example, as described herein with reference to FIG. 7D, user interface element 7030 may be a user interface of an application or a system user interface displayed within environment 7104. Updating the appearance of a back surface of a displayed user interface that is overlaid on a view of the physical environment, where the updating is based on changes in the physical environment, helps the user understand what is in the physical environment and being obscured by the computer-generated user interface element, which provides improved feedback to the user.

In some embodiments, the appearance of the computer-generated user interface element is based on an appearance of one or more portions of the view of the physical environment on which the computer-generated user interface element is overlaid without regard to a simulated position of the computer-generated user interface element relative to the physical environment. As described herein with reference to FIGS. 7F-7G, the appearance of user interface element 7030-*d* in FIG. 7G is based on the appearance of overlapping portions of the view of physical environment 7102 (e.g., as part of environment 7104) without regard to whether the simulated position of user interface element 7030-*d* is position 7030-1, position 7030-2, position 7030-3, or position 7030-4 in FIG. 7F. Similarly, the appearance of user interface element 7030-*e* in FIG. 7G is based on the appearance of overlapping portions of the view of physical environment 7102 (e.g., as part of environment 7104) without regard to whether the simulated position of user interface element 7030-*e* is position 7030-1, position 7030-2, position 7030-3, or position 7030-4 in FIG. 7F. In some embodiments, the appearance of the computer-generated user interface element is based on an appearance of portions of the physical environment that are in front of the simulated position of the computer-generated user interface element and/or behind the simulated position of the computer-generated user interface element. Basing the appearance of the computer-generated user interface element on the appearance of overlapping portions of the physical environment, including portions that from the user's perspective may be in front of a simulated position of the computer-generated user interface element, helps the user understand what is in the physical environment in the vicinity of the computer-generated user interface element, which provides improved feedback to the user.

In some embodiments, a simulated position of the computer-generated user interface element is a first distance from (e.g., a simulated position of) a viewpoint of a user, and the appearance of the computer-generated user interface element is based on an appearance of one or more portions of the physical environment that are a second distance from (e.g., a simulated position of) the viewpoint of the user, wherein the first distance is greater than the second distance (e.g., the appearance of the computer-generated user interface element is based on an appearance of one or more portions of the physical environment that are closer to the viewpoint of the user than the simulated position of the computer-generated user interface element). As described herein with reference to FIGS. 7F-7G, even when the simulated position of user interface element 7030-*d* is position 7030-4, the appearance of user interface element 7030-*d* may still be as shown in scenario 7036 in FIG. 7G and based on the appearance of overlapping portions of environment 7104 that are closer to viewpoint 7032 of the user than position 7030-4 is to viewpoint 7032. Similarly, even when the simulated position of user interface element 7030-*e* is position 7030-4, the appearance of user interface element 7030-*e* may still be as shown in scenario 7038 in FIG. 7G and based on the appearance of overlapping portions of environment 7104 that are closer to viewpoint 7032 of the user than position 7030-4 is to viewpoint 7032. Basing the appearance of the computer-generated user interface element on the appearance of overlapping portions of the physical environment, including portions that from the user's perspective may be in front of a simulated position of the computer-generated user interface element, helps the user understand what is in the physical environment in the vicinity of the computer-generated user interface element, which provides improved feedback to the user.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, 12000, 13000, and 14000) are also applicable in an analogous manner to method 8000 described above with respect to FIG. 8. For example, the user interface elements or objects, including appearances and regions thereof, physical objects and/or representations of physical objects, virtual objects, graphical composites/compositions, movements, three-dimensional environments, including views and appearances thereof, display generation component, and/or points in time described above with reference to method 8000 optionally have one or more of the characteristics of the user interface elements or objects, including appearances and regions thereof, physical objects and/or representations of physical objects, virtual objects, graphical composites/compositions, movements, three-dimensional environments, including views and appearances thereof, display generation component, and/or points in time described herein with reference to other methods described herein (e.g., methods 9000, 10000, 11000, 12000, 13000, and 14000). For brevity, these details are not repeated here.

Figure 9:
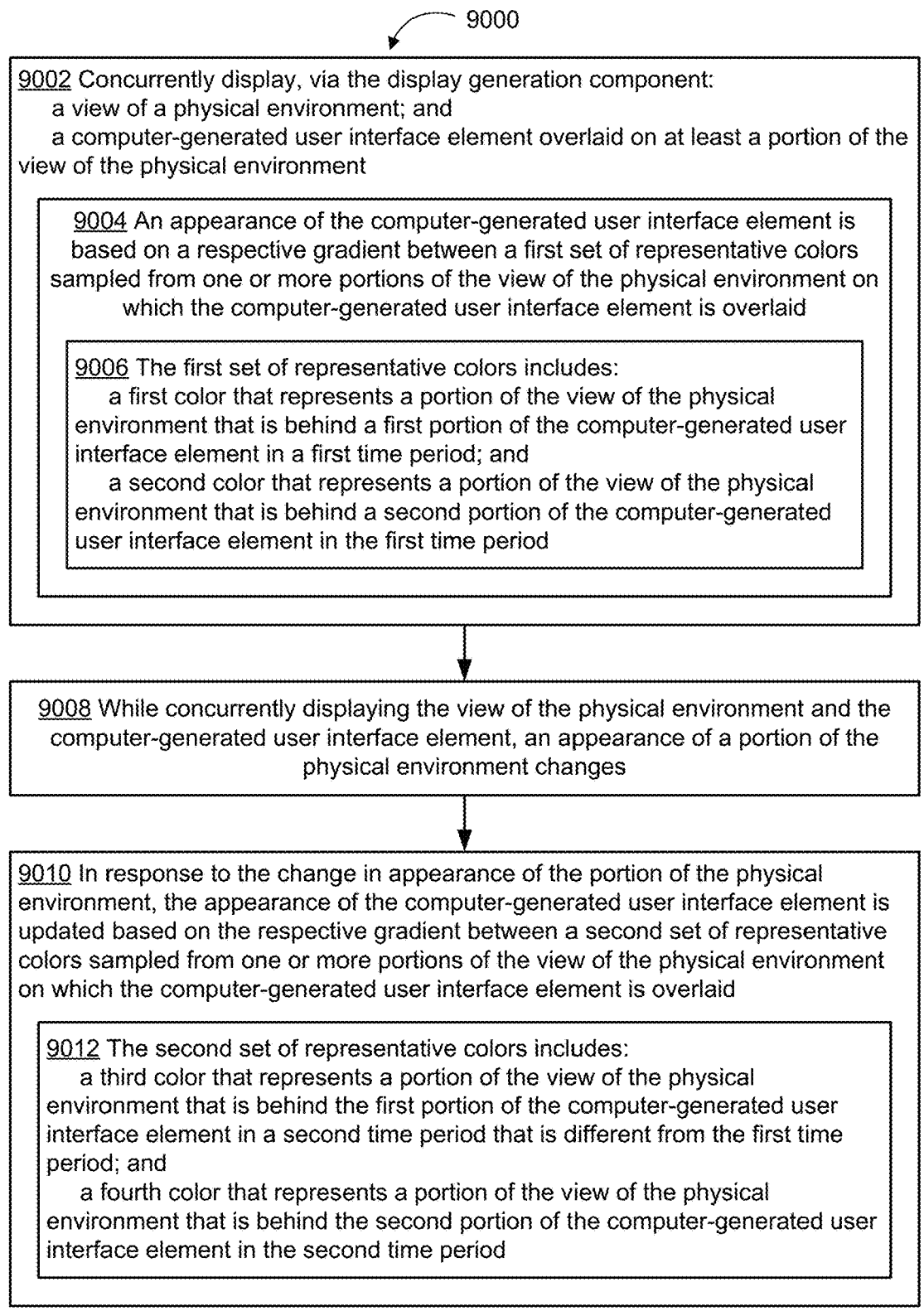
FIG. 9 is a flowchart of a method of displaying a user interface element over a view of a three-dimensional environment, where the user interface element has an appearance that is based on a color gradient generated from one or more colors sampled from multiple points in the three-dimensional environment, in accordance with some embodiments.

FIG. 9 is a flowchart of a method 9000 of displaying a user interface element over a view of a three-dimensional environment, where the user interface element has an appearance that is based on a color gradient generated from one or more colors sampled from multiple points in the three-dimensional environment, in accordance with some embodiments.

In some embodiments, the method 9000 is performed at a computer system (e.g., computer system 101 in FIG. 1) that is in communication with a display generation component (e.g., display generation component 120 in FIGS. 1, 3, and 4) (e.g., a heads-up display, a display, a touchscreen, and/or a projector), and optionally one or more input devices such as one or more cameras (e.g., a camera (e.g., color sensors, infrared sensors, and/or other depth-sensing cameras), for example pointing downward at a user's hand or forward from the user's head. In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In some embodiments, the method 9000 is performed at a computer system (e.g., the computer system 101 in FIG. 1, the computer system 101 described with respect to FIGS. 7A-7G, FIGS. 7H-7J, FIGS. 7K-7O, FIG. 7P, FIGS. 7Q-7W, and/or FIGS. 7X-7Z). In some embodiments, the computer system is in communication with a display generation component (e.g., the display generation component is a heads-up display, a head-mounted display (HMD), a display, a touchscreen, and/or a projector) and optionally one or more input devices (e.g., cameras, controllers, touch-sensitive surfaces, joysticks, buttons, gloves, watches, motion sensors, and/or orientation sensors). In some embodiments, the display generation component is a display generation component 7100 described with respect to FIGS. 7A-7Z. In some embodiments, the computer system is an integrated device with one or more processors and memory enclosed in the same housing as the display generation component and at least some of one or more input devices. In some embodiments, the computer system includes a computing component (e.g., a server, a mobile electronic device such as a smart phone or tablet device, a wearable device such as a watch, wristband, earphones, a desktop computer, or a laptop computer) that includes one or more processors and memory that is separate from the display generation component and/or the one or more input devices. In some embodiments, the display generation component and the one or more input devices are integrated and enclosed in the same housing. Many of the features of the method 9000 are described with respect to FIGS. 7H-7J, in accordance with some embodiments.

In method 9000, the computer system concurrently displays (9002), via the display generation component: a view of a physical environment; and a computer-generated user interface element overlaid on at least a portion of the view of the physical environment. An appearance of the computer-generated user interface element is (9004) based on a respective gradient between a first set of representative colors sampled from one or more portions of the view of the physical environment on which the computer-generated user interface element is overlaid. The first set of representative colors includes (9006): a first color that represents (e.g., is selected from or sampled from) a portion of the view of the physical environment that is behind (e.g., a simulated position of) a first portion of the computer-generated user interface element in a first time period (e.g., at a first time, or during a first range of times); and a second color (e.g., different from the first color) that represents (e.g., is selected from or sampled from) a portion of the view of the physical environment that is behind (e.g., a simulated position of) a second portion of the computer-generated user interface element in the first time period (e.g., at the same first time, or during the same first range of times as that used for the first color). For example, as described herein with reference to FIGS. 7H-7J, the appearance of user interface element 7040 is based on a color gradient between representative colors sampled from region 7042 (FIG. 7H), region 7046 (FIG. 7I), and region 7048 (FIG. 7J) of environment 7104. The representative colors include colors 7044-1 through 7044-3 (FIG. 7H), colors 7044-4 through 7044-6 (FIG. 7I), and colors 7044-7 through 7044-10 (FIG. 7J).

In method 9000, while concurrently displaying the view of the physical environment and the computer-generated user interface element, an appearance of a portion of the physical environment changes (9008). For example, as described herein with reference to FIGS. 7H-7J, the view of environment 7104 changes in response to changes in the viewpoint of the user (e.g., tilting and leveling the computer system in FIGS. 7H-7I) and movement of user interface element 7040 in environment 7104 (FIG. 7J). In some embodiments, the computer system detects the change in the appearance of the portion of the physical environment.

In method 9000, in response to the change in appearance of the portion of the physical environment, (e.g., in addition to updating the view of the physical environment accordingly,) the computer system updates (9010) the appearance of the computer-generated user interface element based on the respective gradient between a second set of representative colors sampled from one or more portions of the view of the physical environment on which the computer-generated user interface element is overlaid. The second set of representative colors includes (9012): a third color (e.g., different from the first color) that represents (e.g., is selected from or sampled from) a portion of the view of the physical environment that is behind (e.g., a simulated position of) the first portion of the computer-generated user interface element in a second time period (e.g., at a second time, or during a second range of times) that is different from (e.g., after) the first time period; and a fourth color (e.g., different from the second and/or third colors) that represents (e.g., is selected from or sampled from) a portion of the view of the physical environment that is behind (e.g., a simulated position of) the second portion of the computer-generated user interface element in the second time period (e.g., at the same second time, or during the same second range of times as that used for the third color). For example, in response to the change in appearance of environment 7104 from FIG. 7H to FIG. 7I, the appearance of user interface element 7040 is updated to be based on a gradient between colors 7044-4 through 7044-6 in FIG. 7I instead of on a gradient between colors 7044-1 through 7044-3 as in FIG. 7H. Similarly, in response to the change in appearance of environment 7104 from FIG. 7I to FIG. 7J, the appearance of user interface element 7040 is (e.g., further) updated to be based on a gradient between colors 7044-7 through 7044-10 in FIG. 7J instead of on a gradient between colors 7044-4 through 7044-6 as in FIG. 7I. In some embodiments, in the absence of a change in the appearance of the portion of the physical environment and any other computer-generated user interface element overlapping the computer-generated user interface element, the appearance of the computer-generated user interface element is maintained (e.g., continues to be based on the respective gradient between the first set of representative colors, as described herein with reference to FIGS. 7H-7I).

Where a computer-generated user interface element is displayed over a view of one or more portions of a physical environment, basing the appearance of the computer-generated user interface element on a gradient between colors sampled from the one or more underlying portions of the physical environment, and updating the appearance of the computer-generated user interface element in response to changes in the one or more underlying portions of the physical environment, simulates the appearance of an object made of a partially transparent material (e.g., sometimes called a blur material) and helps the user understand what is in the physical environment and being obscured by the computer-generated user interface element, and informs the user of changes occurring in the physical environment, while reducing the computational burden of rendering the computer-generated user interface element relative to more complex graphical compositions of the appearance of the underlying portions of the physical environment, which provides improved feedback to the user. In addition, using the blur materials improves the user's context awareness, which improves user safety by helping the user to avoid collisions with physical objects in the physical space and reduces the likelihood that the user will suffer from motion sickness when using the computer system.

In some embodiments, the computer-generated user interface element is opaque (e.g., as described herein with reference to FIGS. 7H-7J). Displaying the computer-generated user interface element as opaque and with an appearance that is based on a gradient between colors sampled from the one or more underlying portions of the physical environment helps the user understand what is in the physical environment and being obscured by the computer-generated user interface element, and informs the user of changes occurring in the physical environment, while reducing the computational burden of rendering the computer-generated user interface element relative to rendering the computer-generated user interface element with a degree of transparency and/or with more complex graphical compositions of the appearance of the underlying portions of the physical environment, which provides improved feedback to the user.

In some embodiments, the first set of representative colors includes a fifth color that represents (e.g., is selected from or sampled from) a portion of the view of the physical environment that is behind a third portion of the computer-generated user interface element in the first time period (e.g., at the same first time, or during the same first range of times as that used for the first and second colors), and the second set of representative colors includes a sixth color that represents (e.g., is selected from or sampled from) a portion of the view of the physical environment that is behind the third portion of the computer-generated user interface element in the second time period (e.g., at the same second time, or during the same second range of times as that used for the third and fourth colors). In some embodiments, the first set of representative colors includes three or more colors that represent portions of the view of the physical environment that are behind respective corresponding portions of the computer-generated user interface element in the first time period. In some embodiments, the second set of representative colors includes three or more colors that represent portions of the view of the physical environment that are behind respective corresponding portions of the computer-generated user interface element in the second time period. For example, as described herein with reference to FIG. 7H, the appearance of user interface element 7040 at time $t_2$ is based on a color gradient that includes at least three colors 7044-1 through 7044-3 sampled respectively from behind at least three corners of user interface element 7040. Similarly, as described herein with reference to FIG. 7I, the appearance of user interface element 7040 at time $t_3$ is based on a color gradient that includes at least three colors 7044-4 through 7044-6 sampled respectively from behind at least three corners of user interface element 7040. Likewise, as described herein with reference to FIG. 7J, the appearance of user interface element 7040 at time $t_4$ is based on a color gradient that includes at least three colors 7044-7, 7044-8 and/or 7044-10, and 7044-9 sampled respectively from behind at least three corners of user interface element 7040. Displaying the computer-generated user interface element with an appearance that is based on a gradient between at least three colors sampled from the one or more underlying portions of the physical environment, updated in response to changes in the one or more underlying portions of the physical environment, helps the user better understand what is in the physical environment and being obscured by the computer-generated user interface element, and better informs the user of changes occurring in the physical environment, by giving the computer-generated user interface element an appearance that is more representative of the underlying physical environment (e.g., relative to if two colors or only one color were used), which provides improved feedback to the user.

In some embodiments, the appearance of the computer-generated user interface element that is based on the respective gradient extends to one or more edges of the computer-generated user interface element (e.g., all edges, or at a minimum all displayed edges). For example, as described herein with reference to FIGS. 7H-7J, the appearance of user interface element 7040 is based on the color gradient all the way to the edges of the user interface element 7040. Applying the respective gradient to the appearance of computer-generated user interface element extending to the visible edges of the computer-generated user interface element simulates the appearance of an object made of a uniform material that allows the user to understand what is in the physical environment and being obscured by the computer-generated user interface element, and that informs the user of changes occurring in the physical environment, while avoiding giving the computer-generated user interface element an appearance that is visually jarring in the context of the view of the physical environment, which provides improved feedback to the user.

In some embodiments, a color of a respective portion of the computer-generated user interface element is sampled from a respective portion of the view of the physical environment that is behind a simulated position of the respective portion of the computer-generated user interface element (e.g., in a simulated three-dimensional space, such as an augmented or virtual reality environment that includes the view of the physical environment, in which different computer-generated user interface elements have different respective simulated positions in the three-dimensional space). For example, as described herein with reference to FIGS. 7H-7J, the appearance of user interface element 7040 is based on a color gradient between representative colors sampled from region 7042 (FIG. 7H), region 7046 (FIG. 7I), and region 7048 (FIG. 7J) of environment 7104 behind user interface element 7040. Specifically, in FIG. 7H for example, color 7044-1 of the upper left corner of user interface element 7040 is sampled from box 7012'; color 7044-2 of the upper right corner of user interface element 7040 is sampled from wall hanging 7106; and color 7044-3 of the bottom edge region of user interface element 7040 is sampled from wall 7004'. Similarly, in FIG. 7I for example, color 7044-4 of the upper left corner of user interface element 7040 is sampled from box 7012'; color 7044-5 of the upper right corner of user interface element 7040 is sampled from wall hanging 7106; and color 7044-6 of the bottom edge region of user interface element 7040 is sampled from wall 7004'. Likewise, in FIG. 7J for example, color 7044-7 of the upper left corner of user interface element 7040 is sampled from wall hanging 7106; color 7044-8 of the upper right corner of user interface element 7040 and color 7044-10 of the bottom left corner of user interface element 7040 are sampled from wall 7004'; and color 7044-9 of the bottom right corner of user interface element 7040 is sampled from box 7014'. Displaying the computer-generated user interface element with an appearance that is based on a gradient between colors sampled from the one or more underlying portions of the physical environment simulates the appearance of an object made of a partially transparent material and helps the user understand what is in the physical environment and being obscured by the computer-generated user interface element, and informs the user of changes occurring in the physical environment, which provides improved feedback to the user.

In some embodiments, the updating of the appearance of the computer-generated user interface element based on the respective gradient changes the appearance of the computer-generated user interface element as a viewing perspective of the computer-generated user interface element (e.g., a viewpoint of the user) changes relative to the physical environment (e.g., movement of the computer system that changes the view of the physical environment from the perspective of one or more cameras of the computer system, or movement of a user that changes the user's perspective of the computer-generated user interface element and/or the physical environment). For example, as described herein with reference to FIGS. 7H-7I, the appearance of user interface element 7040 is updated as the view of environment 7104 changes in response to changes in the viewpoint of the user based on tilting the computer system (FIG. 7H) and leveling the computer system (FIG. 7I). Displaying the computer-generated user interface element with an appearance that is based on a gradient between colors sampled from the one or more underlying portions of the physical environment, updated as the viewpoint of the user changes (e.g., a viewing perspective of the computer-generated user interface element and/or the one or more underlying portions of the physical environment changes), provides a more realistic and immersive viewing experience that helps the user understand what is in the physical environment and being obscured by the computer-generated user interface element, which provides improved feedback to the user.

In some embodiments, the updating of the appearance of the computer-generated user interface element based on the respective gradient includes changing the appearance of the computer-generated user interface element as the computer-generated user interface element is moved (e.g., relative to the displayed view of the physical environment). For example, as described herein with reference to FIG. 7J, the appearance of user interface element 7040 is updated as the view of environment 7104 changes in response to movement of user interface element 7040 in environment 7104. Displaying the computer-generated user interface element with an appearance that is based on a gradient between colors sampled from the one or more underlying portions of the physical environment, updated as the computer-generated user interface element is moved relative to the displayed view of the physical environment, helps the user understand what is in the physical environment and being obscured by the computer-generated user interface element, which provides improved feedback to the user.

In some embodiments, the appearance of the computer-generated user interface element is updated based on one or more additional computer-generated user interface elements having simulated positions behind a simulated position of the computer-generated user interface element (e.g., in the background of the computer-generated user interface element, from the perspective of the user). For example, the first set of representative colors includes one or more colors that represent portions of the one or more additional computer-generated user interface elements virtually positioned behind the computer-generated user interface element in the first time period, and/or the second set of representative colors includes one or more colors that represent portions of the one or more additional computer-generated user interface elements virtually positioned behind the computer-generated user interface element in the second time period. For example, as described herein with reference to FIGS. 7H-7J, the color gradients used for the appearance of user interface element 7040 is based at least partially on one or more colors sampled from computer-generated wall hanging 7106 behind user interface element 7040 in environment 7104. In some embodiments, the appearance of the computer-generated user interface element is updated based on one or more physical objects in the physical environment having respective physical positions in the physical environment behind the simulated position of the computer-generated user interface element (e.g., in addition to or instead of being based on the one or more additional computer-generated user interface elements having simulated positions behind the simulated position of the computer-generated user interface element). Displaying the computer-generated user interface element with an appearance that is based on a gradient between colors sampled from other computer-generated user interface elements that are positioned, in a virtual sense, behind the computer-generated user interface element helps the user understand what else is in the environment that the user is viewing and being obscured by the computer-generated user interface element (e.g., a three-dimensional environment with various computer-generated user interface elements virtually positioned therein and overlaid on the view of the physical environment), which provides improved feedback to the user.

In some embodiments, the appearance of the one or more additional computer-generated user interface elements is updated over time (e.g., analogously as described herein with reference to the computer-generated user interface element). For example, as described herein with reference to FIGS. 7H-7J, the appearance of wall hanging 7106 is in some embodiments updated over time in a similar manner to user interface element 7040. In another example, as described herein with reference to FIG. 7K, the appearance of user interface element 7052, which is behind user interface element 7050 and which in some embodiments serves as a basis for the appearance of user interface element 7050, is also updated over time in a similar manner to other user interface elements described herein with reference to FIGS. 7A-7J and/or user interface element 7050 in FIG. 7K. In some embodiments, in the absence of any change in the appearance of the portion of the physical environment and any other computer-generated user interface element overlapping the respective additional computer-generated user interface element, the appearance of the respective additional computer-generated user interface element is maintained (e.g., continues to be based on the respective gradient between the third set of representative colors). Displaying multiple computer-generated user interface elements with appearances that are based on gradients between colors sampled from the underlying physical environment and any other underlying computer-generated user interface elements gives the computer-generated user interface elements a consistent appearance simulating that of objects made of a partially transparent material, which helps the user understand the environment that the user is viewing and spatial relationships between different objects therein, which provides improved feedback to the user.

In some embodiments, an appearance of a respective additional computer-generated user interface element of the one or more additional computer-generated user interface elements is based on a respective gradient (e.g., the same gradient used for the computer-generated user interface element) between a third set of representative colors sampled from one or more portions of the view of the physical environment on which the respective additional computer-generated user interface element is overlaid (e.g., sampled from one or more portions of the physical environment behind a simulated position of the respective additional computer-generated user interface element). In some embodiments, the third set of representative colors includes: a seventh color that represents (e.g., is selected from or sampled from) a portion of the view of the physical environment that is behind (e.g., a simulated position of) a first portion of the respective additional computer-generated user interface element in a third time period (e.g., at a third time, or during a third range of times); and an eighth color (e.g., different from the seventh color) that represents (e.g., is selected from or sampled from) a portion of the view of the physical environment that is behind (e.g., a simulated position of) a second portion of the respective additional computer-generated user interface element in the third time period (e.g., at the same third time, or during the same third range of times as that used for the seventh color). In some embodiments, the third time period is the first time period, the second time period, or a time period distinct from the first and second time periods.

In some embodiments, while displaying the view of the physical environment (e.g., and the computer-generated user interface element and/or at least a portion of the respective additional computer-generated user interface element), an appearance of a portion of the physical environment changes. In some embodiments, the computer system detects the change in the appearance of the portion of the physical environment. In some embodiments, in response to the change in appearance of the portion of the physical environment, (e.g., in addition to updating the view of the physical environment accordingly,) the computer system updates the appearance of the respective additional computer-generated user interface element based on the respective gradient between a fourth set of representative colors sampled from one or more portions of the view of the physical environment on which the respective additional computer-generated user interface element is overlaid. In some embodiments, the fourth set of representative colors include: a ninth color (e.g., different from the seventh color) that represents (e.g., is selected from or sampled from) a portion of the view of the physical environment that is behind (e.g., a simulated position of) the first portion of the respective additional computer-generated user interface element in a fourth time period (e.g., at a fourth time, or during a fourth range of times) that is different from (e.g., after) the third time period; and a tenth color (e.g., different from the eight and/or ninth colors) that represents (e.g., is selected from or sampled from) a portion of the view of the physical environment that is behind (e.g., a simulated position of) the second portion of the respective additional computer-generated user interface element in the fourth time period (e.g., at the same fourth time, or during the same fourth range of times as that used for the ninth color). For example, as described herein with reference to FIGS. 7H-7J, the appearance of wall hanging 7106 is in some embodiments also updated over time in a manner similar to user interface element 7040. In another example, as described herein with reference to FIG. 7K, the appearance of user interface element 7052 is in some embodiments also updated over time in a similar manner to user interface element 7050. In some embodiments, the fourth time period is the second time period (e.g., if the third time period is the first time period) or a time period distinct from the first, second, and third time periods. Displaying additional computer-generated user interface elements with appearances that are based on gradients between colors sampled from the underlying physical environment and any other underlying computer-generated user interface elements gives computer-generated user interface elements a consistent appearance simulating that of objects made of a partially transparent material, which helps the user understand the environment that the user is viewing and spatial relationships between different objects therein, which provides improved feedback to the user.

In some embodiments, a respective color that represents a portion of the view of the physical environment that is behind a respective portion of the computer-generated user interface element is sampled from a second computer-generated user interface element that has a simulated position that is at least partially behind a simulated position of the respective portion of the computer-generated user interface element. For example, in some circumstances the first color is selected from or sampled from a portion of a second computer-generated user interface element that is behind the first portion of the computer-generated user interface element (e.g., rather than selecting or sampling colors directly from the view of the physical environment for each computer-generated user interface element). In some circumstances, the second color is selected from or sampled from a portion of a third (e.g., the second) computer-generated user interface element that is behind the second portion of the computer-generated user interface element. Similarly, in some circumstances, the third color and/or the fourth color are selected from or sampled from portions of other computer-generated user interface elements behind the aforementioned computer-generated user interface element.

For example, as described herein with reference to FIGS. 7H-7J, if the appearance of wall hanging 7106 were updated over time in a manner similar to that described for user interface element 7040 in FIG. 7H-7J, the appearances of portions of user interface element 7040 that overlap with wall hanging 7106 optionally are based on or reuse the generated appearances of underlying portions of wall hanging 7106 rather than separately generated from portions of environment behind both wall hanging 7106 and user interface element 7040. Similarly, as described herein with reference to FIG. 7K, the appearance of foreground user interface element 7050 optionally is based on or reuses the generated appearances of underlying portions of background user interface element 7052. Basing the appearance of a computer-generated user interface element on the color gradient of an underlying computer-generated user interface element gives the computer-generated user interface elements a consistent appearance simulating that of objects made of a partially transparent material, which helps the user understand what else is in the environment that the user is viewing and being obscured by the computer-generated user interface element in the foreground while reducing the computational burden of generating a color gradient and/or blurring the appearance of each computer-generated user interface element separately, which provides improved feedback to the user.

In some embodiments, the appearance of the computer-generated user interface element is based on the respective gradient between a respective set of representative colors sampled from the one or more portions of the view of the physical environment without regard to a simulated position of the computer-generated user interface element relative to the physical environment. For example, as described herein with reference to FIGS. 7H-7J, the appearance of user interface element 7040 is optionally based on portions of environment 7104 that are in front of a simulated position (e.g., position 7030-4 in FIG. 7F) of user interface element 7040 in environment 7104. In some embodiments, the respective gradient uses colors sampled from portions of the physical environment that are in front of the simulated position of the computer-generated user interface element and/or behind the simulated position of the computer-generated user interface element. Basing the appearance of the computer-generated user interface element on a gradient between colors sampled from overlapping portions of the physical environment, including portions that from the user's perspective may be in front of a simulated position of the computer-generated user interface element, helps the user understand what is in the physical environment in the vicinity of the computer-generated user interface element, which provides improved feedback to the user.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, 12000, 13000, and 14000) are also applicable in an analogous manner to method 9000 described above with respect to FIG. 9. For example, the user interface elements or objects, including appearances and regions thereof, physical objects and/or representations of physical objects, virtual objects, user viewpoints, movements, three-dimensional environments, including views and appearances thereof, display generation component, and/or color gradients described above with reference to method 9000 optionally have one or more of the characteristics of the user interface elements or objects, including appearances and regions thereof, physical objects and/or representations of physical objects, virtual objects, user viewpoints, movements, three-dimensional environments, including views and appearances thereof, display generation component, and/or color gradients described herein with reference to other methods described herein (e.g., methods 8000, 10000, 11000, 12000, 13000, and 14000). For brevity, these details are not repeated here.

Figure 10:
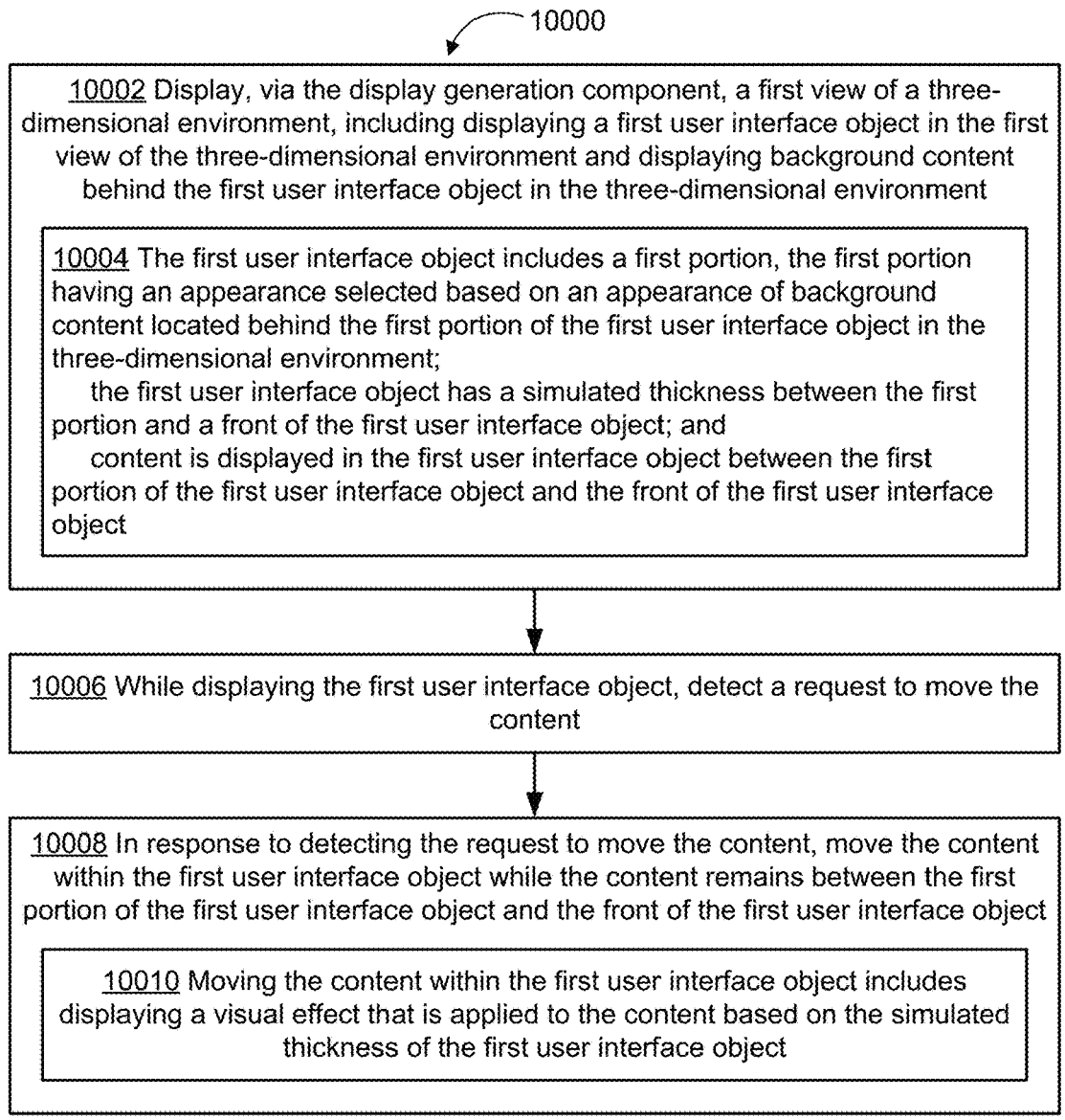
FIG. 10 is a flowchart of a method of displaying a user interface element with the appearance of a simulated material having a simulated thickness and curvature along the edges of the user interface element, where the edges of the user interface element have simulated optical properties that interact with light in the three-dimensional environment, in accordance with some embodiments.

FIG. 10 is a flowchart of a method 10000 of displaying a user interface element with the appearance of a simulated material having a simulated thickness and curvature along the edges of the user interface element, where the edges of the user interface element have simulated optical properties that interact with light in the three-dimensional environment, in accordance with some embodiments.

In some embodiments, the method 10000 is performed at a computer system (e.g., computer system 101 in FIG. 1) that is in communication with a display generation component (e.g., display generation component 120 in FIGS. 1, 3, and 4) (e.g., a heads-up display, a display, a touchscreen, and/or a projector), and optionally one or more input devices such as one or more cameras (e.g., a camera (e.g., color sensors, infrared sensors, and/or other depth-sensing cameras), for example pointing downward at a user's hand or forward from the user's head. In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In some embodiments, the method 10000 is performed at a computer system (e.g., the computer system 101 in FIG. 1, the computer system 101 described with respect to FIGS. 7A-7G, FIGS. 7H-7J, FIGS. 7K-7O, FIG. 7P, FIGS. 7Q-7W, and/or FIGS. 7X-7Z). In some embodiments, the computer system is in communication with a display generation component (e.g., the display generation component is a heads-up display, a head-mounted display (HMD), a display, a touchscreen, and/or a projector) and optionally one or more input devices (e.g., cameras, controllers, touch-sensitive surfaces, joysticks, buttons, gloves, watches, motion sensors, and/or orientation sensors). In some embodiments, the display generation component is a display generation component 7100 described with respect to FIGS. 7A-7Z. In some embodiments, the computer system is an integrated device with one or more processors and memory enclosed in the same housing as the display generation component and at least some of one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component and/or the one or more input devices. In some embodiments, the display generation component and the one or more input devices are integrated and enclosed in the same housing. Many of the features of the method 10000 are described with respect to FIGS. 7K-7O, in accordance with some embodiments.

In method 10000, the computer system displays (10002), via the display generation component, a first view of a three-dimensional environment, including displaying a first user interface object in the first view of the three-dimensional environment and displaying background content behind the first user interface object in the three-dimensional environment. The first user interface object includes (10004) a first portion, the first portion having an appearance selected based on an appearance of background content (e.g., virtual content or a representation of a physical space) located behind the first portion of the first user interface object in the three-dimensional environment. In some embodiments, the first portion of the first user interface object is a back surface of the first user interface object. The first user interface object has a simulated thickness between the first portion and a front of the first user interface object; and content is displayed in the first user interface object between the first portion of the first user interface object and the front of the first user interface object. For example, as shown in and described herein with reference to FIG. 7K, user interface element 7050 has a simulated thickness indicated by edge 7050-*e*, where content is displayed with the appearance of being behind the front surface of user interface element 7050 and between the front surface and the back surface of user interface element 7050 (e.g., embedded within user interface element 7050 at a depth that is less than the simulated thickness of user interface element 7050); likewise, user interface element 7052 optionally has a simulated thickness indicated by edge 7052-*e*, where content is displayed with the appearance of being behind the front surface of user interface element 7052 and embedded within user interface element 7052. As shown in and described herein with reference to FIGS. 7L-7O, user interface element 7054 has a simulated thickness between a front surface of user interface element 7054 and a back surface of user interface element 7054, with user interface element 7054 being configured to display content in background portion 7054-*a* between the front surface and the back surface of user interface element 7054.

While displaying the first user interface object, the computer system detects (10006) a request to move the content (e.g., scroll, reposition, resize, rescale, rotate, and/or other transformation). In response to detecting the request to move the content, the computer system moves (10008) the content within the first user interface object while the content remains between the first portion of the first user interface object and the front of the first user interface object. Moving the content within the first user interface object includes (10010) displaying a visual effect that is applied to the content based on the simulated thickness of the first user interface object. For example, as described herein with reference to FIG. 7K, content embedded within user interface element 7050 and within a threshold distance of edge 7050-*e* is displayed with an optical effect of wrapping around the simulated thickness of edge 7050-*e* in accordance with simulated internal reflection and/or refraction. Similarly, as described herein with reference to FIG. 7K, content embedded within user interface element 7052 and within a threshold distance of edge 7052-*e* is displayed with an optical effect of wrapping around the simulated thickness of edge 7052-*e* in accordance with simulated internal reflection and/or refraction.

Basing the appearance of a user interface object in a three-dimensional environment on an appearance of background content in a three-dimensional environment behind (e.g., in a virtual sense) the user interface object simulates the appearance of an object made of a transparent or partially transparent material (e.g., sometimes called a blur material), which is reinforced by displaying content being moved within the user interface object with a visual effect applied to the edges of the user interface object to simulate content moving within an object with a simulated thickness and refractive properties along the edges of the object (e.g., simulating internal reflection from the edges of the object, such as of light and/or embedded content), which helps the user understand what else is in the three-dimensional environment and being obscured by the user interface object, which provides improved feedback to the user. In addition, using the blur materials improves the user's context awareness, which improves user safety by helping the user to avoid collisions with physical objects in the physical space and reduces the likelihood that the user will suffer from motion sickness when using the computer system.

In some embodiments, the appearance of (e.g., the first portion of) the first user interface object is based on the appearance of the background content in accordance with a first level of translucency of the first user interface object (e.g., so as to simulate the appearance of the background content as would be visible through a semitransparent material having the first level of translucency), and the method includes displaying a shadow on background content displayed adjacent to an edge of the first user interface object, wherein an appearance of the shadow is in accordance with a second level of translucency of the first user interface object that is different from the first level of translucency (e.g., so as to simulate a shadow cast on the background content by a semitransparent material having the second level of translucency). For example, although user interface element 7050 in FIG. 7K is displayed with the appearance of an object made of a transparent or partially transparent material, the shadow(s) displayed in environment 7104 as apparently cast by user interface element 7050 are optionally different from the shadow(s) that would be cast from a physical object made of the same transparent or partially transparent material. For example, while a physical pane of transparent glass might cast a given amount of shadow on nearby objects in a physical environment, user interface element 7050 is optionally displayed to simulate the pane of transparent glass while also being displayed with the appearance of casting more or less shadow on nearby objects in environment 7104 than the physical pane of glass would. Similarly, in some embodiments, user interface element 7052 in FIG. 7K is optionally displayed as casting more or less shadow in environment 7104 than a corresponding physical object of the same material that user interface element 7052 is displayed as simulating.

In the physical world, physical objects cast an associated amount of shadow on other objects that is defined by the lighting in the physical environment and the materials making up the objects (e.g., including materials with a particular degree of transparency or translucency). In a computer-generated three-dimensional environment, a computer-generated object may be displayed with an amount of transparency or translucency that is independent of the amount of shadow that the computer-generated object is shown as casting on other objects. Displaying a user interface object that simulates an object made of a transparent or partially transparent material while decoupling the amount of shadow that the object is displayed as casting on other objects provides the user with information about the dimensions and position of the user interface object in the three-dimensional environment, as well as providing flexibility in how such information is conveyed, so as to help orient the user in the three-dimensional environment, which provides improved feedback to the user.

In some embodiments, displaying the visual effect that is applied to the content based on the simulated thickness of the first user interface object includes displaying a portion of the content that is within a threshold distance from an edge of the first user interface object as curving around the simulated thickness of the first user interface object (e.g., as described herein with reference to user interface elements 7050 and 7052 of FIG. 7K). Displaying content being moved within the user interface object with a visual effect applied to the edges of the user interface object to simulate the content curving around the simulated thickness of the user interface object reinforces the appearance of the user interface object as being made of a transparent or partially transparent material having refractive properties, by simulating internal reflection from and transparency of the edges of the object, which helps the user understand what is in the three-dimensional environment and being obscured by the user interface object, which provides improved feedback to the user.

In some embodiments, one or more edges of the first user interface object are displayed as having curvature (e.g., a curved or rounded edge) and with a visual effect of light reflecting from the one or more edges. For example, as described herein with reference to FIG. 7K, user interface element 7050 is optionally displayed with the visual effect of light reflecting from one or more locations along the curved edge 7050-*e* of user interface element 7050, and/or user interface element 7052 is displayed with the visual effect of light reflecting from one or more locations along the curved edge 7052-*e* of user interface element 7050. In another example, as described herein with reference to FIGS. 7L-7O, user interface element 7054 has a simulated thickness and is displayed with the visual effect of light reflecting from one or more locations along the edge of user interface element 7054, which is optionally curved. In some embodiments, a portion of the first user interface object that is not an edge is displayed without curvature and/or without the visual effect of reflecting light. Displaying a visual effect of light reflecting from the edges of the user interface object reinforces the appearance of the user interface object as being made of a transparent or partially transparent material having refractive properties, by simulating internal reflection from the edges of the object, which helps the user understand what is in the three-dimensional environment and being obscured by the user interface object, which provides improved feedback to the user.

In some embodiments, the curvature is in two dimensions (e.g., curvature in a plane, such as in x- and y-directions, or any other two-dimensional coordinate system). For example, as described herein with reference to FIG. 7K, the edge of user interface element 7050 and the edge of user interface element 7052 are rounded in at least two dimensions. In another example, as described herein with reference to FIGS. 7L-7O, the edges of user interface element 7054 are optionally rounded in two dimensions (e.g., an edge where two faces meet, such as the top face and a side face, a side face and the bottom face, the front face and a side face, or a side face and the back face, is rounded such that the two faces smoothly transition into each other). Displaying a visual effect of light reflecting in two dimensions from the edges of the user interface object reinforces the appearance of the user interface object as being made of a transparent or partially transparent material having refractive properties, by simulating internal reflection from the edges of the object, and helps the user differentiate the user interface object from representations or renderings of three-dimensional physical objects in the three-dimensional environment, which provides improved feedback to the user.

In some embodiments, the curvature is in three dimensions (e.g., curvature in space, such as in x-, y-, and z-directions, or any other three-dimensional coordinate system). For example, as described herein with reference to FIG. 7K, the edge of user interface element 7050 and/or the edge of user interface element 7052 are optionally rounded in three dimensions. In another example, as described herein with reference to FIGS. 7L-7O, the edges and/or corners of user interface element 7054 are optionally rounded in three dimensions (e.g., a vertex where three faces meet is rounded such that the three faces smoothly transition into each other). Displaying a visual effect of light reflecting in three dimensions from the edges of the user interface object reinforces the appearance of the user interface object as being made of a transparent or partially transparent material having refractive properties, by simulating internal reflection from the edges of the object, and helps the user visualize the user interface object as a realistic three-dimensional object in the three-dimensional environment, which provides improved feedback to the user.

In some embodiments, the three-dimensional environment includes a representation of at least a portion of a physical environment (e.g., in which one or more cameras of the computer system are located), and the visual effect of light reflecting from the one or more edges of the first user interface object is based on light detected in the physical environment. For example, as described herein with reference to FIG. 7K, specular reflection(s) for user interface elements 7050 and/or 7052 in FIG. 7K may simulate reflection of physical light from one or more physical light sources in physical environment 7102 (FIG. 7A). In another example, as described herein with reference to FIGS. 7L-7O, the specular reflections from user interface element 7054 are in some embodiments based at least partially on lighting in physical environment 7102, which is at least partially represented by environment 7104. Displaying a visual effect of light reflecting from the edges of the user interface object based on actual light detected from the physical environment represented by the displayed three-dimensional environment helps the user visualize the user interface object as a realistic three-dimensional object in the physical environment and reduces the cognitive dissonance between the user interface object and the view of the physical environment, which provides improved feedback to the user.

In some embodiments, the visual effect of light reflecting from the one or more edges of the first user interface object is based on light in the three-dimensional environment. For example, as described herein with reference to FIG. 7K, specular reflection(s) for user interface elements 7050 and/or 7052 in FIG. 7K may simulate reflection of light from one or more simulated light sources in environment 7104 (e.g., distinct from, and not corresponding $t_0$, actual light in physical environment 7102). In another example, as described herein with reference to FIGS. 7L-7O, the specular reflections from user interface element 7054 are in some embodiments based at least partially on simulated light in environment 7104 (e.g., distinct from, and not corresponding $t_0$, actual light in physical environment 7102). In some embodiments, the light in the three-dimensional environment includes simulated light from a virtual light source in the three-dimensional environment and/or a representation of light from a physical environment represented by the three-dimensional environment. Displaying a visual effect of light reflecting from the edges of the user interface object based on simulated light in the three-dimensional environment helps the user visualize the user interface object as a three-dimensional object in the three-dimensional environment and increases immersion in the three-dimensional environment, which provides improved feedback to the user.

In some embodiments, the first user interface object includes one or more activatable user interface objects, and the one or more activatable user interface objects are displayed on the front of the first user interface object (e.g., on the surface of the front of the first user interface object, rather than within the first user interface object between the front and the first portion). For example, as described herein with reference to FIGS. 7L-7O, user interface object 7054 includes raised region **7054-*d*, which appears as a portion of material that is raised relative to the front surface of user interface element 7054, analogous to a separate piece of material placed on top of the front surface of user interface element 7054**. In some embodiments, the one or more activatable user interface objects are displayed on a surface (e.g., a plane) that is a predefined distance from the front of the first user interface object (e.g., above or in front of the front surface of the first user interface object). Displaying activatable user interface objects on the front surface of the user interface object distinguishes the activatable objects from content (e.g., substantive material, such as multimedia content and/or text content) displayed embedded within the user interface object and provides the user with visual feedback that the activatable objects are interactive, which provides improved feedback to the user.

In some embodiments, a first activatable user interface object of the first user interface object has a first thickness. In some embodiments, the computer system detects an input interacting with the first activatable user interface object; and, in response to detecting the input, displays the first activatable user interface object with a second thickness that is different from the first thickness. For example, as described herein with reference to FIGS. 7M-7N, the thickness of raised region **7054-*d* is changed in response to user interaction with raised region 7054-*d* (e.g., raised region 7054-*d* is displayed with a first thickness in FIG. 7M, whereas in FIG. 7N, in response to user 7002 directing attention to raised region 7054-*d*, raised region 7054-*d* is displayed with a second, different thickness than in FIG. 7M**). For example, absent interaction with the first activatable user interface object, the first activatable user interface object is displayed as extending a first amount from a respective surface such as the front of the first user interface object. In this example, in response to interaction with the first activatable user interface object, the first activatable user interface object is displayed as extending a different amount, and optionally in a different direction from the respective surface (e.g., changing from protruding (e.g., extending forward or upward) from the first user interface object, to being recessed (e.g., extending backward or downward) into the first user interface object). Changing the thickness of an activatable user interface object relative to the surface of the underlying user interface object provides the user with visual feedback that interaction with the activatable object has been detected and that an operation associated with the activatable object is being performed in response to the interaction or will be performed in response to further interaction, which provides improved feedback to the user.

In some embodiments, the computer system displays, on background content displayed adjacent to the first user interface object, a shadow that corresponds to the first user interface object. In some embodiments, the computer system detects an input interacting with the first user interface object (e.g., to move the first user interface object in simulated three-dimensional space); and, in response to detecting the input interacting with the first user interface object, changes an appearance of the shadow that corresponds to the first user interface object (e.g., to indicate a change in thickness, distance, or height of the first user interface object relative to the background). For example, as described herein with reference to FIGS. 7M-7N, a longer shadow from raised region **7054-*d* is displayed on user interface element 7054 in FIG. 7N in response to user 7002 directing attention to raised region 7054-*d* (e.g., in accordance with the thickness of raised region 7054-*d* being changed in response to the user gazing at raised region 7054-*d***). In some embodiments, the appearance of the shadow indicates a simulated distance between the first user interface object (e.g., a first point in simulated three-dimensional space in or on the first user interface object) and the background content (e.g., a second point in simulated three-dimensional space in or on the background content), and while the first user interface object is a first distance from the background content, the shadow is displayed with a first appearance, whereas while the first user interface object is a second distance from the background content (e.g., in response to a user input to move the first user interface object in the simulated three-dimensional space and relative to the background content) the shadow is displayed with a second appearance that is different from the first appearance. Changing the appearance of the shadow of an activatable user interface object, particularly if performed in conjunction with changing the thickness of the activatable user interface object relative to the surface of the underlying user interface object, reinforces the appearance of the activatable user interface object as three-dimensional and provides the user with visual feedback that interaction with the activatable object has been detected, which provides improved feedback to the user.

In some embodiments, the first view of the three-dimensional environment includes a view of the front of the first user interface object. In some embodiments, the computer system receives a request to display a view of a back of the first user interface object (e.g., a request to rotate or flip the first user interface object within the three-dimensional environment, or a request to view the three-dimensional environment from a different perspective that has a view of the back of the first user interface object, for example due to movement of the user and/or the one or more cameras of the computer system relative to a physical environment represented by the three-dimensional environment, corresponding to changing a viewpoint of a user from in front of and facing the first user interface object to behind and facing the first user interface object). In some embodiments, in response to the request to display the view of the back of the first user interface object, the computer system visually deemphasizes (e.g., by blurring, fading, shading, or darkening, or other similar transformation, or by forgoing displaying or ceasing to display) the content between the first portion of the first user interface object and the front of the first user interface object. For example, as described herein with reference to FIG. 7K, content displayed as embedded within user interface element 7050 and/or user interface element 7052 is optionally visible from the front of user interface elements 7050 and 7052, such as from the perspective shown in FIG. 7K, and not clearly visible from the back of user interface elements 7050 and 7052. In some embodiments, the front of the first user interface object has the appearance of a transparent material through which the content within the first user interface object is visible. In some embodiments, the back of the first user interface object has the appearance of a semi-transparent material through which the content is less visible than from the front of the first user interface object. In some embodiments, the content is not visible (e.g., not displayed) while viewing the back of the first user interface object, even though the appearance of the first user interface object from the back continues to be based on an appearance of background content located in the three-dimensional environment behind the first user interface object (e.g., portions of the three-dimensional environment behind the first user interface object are at least partially visible through the first user interface object). Deemphasizing the content embedded in the user interface object when the user interface object is viewed from the back avoids the undesirable effect of displaying the content in reverse as it would appear in an actual transparent or semi-transparent object, which reduces the computational burden of rendering the user interface object and provides improved feedback to the user.

In some embodiments, the computer system displays the first user interface object with a first appearance in accordance with a first context of the three-dimensional environment (e.g., a first time of day or other ambient condition in the three-dimensional environment); and, in response to a change in the three-dimensional environment to a second context that is different from the first context, displays the first user interface object with a second appearance that is different from the first appearance in accordance with the second context of the three-dimensional environment (e.g., a second time of day or other ambient condition in the three-dimensional environment). For example, as described herein with reference to FIG. 7K-7M, the specular reflections, brightness, color temperature, and other visual characteristics of user interface elements 7050, 7052, and/or 7054 are optionally adjusted to correspond to the context of environment 7104. Changing the appearance of the user interface object based on the context of the surrounding three-dimensional environment provides the user with visual feedback about changes in the surrounding environment, such as changes in color, lighting, and/or time of day, which helps the user understand the environment that the user is viewing, which provides improved feedback to the user.

In some embodiments, the computer system selects an appearance of the first user interface object based on a context of the three-dimensional environment. In some embodiments, in accordance with a determination that the three-dimensional environment is in a first context, a first appearance that is based on the first context of the three-dimensional environment is selected; and, in accordance with a determination that the three-dimensional environment is in a second context different from the first context, a second appearance that is based on the second context of the three-dimensional environment is selected. The second appearance is different from the first appearance. For example, as described herein with reference to FIG. 7K-7M, the specular reflections, brightness, color temperature, and other visual characteristics of user interface elements 7050, 7052, and/or 7054 are optionally selected based on the context of environment 7104. For example, a color of a respective portion of the first user interface object is selected based on, or from, one or more colors in the three-dimensional environment (e.g., one or more colors of content or objects positioned behind a simulated position of the first user interface object in the three-dimensional environment and/or an ambient color temperature of the three-dimensional environment). If warmer colors are more prevalent in the three-dimensional environment, the first user interface object has an appearance with warmer tones. If cooler colors are more prevalent in the three-dimensional environment, the first user interface object has an appearance with cooler tones. In another example, a brightness of the first user interface object is selected based on, or from, brightness and/or an amount of light in the three-dimensional environment (e.g., based on simulated lighting in the three-dimensional environment and/or light in a physical environment that is represented by the three-dimensional environment). If the three-dimensional environment is bright, the first user interface object has a brighter appearance. If the three-dimensional environment is dim, the first user interface object has a dimmer appearance. Selecting the appearance of the user interface object based on the context of the surrounding three-dimensional environment reduces the cognitive dissonance of the user interface object appearing out of place and helps the user understand the environment that the user is viewing, which provides improved feedback to the user.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, 12000, 13000, and 14000) are also applicable in an analogous manner to method 10000 described above with respect to FIG. 10. For example, the user interface elements or objects, including appearances and regions thereof, physical objects and/or representations of physical objects, virtual objects, user viewpoints, movements, three-dimensional environments, including views and appearances thereof, display generation component, light sources, reflections, and/or shadows described above with reference to method 10000 optionally have one or more of the characteristics of the user interface elements or objects, including appearances and regions thereof, physical objects and/or representations of physical objects, virtual objects, user viewpoints, movements, three-dimensional environments, including views and appearances thereof, display generation component, light sources, reflections, and/or shadows described herein with reference to other methods described herein (e.g., methods 8000, 9000, 11000, 12000, 13000, and 14000). For brevity, these details are not repeated here.

Figure 11:
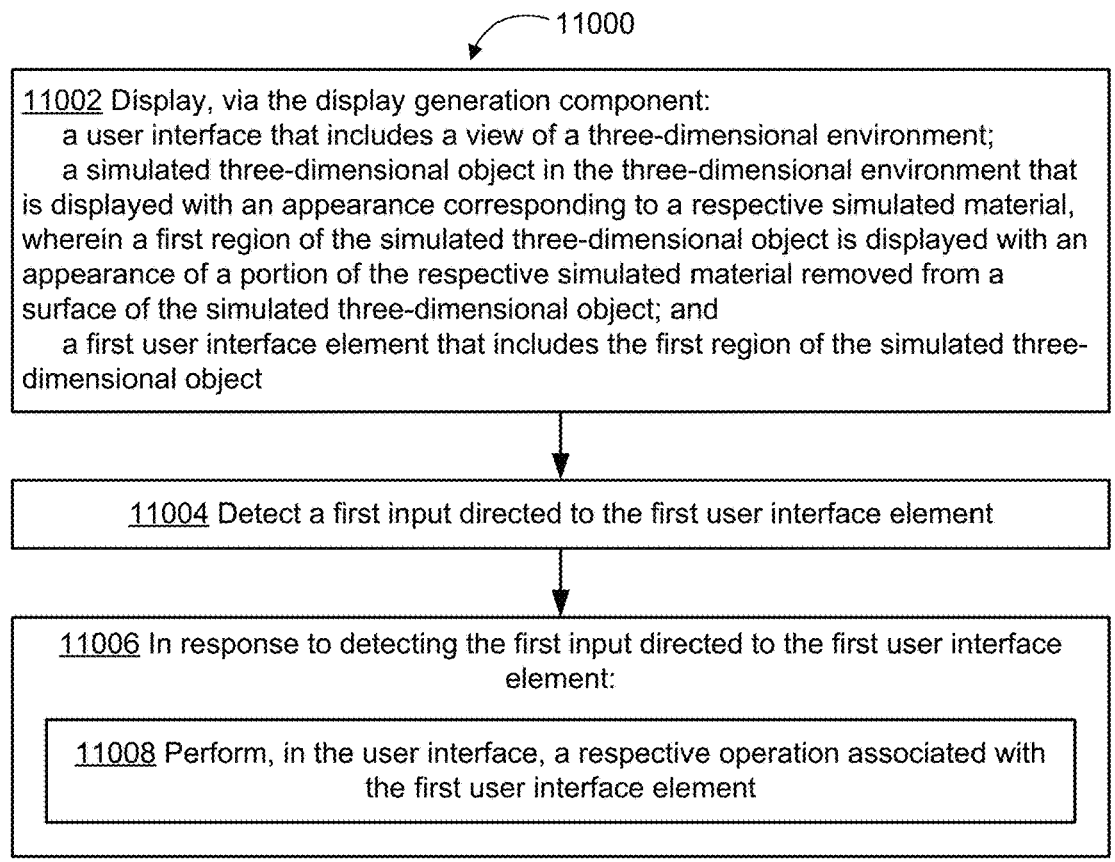
FIG. 11 is a flowchart of a method of displaying a user interface element with the appearance of a simulated material having a simulated thickness and curvature along the edges of the user interface element, where the edges of the user interface element have simulated optical properties that interact with light in the three-dimensional environment, in accordance with some embodiments.

FIG. 11 is a flowchart of a method 11000 of displaying a user interface element with the appearance of a simulated material having a simulated thickness and curvature along the edges of the user interface element, where the edges of the user interface element have simulated optical properties that interact with light in the three-dimensional environment, in accordance with some embodiments.

In some embodiments, the method 11000 is performed at a computer system (e.g., computer system 101 in FIG. 1) that includes or is in communication with a display generation component (e.g., display generation component 120 in FIGS. 1, 3, and 4) (e.g., a heads-up display, a display, a touchscreen, and/or a projector), and one or more input devices such as one or more cameras (e.g., a camera (e.g., color sensors, infrared sensors, and/or other depth-sensing cameras), for example pointing downward at a user's hand or forward from the user's head. In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In some embodiments, the method 11000 is performed at a computer system (e.g., the computer system 101 in FIG. 1, the computer system 101 described with respect to FIGS. 7A-7G, FIGS. 7H-7J, FIGS. 7K-7O, FIG. 7P, FIGS. 7Q-7W, and/or FIGS. 7X-7Z). In some embodiments, the computer system is in communication with a display generation component (e.g., the display generation component is a heads-up display, a head-mounted display (HMD), a display, a touchscreen, and/or a projector) and optionally one or more input devices (e.g., cameras, controllers, touch-sensitive surfaces, joysticks, buttons, gloves, watches, motion sensors, and/or orientation sensors). In some embodiments, the display generation component is a display generation component 7100 described with respect to FIGS. 7A-7Z. In some embodiments, the computer system is an integrated device with one or more processors and memory enclosed in the same housing as the display generation component and at least some of one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component and/or the one or more input devices. In some embodiments, the display generation component and the one or more input devices are integrated and enclosed in the same housing. Many of the features of the method 11000 are described with respect to FIGS. 7K-7O, in accordance with some embodiments.

In method 11000, the computer system displays (11002), via the display generation component: a user interface that includes a view of a three-dimensional environment (e.g., corresponding to a view of a portion of a physical environment that is in a field of view of one or more cameras of the computer system); and a simulated three-dimensional object (e.g., a simulated object that is not a representation or rendering of a physical object contemporaneously in the field of view of one or more cameras of the computer system) in the three-dimensional environment that is displayed with an appearance corresponding to a respective simulated material. A first region of the simulated three-dimensional object is displayed with an appearance of a portion of the respective simulated material removed from a surface of the simulated three-dimensional object (e.g., a concave portion or depression in the respective simulated material of the simulated three-dimensional object, such as a portion that is etched or cut away from the surface of the simulated three-dimensional object). For example, as described herein with reference to FIGS. 7L-7O, user interface element 7054 includes recessed region 7054-b and recessed region 7054-c. In some embodiments, a region of the simulated three-dimensional object outside of (e.g., adjacent to) the first region has a first simulated thickness, and the first portion of the simulated three-dimensional object has a second simulated thickness that is less than the first simulated thickness (e.g., in accordance with material of the first portion being removed). For example, recessed region 7054-b and recessed region 7054-c are thinner than background region 7054-a of user interface element 7054 in FIGS. 7L-7N. In some embodiments, giving the appearance that a portion of the respective simulated material has been removed from the surface of the simulated three-dimensional object is achieved through displaying stereoscopic depth of the region and/or through displaying specular effects such as reflection and/or refraction from one or more edges of the region (e.g., displaying a greater amount of light reflection from an edge of a deeper etched region). In some embodiments, the apparent depth of the region of removed material (e.g., apparent etched depth) is small compared to the size of the simulated three-dimensional object. For example, while the depth of the region may correspond to removal of 10%-90% of the thickness of the simulated three-dimensional object, the depth of the region is a small fraction (e.g., less than 1%-20%) of the thickness, length, and/or width of the simulated three-dimensional object. The computer system further displays (11002), via the display generation component, a first user interface element that includes the first region of the simulated three-dimensional object (e.g., the first region of the simulated three-dimensional object delineates the first user interface element; the first region of the simulated three-dimensional object is the first user interface element). For example, as described herein with reference to FIGS. 7L-7O, recessed region 7054-b, recessed region 7054-c, and raised region 7054-d of user interface element 7054 correspond to interactive user interface elements.

In method 11000, the computer system detects (11004) a first input directed to the first user interface element. In response to detecting the first input directed to the first user interface element (11006), the computer system: performs (11008), in the user interface, a respective operation associated with the first user interface element. For example, as described herein with reference to FIGS. 7L-7O, the computer system is configured to perform a respective operation associated with a respective region of recessed region 7054-b, recessed region 7054-c, or raised region 7054-d in response to a user input directed to the respective region. Displaying one or more regions of a simulated three-dimensional object, having the appearance of a simulated material, as portions of the simulated material removed from the surface of the simulated object and associating those regions with user interface elements distinguishes those regions from other regions along the surface of the simulated object and provides visual feedback to the user that those regions can be interacted with to perform operations in the user interface, which provides improved feedback to the user.

In some embodiments, one or more edges of the simulated three-dimensional object (e.g., edges along an outline of the simulated three-dimensional object, and/or edges of etched regions such as the first user interface element) are displayed with a visual effect of light (e.g., from one or more light sources) from the three-dimensional environment reflecting from the one or more edges based on properties of the respective simulated material. For example, as described herein with reference to FIGS. 7L-7O, specular reflection is displayed along one or more edges of user interface element 7054. In some embodiments, the visual effect of reflected light is based on light from one or more (e.g., physical and/or virtual) light sources. In some embodiments, the visual effect is based on light from multiple (e.g., physical and/or virtual) light sources. Displaying one or more edges of the simulated three-dimensional object with specular reflection, including from both outer and inner surfaces of the edges of the simulated object, simulates the appearance of a physical object made of a transparent or partially transparent material (e.g., sometimes called a blur material), which provides the user with visual feedback about the locations of light sources in the three-dimensional environment and distinguishes the simulated object from other displayed representations of objects that correspond to physical objects in the user's surrounding physical environment, which provides improved feedback to the user and improves the user's context awareness, which improves user safety by helping the user to avoid collisions with physical objects in the physical space and reduces the likelihood that the user will suffer from motion sickness when using the computer system.

In some embodiments, the light from the three-dimensional environment includes simulated light from one or more simulated light sources in the three-dimensional environment. For example, as described herein with reference to FIGS. 7L-7O, specular reflection based on simulated light sources in environment 7104 is displayed along one or more edges of user interface element 7054. Displaying one or more edges of the simulated three-dimensional object with specular reflection based on one or more simulated light sources in the three-dimensional environment allows the lighting effects in the environment to be generated and adjusted by the computer system, which provides control over the context and ambience of the user's viewing experience, which provides improved feedback to the user.

In some embodiments, the three-dimensional environment corresponds to a physical environment (e.g., in which one or more cameras of the computer system are located), and the light from the three-dimensional environment includes light detected in the physical environment (e.g., from one or more physical light sources, such as the sun, a lamp or light fixture, a flashlight, a headlight or headlamp, a flame or fire, or other physical source of light). For example, as described herein with reference to FIGS. 7L-7O, specular reflection based on physical light and/or physical light sources in physical environment 7102 (FIG. 7A) is displayed along one or more edges of user interface element 7054. In some embodiments, a representation of at least a portion of the physical environment is displayed in the three-dimensional environment. Displaying one or more edges of the simulated three-dimensional object with specular reflection based on one or more physical light sources in a physical environment corresponding to the three-dimensional environment provides the user with visual feedback about the lighting in the user's surrounding physical environment, which provides improved feedback to the user and improves the user's context awareness, which improves user safety by helping the user to avoid collisions with physical objects in the physical space and reduces the likelihood that the user will suffer from motion sickness when using the computer system.

In some embodiments, the simulated three-dimensional object is displayed at a first position in the three-dimensional environment, and the one or more edges of the simulated three-dimensional object have an appearance based on the visual effect of light reflecting from the one or more edges in accordance with the simulated three-dimensional object being at the first position. In some embodiments, the computer system detects an input to move the simulated three-dimensional object in the three-dimensional environment. In some embodiments, in response to detecting the input to move the simulated three-dimensional object in the three-dimensional environment, the computer system: displays the simulated three-dimensional object at a second position, different from the first position, in the three-dimensional environment; and changes the appearance of the one or more edges of the simulated three-dimensional object based on the visual effect of light reflecting from the one or more edges in accordance with the simulated three-dimensional object being at the second position.

For example, on a simulated transparent or partially transparent object that is positioned, from the viewpoint of the user, underneath a light source (e.g., simulated or physical), specular reflection is displayed along a top edge of the simulated object (e.g., representing light reflected outwardly from the top edge of the simulated object) and, to a lesser degree, along a bottom edge of the simulated object (e.g., representing light that has traveled through the simulated object and is reflected inwardly from the bottom edge of the simulated object). If the simulated object is moved to a position that, from the viewpoint of the user, is to the right of the light source, specular reflection is displayed instead along the left edge of the simulated object (e.g., representing light reflected outwardly from the left edge of the simulated object) and, to a lesser degree, along a right edge of the simulated object (e.g., representing light that has traveled through the simulated object and is reflected inwardly from the right edge of the simulated object). In some embodiments, as the simulated object is gradually moved from the position underneath the light source to the position to the right of the light source, the specular reflection on the top edge of the simulated object is gradually moved along the top edge of the simulated object toward the left and then down along the left edge of the simulated object, and the specular reflection on the bottom edge of the simulated object is gradually moved along the bottom edge of the simulated object toward the right and then up along the right edge of the simulated object, in accordance with the locations at which light would reflect externally and internally from the edges of the simulated object. In another example, as described herein with reference to FIGS. 7L-7M, the appearances and locations of the specular reflections from user interface element 7054 change as user interface element 7054 moves from the position in FIG. 7L to the position shown in FIG. 7M.

Displaying a change in the specular reflection from the one or more edges of the simulated three-dimensional object in response to movement of the simulated object in the three-dimensional environment gives the simulated object an appearance that is consistent with how a physical object interacts with light and provides the user with visual feedback about the locations of light sources in the three-dimensional environment and the spatial relationship between the simulated object, the light sources, and the viewpoint of the user, which improves the user's context awareness and reduces cognitive dissonance between the simulated object and the displayed environment, which provides improved feedback to the user.

In some embodiments, the view of the three-dimensional environment is a view from a first viewpoint of the user relative to the three-dimensional environment, and the one or more edges of the simulated three-dimensional object have an appearance based on the visual effect of light reflecting from the one or more edges in accordance with the first viewpoint of the user (e.g., the appearance of light reflecting from the one or more edges is as it would appear to a user viewing the simulated three-dimensional object in the three-dimensional environment from the perspective of the first viewpoint). In some embodiments, the computer system transitions to a second viewpoint of the user relative to the three-dimensional environment (e.g., in response to detecting movement of the viewpoint of the user, such as via movement of the computer system or one or more cameras of the computer system, or in response to detecting an input requesting a change in the viewpoint of the user, such as an input to zoom or pan the view of the three-dimensional environment), including: updating the user interface to a view of the three-dimensional environment from the second viewpoint of the user (e.g., gradually transitioning the view of the three-dimensional environment to simulate continuous movement from the first viewpoint to the second viewpoint); and changing the appearance of the one or more edges of the simulated three-dimensional object based on the visual effect of light reflecting from the one or more edges in accordance with the second viewpoint of the user (e.g., the appearance of light reflecting from the one or more edges as it would appear to a user viewing the simulated three-dimensional object in the three-dimensional environment form the perspective of the second viewpoint).

For example, as described herein with reference to FIGS. 7L-7M, the appearances and locations of the specular reflections from user interface element 7054 would change as the viewpoint of the user relative to user interface element 7054 changes. Displaying a change in the specular reflection from the one or more edges of the simulated three-dimensional object in response to a change in the viewpoint of the user relative to the simulated object and/or the three-dimensional environment gives the simulated object an appearance that is consistent with how a physical object interacts with light from different viewing perspectives of the physical object and provides the user with visual feedback about the locations of light sources in the three-dimensional environment and the spatial relationship between the viewpoint of the user, the simulated object, and the light sources, which improves the user's context awareness and reduces cognitive dissonance between the simulated object and the displayed environment, which provides improved feedback to the user.

In some embodiments, the light in the three-dimensional environment changes (e.g., changing in color, brightness, location, and/or direction, due to changes in lighting in the physical environment represented in the three-dimensional environment and/or changes in simulated lighting in the three-dimensional environment). In some embodiments, in response to the change in the light in the three-dimensional environment, the computer system: displays a change in the view of the three-dimensional environment in accordance with the changes in the light; and changes an appearance of the one or more edges of the simulated three-dimensional object to display a visual effect of the changed light reflecting from the one or more edges based on the properties of the respective simulated material. For example, as described herein with reference to FIGS. 7L-7M, the appearances and locations of the specular reflections from user interface element 7054 change in accordance with changes in light source 7056 and/or light source 7058. Displaying a change in the specular reflection from the one or more edges of the simulated three-dimensional object in response to changes in light in the three-dimensional environment, where the light is based on simulated lighting and/or physical light in the user's surrounding physical environment, gives the simulated object an appearance that is consistent with how a physical object interacts with light and provides the user with visual feedback about the locations of light sources in the three-dimensional environment and the spatial relationship between the light sources, the simulated object, and the viewpoint of the user, which improves the user's context awareness and reduces cognitive dissonance between the simulated object and the displayed environment, which provides improved feedback to the user.

In some embodiments, a second region of the simulated three-dimensional object is displayed with an appearance of a portion of the respective simulated material removed from the surface of the simulated three-dimensional object (e.g., a second etched region); and a second user interface element includes the second region of the simulated three-dimensional object (e.g., the second region of the simulated three-dimensional object delineates the second user interface element; the second region of the simulated three-dimensional object is the second user interface element). In some embodiments, the computer system detects an input directed to the second user interface element; and, in response to detecting the input directed to the second user interface element: performs, in the user interface, a respective operation associated with the second user interface element. In some embodiments, the simulated three-dimensional object includes a plurality of etched regions each corresponding to a respective user interface element, and a user may direct an input to a respective user interface element to perform a respective associated operation in the user interface. For example, as described herein with reference to FIGS. 7L-7O, user interface element 7054 includes multiple recessed regions 7054-*b* and 7054-*c* configured to perform respective operations in the user interface. Displaying multiple regions of a simulated three-dimensional object as portions of material removed from the surface of the object and associating those regions with user interface elements provides additional regions with which the user can readily interact to perform operations in the user interface, and distinguishes those regions from other regions along the surface of the simulated object to provide visual feedback to the user that those regions are interactive, which provides additional control options that reduce the number of inputs needed to access the associated operations and provides improved feedback to the user.

In some embodiments, the computer system receives an input corresponding to entry of text; and displays the entered text in the first user interface element. In some embodiments, the first user interface element is or includes a text entry field. In some embodiments, text that is entered (e.g., while the first user interface element has focus) is displayed in the text entry field of the first user interface element. For example, as described herein with reference to FIG. 7L, recessed regions 7054-*b* and 7054-*c* of user interface element 7054 are optionally content entry regions such as text entry boxes. Establishing a region of a simulated three-dimensional object, which is displayed as a portion of material removed from the surface of the simulated object, as a text entry region that is configured to receive text input distinguishes that region from other regions along the surface of the simulated object, to provide visual feedback to the user that that region is interactive, and in some embodiments to provide visual feedback to the user that that region is a text entry region instead of an activatable control region, which provides improved feedback to the user.

In some embodiments, prior to detecting the first input corresponding to the activation of the first user interface element, the computer system detects a second input corresponding to a user directing focus (e.g., attention) to the first user interface element. In some circumstances, the second input and the first input are successive portions of a same input. In some embodiments, in response to detecting the second input corresponding to a user directing focus to the first user interface element: in accordance with a determination that the first user interface element is a first type of user interface element (e.g., a button or activatable control), the computer system displays the first region of the simulated three-dimensional object with an appearance of a portion of the respective simulated material raised from the surface of the simulated three-dimensional object (e.g., a convex portion of the respective simulated material, a portion that extends or protrudes from the surface of the simulated three-dimensional object, or a portion of the respective simulated material that is positioned with a degree of separation from the surface of the simulated three-dimensional object); and, in accordance with a determination that the first user interface element is a second type of user interface element different from the first type (e.g., a text entry field), the computer system maintains display of the first region of the simulated three-dimensional object with the appearance of a portion of the respective simulated material removed from the surface of the simulated three-dimensional object.

For example, as described herein with reference to FIGS. 7L-7O, some types of user interface elements are displayed as raised regions (e.g., some recessed regions are changed to raised regions and/or some raised regions are raised even further) while focus (e.g., the user's attention) is directed to the user interface element. Displaying a region of a simulated three-dimensional object as a portion of material removed from the surface of the simulated object, and changing the appearance of the region to the appearance of a portion of raised material from the surface of the simulated object if the region is associated with a first type of user interface element, while maintaining the appearance of the region as that of removed material if the region is associated with a second type of user interface element, provides the user with visual feedback about the type of user interface element that is associated with that region and consequently the type of user interface operation that is configured to be performed in response to further interaction with the user interface element of that region, which provides improved feedback to the user.

In some embodiments, a third region of the simulated three-dimensional object is displayed with an appearance of a portion of the respective simulated material raised from the surface of the simulated three-dimensional object (e.g., a convex portion or protrusion of the respective simulated material of the simulated-three-dimensional object, appearing as a portion of the simulated material that is layered on the surface of the simulated three-dimensional object, as an embossed or extruded region, or a portion of the respective simulated material that is positioned with a degree of separation from the surface of the simulated three-dimensional object, or other similar visual effect); and a third user interface element includes the third region of the simulated three-dimensional object (e.g., the third region of the simulated three-dimensional object delineates the third user interface element; the third region of the simulated three-dimensional object is the third user interface element). In some embodiments, the computer system: detects an input directed to the third user interface element; and, in response to detecting the input directed to the third user interface element: performs, in the user interface, a respective operation associated with the third user interface element. For example, as described herein with reference to FIGS. 7L-7O, raised region 7054-*d* of user interface element 7054 is optionally layered onto or placed on top of user interface element 7054.

In some embodiments, the third user interface element, comprising the third region of the simulated three-dimensional object, is raised away from the surface of the simulated three-dimensional object in response to a first portion of the input directed to the third user interface element, and the respective operation associated with the third user interface element is performed in response to a second, subsequent portion of the input directed to the third user interface element, as described in more detail herein with reference to method 12000 (e.g., the first portion of the input involving the user directing attention to the third user interface element, and the second portion of the input involving the user performing a selection gesture, such as an air gesture, directed toward the third user interface element, optionally while the user's attention remains directed to the third user interface element). In some embodiments, displaying the third user interface element as raised up or away from the surface of the simulated three-dimensional object is performed in accordance with a determination that the third user interface element is the first type of user interface element (e.g., a button or activatable control). In some embodiments, the third user interface element is raised a first amount in response to a first type of input (e.g., detecting that the user is gazing at the third user interface element and/or that the user's hand is in a predefined ready state), and a different second amount in response to a different second type of input (e.g., detecting that the user's hand is in a predefined ready state and/or that a predefined gesture, such as an air gesture, is being performed), as described in more detail herein with reference to method 12000. In some embodiments, the simulated three-dimensional object includes any number of etched regions each optionally corresponding to a respective user interface element and/or any number of raised regions each optionally corresponding to a respective user interface element, and a user may direct an input to a respective user interface element to perform a respective associated operation in the user interface.

Displaying a region of a simulated three-dimensional object as a portion of material raised from the surface of the simulated object and associating the region with a user interface element distinguishes the region from other regions along the surface of the simulated object and provides visual feedback to the user that the raised region can be interacted with to perform an operation in the user interface, as well as distinguishes the type of user interface operation associated with the raised region from the type(s) of user interface operations associated with recessed regions displayed with the appearance of removed portions of material from the surface of the user interface element, which provides improved feedback to the user.

In some embodiments, content of the simulated three-dimensional object (e.g., application content) is displayed behind a front surface of the simulated three-dimensional object in a second portion of the simulated three-dimensional object with simulated thickness, wherein the front surface of the simulated three-dimensional object corresponds to a portion of an exterior surface of the simulated three-dimensional object that faces a viewpoint of a user (e.g., as described herein with reference to content displayed as embedded in user interface element 7050 and/or content displayed as embedded in user interface element 7052 in FIG. 7K). In some embodiments, the content of the simulated three-dimensional object is displayed as embedded in the respective simulated material of the simulated three-dimensional object. In some embodiments, the content of the simulated three-dimensional object is displayed along a back surface of the simulated three-dimensional object (e.g., opposite and facing away from the viewpoint of the user). Displaying content as embedded within (e.g., between two surfaces of) a simulated three-dimensional object simulates the appearance of an object made of a transparent or partially transparent material and distinguishes the content from other user interface elements such as content entry regions or activatable controls displayed as recessed or raised regions with respect to the surface of the simulated object, as well as from other user interface elements that are not interactive and/or are representations of physical objects in a physical environment surrounding the user, which provides improved feedback to the user and improves the user's context awareness, which improves user safety by helping the user to avoid collisions with physical objects in the physical space and reduces the likelihood that the user will suffer from motion sickness when using the computer system.

In some embodiments, the simulated three-dimensional object is displayed at a first time with a first set of characteristics at a first position relative to a viewpoint of the user. In some embodiments, the first set of characteristics include characteristics other than position, such as depth, thickness, brightness, color, and/or color temperature. In some embodiments, after the first time, the simulated three-dimensional object is moved to a second position relative to the viewpoint of the user. In some embodiments, the computer system, in response to the change in position of the simulated three-dimensional object relative to the viewpoint of the user, displays the simulated three-dimensional object at the second position with a second set of characteristics that are different from the first set of characteristics in accordance with the changed viewpoint of the user.

In some embodiments, in response to the change in position of the simulated three-dimensional object relative to the viewpoint of the user, the thickness of the simulated three-dimensional object is changed. In some embodiments, accordingly, the appearance of one or more edges of the simulated three-dimensional object is changed to show the visual effect of light reflecting from the one or more edges based on the changed thickness of the simulated three-dimensional object (e.g., corresponding to light reflecting from a thicker edge, if the thickness of the simulated three-dimensional object is increased, or from a thinner edge, if the thickness of the simulated three-dimensional object is decreased). For example, as described herein with reference to FIGS. 7L-7M, the thickness of user interface element 7054 is increased in FIG. 7M beyond the proportional increase in thickness that is associated with the movement of user interface element 7054 from its position further from the viewpoint of the user in FIG. 7L to its position closer to the viewpoint of the user in FIG. 7M.

In the physical world, as the spatial relationship between a physical object and the viewpoint of the user changes (e.g., the object and the viewpoint of the user are moved relative to each other), with the dimensions of the object remaining the same, the object appears to the user proportionally larger when closer to the user and proportionally smaller when further from the user. In a computer-generated three-dimensional environment, a computer-generated (e.g., simulated) object may be displayed with dimensions that are independent of the spatial relationship between the simulated object and the viewpoint of the user, such as the object being displayed as changed in one or more dimensions beyond the proportional change associated with spatial movement. Decoupling, and exaggerating, the displayed visual change in the dimensions of an object relative to the proportional change associated with spatial movement reinforces the appearance of the user interface object as a computer-generated, simulated object and distinguishes the simulated object from other displayed representations of objects that correspond to physical objects in the user's surrounding physical environment, which provides improved feedback to the user and improves the user's context awareness, which improves user safety by helping the user to avoid collisions with physical objects in the physical space and reduces the likelihood that the user will suffer from motion sickness when using the computer system.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 12000, 13000, and 14000) are also applicable in an analogous manner to method 11000 described above with respect to FIG. 11. For example, the user interface elements or objects, including appearances and regions thereof, physical objects and/or representations of physical objects, virtual objects, user viewpoints, movements, three-dimensional environments, including views and appearances thereof, display generation component, light sources, reflections, and/or shadows described above with reference to method 11000 optionally have one or more of the characteristics of the user interface elements or objects, including appearances and regions thereof, physical objects and/or representations of physical objects, virtual objects, user viewpoints, movements, three-dimensional environments, including views and appearances thereof, display generation component, light sources, reflections, and/or shadows described herein with reference to other methods described herein (e.g., methods 8000, 9000, 10000, 12000, 13000, and 14000). For brevity, these details are not repeated here.

Figure 12:
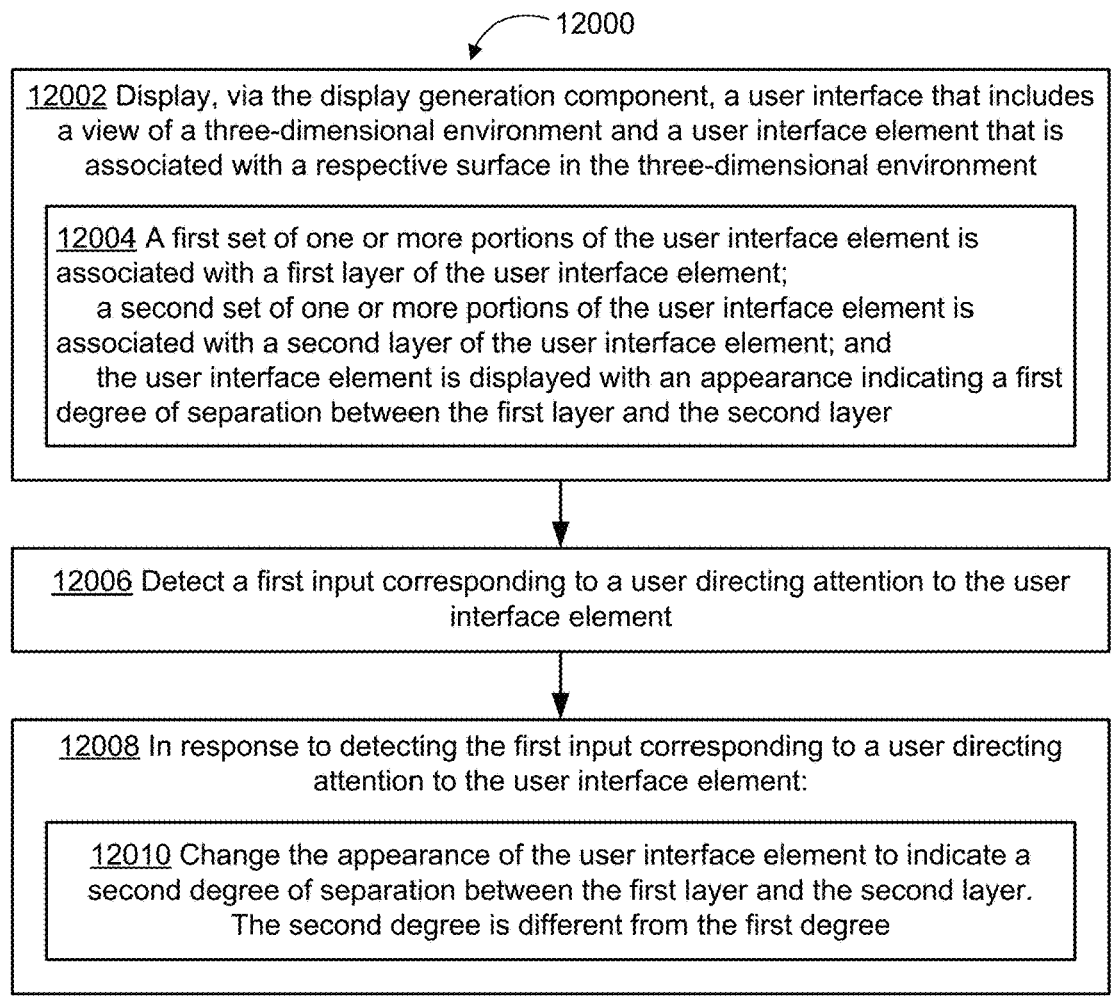
FIG. 12 is a flowchart of a method of separating layers of a user interface element to different degrees in response to different user interactions including a user directing attention to the user interface element, in accordance with some embodiments.

FIG. 12 is a flowchart of a method 12000 of separating layers of a user interface element to different degrees in response to different user interactions including a user directing attention to the user interface element, in accordance with some embodiments.

In some embodiments, the method 12000 is performed at a computer system (e.g., computer system 101 in FIG. 1) that includes or is in communication with a display generation component (e.g., display generation component 120 in FIGS. 1, 3, and 4) (e.g., a heads-up display, a display, a touchscreen, and/or a projector), and one or more input devices such as one or more cameras (e.g., a camera (e.g., color sensors, infrared sensors, and/or other depth-sensing cameras), for example pointing downward at a user's hand or forward from the user's head. In some embodiments, the method 12000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 12000 are, optionally, combined and/or the order of some operations is, optionally, changed.

In some embodiments, the method 12000 is performed at a computer system (e.g., the computer system 101 in FIG. 1, the computer system 101 described with respect to FIGS. 7A-7G, FIGS. 7H-7J, FIGS. 7K-7O, FIG. 7P, FIGS. 7Q-7W, and/or FIGS. 7X-7Z). In some embodiments, the computer system is in communication with a display generation component (e.g., the display generation component is a heads-up display, a head-mounted display (HMD), a display, a touchscreen, and/or a projector) and optionally one or more input devices (e.g., cameras, controllers, touch-sensitive surfaces, joysticks, buttons, gloves, watches, motion sensors, and/or orientation sensors). In some embodiments, the display generation component is a display generation component 7100 described with respect to FIGS. 7A-7Z. In some embodiments, the computer system is an integrated device with one or more processors and memory enclosed in the same housing as the display generation component and at least some of one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the display generation component and/or the one or more input devices. In some embodiments, the display generation component and the one or more input devices are integrated and enclosed in the same housing. Many of the features of the method 12000 are described with respect to FIG. 7P, in accordance with some embodiments.

In method 12000, the computer system displays (12002), via the display generation component, a user interface that includes a view of a three-dimensional environment and a user interface element that is associated with a respective surface (e.g., a front surface of a user interface platter such as user interface element 7054 in FIG. 7L, or a common plane on which a cluster of icons 7070 are displayed as shown in FIG. 7P) in the three-dimensional environment. A first set of one or more portions of the user interface element is (12004) associated with (e.g., included in) a first layer of the user interface element; a second set of one or more portions of the user interface element is associated with a second layer of the user interface element; and the user interface element is displayed with an appearance indicating a first degree of separation between the first layer and the second layer. In some embodiments, the first degree of separation is zero while a user is not directing focus to the user interface element.

In method 12000, the computer system detects (12006) a first input corresponding to a user directing attention to the user interface element (e.g., detecting an input corresponding to a user directing attention to the user interface element, such as detecting that the user's gaze is directed toward the user interface element and/or a cursor being moved over the user interface element). In response to detecting the first input corresponding to a user directing attention to the user interface element (12008): the computer system changes (12010) the appearance of the user interface element to indicate a second degree of separation between the first layer and the second layer. The second degree is different from (e.g., greater than) the first degree. In some embodiments, in response to detecting the first input, the appearance of the user interface element is changed to indicate a different degree of separation between one or more layers of the user interface element and the respective surface in the three-dimensional environment. Displaying a user interface element that is associated with a surface in a displayed three-dimensional environment and that includes multiple layered elements, and changing a degree of separation between the multiple layered elements in response to a user directing attention to the user interface element provides the user with visual feedback about which object in the user interface has focus and can be selected or activated in response to further user input, which is particularly helpful in situations where the user input does not involve direct physical contact with the user interface element (e.g., via touch input on a touch-screen), which provides improved feedback to the user.

In some embodiments, the user interface element is activatable to perform a respective operation in the user interface that is distinct from changing the appearance of the user interface element (e.g., distinct from changing the degree of separation between different layers of the user interface element). In some embodiments, in response to detecting the first input corresponding to a user directing focus to the user interface element, the appearance of the user interface element is changed without (yet) performing the respective operation (e.g., additional interaction is needed in order for the respective operation to be performed) (e.g., changing the appearance of the user interface element provides visual feedback that is indicative of interaction with the user interface element and that is distinct from the user interface operation performed in response to interaction with the user interface element). For example, as described herein with reference to FIG. 7P, in response to user 7002 gazing at icon 7060, the degrees of separation between layers 7060-1 through 7060-3 are changed, although activation of icon 7060 (e.g., to launch an application, open a file, start a communication session, or other associated operation) is not performed until a selection gesture directed to icon 7060 is performed (e.g., an air gesture such as a pinch while the user's gaze is directed to the icon or a tap at a location in the three-dimensional environment corresponding to the icon). Configuring a user interface element, whose appearance is changed to indicate a different a degree of separation between its multiple layered elements in response to a user directing attention to the user interface element, to be activatable to perform one or more operations in the user interface provides the user with visual feedback about which object in the user interface has focus and will trigger the performance of one or more operations in the user interface in response to further user input, which provides improved feedback to the user and reduces the number of inputs needed to perform an operation.

In some embodiments, detecting the first input includes detecting that the user is gazing at (e.g., or toward) the user interface element (e.g., and optionally detecting that the user's hand is not in a predefined ready state, or without regard to whether the user's hand is in or moving into a predefined ready state). For example, as described herein with reference to FIG. 7P, in response to user 7002 gazing at icon 7060 as shown in scenario 7064 (e.g., without hand 7020 being in a ready state), the degrees of separation between layers 7060-1 through 7060-3 is changed to that shown in view 7076. Configuring a user interface element to be activatable to perform one or more operations in the user interface in response to a user gazing at the user interface element, and changing the appearance of the user interface element to indicate a different a degree of separation between its multiple layered elements accordingly, provides an intuitive, simple, and fast mechanism for interacting with the user interface, which provides improved feedback to the user and reduces the number of inputs needed to perform an operation.

In some embodiments, detecting the first input includes detecting that a hand of the user is in a predefined ready state (e.g., and optionally detecting that the user is not gazing at the user interface element, or without regard to whether the user is gazing at the user interface element). In some embodiments, a user's hand is in the predefined ready state if the user's hand is raised (e.g., rather than down at the user's side, and optionally if the user's hand is raised with the elbow bent rather than the arm extended) and/or in a configuration that indicates readiness to perform a gesture, such as with the palm facing down and the index finger extended and/or raised, or with the palm facing inward (e.g., toward the user's midline) and the thumb resting on the index finger, or other predefined hand configuration. For example, as described herein with reference to FIG. 7P, in response to user 7002 gazing at icon 7060 with hand 7020 in the ready state as shown in scenario 7066, the degrees of separation between layers 7060-1 through 7060-3 is changed to that shown in view 7078. Configuring a user interface element to be activatable to perform one or more operations in the user interface in response to a user's hand being in a predefined ready state, and changing the appearance of the user interface element to indicate a different a degree of separation between its multiple layered elements accordingly, provides an intuitive, simple, and fast mechanism for interacting with the user interface, which provides improved feedback to the user and reduces the number of inputs needed to perform an operation.

In some embodiments, detecting the first input includes detecting that the user is gazing at the user interface element and that a hand of the user is in a predefined ready state. For example, as described herein with reference to FIG. 7P, in response to user 7002 gazing at icon 7060 with hand 7020 in the ready state as shown in scenario 7066, the degrees of separation between layers 7060-1 through 7060-3 is changed to that shown in view 7078. Configuring a user interface element to be activatable to perform one or more operations in the user interface in response to a user gazing at the user interface element while the user's hand is in a predefined ready state, and changing the appearance of the user interface element to indicate a different a degree of separation between its multiple layered elements accordingly, provides an intuitive, simple, and fast mechanism for interacting with the user interface, which provides improved feedback to the user and reduces the number of inputs needed to perform an operation.

In some embodiments, in accordance with a determination that the input is a first type of input that includes the user's gaze being toward the user interface element (e.g., without a hand of the user being in or moving into a predefined ready state), the second degree of separation has a first magnitude (which is different from a magnitude of the first degree of separation). In some embodiments, in accordance with a determination that the input is a second type of input that includes the user's gaze being directed toward the user interface element and a hand of the user being in a predefined ready state, the second degree of separation has a second magnitude that is different from the first magnitude (and also different from a magnitude of the first degree of separation). In some embodiments, in response to an input corresponding to the user directing the user's gaze toward the user interface element while the user's hand is (e.g., already) in the predefined ready state, the appearance of the user interface element is changed from indicating the first degree of separation to indicating the second magnitude of the second degree of separation, with or without intervening display of the user interface element with an appearance that indicates the first magnitude of the second degree of separation. In some embodiments, in response to a first respective input (or a first portion of a respective input) corresponding to the user directing the user's gaze toward the user interface element while the user's hand is not in the predefined ready state, the appearance of the user interface element is changed from indicating the first degree of separation to indicating the first magnitude of the second degree of separation. In some embodiments, in response to a second respective input (or a second portion of the respective input) corresponding to the user's hand moving into the predefined ready state while the user's gaze is directed toward the user interface element, the appearance of the user interface element is (e.g., further) changed from indicating the first magnitude of the second degree of separation to indicating the second magnitude of the second degree of separation. For example, as described herein with reference to FIG. 7P, in response to user 7002 gazing at icon 7060 as shown in scenario 7064 without hand 7020 being in a ready state, the degrees of separation between layers 7060-1 through 7060-3 is changed to that shown in view 7076, whereas in response to user 7002 gazing at icon 7060 with hand 7020 in the ready state as shown in scenario 7066, the degrees of separation between layers 7060-1 through 7060-3 is changed to that shown in view 7078. Indicating different degrees of separation between multiple layered elements of a user interface element in response to different types of input directed to the user interface element, and in particular in response to gaze inputs versus gaze inputs with the user's hand in a predefined ready state, enables disambiguation between different inputs and associated operation(s) to be performed in the user interface and provides the user with visual feedback about which type of input has been detected and which operation(s) will be performed in the user interface in response, which provides improved feedback to the user and provides additional control options without cluttering the user interface with additional displayed controls.

In some embodiments, after detecting the first input, while the appearance of the user interface element indicates the second degree of separation between the first layer and the second layer, the computer system detects a second input corresponding to selection of the user interface element (e.g., a selection gesture, for example an air gesture such as a pinch while the user's gaze is directed to the user interface element or a tap at a location in the three-dimensional environment corresponding to the user interface element). In some embodiments, in response to detecting the second input, the computer system changes the appearance of the user interface element to indicate a third degree of separation between the first layer and the second layer. In some embodiments, the third degree of separation is less than the second degree of separation. In some embodiments, in response to detecting an end of the second input (e.g., a subsequent portion of the second input, such as a release gesture), a respective operation in the user interface that is distinct from changing the appearance of the user interface element is performed. For example, as described herein with reference to FIG. 7P, in response to user 7002 performing a selection gesture (e.g., while gazing at icon 7060) as described with reference to scenario 7066, the degrees of separation between layers 7060-1 through 7060-3 is decreased from that shown in view 7078, and an operation associated with icon 7060 is performed in environment 7104 in response to completion of the selection gesture. Reducing the degree of separation between the layers of a user interface element that has focus, in response to further input directed to the user interface element after attention is directed to the user interface element, provides the user with visual feedback that the user interface element that has focus has been selected for further interaction, which is particularly helpful in situations where the user input does not involve direct physical contact with the user interface element (e.g., via touch input on a touchscreen), which provides improved feedback to the user.

In some embodiments, the second input includes progression of an input to perform a predefined gesture. In some embodiments, the predefined gesture is a pinch where two fingers are moving toward each other. In some embodiments, the predefined gesture is a tap gesture, for example at a location on a touch-sensitive surface that corresponds to the displayed user interface element. Typically, in implementations in which the predefined gesture is a gesture performed in the air (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's gaze to determine the target of the user input. Thus, in implementations involving air gestures, the predefined gesture is, for an air tap gesture for example, a gaze toward the user interface element in combination (e.g., concurrent) with movement of a user's finger toward the user interface element, movement of the user's hand toward the user interface element optionally with the user's finger extended toward the user interface element, a downward motion of a user's finger (e.g., mimicking a mouse click motion or a tap on a touchscreen), or other predefined movement.

In some embodiments, as the predefined gesture progresses (e.g., the progression of the input progresses the predefined gesture, such as by movement of two fingers toward each other in a pinch gesture, or movement of a finger toward the user interface element in a tap gesture), the computer system (e.g., gradually) progresses the change in the appearance of the user interface element toward indicating the third degree of separation (e.g., reducing the degree of separation between the first layer and the second layer) by an amount corresponding to an amount of progression of the input. In some embodiments, as the predefined gesture is reversed (e.g., the progression of the input reverses the predefined gesture, such as by reversing a pinch gesture by movement of the two fingers away from each other, or by reversing a tap gesture by movement of the finger away from the user interface element), the computer system (e.g., gradually) reverses the change in the appearance of the user interface element toward indicating the second degree of separation (e.g., increasing the degree of separation between the first layer and the second layer) by an amount corresponding to an amount of progression of the input. For example, as described herein with reference to FIG. 7P, in response to progression of a selection gesture as described with reference to scenario 7066, the degrees of separation between layers 7060-1 through 7060-3 are changed, whereas the changes in the degrees of separation are reversed in response to reversal of the selection gesture prior to completion of the selection gesture. Gradually progressing the reduction in the degree of separation between the layers of a user interface element that has focus, in response to further input directed to the user interface element that progresses a predefined gesture after attention is directed to the user interface element, and enabling reversal of the reduction in the degree of separation in response to reversal of the predefined gesture, provides the user with visual feedback that the user interface element that has focus has been selected for further interaction and provides the user with greater control over whether to progress or cancel the interaction with the selection, which provides improved feedback to the user and provides additional control options without cluttering the user interface with additional displayed controls.

In some embodiments, the computer system displays the second set of one or more portions of the user interface element with a visual effect of the first set of one or more portions of the user interface element, associated with the first layer, casting light onto the second layer. In some embodiments, the first set of one or more portions of the user interface element is displayed with an appearance that simulates the second set of one or more portions of the user interface element, associated with the second layer, casting light onto the first layer. For example, as described herein with reference to FIG. 7P, layers 7060-1 through 7060-3 optionally are displayed as casting light on each other. Displaying a visual effect of a respective layer of the user interface element casting light onto another layer of the user interface element and/or different layers casting light onto each other enhances the appearance of the layers of the user interface element as being separated from each other, which enhances the visual feedback provided to the user identifying the object with which the user is interacting, which provides improved feedback to the user.

In some embodiments, the visual effect simulates the first set of one or more portions of the user interface element reflecting light (e.g., from a light source in the three-dimensional environment that is distinct from the first set of one or more portions of the user interface element) onto the second set of one or more portions of the user interface element. For example, as described herein with reference to FIG. 7P, layers 7060-1 through 7060-3 optionally are displayed as reflecting light onto each other from one or more separate (e.g., physical and/or simulated) light sources in environment 7104. Displaying a visual effect of a respective layer of the user interface element reflecting light onto another layer of the user interface element and/or different layers reflecting light onto each other enhances the appearance of the layers of the user interface element as being separated from each other, which enhances the visual feedback provided to the user identifying the object with which the user is interacting, which provides improved feedback to the user.

In some embodiments, the visual effect simulates the first set of one or more portions of the user interface element emitting light onto the second set of one or more portions of the user interface element (e.g., the first set of one or more portions of the user interface element act as a light source). For example, as described herein with reference to FIG. 7P, layers 7060-1 through 7060-3 optionally are displayed as emitting light onto each other. Displaying a visual effect of a respective layer of the user interface element emitting light onto another layer of the user interface element and/or different layers emitting light onto each other enhances the appearance of the layers of the user interface element as being separated from each other, which enhances the visual feedback provided to the user identifying the object with which the user is interacting, which provides improved feedback to the user.

In some embodiments, the computer system displays the second set of one or more portions of the user interface element with an appearance that simulates the first set of one or more portions of the user interface element, associated with the first layer, casting one or more shadows onto the second layer. For example, as described herein with reference to FIG. 7P, layers 7060-1 through 7060-3 optionally are displayed as casting shadow onto each other. Displaying a visual effect of a respective layer of the user interface element casting shadow onto another layer of the user interface element and/or different layers casting shadows onto each other enhances the appearance of the layers of the user interface element as being separated from each other, which enhances the visual feedback provided to the user identifying the object with which the user is interacting, which provides improved feedback to the user.

In some embodiments, in response to detecting the first input, the computer system displays an animation of one or more portions of the user interface element (e.g., in addition to separating layers of the user interface element). In some embodiments, the animation is progressed in response to progression of the input that progresses a predefined gesture, and the animation is reversed in response to progression of the input that reverses the predefined gesture, as described in further detail herein with reference to method 12000. For example, as described herein with reference to FIG. 7P, icon 7060 is in some embodiments animated in response to an input directing attention to and/or performing a selection gesture directed to icon 7060. Displaying an animation of at least part of the user interface element in response to the user directing attention to the user interface element, in combination with changing the degree of separation between multiple layered elements of the user interface element, enhances the visual feedback provided to the user identifying the object with which the user is interacting, which provides improved feedback to the user.

In some embodiments, displaying the animation of the one or more portions of the user interface element includes rotating one or more portions of the user interface element (e.g., rotating or spinning a graphic such as an icon or glyph, such as rotating or spinning the envelope graphic of icon 7060 in FIG. 7P). Displaying an animation of at least part of the user interface element rotating in response to the user directing attention to the user interface element, in combination with changing the degree of separation between multiple layered elements of the user interface element, enhances the visual feedback provided to the user identifying the object with which the user is interacting, which provides improved feedback to the user.

In some embodiments, displaying the animation of the one or more portions of the user interface element includes sliding one or more portions of the user interface element in a respective direction (e.g., along or relative to another portion of the user interface element, such as moving a slider thumb along a slider, or sliding the envelope graphic of icon 7060 past the circle element of icon 7060 in FIG. 7P). Displaying an animation of at least part of the user interface element sliding in a respective direction in response to the user directing attention to the user interface element, in combination with changing the degree of separation between multiple layered elements of the user interface element, enhances the visual feedback provided to the user identifying the object with which the user is interacting, which provides improved feedback to the user.

In some embodiments, displaying the animation of the one or more portions of the user interface element includes changing a scale of one or more elements of a displayed graphic followed by reversing the change in scale of the one or more elements of the displayed graphic (e.g., increasing scale followed by decreasing scale, and/or decreasing scale followed by increasing scale, such as expansion followed by contraction and/or contraction followed by expansion, for example to represent breathing in and then out or vice versa). Using the example from FIG. 7P, the animation of icon 7060 optionally includes successively shrinking and enlarging, and/or rotating or spinning, the envelope graphic and/or circle element of icon 7060. In some embodiments, displaying the animation includes changing the scale of a displayed graphic and reversing the change in scale. In some embodiments, displaying the animation includes changing the scale of multiple elements that make up a displayed graphic and reversing the change in scale, and meanwhile optionally moving (e.g., translating) and/or rotating the elements of the graphic relative to each other (or moving and/or rotating the graphic as a whole). In some embodiments, displaying the animation includes repeating a portion of the animation (e.g., repeatedly increasing and decreasing scale, for example to represent breathing in and then out repeatedly). Displaying an animation of at least part of the user interface element successively increasing and decreasing in scale, or vice versa, in response to the user directing attention to the user interface element, in combination with changing the degree of separation between multiple layered elements of the user interface element, enhances the visual feedback provided to the user identifying the object with which the user is interacting, which provides improved feedback to the user.

In some embodiments, displaying the animation of the one or more portions of the user interface element includes displaying a preview of content associated with the user interface element (e.g., the user interface element is a file such as a document, image, video, or email, and the animation includes displaying a preview of the file and/or information about or metadata of the file; the user interface element is a folder of files, and the animation includes displaying a preview of the files in the folder; or the user interface element is an application icon that is activatable to launch the application, and the animation includes displaying a user interface of the application). For example, as shown in FIG. 7P, icon 7060 includes an envelope graphic (e.g., representative of e-mail), and the animation optionally includes displaying a preview of an e-mail associated with icon 7060. In some embodiments, the preview is displayed over a portion of the displayed user interface (e.g., less than all, or less than substantially all, of the user interface, such as less than 90%, 80%, 70%, 60%, 50%, or any other amount between 10% and 100% of the user interface). Displaying an animation that reveals a preview of content associated with the user interface element in response to the user directing attention to the user interface element, in combination with changing the degree of separation between multiple layered elements of the user interface element, enhances the visual feedback provided to the user identifying the object with which the user is interacting and provides an indication as to the type of operation that is configured to be performed in response to further interaction with the user interface element, which provides improved feedback to the user.

In some embodiments, the user interface element includes a representation of an envelope (e.g., an envelope icon or graphic, optionally associated with a communication application or a communication file such as e-mail, as shown for example in icon 7060 in FIG. 7P), and displaying the animation of the one or more portions of the user interface element includes displaying an animation of opening the envelope. Displaying an animation that reveals a preview of content associated with the user interface element in response to the user directing attention to the user interface element, in combination with changing the degree of separation between multiple layered elements of the user interface element, enhances the visual feedback provided to the user identifying the object with which the user is interacting and provides an indication as to the type of operation that is configured to be performed in response to further interaction with the user interface element, which provides improved feedback to the user.

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 13000, and 14000) are also applicable in an analogous manner to method 12000 described above with respect to FIG. 12. For example, the user interface elements or objects, including appearances and regions thereof, virtual objects, layers, degrees or amounts of separation, user viewpoints, movements, three-dimensional environments, including views and appearances thereof, display generation component, inputs, gestures, animations, user interface operations, light sources, reflections, and/or shadows described above with reference to method 12000 optionally have one or more of the characteristics of the user interface elements or objects, including appearances and regions thereof, virtual objects, layers, degrees or amounts of separation, user viewpoints, movements, three-dimensional environments, including views and appearances thereof, display generation component, inputs, gestures, animations, user interface operations, light sources, reflections, and/or shadows described herein with reference to other methods described herein (e.g., methods 8000, 9000, 10000, 11000, 13000, and 14000). For brevity, these details are not repeated here.

Figure 13:
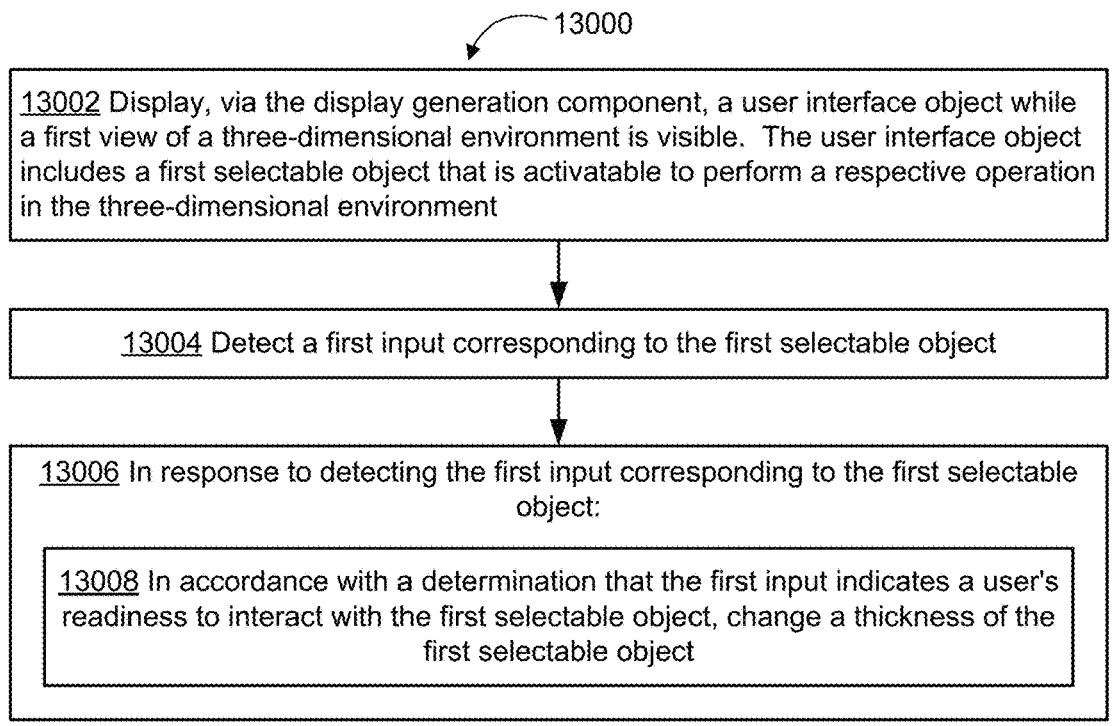
FIG. 13 is a flowchart of a method of changing the appearance of a selectable user interface object in response to an input that corresponds to and indicates readiness to interact with the selectable user interface object, in accordance with some embodiments.

FIG. 13 is a flowchart of a method 13000 of changing the appearance of a selectable user interface object in response to an input that corresponds to and indicates readiness to interact with the selectable user interface object, in accordance with some embodiments.

In some embodiments, the method 13000 is performed at a computer system (e.g., computer system 101 in FIG. 1) that is in communication with a display generation component (e.g., display generation component 120 in FIGS. 1, 3, and 4, such as display 7100 in FIGS. 7A-7Z) (e.g., a heads-up display, a display, a touchscreen, and/or a projector), and optionally one or more input devices such as one or more cameras (e.g., a camera (e.g., color sensors, infrared sensors, and/or other depth-sensing cameras), for example pointing downward at a user's hand or forward from the user's head. In some embodiments, the method 13000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 13000 are, optionally, combined and/or the order of some operations is, optionally, changed.

In some embodiments, the method 13000 is performed at a computer system (e.g., the computer system 101 in FIG. 1, the computer system 101 described with respect to FIGS. 7A-7G, FIGS. 7H-7J, FIGS. 7K-7O, FIG. 7P, FIGS. 7Q-7W, and/or FIGS. 7X-7Z). In some embodiments, the computer system is in communication with a display generation component (e.g., the display generation component is a heads-up display, a head-mounted display (HMD), a display, a touchscreen, and/or a projector) and optionally one or more input devices (e.g., cameras, controllers, touch-sensitive surfaces, joysticks, buttons, gloves, watches, motion sensors, and/or orientation sensors). In some embodiments, the display generation component is a display generation component 7100 described with respect to FIGS. 7A-7Z. In some embodiments, the computer system is an integrated device with one or more processors and memory enclosed in the same housing as the display generation component and at least some of one or more input devices. In some embodiments, the computer system includes a computing component (e.g., a server, a mobile electronic device such as a smart phone or tablet device, a wearable device such as a watch, wristband, earphones, a desktop computer, or a laptop computer) that includes one or more processors and memory that is separate from the display generation component and/or the one or more input devices. In some embodiments, the display generation component and the one or more input devices are integrated and enclosed in the same housing. Many of the features of the method 13000 are described with respect to FIGS. 7Q-7W, in accordance with some embodiments.

In method 13000, the computer system displays (13002), via the display generation component, a user interface object while a first view of a three-dimensional environment (e.g., environment 7104 (FIG. 7Q)) is visible (e.g., via the display generation component). The user interface object (e.g., user interface object 7080 (FIG. 7Q)) includes a first selectable object (e.g., any of regions 7080-b, 7080-c, or 7080-d (FIG. 7Q)) that is activatable to perform a respective operation in the three-dimensional environment. In some embodiments, the first selectable object occupies a first region of the user interface object (e.g., any of regions 7080-b, 7080-c, or 7080-d (FIG. 7Q)), and a surface of the first region of the user interface object (e.g., the surface of the first selectable object) is displayed with a first degree of separation from a surface of a second region of the user interface object (e.g., region 7080-a (FIG. 7Q)), wherein the second region is different from (e.g., adjacent to) the first region. In some embodiments, the first degree of separation is zero (e.g., no separation; the surface of the first region is flush with the surface of the second region).

In method 13000, the computer system detects (13004) a first input corresponding to the first selectable object (e.g., a first input indicative of a user's readiness to interact with the first selectable object). In response to detecting the first input corresponding to the first selectable object (13006): in accordance with a determination that the first input indicates a user's readiness to interact with the first selectable object, the computer system changes (13008) (e.g., increases) a thickness of the first selectable object (e.g., without performing the respective operation in the three-dimensional environment). For example, as shown in and described with reference to FIGS. 7R and 7T, in response to detection of user 7002's attention directed to region 7080-b, the thickness of region 7080-b is increased. In another example, as shown in and described with reference to FIG. 7S, in response to detection of user 7002's attention directed to region 7080-c, the thickness of region 7080-c is increased. In some embodiments, changing the thickness of the first selectable object of the user interface object (e.g., from a first thickness to a second thickness) in response to detecting the first input that indicates a user's readiness to interact with the first selectable object includes (or is performed in addition to) displaying the surface of the first selectable object with a second degree of separation from the surface of the second region of the user interface object, wherein the second degree of separation is different from (e.g., greater than) the first degree of separation. In some embodiments, the first thickness is zero (e.g., the first selectable object is flush with a surface of the user interface object) (e.g., as is the case for regions 7080-b, 7080-c, and 7080-d being flush with the surface of user interface object 7080 in FIG. 7Q). In some embodiments, in accordance with a determination that the first input does not indicate a user's readiness to interact with the first selectable object, the computer system does not change the thickness of the first selectable object (e.g., the thickness of region 7080-*d* remains unchanged in FIGS. 7Q-7W, because the inputs from user 7002 in FIGS. 7R-7V are not directed $t_0$, and do not indicate user 7002's readiness to interact with, region 7080-*d*, and because no other input indicating user 7002's readiness to interact with region 7080-*d* is detected). Changing a thickness of a selectable object in response to an input that indicates a user's readiness (e.g., intent) to interact with the selectable object indicates which part of the user interface currently has focus for further interaction, which provides improved visual feedback about a state of the computer system.

In some embodiments, determining that the first input indicates the user's readiness to interact with the first selectable object includes determining that the user is directing attention to the first selectable object (e.g., the user's gaze is directed to the first selectable object). For example, as shown in and described with reference to FIGS. 7R-7T, user 7002's readiness to interact with a respective selectable region of user interface element 7080 is determined based on user 7002 directing attention to the respective selectable region. Requiring that a user be paying attention to a selectable object to enable interaction with the selectable object causes the computer system to automatically discern user intent more accurately and thereby reduce input mistakes and unintended outcomes.

In some embodiments, determining that the first input indicates the user's readiness to interact with the first selectable object includes determining that a hand of the user is in a ready state (e.g., and optionally determining that the user is gazing at the first selectable object in conjunction with the hand of the user being in the ready state). For example, as shown in and described with reference to FIG. 7R, user 7002's readiness to interact with a respective selectable region of user interface element 7080 is determined based on user 7002's hand being in a ready state, instead of or in addition to user 7002 directing attention to the respective selectable region. Requiring that a user have their hand in a ready state to enable interaction with the selectable object causes the computer system to automatically discern user intent more accurately and thereby reduce input mistakes and unintended outcomes.

In some embodiments, changing the thickness of the first selectable object includes displaying an animation of a gradual increase in the thickness of the first selectable object (e.g., from the first thickness to the second thickness). For example, as described with reference to FIG. 7R, the increase in thickness of a respective region, such as region 7080-*b* (or analogously region 7080-*c* (FIG. 7S)), is displayed via an animation of the increase in thickness. Animating the increase in thickness of a selectable object in response to detecting a user's intent to interact with the selectable object provides improved visual feedback about a state of the computer system in a less visually jarring way.

In some embodiments, the computer system indicates the thickness of the first selectable object by displaying a visual effect of simulated light reflecting from one or more edges of the first selectable object (e.g., based on a respective simulated material of the first selectable object). For example, as shown in and described with reference to FIGS. 7R-7V, while a respective selectable region of user interface element 7080 has an increased thickness, specular reflection from one or more edges of the respective selectable region and indicative of the thickness is displayed. In some embodiments, an extent of the visual effect of reflected light is based on the thickness of the first selectable object. In some embodiments, the (e.g., extent of the) visual effect of light reflecting from the one or more edges of the first selectable object is gradually updated as the thickness of the first selectable object is gradually changed (e.g., increased as the animation progresses). Displaying simulated specular reflection from the edges of a selectable object to indicate the object's thickness improves the user's context awareness and provides improved visual feedback about a state of the computer system.

In some embodiments, in combination with changing (e.g., increasing) the thickness of the first selectable object, the computer system changes (e.g., increases) an amount by which the visual effect of simulated light reflecting from the one or more edges of the first selectable object extends toward a center of the first selectable object (e.g., including, for an increase in the thickness of the first selectable object, increasing the apparent amount of light reflecting from the first selectable object, such as by showing the reflection extending further along one or more edges of the first selectable object and/or displaying light internally reflecting further within the first selectable object, if the first selectable object simulates a transparent or semi-transparent simulated material). For example, as described with reference to FIG. 7R, the amount and/or extent of specular reflection from a respective region, such as region 7080-*b* (or analogously region 7080-*c* (FIG. 7S)), is changed correspondingly as the thickness of the respective region is changed. Changing the amount and extent of simulated specular reflection from the edges of a selectable object based on changes in the object's thickness improves the user's context awareness and provides improved visual feedback about a state of the computer system.

In some embodiments, the first view of the three-dimensional environment is visible from a viewpoint of the user, and, in response to detecting the first input, and in accordance with the determination that the first input indicates the user's readiness to interact with the first selectable object (e.g., in combination with changing the thickness of the first selectable object), the computer system decreases a simulated distance between the first selectable object and the viewpoint of the user (e.g., displays the first selectable object so as to appear as moving toward the viewpoint of the user). For example, as shown in and described with reference to FIGS. 7R and 7T, in response to user 7002 directing attention to region 7080-*b*, region 7080-*b* is separated and lifted away from the surface of user interface element 7080, and brought closer to the viewpoint of user 7002. In another example, as shown in and described with reference to FIG. 7S, in response to user 7002 directing attention to region 7080-*c*, region 7080-*c* is separated and lifted away from the surface of user interface element 7080, and brought closer to the viewpoint of user 7002. Moving a selectable object closer to the user's viewpoint in response to an input that indicates the user's readiness to interact with the selectable object emphasizes that the selectable object has focus for further interaction, which provides improved visual feedback about a state of the computer system.

In some embodiments, decreasing the simulated distance between the first selectable object and the viewpoint of the user increases a degree of separation between the first selectable object and a surface (e.g., a back surface) of the user interface object (e.g., displaying the first selectable object so as to appear as separating from the user interface object and moving away from (e.g., a surface such as the back surface of) the user interface object toward the viewpoint of the user, typically without changing a simulated distance between the viewpoint of the user and the user interface object). In some embodiments, increasing the degree of separation between the first selectable object and the surface of the user interface object changes (e.g., increases) the z-height of the first selectable object relative to the user interface object. For example, as shown in and described with reference to FIGS. 7R and 7T, in response to user 7002 directing attention to region 7080-*b*, region 7080-*b* is separated and lifted away from the surface (e.g., from the front surface, and by extension from the back surface) of user interface element 7080. In another example, as shown in and described with reference to FIG. 7S, in response to user 7002 directing attention to region 7080-*c*, region 7080-*c* is separated and lifted away from the surface (e.g., from the front surface, and by extension from the back surface) of user interface element 7080. As used herein, the thickness of a respective object refers to a dimension of the object (e.g., a measurement of the object from its front surface to its back surface). As used herein, the height of a respective object, also called z-height, refers to a degree of separation between the object and another object (e.g., rather than referring to a dimension of the object). Lifting a selectable object that is part of a user interface object away from other parts of (e.g., the rest of) the user interface object emphasizes that the selectable object has focus for further interaction while deemphasizing other aspects of the user interface object as not having focus, which provides improved visual feedback about a state of the computer system.

In some embodiments, the computer system displays a simulated shadow cast by the first selectable object onto the surface of the user interface object (e.g., based on one or more simulated light sources in the three-dimensional environment and/or one or more real light sources in a physical environment surrounding the display generation component). In some embodiments, the shadow is displayed in combination with increasing the degree of separation between the first selectable object and the surface of the user interface object (e.g., if the surface of the first selectable object is initially flush with the surface of the user interface object, the shadow is not initially displayed). For example, as shown in and described with reference to FIGS. 7R-7T, while a respective selectable region of user interface element 7080 has an increased thickness, a shadow is displayed as being cast onto user interface element 7080. Displaying a simulated shadow cast by a selectable object onto an associated user interface object (e.g., a backing platter) further emphasizes the selectable object that has focus for further interaction over other parts of the user interface object, which provides improved visual feedback about a state of the computer system.

In some embodiments, the user interface object further includes a second selectable object that is activatable to perform a second operation in the three-dimensional environment, wherein the second selectable object is different from the first selectable object, and the second operation is different from the respective operation. In some embodiments, decreasing the simulated distance between the first selectable object and the viewpoint of the user moves the first selectable object relative to the second selectable object (e.g., changes the degree of separation or z-height of the first selectable object relative to the second selectable object). In some embodiments, in response to an input indicating a user's readiness to interact with the first selectable object (e.g., and not with the second selectable object), as the first selectable object is moved away from the user interface object, the second selectable object is not moved relative to the user interface object and/or not moved relative to the viewpoint of the user. For example, as shown in and described herein with reference to FIG. 7R, in response to user 7002 directing attention to region 7080-*b*, region 7080-*b* is brought closer to the viewpoint of user 7002, thus moving region 7080-*b* relative to regions 7080-*c* and 7080-*d*, which are not moved. Lifting a selectable object that is part of a user interface object away from other selectable objects that are part of the user interface object emphasizes the selectable object that has focus for further interaction while deemphasizing other selectable parts of the user interface object as not having focus, which provides improved visual feedback about a state of the computer system.

In some embodiments, in response to detecting the first input, and in accordance with the determination that the first input indicates the user's readiness to interact with the first selectable object (e.g., in combination with changing the thickness of the first selectable object), the computer system changes (e.g., reduces) an opacity of the first selectable object. For example, as shown in and described herein with reference to FIGS. 7R and 7T, in response to user 7002 directing attention to region 7080-*b*, the opacity of region 7080-*b* is decreased relative to its opacity in FIG. 7Q. In another example, as shown in and described herein with reference to FIG. 7S, in response to user 7002 directing attention to region 7080-*c*, the opacity of region 7080-*c* is decreased relative to its opacity in FIG. 7Q. In some embodiments, the opacity of the first selectable object is increased. In some embodiments, in response to detecting the first input, and in accordance with the determination that the first input indicates the user's readiness to interact with the first selectable object, the computer system changes one or more other visual properties of the first selectable object (e.g., increases or decreases brightness, increases or decreases saturation, and/or changes hue). For example, the brightness of the first selectable object is increased. Changing the opacity of a selectable object in response to detecting a user's intent to interact with the selectable object visually distinguishes the selectable object that has focus for further interaction, which provides improved visual feedback about a state of the computer system.

In some embodiments, in response to detecting the first input, and in accordance with the determination that the first input indicates the user's readiness to interact with the first selectable object (e.g., in combination with changing the thickness of the first selectable object), the computer system changes (e.g., increases) a degree of blurring of the first selectable object (e.g., changing, such as increasing, a blur radius of the first selectable object). For example, as described herein with reference to FIGS. 7R and 7T, in response to user 7002 directing attention to region 7080-*b*, the blurriness of content underlying region 7080-*b*, as viewed through region 7080-*b* in FIGS. 7R and 7T, is increased relative to the blurriness of content underlying region 7080-*b* as viewed through region 7080-*b* in FIG. 7Q. In another example, as shown in and described herein with reference to FIG. 7S, in response to user 7002 directing attention to region 7080-*c*, the blurriness of content underlying region 7080-*c*, as viewed through region 7080-*c* in FIG. 7S, is increased relative to the blurriness of content underlying region 7080-*c* as viewed through region 7080-*c* in FIG. 7Q. In some embodiments, the blurring of the first selectable object is applied to the appearance of the first selectable object within the existing boundaries of the first selectable object (e.g., the blurring does not extend the boundaries (e.g., does not feather or soften the edges) of the first selectable object). In some embodiments, where an appearance of the first selectable object is based on an appearance of a portion of the three-dimensional environment that are behind the first selectable object (e.g., further from the viewpoint of the user than the simulated location of the first selectable object in the three-dimensional environment), for example to mimic the appearance of a transparent or semi-transparent material, the blurring of the first selectable object is applied to the appearance of the underlying portion of the three-dimensional environment (e.g., the degree of blurring of the first selectable object changes how the underlying portion of the three-dimensional environment appears "through" the first selectable object). Changing the degree of blurring of a selectable object in response to detecting a user's intent to interact with the selectable object provides improved visual feedback about a state of the computer system, including, in some circumstances, enhancing the visual effect of a simulated semi-transparent material lifting away from an underlying object.

In some embodiments, the user interface object further includes a second selectable object that is activatable to perform a second operation in the three-dimensional environment, wherein the second selectable object is different from the first selectable object, and the second operation is different from the respective operation. In some embodiments, changing the thickness of the first selectable object (e.g., in response to the first input, if the first input indicates the user's readiness to interact with the first selectable object) changes the thickness of the first selectable object relative to a thickness of the second selectable object. For example, as shown in and described herein with reference to FIG. 7R, in response to user 7002 directing attention to region 7080-*b*, region 7080-*b* is increased in thickness, thus changing the thickness of region 7080-*b* relative to, so as to be different from, the thicknesses of regions 7080-*c* and 7080-*d*, which remain unchanged from FIG. 7Q. In some embodiments, the thickness of the second selectable object is not changed in response to an input indicating a user's readiness to interact with the first selectable object (e.g., and not with the second selectable object). Changing a thickness of a selectable object that is part of a user interface object relative to the thicknesses of other selectable objects that are part of the user interface object emphasizes the selectable object that has focus for further interaction while deemphasizing other selectable parts of the user interface object as not having focus, which provides improved visual feedback about a state of the computer system.

In some embodiments, the user interface object further includes a second selectable object that is activatable to perform a second operation in the three-dimensional environment, wherein the second selectable object is different from the first selectable object, and the second operation is different from the respective operation. In some embodiments, the computer system: detects a second input, corresponding to the second selectable object, that indicates the user's readiness to interact with the second selectable object; and, in response to detecting the second input (e.g., and in accordance with a determination that the second input indicates the user's readiness to interact with the second selectable object), changes (e.g., increases) a thickness of the second selectable object (e.g., from a third thickness, which is optionally the same as the first thickness, to a fourth thickness, which is optionally the same as the second thickness). In some embodiments, the second selectable object occupies a respective region of the user interface object, and changing the thickness of the second selectable object includes changing a degree of separation between a surface of the second selectable object and a surface of a region of the user interface object that is adjacent to the respective region. As described herein with respect to the first selectable object, in some embodiments the degree of separation changes from zero (e.g., from no separation to some separation). For example, as shown in and described herein with reference to FIG. 7S, in response to user 7002 directing attention to region 7080-*c*, the thickness of region 7080-*c* is increased. Changing the thickness of a particular selectable object in response to an input that indicates a user's readiness to interact with that particular selectable object indicates which part of the user interface currently has focus for further interaction, which provides improved visual feedback about a state of the computer system.

In some embodiments, changing the thickness of the first selectable object changes the thickness of the first selectable object by a respective amount, and changing the thickness of the second selectable object changes the thickness of the second selectable object by the same respective amount. For example, the amount of increase in the thickness of region 7080-*b* in response to user 7002's attention being directed to region 7080-*b*, in FIG. 7R, is the same as the amount of increase in the thickness of region 7080-*c* in response to user 7002's attention being directed to region 7080-*c*, in FIG. 7S. Changing the thicknesses of different selectable objects by the same amount provides consistent visual feedback about state changes of the same type at the computer system.

In some embodiments, detecting the second input includes detecting that the user's attention has moved from the first selectable object to the second selectable object (e.g., the second input is detected in conjunction with, or after, ceasing to detect the first input indicating the user's readiness to interact with the first selectable object). In some embodiments, detecting the second input includes detecting that the user's attention has moved from the first selectable object to the second selectable object while the user's hand is maintained in a ready state (e.g., as described herein, the user's hand being in the ready state is one of the requirements for readiness to interact with a selectable object, and thus a precondition for the various types of visual feedback provided in response to detecting readiness to interact). In some embodiments, in response to detecting the second input (e.g., in combination with changing the thickness of the second selectable object), the computer system reverses the change in thickness of the first selectable object (e.g., that was performed in response to the first input indicating the user's readiness to interact with the first selectable object). For example, in response to user 7002's attention being moved from region 7080-*b* (FIG. 7R) to region 7080-*c* (FIG. 7S), the thickness of region 7080-*b* (FIG. 7S) is reverted from its appearance in FIG. 7R to its appearance in FIG. 7Q. In another example, in response to user 7002's attention being moved from region 7080-*c* (FIG. 7S) to region 7080-*b* (FIG. 7T), the thickness of region 7080-*c* (FIG. 7T) is reverted from its appearance in FIG. 7S to its appearance in FIG. 7Q. When a user switches from indicating readiness to interact with a first selectable object to indicating readiness to interact with a second selectable object instead, changing the thickness of the second selectable object and reversing the previous change in the thickness of the first selectable object (e.g., displaying changed thickness for only the selectable object that a user is currently indicating readiness to interact with) indicates which part of the user interface currently has focus for further interaction, which provides improved visual feedback about a state of the computer system.

In some embodiments, after detecting the first input, and in accordance with the determination that the first input indicates the user's readiness to interact with the first selectable object, the computer system detects a first portion of an interaction input directed to the first selectable object (e.g., a first portion of the input gesture performed by user 7002's hand 7020 in FIG. 7U). In some embodiments, the interaction input includes a gesture (e.g., an air gesture such as an air pinch or air tap), and optionally must be initiated while the user is indicating readiness to interact with the first selectable object (e.g., initiated while the user is directing attention to, such as by gazing at, the first selectable object, and/or performed by the user's hand starting from the ready state). In some embodiments, in response to detecting the first portion of the interaction input directed to the first selectable object (e.g., prior to detecting an end of the interaction input), the computer system changes an appearance of the first selectable object. One of ordinary skill will recognize that as described herein, changing a respective visual property (e.g., size, opacity, brightness, amount of blurring, or other visual property described herein) of the first selectable object includes increasing a value, amount, or extent of the respective visual property, or alternatively decreasing the value, amount, or extent of the respective visual property. For example, as described herein with reference to FIG. 7U, in response to (e.g., a first portion of, or the initiation of) the input gesture performed by user 7002's hand 7020, while region 7080-*b* is selected for further interaction, the appearance of region 7080-*b* is changed. Further changing the appearance of a selectable object in response to (e.g., the beginning of an) interaction with the selectable object, after previously changing the thickness of the selectable object in response to a user merely indicating readiness to interact with the selectable object, visually emphasizes the part of the user interface that is currently receiving user input, which provides improved visual feedback about a state of the computer system.

In some embodiments, changing the appearance of the first selectable object in response to detecting the first portion of the interaction input includes changing (e.g., reducing, or in some embodiments increasing) a size of the first selectable object (e.g., scaling down). For example, the size of the lifted region 7080-*b* is decreased in FIG. 7U in response to the input gesture performed by hand 7020. Changing a size of a selectable object in response to interaction with the selectable object visually distinguishes the part of the user interface that is currently receiving user input, which provides improved visual feedback about a state of the computer system.

In some embodiments, changing the appearance of the first selectable object in response to detecting the first portion of the interaction input includes changing (e.g., increasing, or in some embodiments reducing) an opacity of the first selectable object. For example, the opacity of the lifted region 7080-*b* is (e.g., further) decreased in FIG. 7U in response to the input gesture performed by hand 7020. Changing an opacity of a selectable object in response to interaction with the selectable object improves the legibility of the selectable object during the interaction and visually distinguishes the part of the user interface that is currently receiving user input, which provides improved visual feedback about a state of the computer system.

In some embodiments, changing the appearance of the first selectable object in response to detecting the first portion of the interaction input includes changing (e.g., reducing, or in some embodiments increasing) a brightness of the first selectable object. For example, the brightness of the lifted region 7080-*b* is decreased in FIG. 7U in response to the input gesture performed by hand 7020. Changing a brightness of a selectable object in response to interaction with the selectable object improves the legibility of the selectable object during the interaction and visually distinguishes the part of the user interface that is currently receiving user input, which provides improved visual feedback about a state of the computer system.

In some embodiments, changing the appearance of the first selectable object in response to detecting the first portion of the interaction input includes changing (e.g., increasing) an intensity (e.g., length, darkness, and/or sharpness or blurriness) of a simulated shadow of (e.g., displayed on, or appearing to be cast by) the first selectable object (e.g., as if cast by the first selectable object, the user interface object, and/or other object(s) in the three-dimensional environment based on light, real (from a corresponding physical environment) and/or simulated, in the three-dimensional environment). For example, the shadow appearing to be cast by the lifted region 7080-*b* is intensified in FIG. 7U in response to the input gesture performed by hand 7020. Changing an intensity of a simulated shadow of a selectable object in response to interaction with the selectable object visually distinguishes the part of the user interface that is currently receiving user input, which provides improved visual feedback about a state of the computer system.

In some embodiments, changing the appearance of the first selectable object in response to detecting the first portion of the interaction input includes changing the appearance of the first selectable object with respect to a first set of one or more visual properties without changing (e.g., while maintaining) the appearance of the first selectable object with respect to a second set of one or more visual properties, wherein the first set of one or more visual properties is different from the second set of one or more visual properties (e.g., the two sets include different visual properties, and in some embodiments include no visual properties in common). For example, as shown in and described herein with reference to FIG. 7U, while some visual properties of region 7080-*b* such as size, opacity, and brightness are changed in response to the input gesture performed by hand 7020, other visual properties such as thickness, specular reflection, and separation from the surface of user interface element 7080 remain unchanged. In some examples, in response to the interaction input, the appearance of the first selectable object is changed with respect to size, opacity, brightness, and/or shadow intensity (e.g., in the first set of visual properties), and the appearance of the first selectable object is not changed with respect to thickness, z-height (e.g., relative to the user interface object), blurring, and/or specular reflection (e.g., in the second set of visual properties). In some embodiments, the appearance of the first selectable object is not changed with respect to relative spatial positioning of the first selectable object to the user interface object (e.g., a centroid of the first selectable object is not moved in x- or y-directions relative to a centroid of the user interface object, optionally while also maintaining the relative z-positioning of the centroid of the first selectable object to the centroid of the user interface object). In some embodiments, similarly, the changing of one or more visual properties of the first selectable object, in response to detecting the first input and in accordance with the determination that the first input indicates the user's readiness to interact with the first selectable object, is performed without changing one or more other visual properties (e.g., thickness, specular reflection, z-height, shadow, opacity, and/or blur are changed without changing scale). Changing one or more visual properties of a selectable object in response to interaction with the selectable object while maintaining one or more other visual properties of the selectable object balances providing improved visual feedback about a state of the computer system with cluttering the user interface with too many changes, which would increase the likelihood that the user will suffer from motion sickness when using the computer system.

In some embodiments, in response to detecting the first portion of the interaction input, the computer system maintains the thickness of the first selectable object (e.g., at the second thickness). For example, the thickness of the lifted region 7080-*b* is maintained in FIG. 7U at the same thickness as in FIG. 7T, in response to the input gesture performed by hand 7020. Maintaining the thickness of a selectable object while changing one or more other visual properties of the selectable object in response to interaction with the selectable object balances providing improved visual feedback about a state of the computer system with cluttering the user interface with too many changes, which would increase the likelihood that the user will suffer from motion sickness when using the computer system.

In some embodiments, in response to detecting the first portion of the interaction input, the computer system maintains a degree of separation between the first selectable object and a surface of the user interface object (e.g., and maintains a simulated distance between the first selectable object and a viewpoint of the user). For example, the amount by which region 7080-*b* is lifted away from the surface of user interface element 7080 is the same in FIG. 7U as in FIG. 7T. Maintaining the z-height of a selectable object relative to another associated user interface object while changing one or more other visual properties of the selectable object in response to interaction with the selectable object balances providing improved visual feedback about a state of the computer system with cluttering the user interface with too many changes, which would increase the likelihood that the user will suffer from motion sickness when using the computer system.

In some embodiments, in response to detecting the first portion of the interaction input, the computer system maintains a degree of blurring of the first selectable object. For example, the amount of blurring of underlying content as viewed through region 7080-*b* is the same in FIG. 7U as in FIG. 7T (e.g., consistent with the thickness of region 7080-*b* and degree of separation from user interface element 7080 both being the same in FIG. 7U as in FIG. 7T). Maintaining the degree of blurring of a selectable object while changing one or more other visual properties of the selectable object in response to interaction with the selectable object balances providing improved visual feedback about a state of the computer system with cluttering the user interface with too many changes, which would increase the likelihood that the user will suffer from motion sickness when using the computer system.

In some embodiments, in response to detecting the first portion of the interaction input, the computer system maintains (e.g., an extent of) a visual effect of light reflecting from one or more edges of the first selectable object (e.g., in accordance with maintaining the thickness of the first selectable object). For example, the specular reflection from the lifted region 7080-*b* is the same in FIG. 7U as in FIG. 7T (e.g., consistent with the thickness of region 7080-*b* being the same in FIG. 7U as in FIG. 7T). Maintaining the appearance of simulated specular reflection from a selectable object while changing one or more other visual properties of the selectable object in response to interaction with the selectable object balances providing improved visual feedback about a state of the computer system with cluttering the user interface with too many changes, which would increase the likelihood that the user will suffer from motion sickness when using the computer system.

In some embodiments, the computer system detects a second portion of the interaction input that includes an end of the interaction input (e.g., the second portion immediately follows the first portion). In some embodiments, the first portion of the interaction input corresponds to a first portion of a gesture (e.g., a first portion of an air pinch in which two fingers are brought in contact with each other, or a first portion of a tap), and the second portion of the interaction input corresponds to a second portion of the gesture (e.g., releasing the air pinch, after the two fingers are brought in contact with each other, by moving the two fingers apart from each other, or releasing the tap). In some embodiments, in response to detecting the second portion of the interaction input, the computer system changes the appearance of the first selectable object (e.g., in a third manner different from a second manner in which the appearance of the first selectable object was changed in response to detecting the first portion of the interaction input and/or different from a first manner in which the appearance of the first selectable object was changed in response to detecting the first input that indicated the user's readiness to interact with the first selectable object) and performs the respective operation in the three-dimensional environment (e.g., activating a button or other control, launching an application from an application icon, revealing a menu, changing a state of a toggle, or giving focus to an input field such as a text box). In some embodiments, the appearance of the first selectable object is changed in response to detecting a part of the second portion of the interaction input that occurs before the end of the interaction input. In some embodiments, changing one or more visual properties (e.g., size, opacity, brightness, shadow intensity, and/or thickness or etch depth) of the first selectable object in response to detecting the second portion of the interaction input at least partially reverses a prior change in the one or more visual properties of the first selectable object (e.g., a prior change performed in response to detecting the first portion of the interaction input). For example, in response to the end of the input gesture performed by hand 7020 in FIG. 7U, the appearance of region 7080-*b* is changed from the appearance shown in FIG. 7U to the appearance shown in FIG. 7V (e.g., region 7080-*b* is increased in size, opacity, and brightness), and the respective operation associated with region 7080-*b* is performed. In another example, the respective operation associated with region 7080-*b* is performed in response to the end of the input gesture performed by hand 7020 in FIG. 7U as well as in accordance with a determination that user 7002's attention is no longer directed to region 7080-*b* as in FIG. 7W, and accordingly the appearance of region 7080-*b* is changed from the appearance shown in FIG. 7U to the appearance shown in FIG. 7W (e.g., region 7080-*b* is also decreased in thickness and degree of separation from user interface element 7080). Changing the appearance of a selectable object and performing an associated operation in response to the completion of a user interaction with the selectable object, particularly when the appearance of the selectable object is changed in a different way than for earlier portions of the user interaction, provides improved visual feedback about a state of the computer system.

In some embodiments, changing the appearance of the first selectable object in response to detecting the second portion of the interaction input includes changing (e.g., increasing) a size of the first selectable object (e.g., scaling up). For example, the size of region 7080-*b* in FIGS. 7V-7W is increased (e.g., reverted) relative to the size of region 7080-*b* in FIG. 7U, in response to the end of the input gesture performed by hand 7020 (shown in FIG. 7U). Changing a size of a selectable object in response to the completion of a user interaction with the selectable object provides improved visual feedback about a state of the computer system.

In some embodiments, changing the appearance of the first selectable object in response to detecting the second portion of the interaction input includes changing (e.g., reducing, or in some embodiments increasing) an opacity of the first selectable object. For example, the opacity of region 7080-*b* in FIGS. 7V-7W is increased relative to the opacity of region 7080-*b* in FIG. 7U, in response to the end of the input gesture performed by hand 7020 (shown in FIG. 7U). Changing an opacity of a selectable object in response to the completion of a user interaction with the selectable object provides improved visual feedback about a state of the computer system.

In some embodiments, changing the appearance of the first selectable object in response to detecting the second portion of the interaction input includes changing (e.g., increasing or decreasing) a brightness of the first selectable object. For example, the brightness of region 7080-*b* in FIGS. 7V-7W is different from (e.g., increased relative to) the brightness of region 7080-*b* in FIG. 7U, in response to the end of the input gesture performed by hand 7020 (shown in FIG. 7U). Changing a brightness of a selectable object in response to the completion of a user interaction with the selectable object provides improved visual feedback about a state of the computer system.

In some embodiments, changing the appearance of the first selectable object in response to detecting the second portion of the interaction input includes changing (e.g., decreasing or increasing) an intensity of a simulated shadow of (e.g., displayed on, or appearing to be cast by) the first selectable object. For example, the shadow appearing to be cast by region 7080-*b* onto user interface element 7080 is less intense in FIG. 7V than in FIG. 7U. Changing an intensity of a simulated shadow of a selectable object in response to the completion of a user interaction with the selectable object provides improved visual feedback about a state of the computer system.

In some embodiments, after detecting the end of the interaction input (e.g., and/or after performing the respective operation), while the user's attention remains directed to the first selectable object, the computer system maintains the thickness of the first selectable object (e.g., at the second thickness). In some embodiments, in accordance with a determination that the user's attention remained directed to the first selectable object when the end of the interaction input was detected, the thickness of the first selectable object is maintained until the user's attention ceases to be directed to the first selectable object. For example, the increased thickness of region 7080-*b* from FIG. 7U is maintained in FIG. 7V after the end of the input gesture performed by hand 7020 (shown in FIG. 7U), while user 7002's attention remains directed to region 7080-*b* in FIG. 7V. Maintaining the thickness of a selectable object while a user's attention remains directed to the selectable object indicates that the selectable object still has focus even after the user interaction with the selectable object has ended, which provides visual feedback about a state of the computer system.

In some embodiments, changing the appearance of the first selectable object in response to detecting the second portion of the interaction input includes changing (e.g., reducing or increasing) the thickness of the first selectable object (e.g., from the second thickness back to the first thickness, or to a third thickness that is different from the first thickness). In some embodiments, the thickness of the first selectable object is changed after performing the respective operation. In some embodiments, the thickness of the first selectable object is changed without regard to whether the user's attention remains directed to the first selectable object, and optionally even as the user's attention remains directed to the first selectable object (e.g., even as the user continues to indicate readiness to interact with the first selectable object), after detecting the second portion of the interaction input and/or after performing the respective operation. For example, the thickness of region 7080-*b* in FIG. 7W is decreased in response to the end of the input gesture performed by hand 7020 (shown in FIG. 7U), and, as described herein with reference to FIG. 7W, this decrease in thickness optionally occurs whether user 7002's attention remains directed to region 7080-*b* or not. Changing the thickness of a selectable object in response to the completion of a user interaction with the selectable object, even if the user's attention remains directed to the selectable object, provides improved visual feedback about a state of the computer system.

In some embodiments, the first input corresponding to the first selectable object is detected while the first selectable object is displayed with a first appearance. In some embodiments, after detecting the end of the interaction input (e.g., after changing the appearance of the first selectable object in response to detecting the second portion of the interaction input), the computer system displays the first selectable object with a second appearance that is different from the first appearance. In some embodiments, if the first selectable object is a button, the button is displayed with a different appearance before being activated than after being activated (e.g., where activation occurs in response to the first and/or second portions of the interaction input, optionally in combination with the preceding first input indicating readiness to interact). For example, for a toggle switch, the toggle switch is displayed with a first appearance corresponding to a first state and, when activated, displayed with a second appearance corresponding to a second state (e.g., from an "on" state to an "off" state, or vice versa, upon activation). For example, region 7080-*b* in FIG. 7W has a different appearance, after the interaction with (e.g., activation of) region 7080-*b* by the input gesture of FIG. 7U, from region 7080-*b* in FIGS. 7Q and 7S, before the interaction with (e.g., activation of) region 7080-*b* by the input gesture of FIG. 7U. Changing an appearance of a selectable object, which has a first idle state appearance before a user indicates readiness to interact and then interacts with the selectable object, to a second idle state appearance after the user completes the interaction with the selectable object, indicates that the selectable object has been activated, which provides improved visual feedback about a state of the computer system.

In some embodiments, in accordance with a determination that the first selectable object is a first type of interactive object (e.g., a button, toggle, or slider), changing the thickness of the first selectable object (e.g., in response to detecting a user input that indicates a user's readiness to interact with the first selectable object) includes moving the first selectable object away from (e.g., raising and/or separating in a direction normal to a surface of) the user interface object. For example, region 7080-*b* is moved away from user interface element 7080 in response to user 7002 directing attention to region 7080-*b* (FIGS. 7R and 7T). In another example, region 7080-*c* is moved away from user interface element 7080 in response to user 7002 directing attention to region 7080-*c* (FIG. 7S). In some embodiments, in accordance with a determination that the first selectable object is a second type of interactive object (e.g., an input field, such as for text entry), changing the thickness of the first selectable object includes increasing a depth to which the first selectable object is recessed into (e.g., in a direction normal to the surface of) the user interface object. For example, in FIG. 7O, in response to user 7002 directing attention to recessed region 7054-*b* (e.g., the recessing of region 7054-*b* indicating that region 7054-*b* is a different type of interactive object than regions 7080-*b*, 7080-*c*, and 7080-*d* (FIG. 7O)), recessed region 7054-*b* is further recessed (e.g., increased in depth) from the surface of user interface element 7054. In some embodiments, recessing the first selectable object into the user interface object moves a surface (e.g., a front surface) of the first selectable object from being flush with a surface (e.g., a front surface) of the user interface object to being further from the viewpoint of the user than the surface of the user interface object (e.g., in a direction normal to the surface of the user interface object). Changing the thickness of certain types of selectable objects by lifting the selectable object away from an associated user interface object, and other types of selectable objects by recessing the selectable object further into the associated user interface object, indicates what type of object the selectable object is, and thus what types of interactions the selectable object supports, which provides improved visual feedback about a state of the computer system.

In some embodiments, changing the thickness of the first selectable object (e.g., if the first selectable object is an input field such as a text box or search bar) includes increasing a depth to which the first selectable object is recessed (e.g., extends) into a front surface (e.g., a surface facing the viewpoint of the user) of the user interface object. For example, in FIG. 7O, in response to user 7002 directing attention to recessed region 7054-*b*, recessed region 7054-*b* is further recessed (e.g., increased in depth) from the surface of user interface element 7054. In some embodiments, the first selectable object is a recessed (e.g., etched) region from the surface of the user interface object (e.g., and the first selectable object is displayed with one or more specular reflections and/or with one or more shadows cast by, for example, the user interface object), and changing the thickness of the first selectable object (e.g., in response to detecting the first input, and in accordance with the determination that the first input indicates the user's readiness to interact with the first selectable object) includes further recessing the first selectable object into (e.g., further etching) the surface of the user interface object (e.g., and optionally increasing the extent and/or intensity of the specular reflections from and/or the shadows cast onto the first selectable object accordingly). In some embodiments, further recessing the first selectable object into the user interface object is performed, alternatively or additionally, in response to detecting (e.g., the first portion of) the interaction input, described herein. Recessing a selectable object that is part of an associated user interface object further into the user interface object in response to an input that indicates a user's readiness to interact with the selectable object indicates which part of the user interface currently has focus for further interaction, what type of object the selectable object is, and thus what types of interactions the selectable object supports, which provides improved visual feedback about a state of the computer system.

In some embodiments, the depth to which the first selectable object is recessed into the front surface of the user interface object is increased without changing a back surface of the user interface object based on the change in thickness of the first selectable object (e.g., a surface opposite the front surface, a surface facing away from the viewpoint of the user). In some embodiments, the back surface of the user interface object remains unchanged in that no protrusion, or no further protrusion, from the back surface of the user interface object is generated in accordance with the recessing of the first selectable object into the front surface of the user interface object. For example, in FIG. 7O, side view 7055 indicates that no change to the back surface of user interface element 7054 occurs as recessed region 7054-*b* is further recessed from the surface of user interface element 7054. Recessing a selectable object that is part of a front surface of an associated user interface object further into the front surface of the user interface object without changing a back surface of the user interface object in response to an input that indicates a user's readiness to interact with the selectable object indicates the type of input that is being detected (e.g., an intent to interact with the selectable object rather than a request for lateral movement of the selectable object), which provides improved visual feedback about a state of the computer system.

In some embodiments, the computer system displays text in the first selectable object, and the first input is detected while displaying the text at a first simulated distance from a viewpoint of the user (e.g., a first depth relative to the recessed first selectable object, such as at a foremost plane of the user interface object into which the first selectable object is recessed (e.g., a depth of zero)). In some embodiments, in response to detecting the first input, and in accordance with the determination that the first input indicates the user's readiness to interact with the first selectable object, the computer system displays the text in the first selectable object at a second (e.g., greater) simulated distance relative to the viewpoint of the user (e.g., moving the text to a different simulated distance from the viewpoint of the user, and optionally to a different, second depth relative to the recessed first selectable object, such as past the foremost plane of the user interface object (e.g., a non-zero depth)). In some embodiments, the text is moved by an amount that is based on (e.g., equal to, proportional to) the amount by which the thickness of the first selectable object is changed in response to the first input (e.g., a relative depth of the text with respect to the first selectable object is maintained). In some embodiments, displaying the text at a different (e.g., increased) simulated distance relative to the viewpoint of the user is performed, alternatively or additionally, in response to detecting (e.g., the first portion of) the interaction input. In some embodiments, the second simulated distance is the same as the first simulated distance (e.g., the text is not moved relative to the viewpoint of the user and/or relative to the user interface object as the thickness (e.g., etch depth) of the first selectable object is changed). Changing the depth of text in a recessed region in response to an input that indicates a user's readiness to interact with the recessed region is described in more detail herein with reference to FIG. 7O. Changing the depth of text in a recessed selectable object in response to an input that indicates a user's readiness to interact with the selectable object provides improved visual feedback about a state of the computer system.

In some embodiments, after detecting the first input, and in accordance with the determination that the first input indicates the user's readiness to interact with the first selectable object, the computer system detects an interaction input directed to the first selectable object (e.g., to activate the first selectable object, such as by selecting a text field so that text can be entered), wherein the interaction input includes a first portion followed by a second portion that includes an end of the interaction input. In some embodiments, in response to detecting the first portion of the interaction input, the computer system changes (e.g., increases) a distance between the text in the first selectable object and the viewpoint of the user. In some embodiments, in response to detecting the second portion (e.g., the end) of the interaction input, the computer system reverses the change in the distance between the text in the first selectable object and the viewpoint of the user (e.g., that was performed in response to detecting the first portion of the interaction input). In some embodiments, any change in the distance between the text and the viewpoint of the user that was displayed in response to detecting the first input is also reversed. Changing the depth of text in a recessed region in response to an input gesture interacting with the recessed region (e.g., where the input gesture was initiated while a user was indicating readiness to interact with the recessed region) is described in more detail herein with reference to FIG. 7O. Changing, and then reversing the change in, the depth of text in a recessed selectable object in response to the beginning and then the end of a user interaction with the selectable object indicates the progression of the user interaction, which provides improved visual feedback about a state of the computer system, particularly if other visual feedback, such as changes in depth, brightness, and/or size, are not provided for recessed selectable objects (despite being provided for selectable objects that are not recessed) in response to user interaction.

In some embodiments, determining that the first input indicates the user's readiness to interact with the first selectable object includes determining that the user's attention (e.g., gaze) is directed to the first selectable object and that a hand of the user is in a ready state. In some embodiments, the first selectable object includes a slider. In some embodiments, in response to detecting the first input corresponding to the first selectable object: while the first input indicates the user's readiness to interact with the first selectable object, the computer system displays an adjustment control for the slider (e.g., a slider thumb or other control for changing a current value selected by the slider, and/or other indication of a current value selected by the slider); and, while the first input does not indicate the user's readiness to interact with the first selectable object (e.g., the user's gaze is not directed to the first selectable object and/or the user's hand is not in the ready state), the computer system displays the slider without displaying the adjustment control for the slider. Display and behavior (e.g., changes in appearance) of a slider control for changing the current value of a slider are described in more detail herein with reference to FIGS. 7R and 7U-7V. Requiring that a user be paying attention to a slider and have their hand in a ready state to enable display of the adjustment control for the slider causes the computer system to automatically discern user intent to interact with the slider more accurately and avoids displaying additional controls when not needed.

It should be understood that the particular order in which the operations in FIG. 13 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 12000, and 14000) are also applicable in an analogous manner to method 13000 described above with respect to FIG. 13. For example, the user interface elements and regions, including appearances and visual properties thereof, virtual objects, user viewpoints, three-dimensional environments, including views and appearances thereof, display generation component, inputs, gestures, animations, user interface operations, light sources, reflections, and/or shadows described above with reference to method 13000 optionally have one or more of the characteristics of the user interface elements and regions, including appearances and visual properties thereof, virtual objects, user viewpoints, three-dimensional environments, including views and appearances thereof, display generation component, inputs, gestures, animations, user interface operations, light sources, reflections, and/or shadows described herein with reference to other methods described herein (e.g., methods 8000, 9000, 10000, 11000, 12000, and 14000). For brevity, these details are not repeated here.

FIG. 14 is a flowchart of a method 14000 of visually distinguishing different parts of a computer-generated user interface object whose appearance is based on content in a surrounding three-dimensional environment that is behind the user interface object, by applying different transformations to a representation of the underlying content, in accordance with some embodiments.

In some embodiments, the method 14000 is performed at a computer system (e.g., computer system 101 in FIG. 1) that is in communication with a display generation component (e.g., display generation component 120 in FIGS. 1, 3, and 4, such as display 7100 in FIGS. 7A-7Z) (e.g., a heads-up display, a display, a touchscreen, and/or a projector), and optionally one or more input devices such as one or more cameras (e.g., a camera (e.g., color sensors, infrared sensors, and/or other depth-sensing cameras), for example pointing downward at a user's hand or forward from the user's head. In some embodiments, the method 14000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 14000 are, optionally, combined and/or the order of some operations is, optionally, changed.

In some embodiments, the method 14000 is performed at a computer system (e.g., the computer system 101 in FIG. 1, the computer system 101 described with respect to FIGS. 7A-7G, FIGS. 7H-7J, FIGS. 7K-7O, FIG. 7P, FIGS. 7Q-7W, and/or FIGS. 7X-7Z). In some embodiments, the computer system is in communication with a display generation component (e.g., the display generation component is a heads-up display, a head-mounted display (HMD), a display, a touchscreen, and/or a projector) and optionally one or more input devices (e.g., cameras, controllers, touch-sensitive surfaces, joysticks, buttons, gloves, watches, motion sensors, and/or orientation sensors). In some embodiments, the display generation component is a display generation component 7100 described with respect to FIGS. 7A-7Z. In some embodiments, the computer system is an integrated device with one or more processors and memory enclosed in the same housing as the display generation component and at least some of one or more input devices. In some embodiments, the computer system includes a computing component (e.g., a server, a mobile electronic device such as a smart phone or tablet device, a wearable device such as a watch, wristband, earphones, a desktop computer, or a laptop computer) that includes one or more processors and memory that is separate from the display generation component and/or the one or more input devices. In some embodiments, the display generation component and the one or more input devices are integrated and enclosed in the same housing. Many of the features of the method 14000 are described with respect to FIGS. 7X-7Z, in accordance with some embodiments.

In method 14000, the computer system displays (14002), via the display generation component, a computer-generated user interface object overlaid on a first portion of a view of a three-dimensional environment (e.g., that includes a view of one or more portions of a physical environment). An appearance of the computer-generated user interface object is based on a blurred representation of the first portion of the view of the three-dimensional environment on which the computer-generated user interface object is overlaid. For example, as described herein with reference to FIG. 7X, user interface element 7030 is overlaid on a view of three-dimensional environment 7104 and has an appearance that is based on a blurred representation of the portions of environment 7104 on which user interface element 7030 is overlaid, at a time $T=t_2$.

In method 14000, the computer system visually distinguishes (14004) a first region (e.g., text, type, glyphs, and/or the like) of the computer-generated user interface object from a second region (e.g., other than text or type, such as a background region or one or more interactive controls) of the computer-generated user interface object by: applying a first transformation without applying a second transformation (e.g., that is different from the first transformation) to a first subset (e.g., a first set of one or more areas) of the blurred representation of the first portion of the view of the three-dimensional environment on which the computer-generated user interface object is overlaid, corresponding to the first region of the computer-generated user interface object; and applying the second transformation without applying the first transformation to a second subset (e.g., a second set of one or more areas) of the blurred representation of the first portion of the view of the three-dimensional environment on which the computer-generated user interface object is overlaid, corresponding to the second region of the computer-generated user interface object. The second subset of the blurred representation of the first portion of the view of the three-dimensional environment is different from the first subset of the blurred representation of the first portion of the view of the three-dimensional environment.

For example, as shown in and described herein with reference to expanded view 7084 of the appearance of user interface element 7030 at time $t_2$, in FIG. 7X, text region 7084-*d* is visually distinguished from background region 7084-*a* in that text region 7084-*d* is the result of applying transformation $X_D$ without applying transformation $X_A$ to the parts of the starting point representation of time $t_2$ that correspond to text region 7084-*d*, whereas background region 7084-*a* is the result of applying transformation $X_A$ without applying transformation $X_D$ to the parts of the starting point representation of time $t_2$ that correspond to background region 7084-*a*. In another example, text region 7084-*d* is visually distinguished from control regions 7084-*b* in that text region 7084-*d* is the result of applying transformation $X_D$ without applying transformation $X_B$ to the parts of the starting point representation of time $t_2$ that correspond to text region 7084-*d*, whereas control regions 7084-*b* are the result of applying transformation $X_B$ without applying transformation $X_D$ to the parts of the starting point representation of time $t_2$ that correspond to control regions 7084-*b*. In yet another example, text region 7084-*c* is visually distinguished from background region 7084-*a* in that text region 7084-*c* is the result of applying an identity transformation without applying transformation $X_A$ to the parts of the starting point representation of time $t_2$ that correspond to text region 7084-*c*, whereas background region 7084-*a* is the result of applying transformation $X_A$ instead of applying the identity transformation to the parts of the starting point representation of time $t_2$ that correspond to background region 7084-*a*.

In method 14000, as an appearance of the first portion of the view of the three-dimensional environment changes (e.g., in response to changes in the corresponding physical environment, changes in computer-generated content in the three-dimensional environment and/or overlaid on a representation of the corresponding physical environment, changes in a viewpoint of the user, or other changes in the viewed environment), the computer system updates (14006) the appearance of the computer-generated user interface object based on a blurred representation of the changed first portion of the view of the three-dimensional environment, including: applying (14008) the first transformation without applying the second transformation to a first subset of the blurred representation of the changed first portion of the view of the three-dimensional environment on which the computer-generated user interface object is overlaid, corresponding to the first region of the computer-generated user interface object; and applying the second transformation without applying the first transformation to a second subset of the blurred representation of the changed first portion of the view of the three-dimensional environment on which the computer-generated user interface object is overlaid, corresponding to the second region of the computer-generated user interface object. The second subset of the blurred representation of the changed first portion of the view of the three-dimensional environment is different from the first subset of the blurred representation of the changed first portion of the view of the three-dimensional environment.

For example, as described herein with reference to FIG. 7Y, in accordance with changes in environment 7104, including in the portions of environment 7104 on which user interface element 7030 is overlaid, the appearance of user interface element 7030 at a time $T=t_3$ is updated based on a blurred representation of the changed portions of environment 7104 on which user interface element 7030 is overlaid. For the appearance of user interface element 7030 at time $t_3$, as shown in expanded view 7086 in FIG. 7Y, text region 7086-*d* is visually distinguished from background region 7086-*a* in that text region 7086-*d* is the result of applying transformation $X_D$ without applying transformation $X_A$ to the parts of the starting point representation of time $t_2$ that correspond to text region 7086-*d*, whereas background region 7086-*a* is the result of applying transformation $X_A$ without applying transformation $X_D$ to the parts of the starting point representation of time $t_2$ that correspond to background region 7086-*a*. In another example, text region 7086-*d* is visually distinguished from control regions 7086-*b* in that text region 7086-*d* is the result of applying transformation $X_D$ without applying transformation $X_B$ to the parts of the starting point representation of time $t_3$ that correspond to text region 7086-*d*, whereas control regions 7086-*b* are the result of applying transformation $X_B$ without applying transformation $X_D$ to the parts of the starting point representation of time $t_3$ that correspond to control regions 7086-*b*. In yet another example, text region 7086-*c* is visually distinguished from background region 7086-*a* in that text region 7086-*c* is the result of applying the identity transformation without applying transformation $X_A$ to the parts of the starting point representation of time $t_3$ that correspond to text region 7086-*c*, whereas background region 7086-*a* is the result of applying transformation $X_A$ instead of applying the identity transformation to the parts of the starting point representation of time $t_3$ that correspond to background region 7086-*a*.

In some embodiments, the appearance of the first region is based on the blurred representation of the respective portion of the view of the three-dimensional environment on which the first region is overlaid to a greater extent than the appearance of the second region is on the blurred representation of the respective portion of the view of the three-dimensional physical environment on which the second region is overlaid. In some embodiments, the first region and/or the second region of the computer-generated user interface object are at least partially transparent (e.g., cutouts from an otherwise solid shape) (e.g., the first transformation is applied to one or more cutout regions, and the second transformation is applied to one or more regions of the computer-generated user interface object that are outside the cutout regions. In some embodiments, the first region and the second region of the computer-generated user interface object correspond to different types or classes of content or user interface regions (e.g., text regions, button or control regions, and other regions, such as background regions). Applying different transformations to different regions of a computer-generated object causes the computer system to automatically visually distinguish some regions from others so as to indicate certain properties of the regions, such as whether a region is interactive and/or whether a region conveys semantic meaning, and accordingly to give visual emphasis to and/or improve the legibility of such regions.

In some embodiments, the appearance of the first portion of the view of the three-dimensional environment on which the computer-generated user interface object is overlaid changes in response to ambient changes in the three-dimensional environment (e.g., visual changes that are independent of movement of the viewpoint of the user and independent of movement of the computer-generated user interface object relative to the three-dimensional environment, such as due to movement of other people or objects in the three-dimensional environment or corresponding physical environment behind the simulated position of the computer-generated user interface object and/or due to changes in light in the three-dimensional or physical environments). For example, as described herein with reference to FIGS. 7X-7Y, changes in the appearance of user interface element 7030 are in some circumstances based on changes in the appearance of one or more underlying portions of environment 7104 due to movement of other objects in environment 7104 and/or changes in lighting in environment 7104. Changing the appearance of a computer-generated object based on ambient changes in the three-dimensional environment improves the user's context awareness, which improves user safety by helping the user to avoid collisions with physical objects in the surrounding physical space and reduces the likelihood that the user will suffer from motion sickness when using the computer system.

In some embodiments, the appearance of the first portion of the view of the three-dimensional environment changes in response to the computer-generated user interface object being moved relative to the three-dimensional environment (e.g., the computer-generated user interface object is moved so as to be overlaid on a different first portion of the view of the three-dimensional environment). For example, as described herein with reference to FIGS. 7X-7Y, changes in appearance of user interface element 7030 are in some circumstances based on movement of user interface element 7030 relative to environment 7104 that changes which portions of environment 7104 are underlying user interface element 7030. Changing the appearance of a computer-generated object as the computer-generated object is moved relative to the three-dimensional environment and based on a blurred representation of underlying portions of the environment improves the user's context awareness, which improves user safety by helping the user to avoid collisions with physical objects in the surrounding physical space and reduces the likelihood that the user will suffer from motion sickness when using the computer system.

In some embodiments, the view of the three-dimensional environment is visible, via the display generation component, from a respective viewpoint of a user (e.g., based on a location of the user or a location of the computer system, or a component of the computer system, in the physical environment), and the appearance of the first portion of the view of the three-dimensional environment changes in response to the respective viewpoint of the user changing (e.g., moving) in the three-dimensional environment (e.g., the user moves themselves and/or the computer system in the physical environment, thus changing the view of the three-dimensional environment that is visible from the current viewpoint of the user). For example, as described herein with reference to FIGS. 7X-7Y, changes in appearance of user interface element 7030 are in some circumstances based on movement of the viewpoint of user 7002 relative to user interface element 7030 or relative to environment 7104 that changes which portions of environment 7104 are underlying user interface element 7030 from the perspective of user 7002. Changing the appearance of a computer-generated object that is in view as a viewpoint of the user changes relative to the three-dimensional environment, and basing the appearance of the computer-generated object on a blurred representation of underlying portions of the three-dimensional environment improves the user's context awareness, which improves user safety by helping the user to avoid collisions with physical objects in the surrounding physical space and reduces the likelihood that the user will suffer from motion sickness when using the computer system.

In some embodiments, color saturation of the blurred representation of the first portion of the view of the three-dimensional environment is increased relative to an appearance of the first portion of the view of the three-dimensional environment without the computer-generated user interface object overlaid. Increased saturation of the blurred representation of environment 7104 (e.g., the starting point representation) is described in more detail herein with reference to FIG. 7X and applies analogously to FIG. 7Y. Stated another way, the first portion of the view of the three-dimensional environment has an appearance with a first amount of saturation, whereas the appearance of the computer-generated user interface object is based on a blurred representation of the first portion of the view of the three-dimensional environment, the blurred representation having an appearance with a second amount of saturation that is greater than the first amount of saturation. In some embodiments, in response to detecting an input to move the computer-generated user interface object such that the computer-generated user interface object is no longer overlaid on the first portion of the view of the three-dimensional environment (e.g., an input to dismiss or close the computer-generated user interface object, or to move the computer-generated user to be overlaid on a different, second portion of the view of the three-dimensional environment), the first portion of the view of the three-dimensional environment is displayed (e.g., redisplayed) with the first amount of saturation (e.g., in place of the computer-generated user interface object). Increasing the saturation of the blurred representation of underlying portions of a three-dimensional environment when basing the appearance of a computer-generated object on that representation causes the computer system to automatically give visual emphasis to and improve the legibility of different content regions of the computer-generated object relative to the three-dimensional environment.

In some embodiments, applying the second transformation includes applying a grey filter to (e.g., a respective subset of) the blurred representation of a respective portion of the view of the three-dimensional environment on which the computer-generated user interface object (or more specifically on which the second region of the computer-generated user interface object) is overlaid (e.g., as described herein with reference to transformation $X_A$ of FIGS. 7X-7Z). In some embodiments, the second transformation reduces the saturation (e.g., reduces the intensity of color and/or increases the amount of gray) of the blurred representation of the respective portion of the view of the three-dimensional environment. In some embodiments, the grey filter (e.g., reduction in saturation) by the second transformation counteracts some or all of the saturation increase of the blurred representation of the first portion of the three-dimensional environment described above. Applying a grey filter to some regions of a computer-generated object whose appearance is based on a saturated blurred representation of underlying portions of a three-dimensional environment causes the computer system to automatically give visual emphasis to and improve the legibility of other content regions of the computer-generated object that do not have the grey filter applied.

In some embodiments, the first region of the computer-generated user interface object includes glyphs (e.g., the areas occupied by letterforms, symbols, and/or other displayed characters), and the second region of the computer-generated user interface object includes a background region of the computer-generated user interface object (e.g., including at least some areas of the computer-generated user interface object that are outside of the areas occupied by the glyphs). For example, the "first region" optionally corresponds to text region 7084-c (FIG. 7X) and analogous text region 7086-c (FIG. 7Y), while the "second region" optionally corresponds to background region 7084-a (FIG. 7X) and analogous background region 7086-a (FIG. 7Y), where the two sets of regions are the result of the application of a mutually different set of transformations (e.g., transformation $X_C$ for the text regions 7084-c and 7086-c versus transformation $X_A$ for the background regions 7084-a and 7086-a). In another example, the "first region" optionally corresponds to text region 7084-d (FIG. 7X) and analogous text region 7086-d (FIG. 7Y), while the "second region" optionally corresponds to background region 7084-a (FIG. 7X) and analogous background region 7086-a (FIG. 7Y), where the two sets of regions are the result of the application of a mutually different set of transformations (e.g., transformation $X_D$ for the text regions 7084-d and 7086-d versus transformation $X_A$ for the background regions 7084-a and 7086-a). Applying a different transformation to text regions of a computer-generated object than to background regions of the computer-generated object causes the computer system to automatically give visual emphasis to and improve the legibility of the text regions.

In some embodiments, the second region of the computer-generated user interface object includes a background of the computer-generated user interface object (e.g., outside of glyphs and outside of one or more interactive control regions) (e.g., background region 7084-a (FIG. 7X) and analogous background region 7086-a (FIG. 7Y)), and a third region of the computer-generated user interface object includes one or more interactive control regions (e.g., buttons, toggles, sliders, and/or input fields) (e.g., areas of interactive controls that are outside of areas occupied by any glyphs of the interactive controls) (e.g., control regions 7084-b (FIG. 7X) and analogous control regions 7086-b (FIG. 7Y)). In some embodiments, the computer system visually distinguishes the third region of the computer-generated user interface object (e.g., from the first and second regions) by applying a third transformation (e.g., that is different from the first transformation and from the second transformation) without applying the first transformation to a third subset (e.g., a third set of one or more areas) of the blurred representation of the first portion of the view of the three-dimensional environment on which the computer-generated user interface object is overlaid and without applying the second transformation to the third subset of the blurred representation of the first portion of the view of the three-dimensional environment on which the computer-generated user interface object is overlaid, corresponding to the third region of the computer-generated user interface object (e.g., as part of operation 14002 of method 14000), wherein the third subset of the blurred representation of the first portion of the view of the three-dimensional environment is different from the first subset and from the second subset of the blurred representation of the first portion of the view of the three-dimensional environment.

In some embodiments, the computer system visually distinguishes the third region of the updated computer-generated user interface object by applying the third transformation without applying the first transformation to a third subset of the blurred representation of the changed first portion of the view of the three-dimensional environment on which the computer-generated user interface object is overlaid and without applying the second transformation to the third subset of the blurred representation of the changed first portion of the view of the three-dimensional environment on which the computer-generated user interface object is overlaid, corresponding to the third region of the computer-generated user interface object (e.g., as part of operation 14006 of method 14000), wherein the third subset of the blurred representation of the changed first portion of the view of the three-dimensional environment is different from the first subset and from the second subset of the blurred representation of the changed first portion of the view of the three-dimensional environment. In some embodiments, applying the second transformation to a respective subset includes reducing a brightness of (e.g., darkening) the respective subset, and applying the third transformation to the respective subset includes increasing the brightness of (e.g., lightening or brightening) the respective subset.

For example, as shown in and described herein with reference to FIG. 7X, in the appearance of user interface element 7030 at time $t_2$, the appearance of control regions 7084-b is generated by applying brightening transformation $X_B$ to corresponding parts of the starting point representation at time $t_2$ without applying darkening transformation $X_A$ and without applying darkening transformation $X_D$, which visually distinguishes background region 7084-a, whose appearance is generated by applying darkening transformation $X_A$ without applying brightening transformation $X_B$ to different corresponding parts of the starting point representation at time $t_2$. Continuing with the same example, as shown in and described herein with reference to FIG. 7Y, in the appearance of user interface element 7030 at time $t_3$, as updated in response to changes in the one or more portions of environment 7104 underlying user interface element 7030, the appearance of control regions 7086-*b* is generated by applying brightening transformation $X_B$ to corresponding parts of the changed starting point representation at time $t_3$ without applying darkening transformation $X_A$ and without applying darkening transformation $X_D$, which visually distinguishes background region 7086-*a*, whose appearance is generated by applying darkening transformation $X_A$ without applying brightening transformation $X_B$ to different corresponding parts of the changed starting point representation at time $t_3$. Applying a transformation that brightens interactive control regions of a computer-generated object, and instead applying a transformation that darkens background regions of the computer-generated object visually emphasizes regions of the computer-generated object that are interactive relative to non-interactive background regions, which provides improved visual feedback about a state of the computer system.

In some embodiments, applying the second transformation to a respective subset reduces the brightness of the respective subset more than applying the first transformation to the respective subset reduces the brightness of the respective subset. Stated another way, relative to the blurred representation of the underlying portion of the view of the three-dimensional environment, the first region (e.g., consisting of areas occupied by glyphs and/or text) of the computer-generated user interface object is darkened less than the second region of the computer-generated user interface object is darkened (e.g., the first region is brighter than the second region). In some embodiments, the first transformation does not reduce the brightness of (e.g., does not apply a darkening effect to) the respective subset. For example, as shown in and described herein with reference to FIGS. 7X-7Y, text regions 7084-*c* and 7086-*c* are not darkened relative to their corresponding areas in the starting point representations as much as background regions 7084-*a* and 7086-*a* are darkened, relative to their corresponding areas in the starting point representations, by transformation $X_A$ (e.g., because a darkening transformation is not applied to text regions 7084-*c* and 7086-*c*).

In some embodiments, applying the third transformation to the respective subset increases the brightness of the respective subset more than applying the first transformation to the respective subset increases the brightness of the respective subset. Stated another way, relative to the blurred representation of the underlying portion of the view of the three-dimensional environment, the first region of the computer-generated user interface object is lightened less than the third region of the computer-generated user interface object is lightened (e.g., the first region is darker than the third region). In some embodiments, the first transformation does not increase the brightness of (e.g., does not apply a lightening effect to) the respective subset. For example, as shown in and described herein with reference to FIGS. 7X-7Y, text regions 7084-*c* and 7086-*c* are not brightened relative to their corresponding areas in the starting point representations as much as control regions 7084-*b* and 7086-*b* are brightened, relative to their corresponding areas in the starting point representations, by transformation $X_B$ (e.g., because a brightening transformation is not applied to text regions 7084-*c* and 7086-*c*). Applying, to different regions of a computer-generated object, different transformations that brighten text regions more than background regions and less than interactive control regions causes the computer system to automatically improve the legibility of the text regions while also providing improved visual feedback about which regions are interactive.

In some embodiments, applying the second transformation to a respective subset reduces the brightness of the respective subset less than applying the first transformation to the respective subset reduces the brightness of the respective subset. Stated another way, relative to the blurred representation of the underlying portion of the view of the three-dimensional environment, the first region (e.g., consisting of the areas occupied by glyphs and/or text) of the computer-generated user interface object is darkened even more than the second region (e.g., consisting of the background areas) of the computer-generated user interface object is darkened. For example, as shown in and described herein with reference to FIGS. 7X-7Y, text regions 7084-*d* and 7086-*d* are darkened, relative to their corresponding areas in the starting point representations, by transformation $X_D$ even more than background regions 7084-*a* and 7086-*a* are darkened, relative to their corresponding areas in the starting point representations, by transformation $X_A$. Applying different transformations to different regions of a computer-generated object that darkens text regions more than other regions causes the computer system to automatically visually distinguish the text regions from the other regions in a way that improves the legibility of the text regions.

It should be understood that the particular order in which the operations in FIG. 14 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, 12000, and 13000) are also applicable in an analogous manner to method 14000 described above with respect to FIG. 14. For example, the user interface elements and regions, including appearances and visual properties thereof, blurred representations, including subsets thereof, transformations, virtual objects, user viewpoints, three-dimensional environments, including views and appearances thereof, display generation component, and/or inputs described above with reference to method 14000 optionally have one or more of the characteristics of the user interface elements and regions, including appearances and visual properties thereof, blurred representations, including subsets thereof, transformations, virtual objects, user viewpoints, three-dimensional environments, including views and appearances thereof, display generation component, and/or inputs described herein with reference to other methods described herein (e.g., methods 8000, 9000, 10000, 11000, 12000, and 13000). For brevity, these details are not repeated here.

The operations described above with reference to FIGS. 8, 9, 10, 11, 12, 13, and 14 are, optionally, implemented by components depicted in FIGS. 1-6. In some embodiments, aspects and/or operations of methods 8000, 9000, 10000, 11000, 12000, 13000, and 14000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system that is in communication with a display generation component:
concurrently displaying, via the display generation component:
a view of a physical environment; and
a computer-generated user interface element overlaid on at least a portion of the view of the physical environment, wherein an appearance of the computer-generated user interface element is based on an appearance of one or more portions of the view of the physical environment on which the computer-generated user interface element is overlaid;
while concurrently displaying the view of the physical environment and the computer-generated user interface element, an appearance of a portion of the physical environment changes; and
in response to the change in appearance of the portion of the physical environment, updating the appearance of the computer-generated user interface element at a first time based on a graphical composition of the appearance of one or more portions of the physical environment at different times prior to the first time, wherein the appearance of the computer-generated user interface element is based on:
an appearance of a first portion of the physical environment at a second time that is before the first time; and
an appearance of a second portion of the physical environment at a third time that is before the second time.

2. The method of claim 1, wherein the appearance of the portion of the physical environment changes in response to movement of the computer system relative to the physical environment.

3. The method of claim 1, wherein the appearance of the portion of the physical environment changes in response to movement of one or more objects in the physical environment, wherein the one or more objects are distinct from the computer system.

4. The method of claim 1, wherein the computer-generated user interface element includes content, and the updating of the appearance of the computer-generated user interface element based on the graphical composition is applied to one or more regions of the computer-generated user interface element distinct from the content of the computer-generated user interface element.

5. The method of claim 1, wherein:
the graphical composition is based a first amount on the appearance of the first portion of the physical environment at the second time that is before the first time and based a second amount on the appearance of the second portion of the physical environment at the third time that is before the second time; and
the first amount is different from the second amount.

6. The method of claim 5, wherein at the first time, a contribution of one or more portions of the physical environment at a time closer to the first time to the appearance of the computer-generated user interface element at the first time is greater than the contribution of one or more portions of the physical environment at a time further from the first time $t_0$ the appearance of the computer-generated user interface element at the first time.

7. The method of claim 6, wherein the contribution of one or more portions of the physical environment at a time furthest from the first time $t_0$ the appearance of the computer-generated user interface element at the first time is less than the contribution of one or more portions of the physical environment at any time closer to the first time $t_0$ the appearance of the computer-generated user interface element at the first time.

8. The method of claim 1, wherein the graphical composition is based on the appearance of the one or more portions of the physical environment at a number of different times prior to the first time, and the number of different times is based on an amount of movement of the computer system relative to the physical environment.

9. The method of claim 1, wherein determining the graphical composition includes applying a noise pattern to information captured about the appearance of the one or more portions of the physical environment at the different times.

10. The method of claim 1, wherein, in determining the graphical composition of the one or more portions of the physical environment at the different times, the appearance of the first portion of the physical environment at the second time is offset from the appearance of the second portion of the physical environment at the third time based on a difference between a perspective of the computer system at the second time and a perspective of the computer system at the third time.

11. The method of claim 1, wherein determining the graphical composition of the appearance of the one or more portions of the physical environment at the different times includes blurring views of the physical environment captured by one or more cameras of the computer system.

12. The method of claim 1, wherein the graphical composition is partially translucent.

13. The method of claim 1, wherein determining the graphical composition of the appearance of the one or more portions of the physical environment at the different times includes reducing resolution of information captured about the one or more portions of the physical environment at different times prior to the first time.

14. The method of claim 1, wherein the appearance of the computer-generated user interface element is updated as a viewing perspective of the computer-generated user interface element changes.

15. The method of claim 1, wherein the appearance of the computer-generated user interface element is updated as the computer-generated user interface element is moved.

16. The method of claim 1, wherein the appearance of the computer-generated user interface element is updated based on one or more additional computer-generated user interface elements having simulated positions behind a simulated position of the computer-generated user interface element.

17. The method of claim 16, wherein the appearance of the one or more additional computer-generated user interface elements is updated over time.

18. The method of claim 1, wherein the computer-generated user interface element is a back surface of a displayed user interface that includes one or more selectable user interface objects.

19. The method of claim 1, wherein the appearance of the computer-generated user interface element is based on an appearance of one or more portions of the view of the physical environment on which the computer-generated user interface element is overlaid without regard to a simulated position of the computer-generated user interface element relative to the physical environment.

20. The method of claim 1, wherein a simulated position of the computer-generated user interface element is a first distance from a viewpoint of a user, and the appearance of the computer-generated user interface element is based on an appearance of one or more portions of the physical environment that are a second distance from the viewpoint of the user, wherein the first distance is greater than the second distance.

21. A computer system that is in communication with a display generation component, comprising:
one or more processors; and
memory storing one or more programs, wherein the one or more programs are configured to be executed by the one or more processors, the one or more programs including instructions for:
concurrently displaying, via the display generation component:
a view of a physical environment; and
a computer-generated user interface element overlaid on at least a portion of the view of the physical environment, wherein an appearance of the computer-generated user interface element is based on an appearance of one or more portions of the view of the physical environment on which the computer-generated user interface element is overlaid;
while concurrently displaying the view of the physical environment and the computer-generated user interface element, an appearance of a portion of the physical environment changes; and
in response to the change in appearance of the portion of the physical environment, updating the appearance of the computer-generated user interface element at a first time based on a graphical composition of the appearance of one or more portions of the physical environment at different times prior to the first time, wherein the appearance of the computer-generated user interface element is based on:
an appearance of a first portion of the physical environment at a second time that is before the first time; and
an appearance of a second portion of the physical environment at a third time that is before the second time.

22. The computer system of claim 21, wherein the appearance of the portion of the physical environment changes in response to movement of the computer system relative to the physical environment.

23. The computer system of claim 21, wherein the appearance of the portion of the physical environment changes in response to movement of one or more objects in the physical environment, wherein the one or more objects are distinct from the computer system.

24. The computer system of claim 21, wherein the computer-generated user interface element includes content, and the updating of the appearance of the computer-generated user interface element based on the graphical composition is applied to one or more regions of the computer-generated user interface element distinct from the content of the computer-generated user interface element.

25. The computer system of claim 21, wherein:
the graphical composition is based a first amount on the appearance of the first portion of the physical environment at the second time that is before the first time and based a second amount on the appearance of the second portion of the physical environment at the third time that is before the second time; and
the first amount is different from the second amount.

26. The computer system of claim 25, wherein at the first time, a contribution of one or more portions of the physical environment at a time closer to the first time $t_0$ the appearance of the computer-generated user interface element at the first time is greater than the contribution of one or more portions of the physical environment at a time further from the first time to the appearance of the computer-generated user interface element at the first time.

27. The computer system of claim 26, wherein the contribution of one or more portions of the physical environment at a time furthest from the first time to the appearance of the computer-generated user interface element at the first time is less than the contribution of one or more portions of the physical environment at any time closer to the first time to the appearance of the computer-generated user interface element at the first time.

28. The computer system of claim 21, wherein the graphical composition is based on the appearance of the one or more portions of the physical environment at a number of different times prior to the first time, and the number of different times is based on an amount of movement of the computer system relative to the physical environment.

29. The computer system of claim 21, wherein determining the graphical composition includes applying a noise pattern to information captured about the appearance of the one or more portions of the physical environment at the different times.

30. The computer system of claim 21, wherein, in determining the graphical composition of the one or more portions of the physical environment at the different times, the appearance of the first portion of the physical environment at the second time is offset from the appearance of the second portion of the physical environment at the third time based on a difference between a perspective of the computer system at the second time and a perspective of the computer system at the third time.

31. The computer system of claim 21, wherein determining the graphical composition of the appearance of the one or more portions of the physical environment at the different times includes blurring views of the physical environment captured by one or more cameras of the computer system.

32. The computer system of claim 21, wherein the graphical composition is partially translucent.

33. The computer system of claim 21, wherein determining the graphical composition of the appearance of the one or more portions of the physical environment at the different times includes reducing resolution of information captured about the one or more portions of the physical environment at different times prior to the first time.

34. The computer system of claim 21, wherein the appearance of the computer-generated user interface element is updated as a viewing perspective of the computer-generated user interface element changes.

35. The computer system of claim 21, wherein the appearance of the computer-generated user interface element is updated as the computer-generated user interface element is moved.

36. The computer system of claim 21, wherein the appearance of the computer-generated user interface element is updated based on one or more additional computer-generated user interface elements having simulated positions behind a simulated position of the computer-generated user interface element.

37. The computer system of claim 36, wherein the appearance of the one or more additional computer-generated user interface elements is updated over time.

38. The computer system of claim 21, wherein the computer-generated user interface element is a back surface of a displayed user interface that includes one or more selectable user interface objects.

39. The computer system of claim 21, wherein the appearance of the computer-generated user interface element is based on an appearance of one or more portions of the view of the physical environment on which the computer-generated user interface element is overlaid without regard to a simulated position of the computer-generated user interface element relative to the physical environment.

40. The computer system of claim 21, wherein a simulated position of the computer-generated user interface element is a first distance from a viewpoint of a user, and the appearance of the computer-generated user interface element is based on an appearance of one or more portions of the physical environment that are a second distance from the viewpoint of the user, wherein the first distance is greater than the second distance.

41. A non-transitory computer readable storage medium storing one or more programs, the one or more programs comprising instructions that, when executed by a computer system that is in communication with a display generation component, cause the computer system to:
concurrently display, via the display generation component:
a view of a physical environment; and
a computer-generated user interface element overlaid on at least a portion of the view of the physical environment, wherein an appearance of the computer-generated user interface element is based on an appearance of one or more portions of the view of the physical environment on which the computer-generated user interface element is overlaid;
while concurrently displaying the view of the physical environment and the computer-generated user interface element, an appearance of a portion of the physical environment changes; and
in response to the change in appearance of the portion of the physical environment, updating the appearance of the computer-generated user interface element at a first time based on a graphical composition of the appearance of one or more portions of the physical environment at different times prior to the first time wherein the appearance of the computer-generated user interface element is based on:
an appearance of a first portion of the physical environment at a second time that is before the first time; and
an appearance of a second portion of the physical environment at a third time that is before the second time.

42. The non-transitory computer readable storage medium of claim 41, wherein the appearance of the portion of the physical environment changes in response to movement of the computer system relative to the physical environment.

43. The non-transitory computer readable storage medium of claim 41, wherein the appearance of the portion of the physical environment changes in response to movement of one or more objects in the physical environment, wherein the one or more objects are distinct from the computer system.

44. The non-transitory computer readable storage medium of claim 41, wherein the computer-generated user interface element includes content, and the updating of the appearance of the computer-generated user interface element based on the graphical composition is applied to one or more regions of the computer-generated user interface element distinct from the content of the computer-generated user interface element.

45. The non-transitory computer readable storage medium of claim 41, wherein:
the graphical composition is based a first amount on the appearance of the first portion of the physical environment at the second time that is before the first time and based a second amount on the appearance of the second portion of the physical environment at the third time that is before the second time; and
the first amount is different from the second amount.

46. The non-transitory computer readable storage medium of claim 45, wherein at the first time, a contribution of one or more portions of the physical environment at a time closer to the first time to the appearance of the computer-generated user interface element at the first time is greater than the contribution of one or more portions of the physical environment at a time further from the first time to the appearance of the computer-generated user interface element at the first time.

47. The non-transitory computer readable storage medium of claim 46, wherein the contribution of one or more portions of the physical environment at a time furthest from the first time to the appearance of the computer-generated user interface element at the first time is less than the contribution of one or more portions of the physical environment at any time closer to the first time to the appearance of the computer-generated user interface element at the first time.

48. The non-transitory computer readable storage medium of claim 41, wherein the graphical composition is based on the appearance of the one or more portions of the physical environment at a number of different times prior to the first time, and the number of different times is based on an amount of movement of the computer system relative to the physical environment.

49. The non-transitory computer readable storage medium of claim 41, wherein determining the graphical composition includes applying a noise pattern to information captured about the appearance of the one or more portions of the physical environment at the different times.

50. The non-transitory computer readable storage medium of claim 41, wherein, in determining the graphical composition of the one or more portions of the physical environment at the different times, the appearance of the first portion of the physical environment at the second time is offset from the appearance of the second portion of the physical environment at the third time based on a difference between a perspective of the computer system at the second time and a perspective of the computer system at the third time.

51. The non-transitory computer readable storage medium of claim 41, wherein determining the graphical composition of the appearance of the one or more portions of the physical environment at the different times includes blurring views of the physical environment captured by one or more cameras of the computer system.

52. The non-transitory computer readable storage medium of claim 41, wherein the graphical composition is partially translucent.

53. The non-transitory computer readable storage medium of claim 41, wherein determining the graphical composition of the appearance of the one or more portions of the physical environment at the different times includes reducing resolution of information captured about the one or more portions of the physical environment at different times prior to the first time.

54. The non-transitory computer readable storage medium of claim 41, wherein the appearance of the computer-generated user interface element is updated as a viewing perspective of the computer-generated user interface element changes.

55. The non-transitory computer readable storage medium of claim 41, wherein the appearance of the computer-generated user interface element is updated as the computer-generated user interface element is moved.

56. The non-transitory computer readable storage medium of claim 41, wherein the appearance of the computer-generated user interface element is updated based on one or more additional computer-generated user interface elements having simulated positions behind a simulated position of the computer-generated user interface element.

57. The non-transitory computer readable storage medium of claim 56, wherein the appearance of the one or more additional computer-generated user interface elements is updated over time.

58. The non-transitory computer readable storage medium of claim 41, wherein the computer-generated user interface element is a back surface of a displayed user interface that includes one or more selectable user interface objects.

59. The non-transitory computer readable storage medium of claim 41, wherein the appearance of the computer-generated user interface element is based on an appearance of one or more portions of the view of the physical environment on which the computer-generated user interface element is overlaid without regard to a simulated position of the computer-generated user interface element relative to the physical environment.

60. The non-transitory computer readable storage medium of claim 41, wherein a simulated position of the computer-generated user interface element is a first distance from a viewpoint of a user, and the appearance of the computer-generated user interface element is based on an appearance of one or more portions of the physical environment that are a second distance from the viewpoint of the user, wherein the first distance is greater than the second distance.

* * * * *